US012807249B2

(12) United States Patent
Leblanc et al.

(10) Patent No.: US 12,807,249 B2
(45) Date of Patent: Nov. 24, 2026

(54) ANGULAR CONTROLLING SYSTEM FOR A TRACK SYSTEM, TRACK SYSTEM AND VEHICLE HAVING SAME, AND METHODS FOR PERFORMING ANGULAR CONTROL OF SAME

(71) Applicant: SOUCY INTERNATIONAL INC., Drummondville (CA)

(72) Inventors: Etienne Leblanc, Becancour (CA); Jonathan Frenette-Marcoux, Drummondville (CA); Michael Charrette, St-Felix de Kingsey (CA); Manuel Lemelin, Saint-Hyacinthe (CA); Normand Roy, St-Hugues (CA); Alexandre Gauthier, Drummondville (CA); Martin Portelance, Levis (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 201 days.

(21) Appl. No.: 18/851,414

(22) PCT Filed: Apr. 21, 2023

(86) PCT No.: PCT/CA2023/050549
§ 371 (c)(1),
(2) Date: Sep. 26, 2024

(87) PCT Pub. No.: WO2023/201440
PCT Pub. Date: Oct. 26, 2023

(65) Prior Publication Data
US 2025/0196949 A1 Jun. 19, 2025

Related U.S. Application Data

(60) Provisional application No. 63/333,376, filed on Apr. 21, 2022.

(51) Int. Cl.
*B62D 55/065* (2006.01)
*B60W 10/04* (2006.01)
*B62D 55/10* (2006.01)

(52) U.S. Cl.
CPC .......... *B62D 55/065* (2013.01); *B60W 10/04* (2013.01); *B62D 55/10* (2013.01)

(58) Field of Classification Search
CPC .... B62D 55/065; B62D 55/10; B62D 55/104; B62D 55/24; B62D 55/125; B60W 10/04; B60W 10/00
(Continued)

(56) References Cited

U.S. PATENT DOCUMENTS 5,148,882 A 9/1992 Carra et al.
5,337,846 A 8/1994 Ogaki et al.
(Continued)

FOREIGN PATENT DOCUMENTS

CA 2744681 A1 12/2011
CA 2947575 A1 5/2017
(Continued)

OTHER PUBLICATIONS

English abstract of CN 114954712 retrieved from Espacenet on Jul. 25, 2024.
(Continued)

*Primary Examiner* — Hai H Huynh
(74) *Attorney, Agent, or Firm* — BCF LLP

(57) ABSTRACT

The present technology relates to track systems, vehicles having track systems, systems for controlling angular relationship between track systems and vehicle having said track systems, and computer-implemented methods for performing angular control of said track systems.

20 Claims, 68 Drawing Sheets

(58) Field of Classification Search
USPC ............................ 701/41, 42, 43, 44, 48, 70
See application file for complete search history.

(56) References Cited

U.S. PATENT DOCUMENTS

| | | | |
|---|---|---|---|
| 9,233,723 B1 | 1/2016 | Metzger et al. | |
| 9,757,855 B2 | 9/2017 | Bewley et al. | |
| 10,730,551 B2 | 8/2020 | Borud | |
| 10,864,954 B2 * | 12/2020 | Zuchoski ............. | B62D 55/116 |
| 12,139,216 B2 * | 11/2024 | Poulin .................... | B62D 11/20 |
| 2004/0168837 A1 | 9/2004 | Michaud et al. | |
| 2021/0129927 A1 | 5/2021 | Lussier et al. | |
| 2021/0173399 A1 | 6/2021 | Richard et al. | |
| 2021/0242142 A1 | 8/2021 | Hekmatshoartabari et al. | |
| 2024/0174309 A1 | 5/2024 | Takahashi et al. | |

FOREIGN PATENT DOCUMENTS

| | | | |
|---|---|---|---|
| CN | 104477268 | B | 4/2015 |
| CN | 112109815 | A | 12/2020 |
| CN | 114954712 | B | 8/2022 |
| EP | 4178848 | A1 | 1/2022 |
| EP | 4253205 | A3 | 10/2023 |
| KR | 1020060116452 | | 11/2006 |
| KR | 1020210112046 | | 9/2021 |
| NZ | 203729 | A | 4/1986 |
| WO | 2015079418 | A2 | 6/2015 |
| WO | 2016129139 | A1 | 8/2016 |
| WO | 2019014757 | A1 | 1/2019 |
| WO | 2019046929 | A1 | 3/2019 |
| WO | 2020242342 | A1 | 12/2020 |
| WO | 2021100991 | A1 | 5/2021 |

OTHER PUBLICATIONS

English abstract of CN 112109815 retrieved from Espacenet on Jul. 25, 2024.

English abstract of CN 104477268 retrieved from Espacenet on Jul. 25, 2024.

English abstract of KR 1020210112046 retrieved from WIPO on Jul. 26, 2024.

English abstract of KR 1020060116452 retrieved from WIPO on Jul. 26, 2024.

International Search Report from PCT/CA2023/050549, Jul. 17, 2023, Eric E. Breton.

* cited by examiner

ANGULAR CONTROLLING SYSTEM FOR A TRACK SYSTEM, TRACK SYSTEM AND VEHICLE HAVING SAME, AND METHODS FOR PERFORMING ANGULAR CONTROL OF SAME

TECHNICAL FIELD

The present technology relates to track systems, vehicles having track systems, systems for controlling angular relationship between track systems and vehicle having said track systems, and computer-implemented methods for performing angular control of said track systems.

BACKGROUND

Certain vehicles, such as, for example, vehicles used in agriculture (e.g., harvesters, combines, tractors, etc.) in construction, in forestry, in mining and in powersports, are used on ground surfaces that are soft, slippery and/or uneven (e.g., soil, mud, sand, ice, snow, etc.). In some instances, such vehicles may be equipped with implements used to perform agricultural work (e.g., seeding, spraying, harvesting, etc.) or to perform other works (e.g. plow, trailer, etc.).

Conventionally, such vehicles have had ground engaging assemblies each comprising a wheel mounted with a tire to operate the vehicle along the ground surface. Under certain conditions, such assemblies may have poor traction and stability on some kinds of ground surfaces. Additionally, the tires may compact the ground surface due to a load sustained by the tires being concentrated over a limited ground engaging contact patch area. As an example, when the vehicle is an agricultural vehicle, the tires may compact the soil in such a way as to undesirably inhibit the growth of crops. Furthermore, stability issues due to poor floatation over a ground surface that is uneven or yielding under such pressure may damage the vehicle (e.g., a spray boom extremity colliding with the ground surface or a plow extremity colliding with the ground) or reduce the quality of the work being performed (e.g., uneven spraying of pesticides or uneven scrapping of ground surface). Such stability issues can be equally problematic for recreational vehicles.

In order to reduce the aforementioned drawbacks, it was deemed desirable to increase stability and traction by distributing the weight of the vehicle across a larger ground engaging contact area on the ground surface, and track systems were developed to be used as ground engaging assemblies in place of at least some of the wheels and tires on the vehicles.

The use of track systems in place of wheels and tires, however, does present inherent inconveniences. For example, track systems are typically equipped with anti-rotation devices (e.g., rods) that can assist in limiting preventing the track system from rotating about an axis relative to the vehicle, which can lead to excessive wear, reduced performance and even damage to the vehicle body. Anti-rotation rods are typically connected to the vehicle frame or other support structure. When the track system tries to rotate relative to the vehicle, the anti-rotation rod applies a force that resists the rotation and keeps the track in its intended orientation. Anti-rotation rods can be made of various materials, such as metal or composite materials, and can be designed to be adjustable or fixed in length.

Anti-rotation devices such as rods are generally not configured to be connected to track systems, and generally need to be adapted to the vehicle to which they are connected, making them inconvenient and time-consuming to use. Additionally, these anti-rotation devices can be expensive to replace and/or maintain and require manual adjustment. Therefore, there is a desire to improve on known solutions for ameliorating performance of track systems.

SUMMARY

Developers of the present technology have devised an Angular Control System (ACS) for a track system.

In some embodiments, it is contemplated that the ACS can be provided and or sold as a modular system to be retrofitted onto a track system. In other embodiments, the ACS may be integrated into the corresponding track system during the manufacturing process of the corresponding track system.

Developers have realized that providing a modular ACS, especially when fully self-contained, the ACS may not necessarily require any further connection to a corresponding vehicle, as opposed to conventional anti-rotation devices. In some embodiments, the ACS does not require further mechanical connection to the corresponding vehicle. In some embodiments, the ACS may not require further electrical connection to the corresponding vehicle.

It should be noted that the ACS as contemplated in the context of the present technology, comprises a transmission assembly with a motor mounted to the track system frame, as opposed to a frame of the corresponding vehicle, for example. The ACS comprises a controller unit configured to acquire at least one of (i) data indicative of rotational movement of one or more components of the transmission assembly and (ii) data indicative of angular positions of the vehicle body and/or of the track system. The controller unit may be configured to process the acquired data and determine whether an actual angular position of the track system is to be adjusted relative to the vehicle body. The controller unit may selectively trigger the motor to perform corrective angular movement of the track system relative to the vehicle body.

It should be noted that the ACS may be embodied as an Anti-Rotation System (ARS) for the track system to prevent the track system frame from rotating about an axle of the vehicle, thereby providing "anti-rotation" capabilities to the track system. Developers of the present technology have realized that providing the ARS with the motor mounted to the track system frame may allow correcting the angular position of the track system without necessitating conventional anti-rotation devices (e.g. rods) mechanically connected between the vehicle and the track system.

As it will become apparent from the description herein further below, the ACS may also be used to perform angular control of the corresponding track system for operating the track system in one or more modes for increasing performance of the track system in a variety of operational conditions. The one or more modes may be triggered automatically based on one or more signals acquired by the controller unit and/or in response to a user input.

In some embodiments, the controller unit may be configured to monitor an actual track system vehicle angle (ATSV). Broadly speaking, it is understood that the ATSV is a relative angle between the vehicle and the track system. It should be noted that a given angular position of the track system relative to the vehicle may correspond to a specific relative angle between the vehicle and the track system. The controller unit may be configured to compare the ATSV against a pre-determined track system vehicle angle (PTSV). Broadly speaking, the PTSV is a pre-determined reference value and corresponds to a pre-determined relative angle between the vehicle and the track system. In response to the comparison, the controller unit may selectively trigger the motor to perform a corrective angular movement of the track system. In one non-limiting example, the controller unit may selectively trigger the motor to perform a corrective angular movement of the track system for at least reducing a difference between the ATSV and the PSTV.

In further embodiments, the controller unit may be configured to acquire a plurality of signals indicative of angular positions of one or more components of the vehicle and/or of the track system. The controller unit may be configured to compare values extracted from the plurality of angle-based signals against one or more reference values for determining whether or not to trigger angular movement of the track system frame relative to the vehicle body.

In other embodiments, the controller unit may be configured to monitor an actual speed ratio (ASR). Broadly speaking, the ASR is a speed ratio between an actual rotational speed of a first transmission component of the transmission assembly over an actual rotational speed of a second transmission component of the transmission assembly. The controller unit may be configured to compare the ASR against a pre-determined speed ratio PSR. Broadly speaking, the PSR is a pre-determined reference value and corresponds to a pre-determined speed ratio between rotational speeds of the first and second transmission components, respectively. In response to the comparison, the controller unit may selectively trigger the motor to perform a corrective angular movement of the track system. In one non-limiting example, the controller unit may selectively trigger the motor to perform a corrective angular movement of the track system for at least reducing a difference between the ASR and the PSR.

In additional embodiments, the controller unit may be configured to acquire a plurality of signals indicative of rotational movement of one or more components of the vehicle and/or of the track system. The controller unit may be configured to compare values extracted from the plurality of rotation-based signals against one or more reference values for determining whether or not to trigger angular movement of the track system frame relative to the vehicle body.

In some embodiments, the motor of the ACS may be co-axial with the drive wheel of the track system, which can, inter alia, assist in reducing the number of parts. The motor can be configured to adjust an orientation of the track system relative to the vehicle to which it is connected by applying a corrective torque. In other embodiments, the motor can be configured to drive the drive wheel. In other embodiments, there could be two motors: one motor for driving the drive wheel and one motor for adjusting the orientation of the track system relative to the vehicle.

According to one aspect, the present technology relates to an angular controlling system for a track system for a vehicle, the track system comprising a track system frame and a wheel assembly rotationally coupled to the track system frame, the vehicle comprising a vehicle frame. The angular controlling system comprises a motor mounted to the track system frame, the motor being operatively coupled to the wheel assembly, the vehicle frame being at a vehicle angle relative to a ground surface. The track system frame being at a track system angle relative to the ground surface and the track system frame being at a pre-determined track system-vehicle angle (PTSV) relative to the vehicle frame when the vehicle is static, the track system frame being at an actual track system-vehicle angle (ATSV) relative to the vehicle frame when the vehicle is in use. The track system comprising a controller assembly including: an angular monitoring device configured for monitoring the ATSV; and a controller unit configured to perform an operation to the motor based on a comparison between the ATSV and the PTSV.

According to one aspect, the present technology relates to a track system for a vehicle, the vehicle comprising a vehicle frame. The track system comprising: a track system frame defining a longitudinal center plane of the track system; a wheel assembly rotationally connected to the frame; and an endless track surrounding the track system frame and the wheel assembly.

According to one aspect, the present technology relates to a vehicle, comprising: a vehicle frame; a seat disposed on the vehicle frame; a steering system operatively connected to the vehicle frame; a vehicle motor; and a track system operatively connected to the vehicle motor for driving the track system. The track system including: a track system frame defining a longitudinal center plane of the track system; a wheel assembly rotationally connected to the frame; an endless track surrounding the track system frame and the wheel assembly; an angular control system. The angular control system including: a motor mounted to the track system frame instead of the vehicle frame, the motor being operatively coupled to the wheel assembly, the vehicle frame being at a vehicle angle relative to a ground surface; the track system frame being at a track system angle relative to the ground surface; the track system frame being at a pre-determined track system-vehicle angle (PTSV) relative to the vehicle frame when the vehicle is static, the track system frame being at an actual track system-vehicle angle (ATSV) relative to the vehicle frame when the vehicle is in operation; a controller assembly including: an angular monitoring device configured for monitoring the ATSV; and a controller unit configured to perform an operation to the motor based on a comparison between the ATSV and the PTSV.

According to one aspect, the present technology relates to a method for controlling an inclination of a track system relative to a vehicle, the track system comprising a track system frame, the vehicle comprising a vehicle frame, the method being executable by a controller unit. The method comprising: i) acquiring, by the controller unit, a first signal indicative of a vehicle angle of the vehicle frame when the vehicle is in use; ii) acquiring, by the controller, a second signal indicative of a track system angle of the track system frame when the vehicle is in use; iii) determining, by the controller, an actual track system-vehicle angle (ATSV) between the vehicle frame and the track system frame based on a combination of the first signal and the second signal; and iv) generating, by the controller unit, a comparison value between a pre-determined track system-vehicle angle (PTSV) and the ATSV, triggering, by the controller unit based on the comparison value, a motor to perform a correcting movement on the track system frame relative to the vehicle frame. The PTSV being based on a combination of the first signal and the second signal when the vehicle is static.

According to one aspect, the present technology relates to an angular controlling system for a track system for a vehicle, the track system comprising a track system frame and a wheel assembly rotationally coupled to the track system frame, the vehicle comprising a vehicle frame. The angular controlling system comprising: a transmission assembly including: a motor mounted to the track system frame; a first transmission part being operatively coupled to the wheel assembly and defining a first rotational speed; a second transmission part being operatively coupled to the motor and defining a second rotational speed; the first and second transmission parts being drivingly engaged with each other, the first rotational speed and the second rotational speed defining a predetermined speed ratio (PSR) when the vehicle is static, the first rotational speed and the second rotation speed defining an actual speed ratio (ASR) when the vehicle is in use. The angular controlling system also comprising a controller assembly including: a rotational speed monitoring device configured for monitoring the ASR; and a controller unit configured to perform an operation to the motor based on a comparison between the PSR and the ASR.

According to one aspect, the present technology relates to a track system for a vehicle, the vehicle comprising a vehicle frame, the track system comprising: a track system frame defining a longitudinal center plane of the track system; a wheel assembly rotationally connected to the frame; an endless track surrounding the track system frame and the wheel assembly; the angular controlling system as defined herein.

According to one aspect, the present technology relates to a vehicle, comprising: a vehicle frame; a seat disposed on the vehicle frame; a steering system operatively connected to the vehicle frame; a vehicle motor; and a track system operatively connected to the vehicle motor for driving the track system, the track system including: a track system frame defining a longitudinal center plane of the track system; a wheel assembly rotationally connected to the frame; an endless track surrounding the track system frame and the wheel assembly; an angular control system including: a transmission assembly having: an other motor mounted to the track system frame instead of the vehicle frame; a first transmission part being operatively coupled to the wheel assembly and defining a first rotational speed; a second transmission part being operatively coupled to the other motor and defining a second rotational speed; the first and second transmission parts being drivingly engaged with each other, the first rotational speed and the second rotational speed defining a pre-determined speed ratio (PSR) when the vehicle is static, the first rotational speed and the second rotation speed defining an actual speed ratio (ASR) when the vehicle is in operation; and a controller assembly. The controller assembly including: a rotational speed monitoring device configured for monitoring the ASR; and a controller unit configured to perform an operation to the other motor based on a comparison between the PSR and the ASR.

According to one aspect, the present technology relates to a method for controlling an inclination of a track system relative to a vehicle, the track system including a transmission assembly, the method being executable by a controller unit, the method comprising: i) acquiring, by the controller unit, a first signal indicative of a first rotational speed of a first rotational component of the transmission assembly when the vehicle is in operation; ii) acquiring, by the controller, a second signal indicative of a second rotational speed of a second rotational component of the transmission assembly when the vehicle is in operation; iii) generating, by the controller, an actual speed ratio (ASR) between the first rotational component and the second rotational component based on a combination of the first signal and the second signal; iv) generating, by the controller, a comparison value between a pre-determined speed ratio (PSR) and the ASR, the PSR being based on a combination of the first signal and the second signal when the vehicle is static; triggering, by the controller based on the comparison value, a motor of the transmission assembly to further drive at least one of the first rotational component and the second rotational component, thereby generating a correcting angular movement of the track system relative to the vehicle.

According to one aspect, the present technology relates to a track system connectable to a vehicle, the track system comprising: a frame; a drive wheel rotationally connected to the frame assembly and operatively connectable to a shaft of the vehicle, the drive wheel being rotatable about a drive wheel axis; an electric motor co-axial with the drive wheel axis. The electric motor comprising: a first electromechanical part fixedly connected to the frame; a second electromechanical part operatively connected to the first electromechanical part, and operatively connected to the drive wheel; a power unit for powering the electric motor; and in response to the electric motor being operated, the first electromechanical part rotates relative to the second electromechanical part about the drive wheel axis, causing the frame assembly to move from a first position to a second position. The track system further comprising an endless track drivingly engaged with the drive wheel, and the endless track surrounding the frame assembly and the drive wheel.

According to one aspect, the present technology relates to a track system track system connectable to a vehicle, the track system comprising: a frame assembly; a drive wheel rotationally connected to the frame assembly and operatively connectable to a shaft of the vehicle, the drive wheel being rotatable about a drive wheel axis; an electric motor comprising: a first electromechanical part; and a second electromechanical part operatively connected to the first electromechanical part, and operatively connected to the drive wheel; in response to the electric motor being operated, the second electromechanical parts rotates about the drive wheel axis, causing rotation of the drive wheel; and an endless track in driving engagement with the drive wheel, and the endless track surrounding the frame assembly and the drive wheel.

According to one aspect, the present technology relates to a computer-implemented method of controlling angular movement of a track system, the track system comprising a frame, the track system being operatively connected to a vehicle, the method being executable by a processor, the method comprising: i) determining, by the processor, based on a first signal that an actual angular position of the track system is to be changed to a second angular position, the track system in the second angular position having a different contact patch on a ground surface than when in the actual angular position; and ii) sending, by the processor, a second signal to a motor for performing a corrective angular movement of the track system, the motor being mounted to the frame, the corrective movement for changing the actual angular position of the track system to the second angular position.

According to one aspect, the present technology relates to a processor for controlling angular movement of a track system, the track system comprising a frame, the track system being operatively connected to a vehicle, the processor being configured to: determine based on a first signal that an actual angular position of the track system is to be changed to a second angular position, the track system in the second angular position having a different contact patch on a ground surface than when in the actual angular position; and send a second signal to a motor for performing a corrective angular movement of the track system, the motor being mounted to the frame, the corrective movement for changing the actual angular position of the track system to the second angular position.

According to one aspect, the present technology relates to a computer-implemented method of controlling angular movement of a track system, the track system comprising a frame, the track system being operatively connected to a vehicle, the method being executable by a processor, the method comprising: i) determining, by the processor, based on a first signal that an actual angular position of the track system is to be changed to a second angular position, the track system in the second angular position having a different approach angle than when in the actual angular position; and ii) sending, by the processor, a second signal to a motor for performing a corrective angular movement of the track system, the motor being mounted to the frame, the corrective movement for changing the actual angular position of the track system to the second angular position.

According to one aspect, the present technology relates to a processor for controlling angular movement of a track system, the track system comprising a frame, the track system being operatively connected to a vehicle, the processor being configured to: i) determine based on a first signal that an actual angular position of the track system is to be changed to a second angular position, the track system in the second angular position having a different approach angle than when in the actual angular position; and ii) send a second signal to a motor for performing a corrective angular movement of the track system, the motor being mounted to the frame, the corrective movement for changing the actual angular position of the track system to the second angular position.

According to one aspect, the present technology relates to a computer-implemented method of controlling angular movement of a track system, the track system comprising a frame, the track system being operatively connected to a vehicle, the method being executable by a processor, the method comprising: in response to a difference between an actual track system-vehicle angle (ATSV) and a pre-determined track system-vehicle angle (PTSV) being greater than a pre-determined angular threshold value (ATV): sending, by the processor, a first signal to a motor for performing a corrective angular movement of the track system, the motor being mounted to the frame; acquiring, by the processor, a second signal indicative of an actual acceleration of the vehicle; in response to a comparison between the actual acceleration and a pre-determined acceleration threshold: updating, by the processor, at least one of the PTSV and the ATV.

According to one aspect, the present technology relates to a processor for controlling angular movement of a track system, the track system comprising a frame, the track system being operatively connected to a vehicle, the processor being configured to: in response to a difference between an actual track system-vehicle angle (ATSV) and a pre-determined track system-vehicle angle (PTSV) being greater than a pre-determined angular threshold value (ATV): send a first signal to a motor for performing a corrective angular movement of the track system, the motor being mounted to the frame; acquire a second signal indicative of an actual acceleration of the vehicle; in response to a comparison between the actual acceleration and a pre-determined acceleration threshold: update at least one of the PTSV and the ATV.

According to one aspect, the present technology relates to a computer-implemented method of controlling an angular position of a track system, the track system comprising a frame, the track system being operatively connected to a vehicle, the method being executable by a processor, the method comprising: in response to a difference between an actual track system-vehicle angle (ATSV) and a pre-determined track system-vehicle angle (PTSV) being greater than a pre-determined angular threshold value (ATV): sending, by the processor, a first signal to a motor for performing a corrective angular movement of the track system, the motor being mounted to the frame; acquiring, by the processor, a second signal indicative of an actual angular position of the vehicle; in response to a comparison between a pre-determined angular position of the vehicle and the actual angular position of the vehicle: updating, by the processor, the ATV so that an updated ATV is greater than the ATV.

According to one aspect, the present technology relates to a processor for controlling angular movement of a track system, the track system comprising a frame, the track system being operatively connected to a vehicle, the processor being configured to: in response to a difference between an actual track system-vehicle angle (ATSV) and a pre-determined track system-vehicle angle (PTSV) being greater than a pre-determined angular threshold value (ATV): send a first signal to a motor for performing a corrective angular movement of the track system, the motor being mounted to the frame; acquire a second signal indicative of an actual angular position of the vehicle; in response to a comparison between a pre-determined angular position of the vehicle and the actual angular position of the vehicle: update the ATV so that an updated ATV is greater than the ATV.

According to one aspect, the present technology relates to a computer-implemented method of controlling angular movement of a track system, the track system comprising a frame and a wheel assembly rotationally connected to the frame, the wheel assembly being operatively connected to a vehicle, the method being executable by a processor, the method comprising: acquiring, by the processor, a first signal indicative of a rotational speed of a transmission assembly, the transmission assembly operatively connecting a motor mounted to the frame with the wheel assembly; acquiring, by the processor, a second signal indicative of a linear speed of the vehicle; determining, by the processor, based on the first signal and the second signal that an actual angular position of the track system is to be changed to a second angular position, the track system in the second angular position having a different approach angle than when in the actual angular position; sending, by the processor, a third signal to the motor for performing a corrective angular movement of the track system using the transmission assembly, the corrective movement for changing the actual angular position of the track system to the second angular position.

According to one aspect, the present technology relates to a processor for controlling angular movement of a track system, the track system comprising a frame and a wheel assembly rotationally connected to the frame, the wheel assembly being operatively connected to a vehicle, the processor being configured to: acquire a first signal indicative of a rotational speed of a transmission assembly, the transmission assembly operatively connecting a motor mounted to the frame with the wheel assembly; acquire a second signal indicative of a linear speed of the vehicle; determine based on the first signal and the second signal that an actual angular position of the track system is to be changed to a second angular position, the track system in the second angular position having a different approach angle than when in the actual angular position; send a third signal to the motor for performing a corrective angular movement of the track system using the transmission assembly, the corrective movement for changing the actual angular position of the track system to the second angular position.

According to one aspect, the present technology relates to a computer-implemented method of controlling angular movement of a track system, the track system comprising a frame, the track system being operatively connected to the vehicle, the method being executable by a processor, the method comprising: acquiring, by the processor, a first signal indicative of at least one of an actual pitch and an actual roll of the track system; acquiring, by the processor, a second signal indicative of at least one of an actual pitch and an actual roll of the vehicle; in response to at least one of (i) a difference between the actual pitch of the track system and the actual pitch of the vehicle, and (ii) a difference between the actual roll of the track system and the actual roll of the vehicle, being greater than at least one of (i) a pre-determined pitch threshold and (ii) a pre-determined roll threshold: determining, by the processor, that an actual angular position of the track system is to be changed to a second angular position, the track system in the second angular position having a different approach angle than when in the actual angular position; sending, by the processor, a third signal to a motor for performing a corrective angular movement of the track system, the motor being mounted to the frame, the corrective movement for changing the actual angular position of the track system to the second angular position.

According to one aspect, the present technology relates to a processor for controlling angular movement of a track system, the track system comprising a frame, the track system being operatively connected to the vehicle, the processor being configured to: acquire a first signal indicative of at least one of an actual pitch and an actual roll of the track system; acquire a second signal indicative of at least one of an actual pitch and an actual roll of the vehicle; in response to at least one of (i) a difference between the actual pitch of the track system and the actual pitch of the vehicle, and (ii) a difference between the actual roll of the track system and the actual roll of the vehicle, being greater than at least one of (i) a pre-determined pitch threshold and (ii) a pre-determined roll threshold: determine that an actual angular position of the track system is to be changed to a second angular position, the track system in the second angular position having a different approach angle than when in the actual angular position; send a third signal to a motor for performing a corrective angular movement of the track system, the motor being mounted to the frame, the corrective movement for changing the actual angular position of the track system to the second angular position.

According to one aspect, the present technology relates to a computer-implemented method of controlling angular movement of a track system, the track system comprising a frame, the track system being operatively connected to the vehicle, the method being executable by a processor, the method comprising: acquiring, by the processor, a first signal indicative of a torque of a motor mounted to the frame; acquiring, by the processor, a second signal indicative of a torque of an other motor mounted to an other frame of an other track system, the other track system being operatively connected to the vehicle; in response to a difference between the torque of the motor and the torque of the other motor being above a pre-determined torque threshold: determining, by the processor, that an actual angular position of the track system is to be changed to a second angular position, the track system in the second angular position having a different approach angle than when in the actual angular position; sending, by the processor, a third signal to the motor for performing a corrective angular movement of the track system, the corrective movement for changing the actual angular position of the track system to the second angular position.

According to one aspect, the present technology relates to a processor for controlling angular movement of a track system, the track system comprising a frame, the track system being operatively connected to the vehicle, the method being executable by a processor, the method comprising: acquire a first signal indicative of a torque of a motor mounted to the frame; acquire a second signal indicative of a torque of an other motor mounted to an other frame of an other track system, the other track system being operatively connected to the vehicle; in response to a difference between the torque of the motor and the torque of the other motor being above a pre-determined torque threshold: determine that an actual angular position of the track system is to be changed to a second angular position, the track system in the second angular position having a different approach angle than when in the actual angular position; send a third signal to the motor for performing a corrective angular movement of the track system, the corrective movement for changing the actual angular position of the track system to the second angular position.

According to one aspect, the present technology relates to an angular controlling system for a track system for a vehicle, the angular controlling system comprising: a transmission assembly including: a motor mounted to a frame of the track system, a first transmission part being operatively coupled to a wheel of the track system and defining a first rotational speed, a second transmission part being operatively coupled to the motor and defining a second rotational speed, the first and second transmission parts being drivingly engaged with each other and defining a pre-determined speed ratio when the vehicle is static; and a controller assembly. The controller assembly including: an angular monitoring device configured for monitoring a vehicle angle and a track system angle relative to the vehicle angle, a controller unit configured to perform an operation to the motor based on the track system angle.

According to one aspect, the present technology relates to an angular controlling system for a track system for a vehicle, the angular controlling system comprising: a motor mounted to a frame of the track system and operatively connected to a wheel of the track system, the wheel defining a first rotational speed and the motor defining a second rotational speed; the first and second rotational speeds defining a pre-determined speed ratio when the vehicle is static; and a controller assembly. The controller assembly including: an angular monitoring device configured for monitoring a vehicle angle and a track system angle relative to the vehicle angle, and a controller unit configured to perform an operation to the motor based on the track system angle.

According to one aspect, the present technology relates to a track system operatively connectable to a vehicle, the track system comprising: a frame; a drive wheel rotatably connected to the frame and operatively connected to an axle of the vehicle; at least one support wheel rotatably connected to the frame; an endless track surrounding the frame, the drive wheel, the at least one support wheel; and an angular controlling system as defined herein.

According to one aspect, the present technology relates to a vehicle having at least one track system as defined herein.

According to one aspect, the present technology relates to a method for controlling an inclination of a track system relative to a vehicle, the track system including a wheel and a motor mounted on the track system and drivingly engaged with the wheel, the method comprising: comparing a first input and a second input to a reference value; generating a correcting angular movement of the track system relative to the vehicle, selectively modifying the rotational speed of the motor to create a correcting angular movement of the track system relative to the vehicle.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

Figure 1:
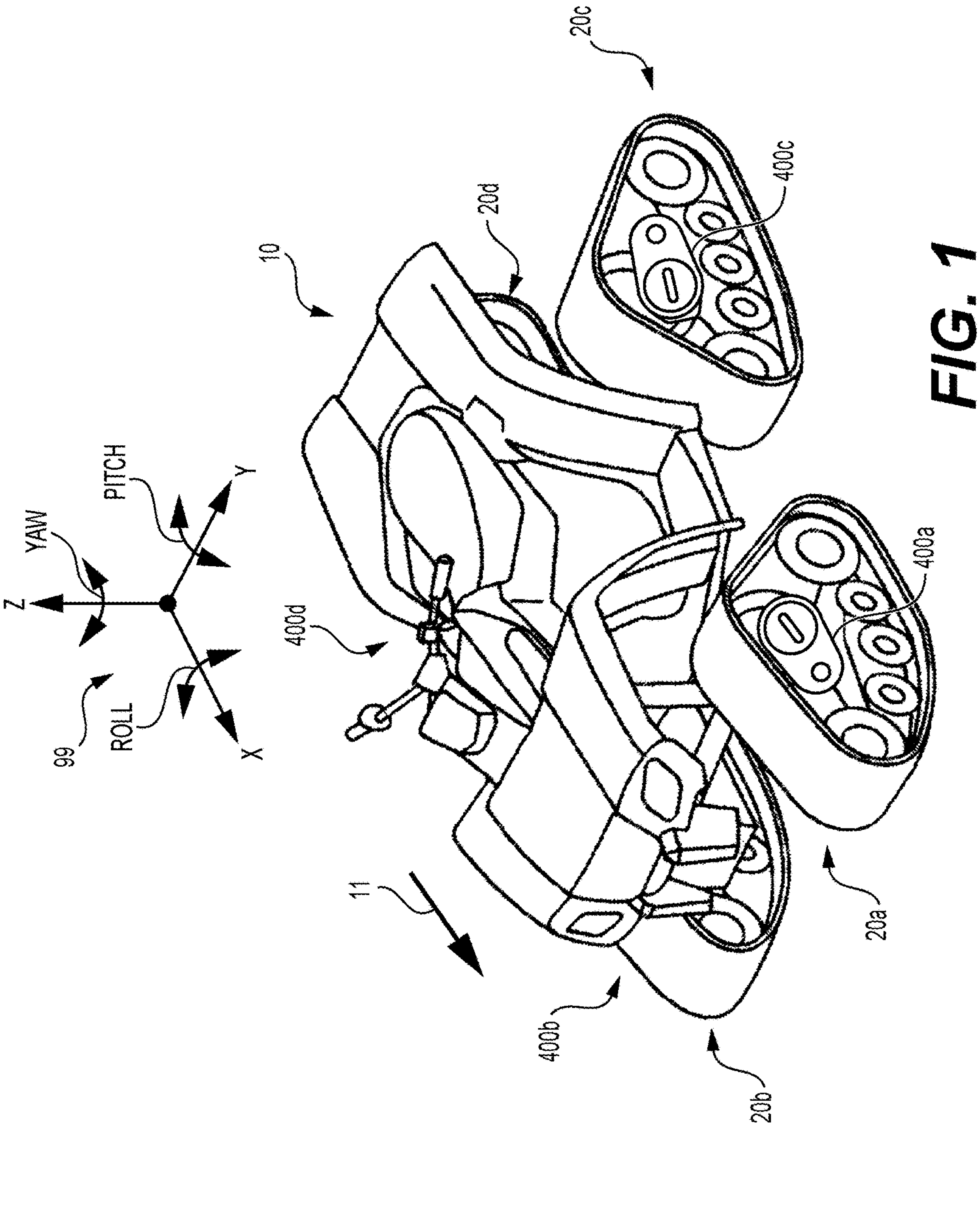
FIG. 1 is a perspective schematic view taken from a front, top, left side of a vehicle having track systems each having an Angular Control System (ACS) according to embodiments of the present technology.

The description of the present technology, which relates to various embodiments of an Angular Control System (ACS) for a track system, is intended to be a description of illustrative examples of the present technology.

It is to be expressly understood that the various embodiments of the angular controlling system are merely embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to apparatus may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the apparatus may provide in certain aspects a simple embodiment of the present technology, and that where such is the case it has been presented in this manner as an aid to understanding. As persons skilled in the art would understand, various embodiments of the present technology may be of a greater complexity than what is described herein.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

For purposes of the present application, terms related to spatial orientation when referring to a track system and components in relation to the track system, such as "vertical", "horizontal", "forwardly", "rearwardly", "left", "right", "above" and "below", are as they would be understood by a driver of a vehicle to which the track system is connected sitting thereon in an upright driving position, with the vehicle steered straight-ahead and being at rest on flat, level ground.

Generally speaking, the present technology relates to ACS for a track system and various features thereof such as, but not limited to, motorized components, mechanical and electrical connections, angular and velocity monitoring devices, data transmission and processing, housing, etc. configured to automatically and/or manually control an angular relationship between a track system and a vehicle body of a vehicle having said track system in accordance with different operating cases in order to provide optimal performances.

Off-Road Vehicle

With reference to FIG. 1, there is depicted a vehicle 10 in accordance with one non-limiting embodiment of the present technology. The forward direction of the vehicle 10 is indicated by arrow 11. In this embodiment, the vehicle 10 is an off-road vehicle 10. More precisely, the vehicle 10 is a powersports vehicle 10. It is contemplated that in other embodiments, the off-road vehicle 10 could be another type of vehicle such as an all-terrain vehicle, a side-by-side vehicle or a utility-task vehicle.

A person skilled in the art will understand that it is also contemplated that some aspects of the present technology in whole or in part could be applied to other types of vehicles such as, for example, agricultural vehicles, industrial vehicles, military vehicles or exploratory vehicles for examples. The vehicle 10 has four track systems 20*a*, 20*b*, 20*c*, 20*d* in accordance with embodiments of the present technology. The track systems 20*a*, 20*b* are front track systems, and the track systems 20*c*, 20*d* are rear track systems. In some embodiments, the vehicle 10 could have more or less than four track systems.

Figure 4A:
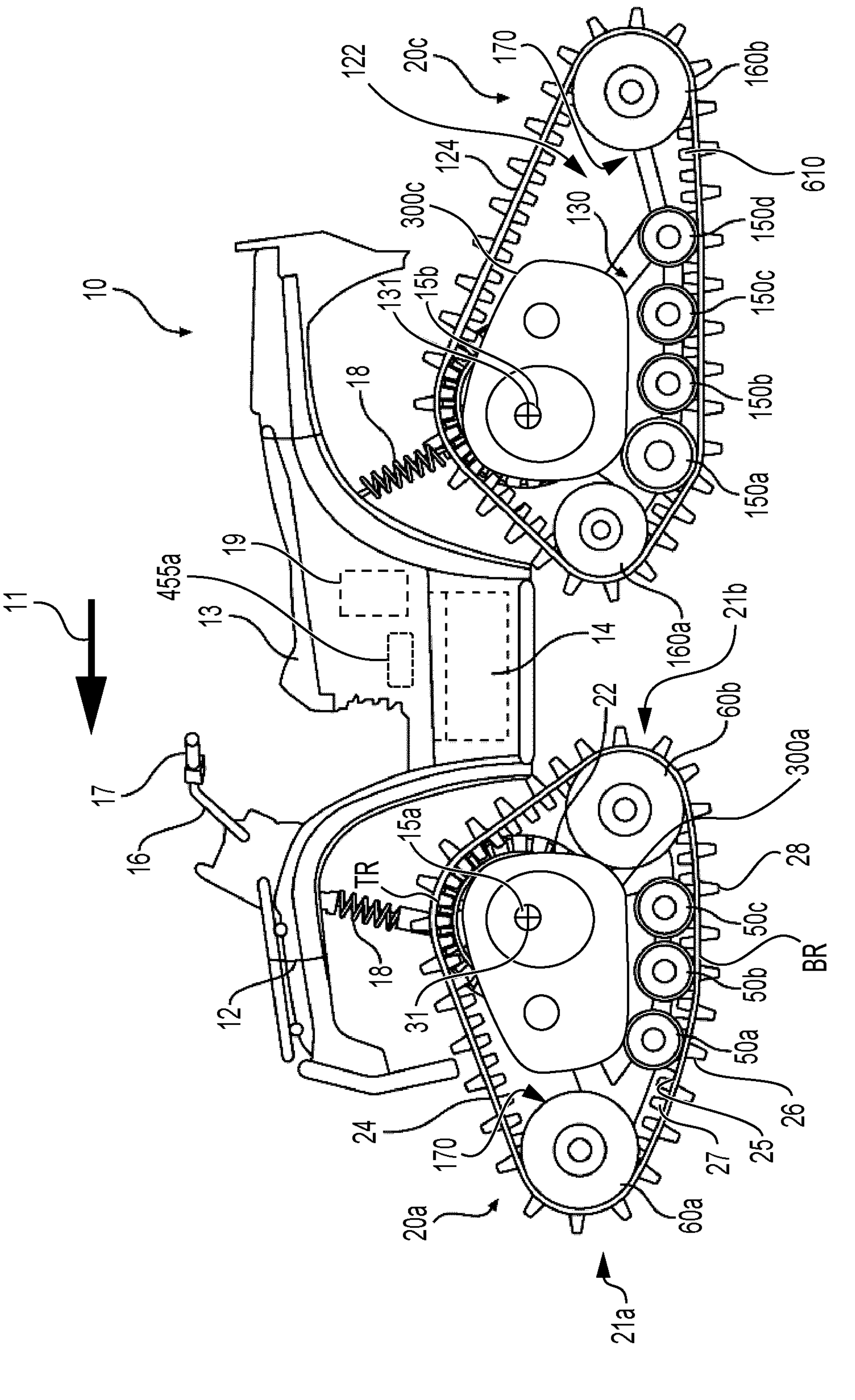
FIG. 4A is a left side elevation view of the vehicle of FIG. 1.

Referring to FIG. 4A, the vehicle 10 includes a frame 12, a straddle seat 13 disposed on the frame 12, a powertrain 14 (shown schematically), a steering system 16, a suspension system 18, and the four track systems 20*a*, 20*b*, 20*c*, 20*d*. As will be described below, in various embodiments, the track systems 20*a*, 20*b*, 20*c*, 20*d* may have various features to enhance their traction and/or other aspects of their use and/or performance, such as, for example, features to ameliorate their maneuverability, to better adapt to ground, and/or to improve overall ride quality.

The powertrain 14, which is supported by the frame 12, is configured to generate power and transmit said power to at least one of the track systems 20*a*, 20*b*, 20*c*, 20*d* via driving axles (not shown), thereby driving the vehicle 10. More precisely, the front track systems 20*a*, 20*b* are operatively connected to a front axle 15*a* and, the rear track systems 20*c*, 20*d* are operatively connected to a rear axle 15*b*. It is contemplated that in some embodiments, the powertrain 14 could be configured to provide its motive power to both the front and the rear axles 15*a*, 15*b*, to only the front axle 15*a* or to only the rear axle 15*b* (i.e., in some embodiments, the front axle and/or rear axle could be a driving axle).

The steering system 16 is configured to enable an operator of the vehicle 10 to steer the vehicle 10. To this end, the steering system 16 includes a handlebar 17 that is operable by the operator to direct the vehicle 10 along a desired course. In other embodiments, the handlebar 17 could be replaced by another steering device such as, for instance, a steering wheel. The steering system 16 is configured so that in response to the operator handling the handlebar 17, the front track systems 20*a*, 20*b* to change their orientation relative to the frame 12, thereby causing the vehicle 10 to turn in a desired direction.

The suspension system 18, which is connected between the frame 12 and the track systems 20*a*, 20*b*, 20*c*, 20*d*, allows relative motion between the frame 12 and the track systems 20*a*, 20*b*, 20*c*, 20*d*, and can enhance handling of the vehicle 10 by absorbing shocks and helping to maintain adequate traction between the track systems 20*a*, 20*b*, 20*c*, 20*d* and the ground.

The track systems 20*a*, 20*b*, 20*c*, 20*d* of the vehicle 10 are equipped with respective ACSs 400*a*, 400*b*, 400*c*, 400*d*. Broadly, the ACS 400 is a system configured to control an angular relationship between a corresponding track system 20 and the vehicle 10 during operation, and comprises inter alia a respective motor mounted onto a frame of the corresponding track system 20. Various components of the ACS 400 will be described in greater details herein further below.

Harvesting Vehicle

Figure 2A:
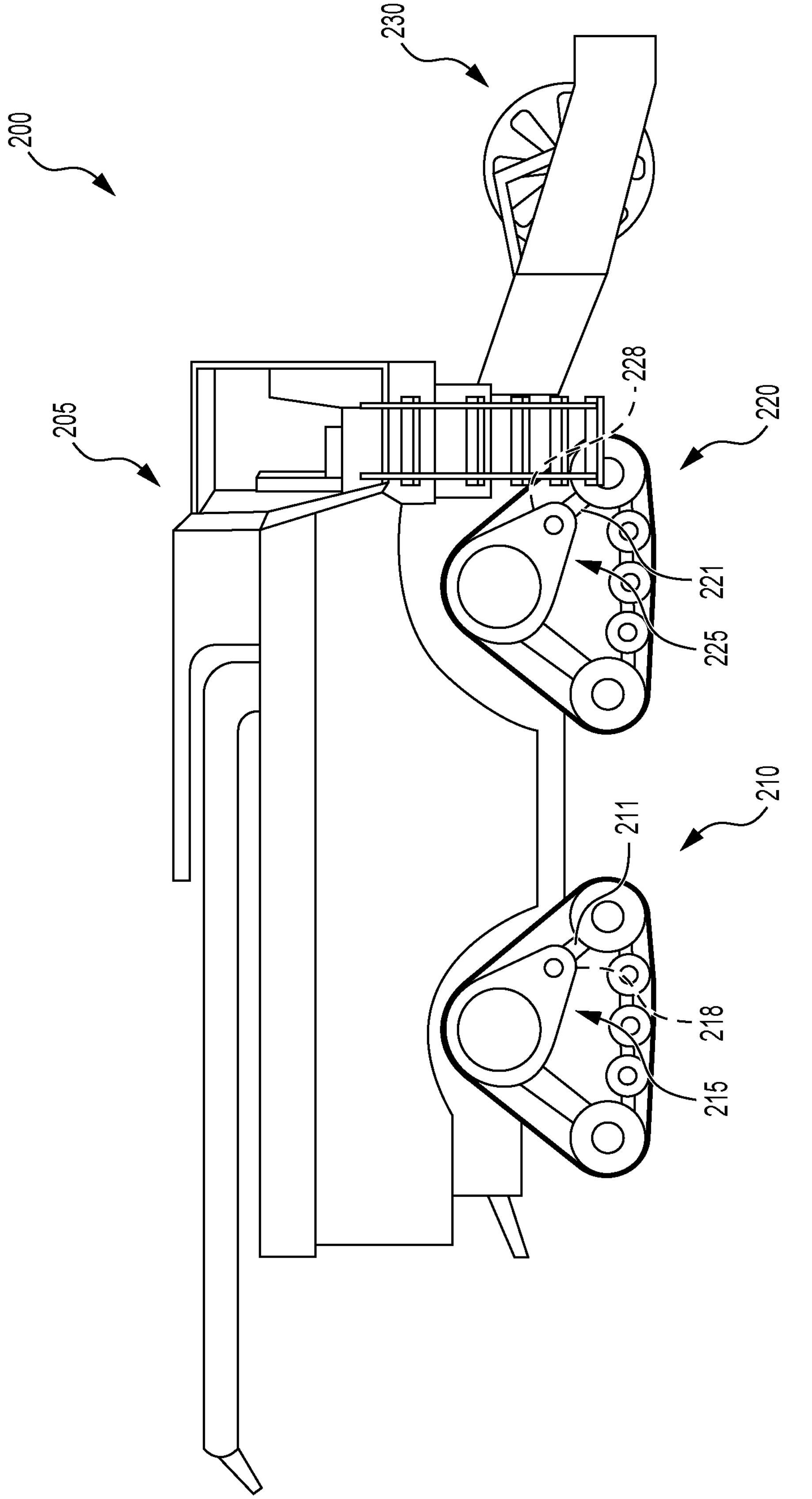
FIG. 2A is a right side elevation view of a harvesting vehicle with track systems each having an ACS according to embodiments of the present technology.

With reference to FIG. 2A, there is depicted a harvesting vehicle 200 in accordance with one non-limiting embodiment of the present technology. The harvesting vehicle has a vehicle body 205 with a front track system 220 and rear track system 210. Broadly, the harvesting vehicle 200 is a type of vehicle designed for harvesting crops in agricultural settings. Examples of harvesting vehicles comprise combine harvesters, potato harvesters, grape harvesters, and the like. The vehicle 200 comprises a harvesting mechanism 230 that can be adjusted to suit different crop types and conditions. The harvesting mechanism 230 typically includes cutting and threshing components that are used to separate the grain or other crop product from the stalk or other plant material. The harvested crop is then collected and stored within the vehicle body 205 for transport or further processing. Though a harvesting vehicle 200 is shown, it is understood that embodiments of the present technology could be used with other heavy vehicles such as tractors or light vehicles such as autonomous robotic vehicles.

The front track system 220 is equipped with an ACS 225 comprising inter alia a motor 228 mounted onto a frame 221 of the front track system 220. Similarly, the rear track system 210 is equipped with an ACS 215 comprising inter alia a motor 218 mounted onto a frame 211 of the rear track system 210. Broadly, the ACS 225 is a system configured to control an angular relationship between the front track system 220 and the vehicle body 205 during operation. Similarly, the ACS 215 is a system configured to control an angular relationship between the rear track system 210 and the vehicle body 205 during operation. Other components of the front track system 220, the rear track system 210, the ACS 215, and the ACS 225 will not be discussed in greater detail for sake of brevity.

It should be noted that the total weight, and weight distribution of the harvesting vehicle 200 may vary as harvested material is collected and stored within the vehicle body 205. As it will be described in greater detail herein below, in some embodiments, the ACS 215 and 225 may be configured to dynamically adjust their own operation as the total weight or the weight distribution of the harvesting vehicle 200 changes.

Articulated Vehicle

Figure 2B:
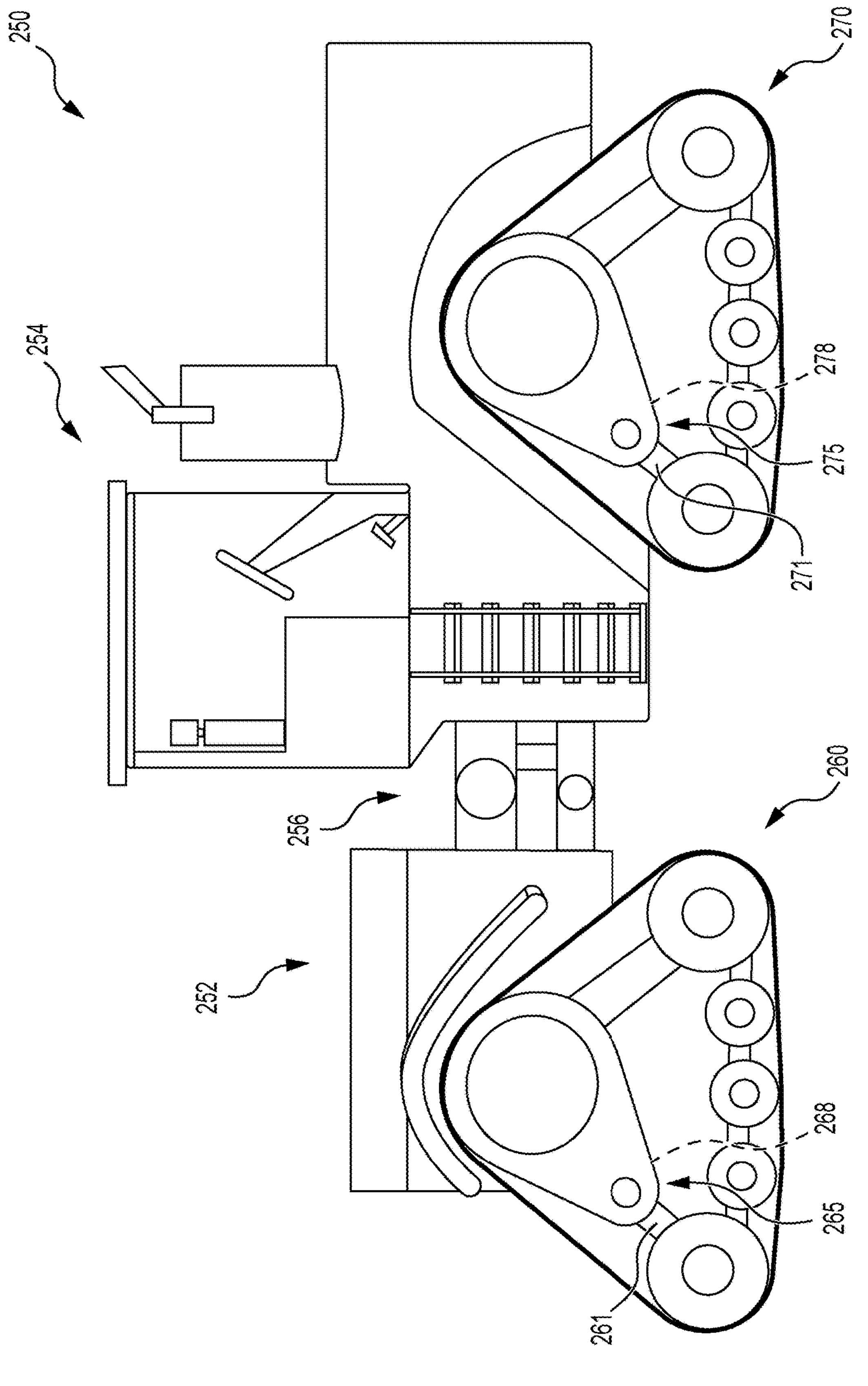
FIG. 2B is a right side elevation view of an articulated vehicle with track systems each having an ACS according to embodiments of the present technology.

With reference to FIG. 2B, there is depicted an articulated vehicle 250 in accordance with one non-limiting embodiment of the present technology. The articulated vehicle 250 has a front vehicle body 254 with a front track system 270 and a rear vehicle body 252 with a rear track system 260. Broadly, the articulated vehicle 250 is a type of vehicle that is comprised of two or more separate units connected by a hinge or other articulating mechanism, such as an articulating mechanism 256. The articulating mechanism 256 allows the front vehicle body 254 and the rear vehicle body 252 to move relative to one another during operation, making the vehicle more maneuverable and adaptable to different operational conditions. Articulated vehicles are commonly used in agricultural, military, and transportation and shipping industries, as they allow for the transport of larger and heavier loads than single-bodied vehicles.

The front track system 270 is equipped with an ACS 275 comprising inter alia a motor 278 mounted onto a frame 271 of the front track system 270. Similarly, the rear track system 260 is equipped with an ACS 265 comprising inter alia a motor 268 mounted onto a frame 261 of the rear track system 260. Broadly, the ACS 275 is a system configured to control an angular relationship between the front track system 270 and the front vehicle body 254 during operation. Similarly, the ACS 265 is a system configured to control an angular relationship between the rear track system 260 and the rear vehicle body 252 during operation. Other components of the front track system 270, the rear track system 260, the ACS 275, and the ACS 265 will not be discussed in greater detail for sake of brevity.

It should be noted that an orientation of the front vehicle body 254 may be different from an orientation of the rear vehicle body 256. As it will be described in greater detail below, the ACS 275 and the ACS 265 may be configured to dynamically adjust their own operation based on different orientations of the front vehicle body 254 and the rear vehicle body 252.

ACS—General

Figure 3:
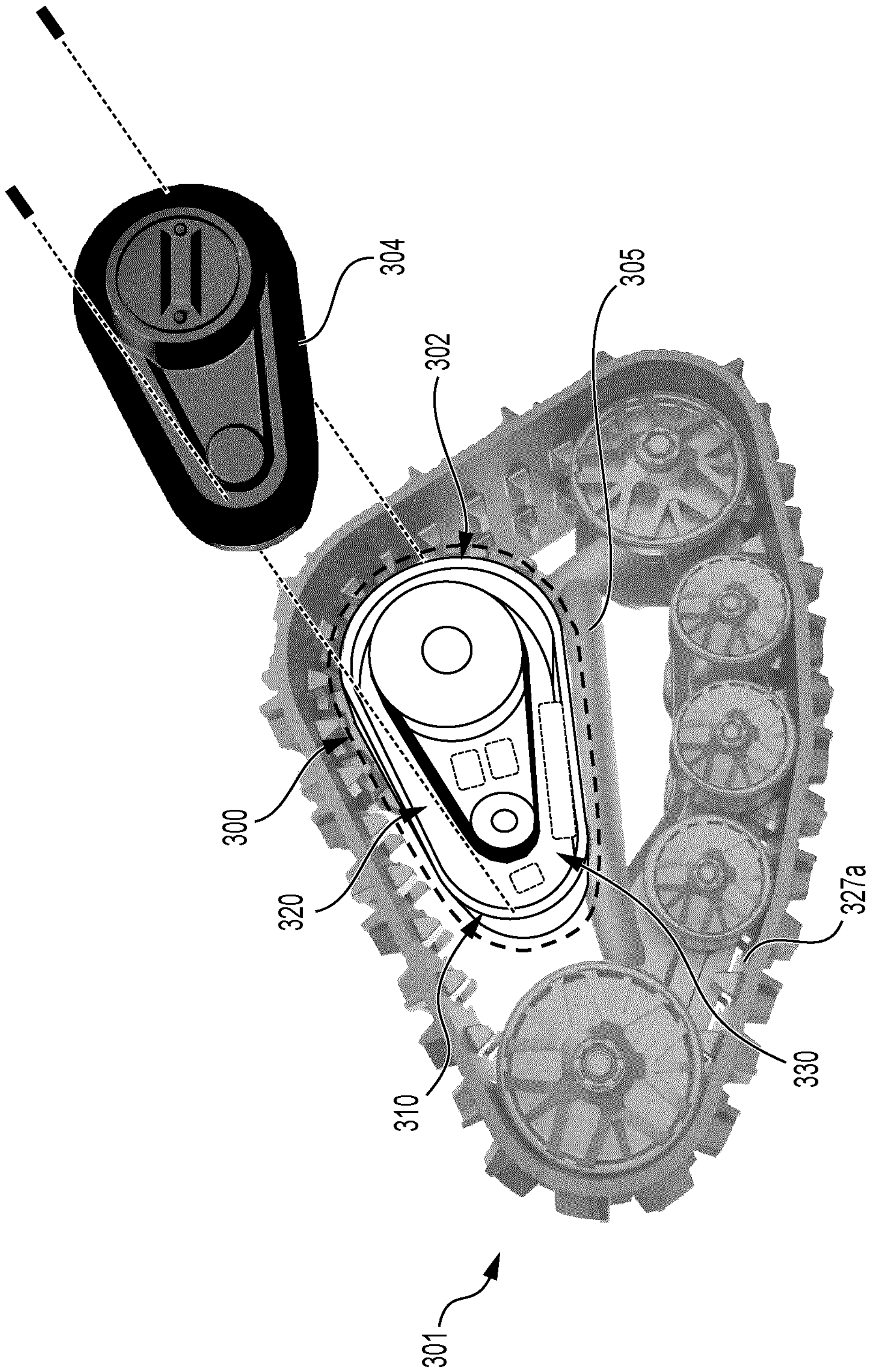
FIG. 3 is a partially exploded perspective view taken from a front, top, left side of a track system of the vehicle of FIG. 1.

With reference to FIG. 3, there is depicted a partially exploded schematic view of an ACS 300 of a track system 301 in accordance with one non-limiting embodiment of the present technology. The track system 301 comprises similar components to the components of the track system **20*a*** described herein below, and therefore will not be described in greater detail for sake of brevity.

The ACS 300 comprises a housing 302 configured to receive at least partially at least one of the components of the ACS 300. For example, the housing 302 is a box-like recipient mounted to a frame 305 of the track system 301 and is adapted to protect at least some of the components of the ACS 300 against water, debris, impact, etc.

In this embodiment, the housing 302 includes a cover 304 removably attachable to the housing 302 for granting access to the components disposed in the housing 302. In some cases, the housing 302 has an ornamental design purpose to enhance the overall visual look of the track system it is mounted on. In some embodiments, the housing 302 and/or the cover 304 are made of plastic, metallic, or composite materials, or any combination thereof. In some embodiments, the housing 302 may be integrated into the frame 305 of the track system 301. In other words, the frame 305 of the track system 301 can be designed and configured to receive at least partially at least one of the components of the ACS 300. In these cases, the cover 304 may be removably attachable to the frame 305 to grant access to components at least partially received therein.

The ACS 300 generally comprises a motor 310, a transmission assembly 320, and a controller assembly 330. Broadly, the controller assembly 330 is configured to acquire one or more signals, process said signals, and in response selectively trigger the motor 310 to operate the transmission assembly 320. Operation of the ACS 300 is generally similar to the operation of the ACS **400*a* as described below, and therefore will not be described in greater detail for sake of brevity. However, suffice it to state that the ACS 300 is operatively connectable to the track system 301 so as to provide the track system 301 with anti-rotation capabilities, and/or to operate the track system 301 in different "modes" for increasing performance of the track system 301 in a variety of operational conditions. A mode is a setting for the track system 301**. Various exemplary modes will be described in greater detail below.

In some cases, the housing 302 is configured to receive all components of the ACS 300, such that the ACS 300 is a packaged solution such as a "plug-and-play" solution to be installed on the track system 301. It is contemplated that the housing 302 may be configured to receive at least some components of the motor 310, the transmission assembly and the controller assembly 330.

It is understood that one advantage of the ACS 300, especially when fully self-contained, is the fact that it is fully integrated to the track system 301 it is mounted on or of which it is part of, and may not require any further connection to a corresponding vehicle, as opposed to conventional anti-rotation devices. In some embodiments, the ACS 300 may not require further mechanical connection to the corresponding vehicle. In some embodiments, the ACS 300 may not require further electrical connection to the vehicle 10.

It is thus understood that the ACS 300 can be sold alone or as a kit to be installed on a track system. In some cases, said track system is "Smart-Ready" i.e., originally configured to receive the ACS 300, or any given track system to be converted in a "smart" track system by receiving the ACS 300. In other words, the ACS 300 (and particularly the housing 302) can be "track system specific" by design or generic and adaptable to convert any given existing track systems. Suitable mounting means (fasteners, clamps, weldments, etc.) are thus contemplated to mount the ACS 300 (and particularly the housing 302 and/or the motor 310) to the frame of said track systems. In some cases, the housing 302 may be removably connectable to the frame 305 of the track system 301, but could be permanently connected to the frame 305 in other cases.

Front Track System

Figure 4B:
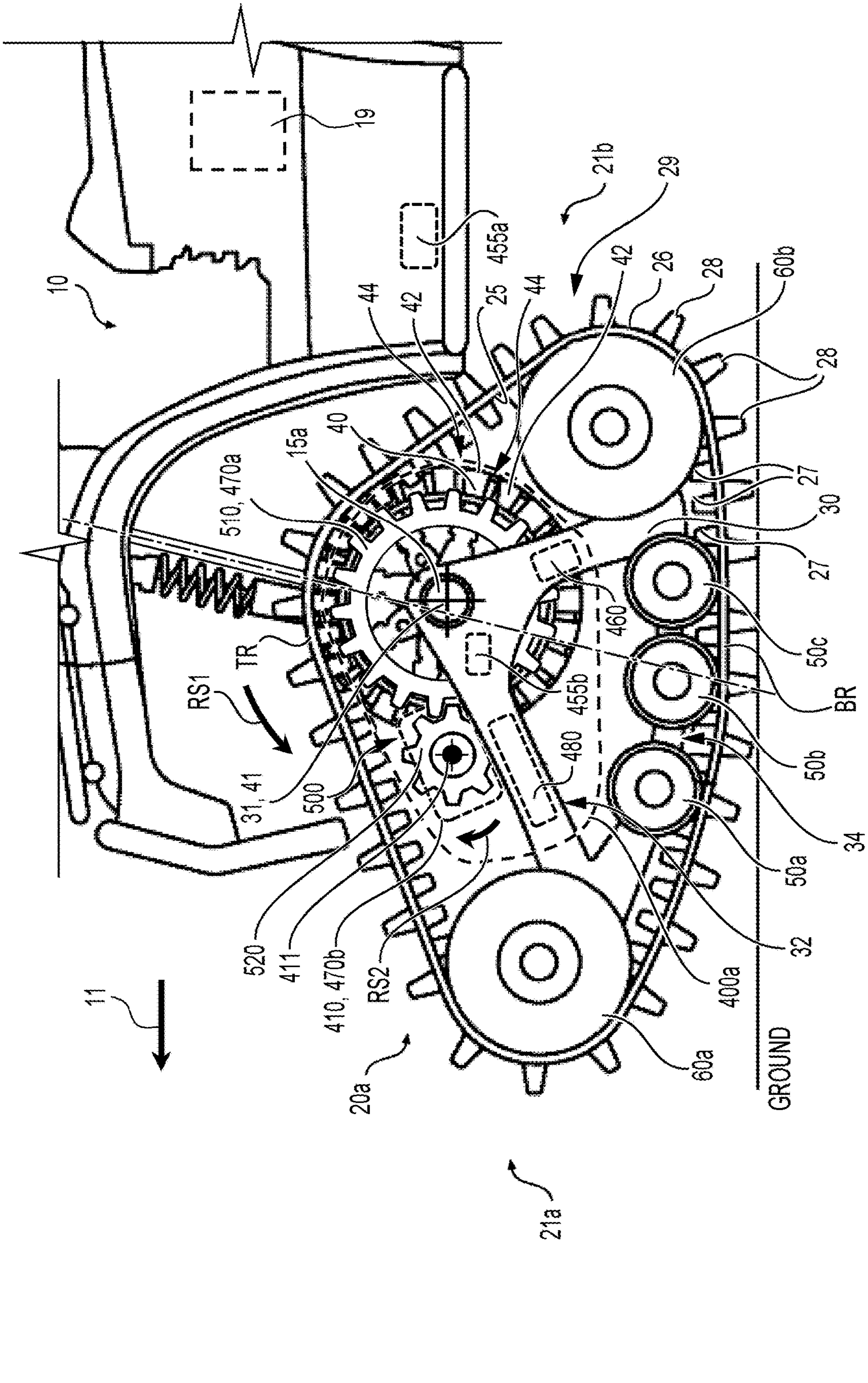
FIG. 4B is a close-up left side elevation view of a front track system of the vehicle of FIG. 1 according to an embodiment of the present technology.

Referring to FIGS. 4A and 4B, the track systems 20*a*, 20*b* will now be generally described. Since the front track systems 20*a*, 20*b* are similar (i.e., generally symmetrical about a longitudinal center plane of the vehicle 10), only the front track system 20*a*, will be described herewith.

The track system 20*a* is a front left track system that is operatively connected to the vehicle 10. In some instances, the front left track system 20*a* could be configured to replace a front left wheel of the vehicle 10.

The track system 20*a*, which has a front longitudinal end 21*a* and a rear longitudinal end 21*b*, includes a track-engaging assembly 22 and an endless track 24 that is disposed around the track-engaging assembly 22. The track-engaging assembly 22 includes a frame 30 and a plurality of wheels including a drive wheel assembly 40, at least one support wheel assembly 50*n* and at least one idler wheel assembly 60*n*. In the present embodiment, the track-engaging assembly 22 includes a drive wheel assembly 40, three support wheel assemblies 50*a*, 50*b*, 50*c* and front and rear idler wheel assemblies 60*a*, 60*b*. It is contemplated that in some embodiments, there could be more or less than three support wheel assemblies and/or more or less than two idler wheel assemblies. In the present embodiment, each of the support wheel assemblies 50*a*, 50*b*, 50*c* and front and rear idler wheel assemblies 60*a*, 60*b* includes left and right wheels. Other configurations of the support and idler wheel assemblies are contemplated.

As best shown in FIG. 4B, the front and rear idler wheel assemblies 60*a*, 60*b* are elevated relative to the support wheel assemblies 50*a*, 50*b*, 50*c*, and the support wheel 50*a* is elevated relative to the support wheel assemblies 50*b*, 50*c*. The elevation of the front idler wheel 60*a*, and the support wheel 50*a* can, in some instances, help the track system 20*a* to overcome obstacles (i.e., increase approach angle) and/or help the track system 20*a* to steer (i.e., minimize contact surface ("contact patch")). The same applies for the elevation of the rear idler wheel 60*b* as well (i.e., increase departure angle). In some embodiments, the front idler wheel assembly 60*a* and/or the rear idler wheel assembly 60*b* could bear weight, and thus could be considered to be support wheel assemblies. In some embodiments, one or more of the support wheels 50*a*, 50*b*, 50*c* could be elevated relative to the other support wheels (e.g., support wheel 50*a* is elevated relative to support wheels 50*b* and 50*c*).

As it will be described in greater details herein further below with reference to FIGS. 10 to 29, in some embodiments, a given ACS may be used to modify a size of a contact patch and/or modify an approach angle and/or modify a departure angle of the respective track systems.

Rear Track System

Figure 4C:
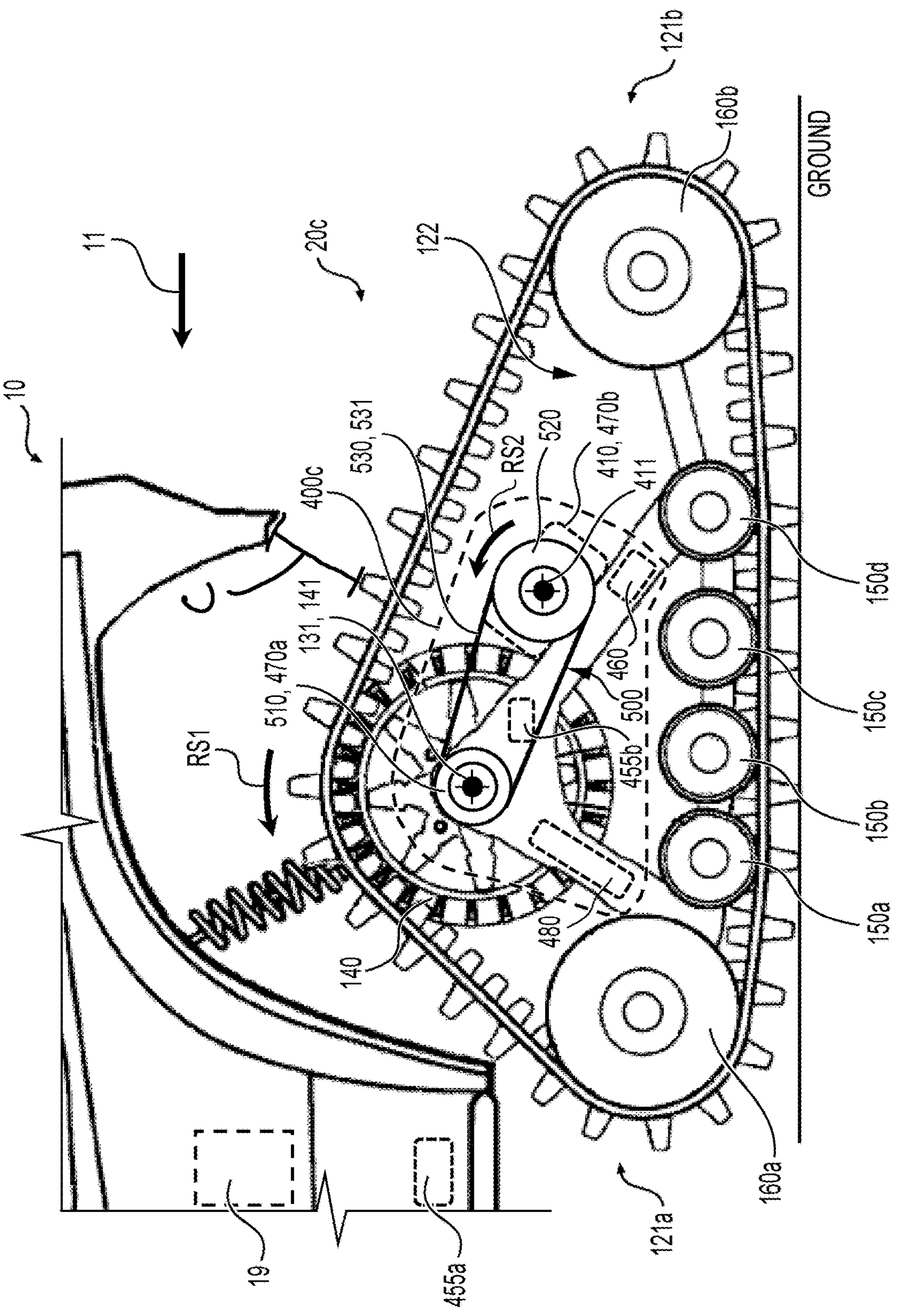
FIG. 4C is a close-up left side elevation view of a rear track system of the vehicle of FIG. 1 according to an embodiment of the present technology.
Figure 4D:
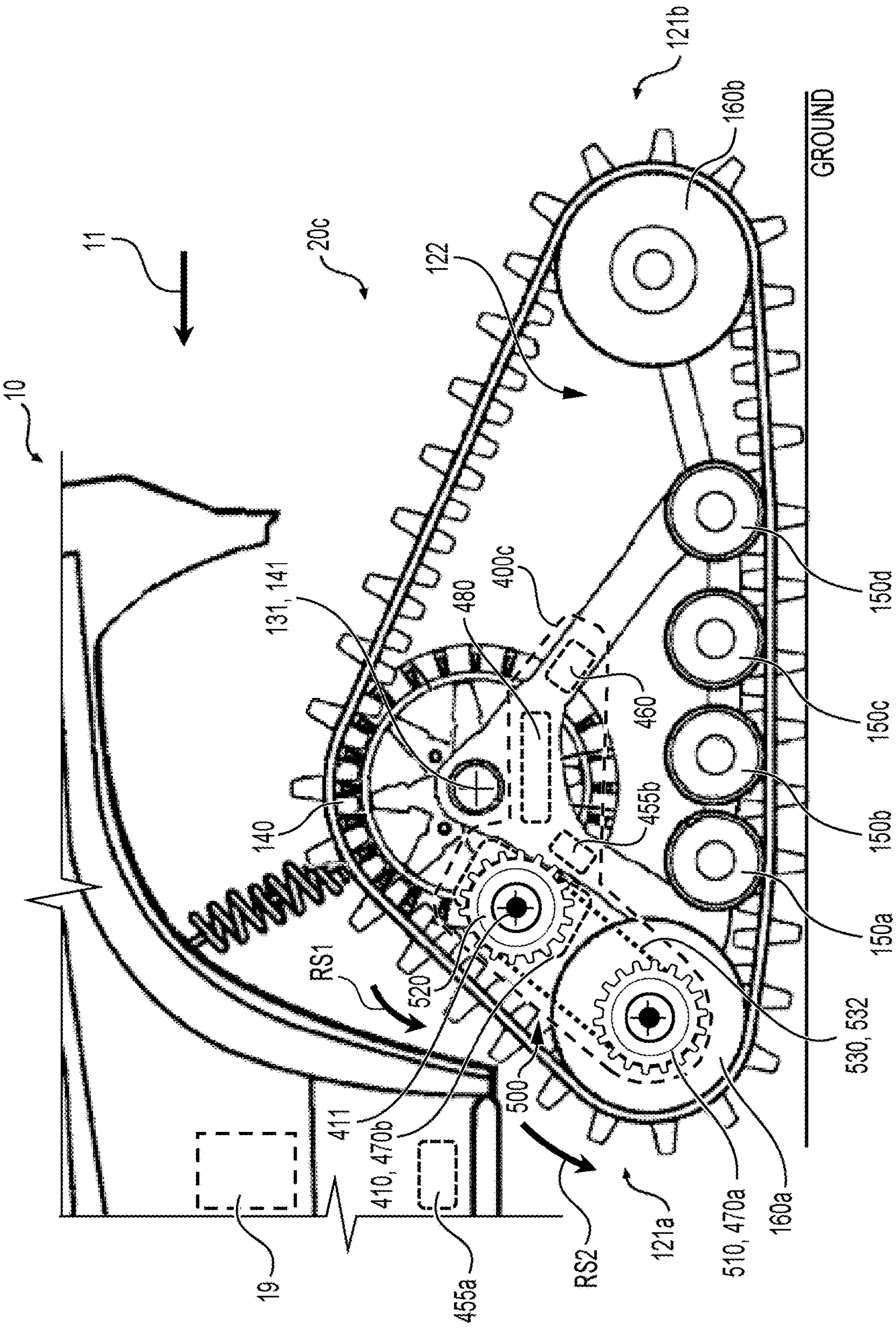
FIG. 4D is a close-up left side elevation view of a rear track system of the vehicle of FIG. 1 according to another embodiment of the present technology.

Turning now particularly to FIGS. 4A, 4C and 4D, as the rear track systems 20*c*, 20*d* are similar (i.e., generally symmetrical about a longitudinal center plane of the vehicle 10), only the rear track system 20*c* will be described herewith. The track system 20*c* is a rear left track system configured to operatively connect to the vehicle 10. In some instances, the rear left track system 20*c* is configured to replace a rear left wheel of the vehicle 10.

The track system 20*c*, which has a front longitudinal end 121*a* and a rear longitudinal end 121*b*, includes a track-engaging assembly 122 and an endless track 124 disposed around the track-engaging assembly 122. The track-engaging assembly 122 includes a frame 130 and a plurality of wheels including a drive wheel assembly 140, at least one support wheel assembly 150*n* and at least one idler wheel assembly 160*n*. In the present embodiment, the track-engaging assembly 122 includes a drive wheel assembly 140, four support wheel assemblies 150*a*, 150*b*, 150*c*, 150*d* and front and rear idler wheel assemblies 160*a*, 160*b*. It is contemplated that in some embodiments, there could be more or less than four support wheel assemblies and/or more or less than two idler wheel assemblies. In the present embodiment, each of the support wheel assemblies 150*a*, 150*b*, 150*c*, 150*d* and front and rear idler wheel assemblies 160*a*, 160*b* includes left and right wheels. Other configurations of the support and idler wheel assemblies are contemplated.

In the embodiments shown in FIGS. 4C and 4D, the front and rear idler wheel assemblies 160*a*, 160*b* are elevated relative to the support wheel assemblies 150*a*, 150*b*, 150*c*, 150*d*. In some embodiments, the support wheel assembly 150*a* could be elevated relative to the support wheel assemblies 150*b*, 150*c*, 150*d* as well. The elevation of the front idler wheel assembly 160*a* can, in some instances, assist the track system 20*c* to overcome obstacles (i.e., increase approach angle). The same applies for the elevation of the support wheel assembly 150*a* (i.e., increase approach angle) and for the elevation of the rear idler wheel 60*b* as well (i.e., increase departure angle). The configuration of the support wheel assemblies 150*a*, 150*b*, 150*c*, 150*d* and the front and rear idler wheel assemblies 160*a*, 160*b* could be different. In some embodiments, the front idler wheel assembly 160*a* and/or the rear idler wheel assembly 160*b* could bear weight, and thus could be considered to be support wheel assemblies.

As will be described in greater detail herein further below, in some embodiments, the ACS 400*c*, 400*d* may be used to modify a size of a contact patch and/or modify an approach angle and/or modify a departure angle of the rear track systems 20*c*, 20*d*, respectively.

It should be noted that track systems with a variety of configurations and layouts are contemplated in the context of the present technology. For example, as opposed to the track systems 20*a*, the track systems 220 illustrated in FIG. 2A has a triangular shape. Various components of the track systems 20*a*, 20*b*, 20*c*, 20*d* will now be described in greater detail.

Components of the Track Systems

Although there are differences between the front track systems 20*a*, 20*b* and the rear track systems 20*c*, 20*d*, the components will be described with reference to the front track systems 20*a*, 20*b* (particularly track system 20*a*). It is understood that the components described herewith with reference to the front track systems 20*a*, 20*b* have counterpart components configured to connect to the rear track systems 20*c*, 20*d*. For instance, the frames 30, 130 are generally similar, and thus, only the frame 30 will be described herewith.

Frame

Referring to FIGS. 4A and 4B, the frame 30 of the track system 20*a* will be described in greater detail. The frame 30 is pivotable about a pivot axis 31 (i.e., pitch), which can facilitate motion of the track system 20*a* on uneven terrain, and enhance traction thereof. More particularly, in the present embodiment, the pivot axis 31 is aligned with the front axle 15*a*, and aligned with an axis of rotation of the drive wheel assembly 40. In other embodiments, the pivot axis 31 of the frame 30 could be offset from the axis of rotation of the drive wheel assembly 40.

In this embodiment, the frame 30 includes an upper frame portion 32 and a lower frame portion 34. The upper frame portion 32 is configured to rotationally connect with the drive wheel assembly 40, and the lower frame portion 34 is configured to rotationally connect with the support wheel assemblies 50*a*, 50*b*, 50*c* and with the front and rear idler wheel assemblies 60*a*, 60*b*. More precisely, the front idler wheel assembly 60*a* is connected to the lower frame portion 34 at a front longitudinal end 21*a* of the track system 20*a*, and the rear idler wheel assembly 60*b* is connected to the lower frame portion 34 at a rear longitudinal end 21*b* of the track system 20*a*. The support wheel assemblies 50*a*, 50*b*, 50*c* are rotationally connected to the lower frame portion 34 and are disposed longitudinally between the front and rear idler wheel assemblies 60*a*, 60*b*. In some embodiments, two or more of the support wheel assemblies 50*a*, 50*b*, 50*c* could be connected to the lower frame portion 34 via a pivot assembly, a tandem assembly, and/or a resilient assembly, for instances.

Tensioner

With reference to FIG. 4A, it is contemplated that the track systems 20*a*, 20*b*, 20*c*, 20*d* may include a tensioner 170 configured to adjust and maintain tension in the endless track 24, 124. In some embodiments, the tensioner 170 could be omitted. The tensioner 170 is connected to the lower frame portion 32, 132, at one of the front and rear ends 21*a*, 21*b*, 121*a*, 121*b* of the track systems 20*a*, 20*b*, 20*c*, 20*d*, and one of the corresponding leading and trailing idler wheel assemblies 60*a*, 60*b*, 160*a*, 160*b* is connected to the tensioner 170. In other words, one of the leading and trailing idler wheel assemblies 60*a*, 60*b*, 160*a*, 160*b* is connected to frame 30, 130 by the tensioner 170. The one of the leading and trailing idler wheel assemblies 60*a*, 60*b*, 160*a*, 160*b* is selectively moveable, relative to the lower frame portion 34, 134, away and toward therefrom (i.e., longitudinally forward and longitudinally rearward) such that the tension in the endless track 24, 124 can be increased and decreased. When a desired tension is reached in the endless track 24, 124, the tensioner 170 can also be locked to maintain the desired tension.

Drive Wheel

Referring particularly to FIGS. 4A and 4B, the drive wheel assembly 40 will now be described in greater detail. Once again, it is understood that the features described with reference to the drive wheel assembly 40 can also apply to the drive wheel assembly 140. The drive wheel assembly 40, which is operatively connected to the front axle 15*a* of the vehicle 10, is rotatable about an axis of rotation 41 for driving the endless track 24. In this embodiment, the axis of rotation 41 is co-axial with the front axle 15*a*. Thus, upon rotation of the front axle 15*a*, the drive wheel assembly 40 rotates, and engages with a plurality of lugs 27 of the endless track 24 to drive the track system 20*a*.

The drive wheel assembly 40 includes a plurality of teeth 42 distributed circumferentially along a rim thereof and extending laterally, defining a plurality of recesses 44 configured to receive the lugs 27 of the endless track 24. Each one of the plurality of recesses 44 is defined between two adjacent teeth 42.

It is contemplated that in some embodiments, the drive wheel assembly 40 could be configured differently. For example, in embodiments where the endless track 24 defines recesses or apertures, the drive wheel assembly 40 could have radially extending teeth configured to be received in the recesses or apertures of the endless track 24. As yet another example, in some embodiments, the drive wheel assembly 40 could frictionally engage an inner side 25 of the endless track 24, thereby frictionally driving the endless track 24.

It is understood that, in some embodiments, the track systems 20*a*, 20*b*, 20*c*, 20*d* are configured to replace wheels on the vehicle 10. Moreover, the track systems 20*a*, 20*b*, 20*c*, 20*d* are connectable to the vehicle 10 via fasteners, namely said "bolt-on" track systems.

Endless Track

Referring to FIGS. 4A and 4B, the endless track 24 will now be described in greater detail. It is understood that the endless track 124, which will not be described herewith, is similar to the endless track 24. The endless track 24 includes an inner side 25 and an outer side 26 opposite the inner side 25.

The inner side 25 faces the support wheel assemblies 50*a*, 50*b*, 50*c*, the front and rear idler wheel assemblies 60*a*, 60*b* and the drive wheel assembly 40.

The endless track 24 has, extending from the inner side 25, a plurality of lugs 27. The lugs 27 are longitudinally spaced and are arranged in a single row that is substantially centered along the widthwise direction of the endless track 24. The lugs 27 could be arranged differently in other embodiments. For instance, there could be two laterally spaced sets of longitudinally spaced lugs 27 (see FIG. 3). The lugs 27 are configured to engage with the teeth 42 of the drive wheel assembly 40 to drive the endless track 24 (i.e., transmit motion from the drive wheel assembly 40 to the endless track 24, and thus the track system 20*a*). The lugs 27 are also configured to engage with the support wheel assemblies 50*a*, 50*b*, 50*c* and the front and rear idler wheel assemblies 60*a*, 60*b* to guide the endless track 24. As such, the lugs 27 can be referred to as "driving projections and/or guiding projections". Thus, each of the lugs 27 is configured to do at least one of driving the endless track 24 and guiding the endless track 24.

On either side of lugs 27, the inner side 25 has wheel paths (one wheel path shown in FIG. 3 with reference to the track system 301, the wheel path being labeled 327*a*), on which the left and right wheels of the support and idler wheel assemblies 50*a*, 50*b*, 50*c*, 60*c*, 60*d* respectively roll. Each of the wheel paths extend adjacent to the lugs 27.

The outer side 26 of the endless track 24, which is configured to engage the ground, includes a plurality of traction projections 28 extending from the outer side 26. The traction projections 28, which can be referred to as "traction lugs", are configured to engage the ground to enhance traction. Thus, in some instances, the traction projections 28 could be configured (e.g., size, shape, pattern, etc.) to penetrate the ground to enhance traction. It is understood however that the present embodiment is only an example, and other configurations are contemplated without departing from the scope of the present technology.

The endless track 24 has a top run TR which extends between the front longitudinal end 21*a* and the rear longitudinal end 21*b* of the track system 20*a*, over the drive wheel assembly 40, and a bottom run BR which extends between the front longitudinal end 21*a* and the rear longitudinal end 21*b* of the track system 20*a*, under the front and rear idler wheel assemblies 60*a*, 60*b*. The bottom run of the endless track 24 defines an area of contact of the endless track 24 with the ground. As mentioned above, the area of contact bears a majority of a load sustained by the track system 20*a*. The area of contact is sometimes referred to as a "contact patch" of the endless track 24 with the ground.

The endless track 24 is elastomeric in that the endless track 24 includes elastomeric material allowing the endless track 24 to flex around the support wheel assemblies 50*a*, 50*b*, 50*c*, the front and rear idler wheel assemblies 60*a*, 60*b* and the drive wheel assembly 40. The elastomeric material of the endless track 24 can include any polymeric material with suitable elasticity. In the present embodiment, the elastomeric material includes rubber. Each of the lugs 27 is an elastomeric in that each of the lugs 27 includes elastomeric material. In the present embodiment, each of the traction projections 28 is an elastomeric traction projection in that the each of the traction projections 28 includes elastomeric material. Other configurations and/or constructions of endless track are contemplated as well.

ACS—Detail

Referring to FIGS. 1 and 4A, the ACSs 400 will now be generally described. As mentioned above, at least some of the track systems 20*a*, 20*b*, 20*c*, 20*d* include respective ACSs 400*a*, 400*b*, 400*c*, 400*d* to adjust their respective orientation relative to the vehicle 10. It is to be noted that orientation of the track systems 20*a*, 20*b*, 20*c*, 20*d* relative to the vehicle 10 includes any combination of pitch, yaw, and roll thereof, with reference to, for example, a gravity vector.

Generally speaking, the ACS 400 is an active device configured to selectively perform an operation to modify the angular relationship between the track system 20 on which it is mounted to relative to the vehicle 10 to enhance its performance (e.g., traction, ability to overcome obstacles, durability, ride comfort quality, vibration, shocks, etc.). The ACS 400 is configured to receive at least one input, to determine a required operation based on the at least one input and to apply the determined required operation to correct the orientation of a corresponding track system relative to the vehicle 10 in accordance with at least one parameter having a pre-determined value.

As will be further described in greater detail below, in some embodiments, the ACS 400 may be configured to perform the operation automatically, (i.e., where at least one input is generated by at least one of its components). In other embodiments, the ACS 400 may be configured to perform one or more operations manually (i.e., where the least one input is generated by an operator via an input device).

Although in the illustrated embodiment in FIGS. 1 and 4A each of the front track systems 20*a*, 20*b* and the rear track systems 20*c*, 20*d* has an ACS 400*n*, it is contemplated that one or more amongst the front track systems 20*a*, 20*b* and the rear track systems 20*c*, 20*d* may be equipped with corresponding ACSs without departing from the scope of the present technology.

As it will be further described below, in some embodiments, a first ACS of a first track system is configured to operate in cooperation with a second ACS of a second track system in order to optimize the overall performance of a given vehicle in accordance with a pre-determined objective.

ACS Components

As mentioned above, any feature of any embodiment discussed herein may be combined with any feature of any other embodiment discussed herein in some examples of implementation. Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

With reference to FIG. 4B, an embodiment of the ACS 400*a* will now be described in detail. The housing of the ACS 400*a* is omitted in FIG. 4B for sake of clarity. It is understood that this embodiment, despite described in context of a front track system 20*a*, can be applicable in whole or partially to the front track system 20*b* and to the rear track systems 20*c*, 20*d* as well.

The ACS 400*a* comprises a motor 410 mounted to the frame 30, a transmission assembly 420 operatively coupling the motor 410 to the one of the plurality of wheels of the track system 20*a*, and a controller assembly 430 electrically coupled with the motor 410.

It is understood that the one of the plurality of wheels of the track system 20*a* to which the motor 410*a* is operatively coupled is configured to be in an operative engagement with the endless track 24, more particularly with the inner side 25 of the endless track 24 in some cases, such that the rotation of said one of the plurality of wheels is generally synchronized or timed with the rotation of the endless track 24. In other words, it is desirable to avoid having a difference of rotational movement between the one of plurality of wheels and the endless track 24 (e.g., through slippage, tooth skipping, etc.) in order to operate the ACS 400*a* under optimal conditions. For example, the operative engagement between the one of the plurality of wheels and the endless track 24 can be by positive engagement, friction engagement, a timing belt, or any other suitable means.

In this embodiment, the drive wheel assembly 40 (or the wheel to which the motor 410 is operatively coupled to) defines a first rotational speed, denoted as "RS1", and the motor 410 defines a second rotational speed, denoted as "RS2". The RS1, RS2 thus define a pre-determined speed ratio (PSR) when the vehicle is static.

As it will become apparent from the description herein further below, a PSR value indicative of a reference ratio between a first transmission component and a second transmission component of a transmission assembly may be stored in memory and updated, at least temporarily, when the ACS 400*a* is operating in one or more modes.

In this embodiment, the ACS 400*a* comprises a power source 480 operatively connected to the controller assembly 430 and more particularly to a controller unit 460 of the controller assembly 430. In some cases, the power source 480 is integrated in the track system 20*a* (e.g., inside the frame 30 of the track system 20*a*). In some other cases, the power source 480 can be integrated to the vehicle 10 and/or can be a vehicle power source 19 (e.g., a battery, an alternator, etc.). In some embodiments, the power source 480 is an alternator operatively connect to the drive wheel assembly 40 of the track system 20*a*.

Motor

As shown in FIGS. 4B and 4C, in some embodiments, the motor 410 is operatively coupled to the drive wheel assembly 40 (or to the drive wheel assembly 140 for the motor 410 of the rear track systems 20*c*, 20*d*). Alternatively, the motor 410 may be operatively coupled to another wheel of the plurality of wheels of the track system 20*a*. Alternatively, in an embodiment shown in FIG. 4D, the motor 410 may be operatively coupled to the front idler wheel assembly 60*a* (or to the front idler wheel assembly 160*a* for the motor 410 of the rear track systems 20*c*, 20*d*). In further embodiments, the motor 410 of the ACS 400 may be operatively coupled to one of the support wheel assemblies 50*a*, 50*b*, 50*c* or to the rear idler wheel assemblies 60*b* (or to the rear idler wheel assembly 160*b* for the motor 410 of the rear track systems 20*c*, 20*d*).

In the embodiments illustrated in FIGS. 4B, 4C, and 4D, the motor 410 is an electric motor such as a brushed motor, a brushless motor, a radial motor, a servo motor, a stepper motor, or an axial flux motor (also known as axial gap motor or pancake motor). In some embodiments, the motor 410 can be a generator configured to generate electricity that can be stored (e.g., via an accumulator, a capacitor, or a battery, or the power source 480) and that can selectively be used by the ACS 400 and/or an electrical system on the vehicle 10. For example, the motor 410 could be used to charge a power source or to provide power to an electrical device, etc. Other types of motors are contemplated as well, such as hydraulic motors and turbine motors.

In the embodiments illustrated in FIGS. 4B, 4C, and 4D, the motor 410 has an output shaft 411 that extends generally parallel to the rotation axis 41 of the drive wheel assembly 40 (or to the rotation axis 141 of the drive wheel assembly 140 for the motor 410 of the rear track systems 20*c*, 20*d*) or to the rotation axis of the wheel to which the motor 410 is coupled to, and that is offset to said rotation axis 41 (or rotation axis 141) (i.e., distal to the rotation axis 41).

In other embodiments, the output shaft 411 extends generally perpendicular to the rotation axis 41 of the drive wheel assembly 40 (or to the rotation axis 141 of the drive wheel assembly 140 for the motor 410 of the rear track systems 20*c*, 20*d*) or to the rotation axis of the wheel to which the motor 410 is coupled to, and is coupled to the drive wheel assembly (or the wheel to which the motor 410 is coupled to) via transmission parts (e.g., bevel gears), as will be further described below.

Figure 30:
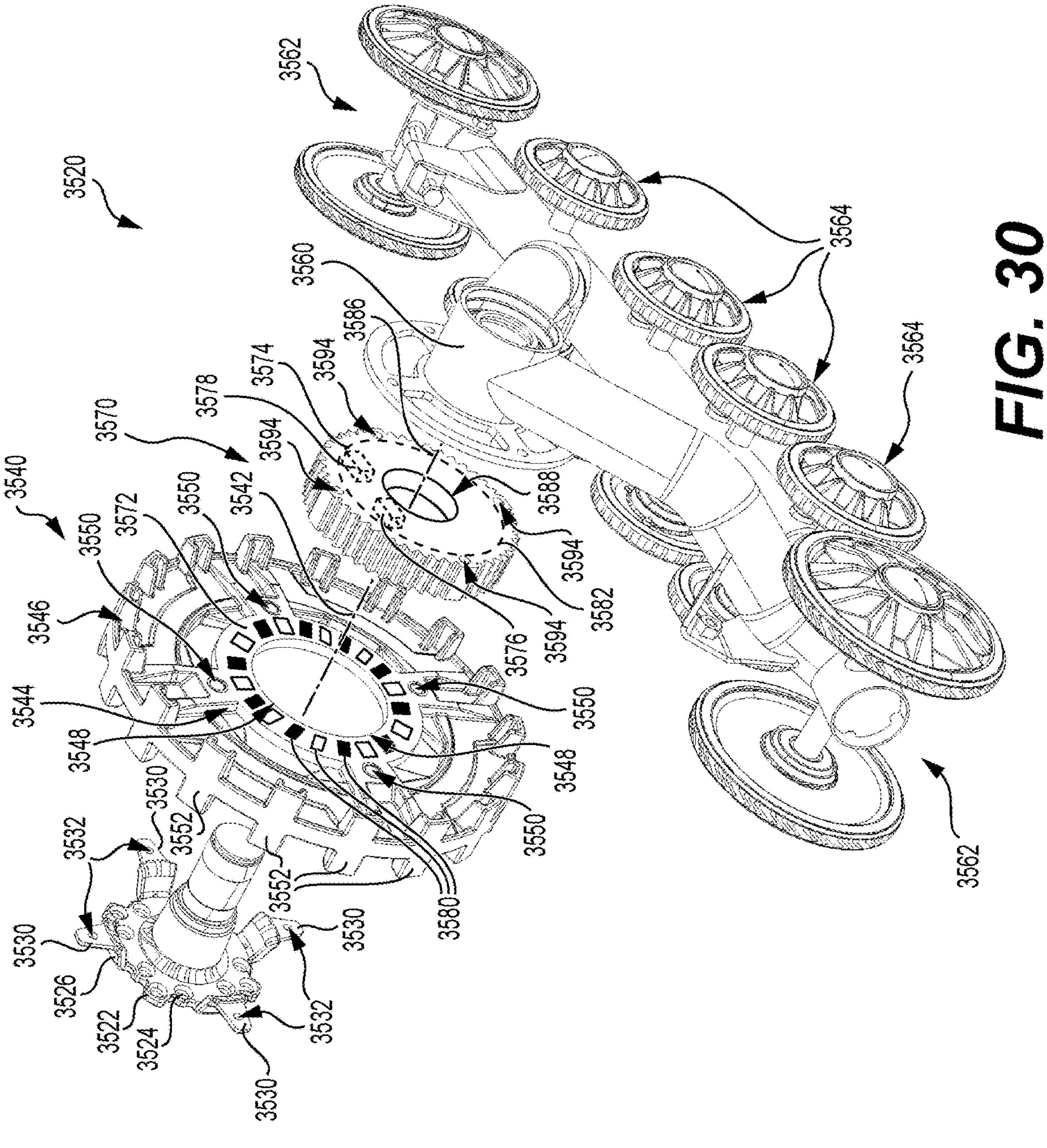
FIG. 30 is a partially exploded perspective view of part of a track system having a co-axial motor.

With a brief reference to FIG. 30, in additional embodiments of the present technology, an ACS motor may be generally coaxial to the rotation axis 41 of the drive wheel assembly 40 (or to the rotation axis 141 of the drive wheel assembly 140 for the motor 410 of the rear track systems 20*c*, 20*d*) or to the rotation axis of the wheel to which the ACS motor is coupled to. In these embodiments, the motor 410 can be integrated to the drive wheel assembly 40 (or the drive wheel assembly 140) (or to the wheel to which the motor 410 is integrated to) such that the motor 410 is configured to selectively drive the drive wheel assembly about the thus shared axis of rotation. It can be said that a given ACS may comprise a "drive wheel" motor that is integrated into the drive wheel assembly of a given track system and is coaxial with the drive wheel for selectively applying a torque to the drive wheel about an axis of rotation.

Transmission Assembly

As shown in FIGS. 4B, 4C, and 4D, the transmission assembly 420 includes a first transmission part 510 that is operatively coupled to one of the plurality of wheels, and a second transmission part 520 that is operatively coupled to the motor 410.

In some embodiments, the first and second transmission parts 510, 520 are directly engaged with each other, e.g., via a gear train arrangement, as particularly shown in FIG. 4B, where the first and second transmission parts 510, 520 are meshed together. It is understood that other configurations are contemplated as well, such as a planetary gear train where the first transmission part 510 is a first gear and where the second transmission part 520 is a second gear.

In some embodiments, the first and second transmission parts 510, 520 are spaced from each other and thus indirectly engaged with each other, e.g., via a transmission link 530 operatively transmitting rotational power from one to another, such as a belt 531 as particularly shown in FIG. 4C, or a chain 532 as particularly shown in FIG. 4D, for instances. In these cases, it is understood that the first and second transmission parts 510, 520 are selected and designed accordingly (e.g., gears, pulleys, etc.). In some embodiments, the transmission assembly 420 further comprises more transmission parts, such as an intermediate pinion, a clutch system, or a tensioner, for examples.

It is understood that in these cases, the first and second transmission parts 510, 520 rotate at the RS1, RS2 respectfully. In some embodiments, the PSR can be defined by a number of teeth of the first transmission part 510 over a number of teeth of the second transmission part 520 when the first and second transmission parts 510, 520 are gears. Similarly, the PSR can be defined by a diameter of the first transmission part 510 over a diameter of the second transmission part 520 when the first and second transmission parts 510, 520 are wheels of a pulley system.

In some embodiments, the PSR is greater than "1", i.e., where the second transmission part 520 is smaller than the first transmission part 510 (in terms of respective number of teeth or diameter) as illustrated in FIG. 4B. In other embodiments, the PSR is smaller than "1", i.e., where the second transmission part 510 is bigger than the first transmission part 520 (in terms of respective number of teeth or diameter) as illustrated in FIG. 4C. In further embodiments, the PSR is generally equal to "1" (or is about "1"), i.e., where the second transmission part 510 is generally equal to the first transmission part 520 (in terms of respective number of teeth or diameter) as illustrated in FIG. 4D.

Controller Assembly

Figure 5:
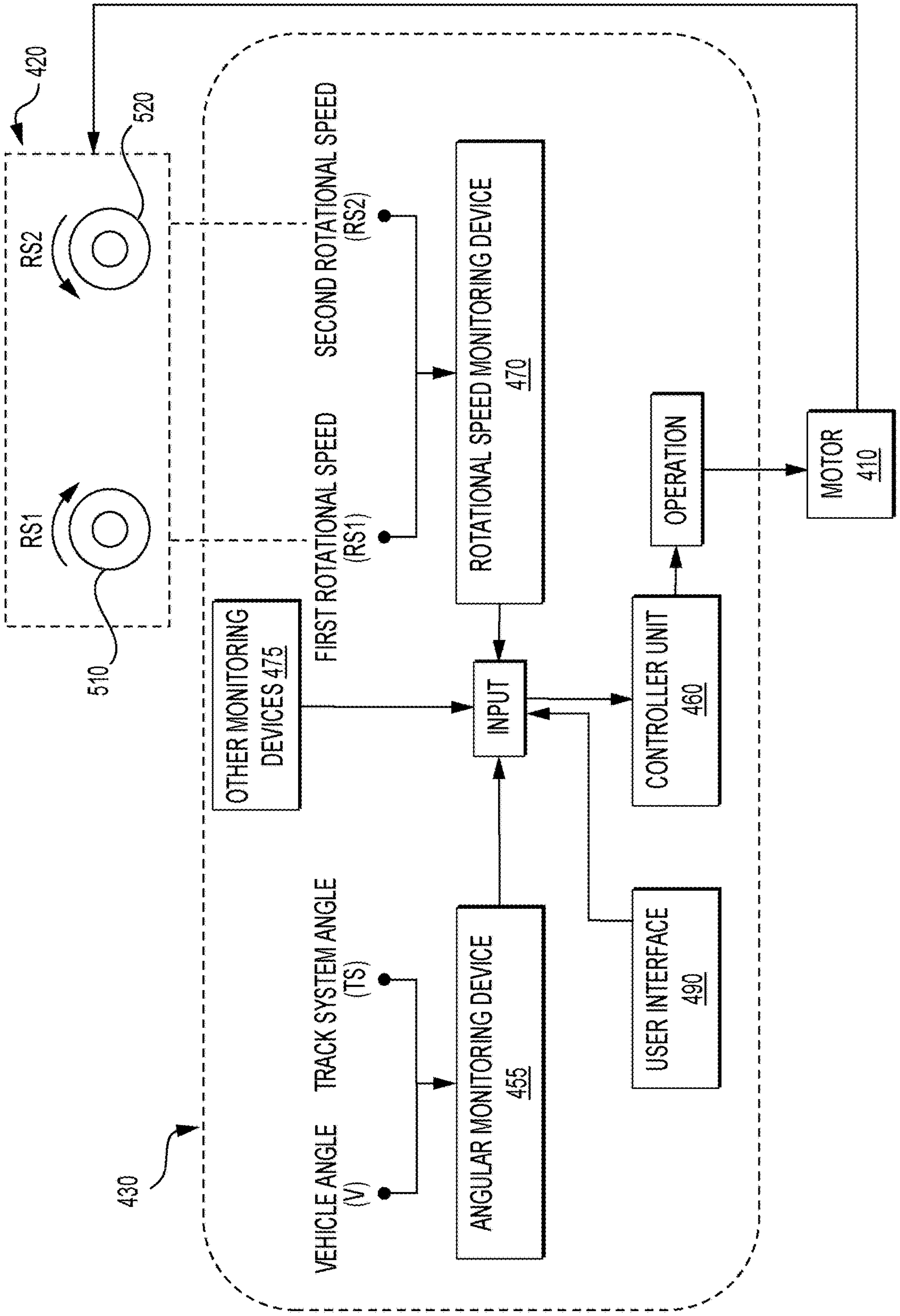
FIG. 5 is a block-diagram of a controller assembly of the ACS of FIG. 1 performing signal processing according to an embodiment of the present technology.

With reference to FIG. 5, there is depicted a schematic representation of the controller assembly 430. The controller assembly 430 comprises an angular monitoring device 455 that is configured to monitor a vehicle angle V and a track system angle TS, and a controller unit 460 that is configured to trigger an operation related to the motor 410 based on the track system angle TS and/or the vehicle angle V. The controller assembly 430 is configured to control the angular relationship between the track system 20*a* and the vehicle 10 by selectively triggering an operation on the frame 30 of the track system 20*a*, if required to correct said angular relationship as will be described in further detail below.

In some embodiments, the controller assembly 430 includes the angular monitoring device 455, which is configured for monitoring an actual track system-vehicle angle (ATSV) based on the vehicle angle V and the track system angle TS, and the controller unit 460, which is configured to selectively perform an operation related to the motor 410 based on the ATSV. It is understood that the ATSV is a relative angle between the vehicle 10 and the track system 20*a*.

It should be noted that, even if the vehicle angle V and the track system angle TS are used to define the PTSV when the vehicle 10 is static on a flat surface, ATSV is a dynamic parameter, meaning that a difference between an actual vehicle angle V and an actual track system angle TS changes depending on the angular relationship between the track system 20*a* and the vehicle 10. The angular monitoring device 455 may be configured to monitor a difference between the vehicle angle V and the track system angle TS in real time (e.g., the ATSV) and may transmit one or more signals to the controller unit 460 indicative of the ATSV.

As it will become apparent from the description herein further below, the controller unit 460 may be configured to monitor the ATSV and compare the ATSV against the PTSV, and/or other pre-determined reference values, for determining whether or not to trigger the motor 410 to move the track system 20*a* from an actual angular position relative to the vehicle 10 to an other, different, angular position relative to vehicle 10.

With reference to FIGS. 4B, 4C and 4D, the controller assembly 430 may comprise a vehicle angle monitoring device 455*a* and a track system angle monitoring device 455*b*. With a quick reference to FIG. 10A, the vehicle angle monitoring device 455*a* is configured to measure a vehicle orientation (vehicle angle V) relative to the gravity vector G for instance, and the track system angle monitoring device 455*b* is configured to measure a track system orientation (track system angle TS) relative to the gravity vector G for instance.

In those embodiments where an ACS is used for a track system of an articulated vehicle (such as the ACS 265, 275 in FIG. 2B, for example) the controller assembly 430 may comprise an additional vehicle angle monitoring device for monitoring a vehicle angle of an additional vehicle body of the articulated vehicle 250.

In an embodiment, the vehicle angle monitoring device 455*a* may be integrated to the vehicle 10 or part of the vehicle 10 as manufactured, and the track system angle monitoring device 455*b* may be integrated into the track system 20*a*. Optionally, the vehicle angle monitoring device 455*a* may be retrofitted onto the vehicle body or frame of the vehicle 10, and/or the vehicle angle monitoring device 455*b* may be retrofitted onto the frame of the track system 20*a*. It is contemplated that the vehicle angle monitoring device 455*a* and the track system angle monitoring device 455*b* can be any device or sensor configured to measure at least one angle relative to a pre-determined reference (e.g., gravity vector), such as but without being limited to an inclinometer, an accelerometer, a gyroscope, an encoder, a pressure sensor, a magnetic sensor, or any other suitable means.

In the context of the present technology, a vehicle angle V and/or a track system angle TS can refer to a roll angle, a pitch angle, a yaw angle, or any combination thereof, relative to a coordinate system 99 as shown in FIG. 1. In accordance with the coordinate system 99, the roll angle can be measured from a pre-determined reference about a longitudinal axis (e.g., X-axis), the pitch angle can be measured from a pre-determined reference about a lateral axis (e.g., Y-axis), and the yaw angle can be measured from a pre-determined reference about an axis perpendicular to both the longitudinal and lateral axes (e.g., Z-axis).

Without being bound to any specific theory, one utility of measuring the roll angle is being able to determine if the vehicle 10 is on an inclined surface (e.g., sidehill), and one utility of measuring the yaw angle is being able to determine if the track system 20 is steered (e.g., front left/right track systems 20*a*, 20*b*) or misaligned relative to the vehicle 10 (e.g., rear left/right track systems 20*c*, 20*d*). This angular information can be used by the controller unit 460 for determining the required operation, if any, to correct the orientation of the track systems 20 relative to the vehicle 10.

As it will be described in greater detail further below, the controller unit 460 may be configured to monitor an actual vehicle angle V and/or an actual track system angle TS for determining whether or not to trigger the motor 410 in order to move the track system 20 from an actual angular position relative to the vehicle 10 to an other, different, angular position relative to vehicle 10.

Returning to the description of FIG. 5, the controller assembly 430 comprises a rotational speed monitoring device 470 configured for monitoring an ASR defined by a ratio of an actual RS1 over an actual RS2 when the vehicle 10 is in operation.

With reference to FIGS. 4B, 4C and 4D, the controller assembly 430 may comprise a first rotational speed monitoring device 470*a* configured to measure the actual RS1 and a second rotational speed monitoring device 470*b* configured to measure the actual RS2. With a quick reference to FIG. 10A, the first rotational speed monitoring device 470*a* is configured to measure RS1, and the second rotational speed monitoring device 470*b* is configured to measure the RS2. The first and second rotational speed monitoring devices 470*a*, 470*b* can be embodied as an encoder, a tachometer, or any suitable means known in the art.

As previously mentioned, even if the RS1, RS2 may be used to define the PSR when the vehicle 10 is static, a speed ratio between the actual RS1 and the actual RS2 is a dynamic parameter, meaning that it changes depending on the angular relationship between the track system 20*a* and the vehicle 10. The rotational speed monitoring device 470 may be configured to monitor the speed ratio in real time (e.g., the ASR) and may transmit one or more signals to the controller unit 460 indicative of the ASR.

As it will become apparent from the description herein further below, the controller unit 460 may be configured to monitor the ASR and compare the ASR against the PSR, and/or other pre-determined reference values, for determining whether or not to trigger the motor 410 to move the track system 20 from an actual angular position relative to the vehicle 10 to an other, different, angular position relative to vehicle 10.

The rotational speed monitoring device 470 can be complementary to the angular monitoring device 455 in some embodiments, or in replacement of the angular monitoring device 455 in other embodiments. Both rotational speed and angular monitoring devices 470, 455 are part of the controller assembly 430, but this may not be the case in each and every embodiment of the present technology.

In some embodiments, the controller assembly 430 comprises other monitoring devices 475 configured to monitor one or more operational parameters of the vehicle 10 and/or of the track system 20. It is contemplated that the other monitoring devices 475 may be configured to monitor, without being limited thereto, one or more of a speed, an acceleration, a steering angle, a position, a pressure, and a torque of the vehicle 10 and/or of the track system 20*a*. How the other monitoring devices 475 are implemented is not particularly limiting. However, just as examples, the monitoring devices 475 may include, without being limited thereto, accelerometers, GPS tracking devices, tachometer and or load cells.

In some embodiments, the controller assembly 430 comprises a user interface 490 configured to receive manual inputs from a user via a user device, for example, to modify one or more parameters (e.g., such as one or more threshold/ reference values) used by the controller unit 460 during operation of the track system 20*a*, as will be further described below.

In some embodiments, the controller unit 460 may be configured to transmit a control signal to the motor 410 and/or to a corresponding power source for controlling operation of the motor 410. In some embodiments, the controller unit 460 may transmit a control signal for selectively modulating the power provided by the power source 480 to the motor 410.

In some embodiments, the controller unit 460 comprises a processing element and a memory element. The processing element of the controller unit 460 comprises one or more processors for performing processing operations that allow the controller unit 460 to operate as described. A processor may be a general-purpose processor executing program code stored in the memory portion of the controller unit 460. Alternatively, a processor may be a specific-purpose processor comprising one or more preprogrammed hardware or firmware elements (e.g., application-specific integrated circuits (ASICs), electrically erasable programmable read-only memories (EEPROMs), etc.) or other related elements. The memory element of the controller unit 460 comprises one or more memories for storing program code executed by the processing element of the controller unit 460 and/or data used during operation of the processing element of the controller unit 460. The memory element can also be used to store a plurality of reference values 750 used by the processing element. A memory may be a semiconductor memory (e.g., read-only memory (ROM) and/or random-access memory (RAM)), a magnetic storage medium, an optical storage medium, and/or any other suitable type of memory.

Figure 6:
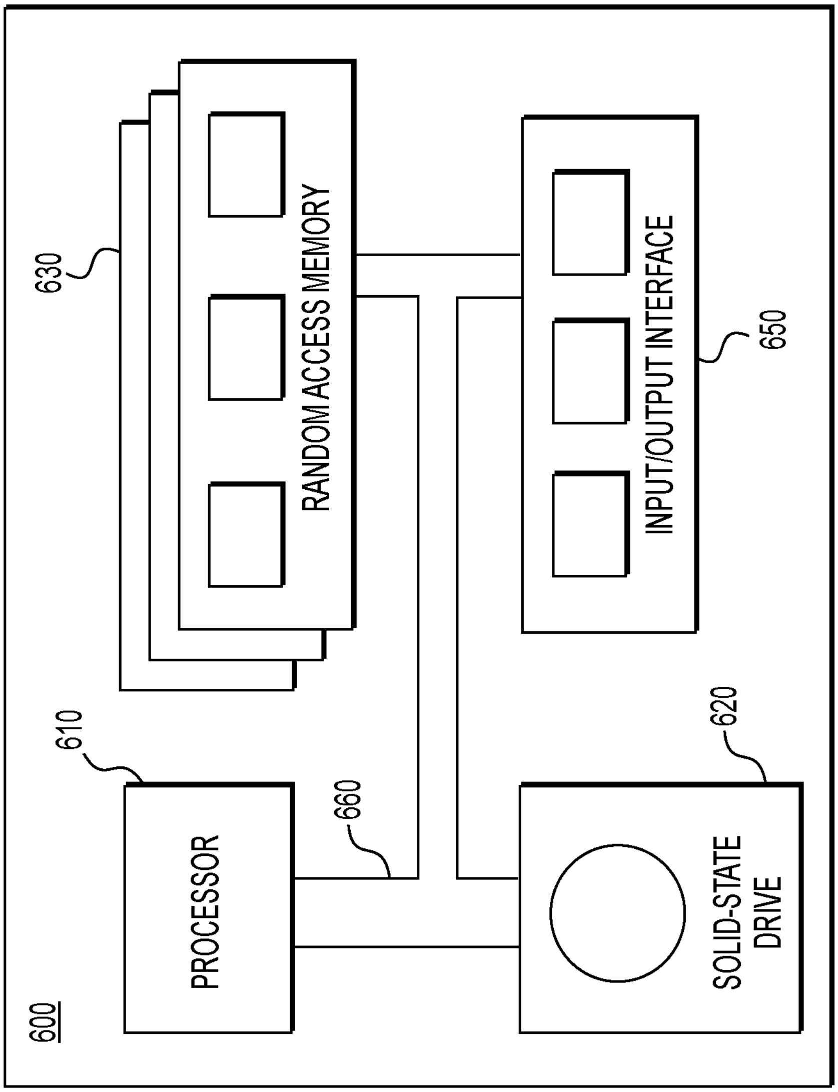
FIG. 6 is a schematic illustration of an electronic device according to an embodiment of the present technology.

With reference to FIG. 6, there is illustrated a diagram of a computing environment 600 in accordance with an embodiment of the present technology. It is contemplated that the controller unit 460 may comprise one or more components of the computing environment 600, without departing from the scope of the present technology.

In some embodiments, the computing environment 600 may be implemented by any of a conventional controller. In some embodiments, the computing environment 600 comprises various hardware components including one or more single or multi-core processors collectively represented by a processor 610, a solid-state drive 620, a random-access memory 630 and an input/output interface 650.

In some embodiments, the computing environment 600 may also be a sub-system of one of the above-listed systems. In some other embodiments, the computing environment 600 may be an "off the shelf" generic computer system. In some embodiments, the computing environment 600 may also be distributed amongst multiple systems. The computing environment 600 may also be specifically dedicated to the implementation of the present technology. As a person in the art of the present technology may appreciate, multiple variations as to how the computing environment 600 is implemented may be envisioned without departing from the scope of the present technology.

Communication between the various components of the computing environment 600 may be enabled by one or more internal and/or external buses 660 (e.g., a PCI bus, universal serial bus, IEEE 1394 "Firewire" bus, SCSI bus, Serial-ATA bus, ARINC bus, etc.), to which the various hardware components are electronically coupled.

The input/output interface 650 may allow enabling networking capabilities such as wire or wireless access. As an example, the input/output interface 650 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 620 stores program instructions suitable for being loaded into the random access memory 630 and executed by the processor 610 for executing operating data centers based on a generated machine learning pipeline. For example, the program instructions may be part of a library or an application.

Multi-ACS Configuration

Figure 7A:
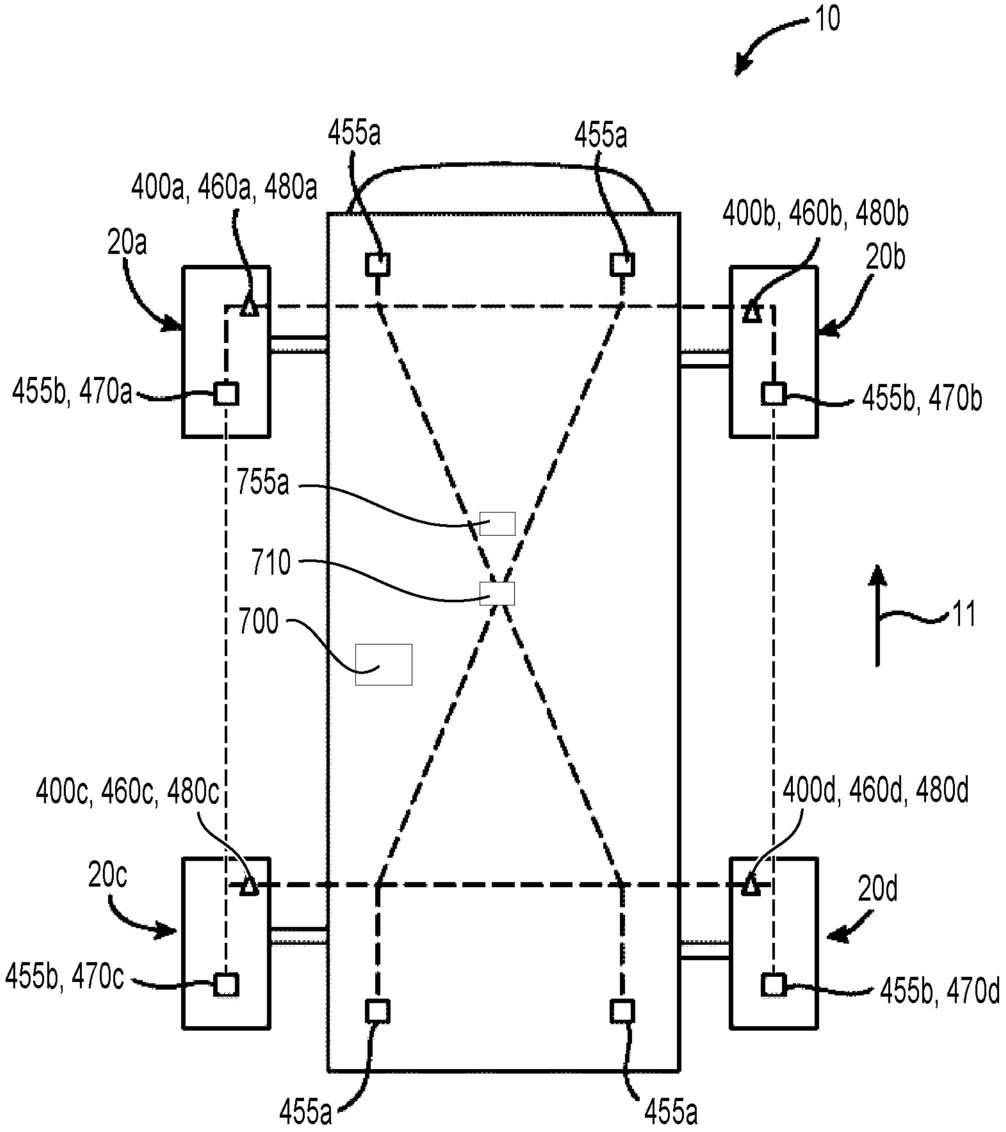
FIG. 7A is a schematic top plan view of a vehicle having track systems having an ACS according to embodiments of the present technology.
Figure 7B:
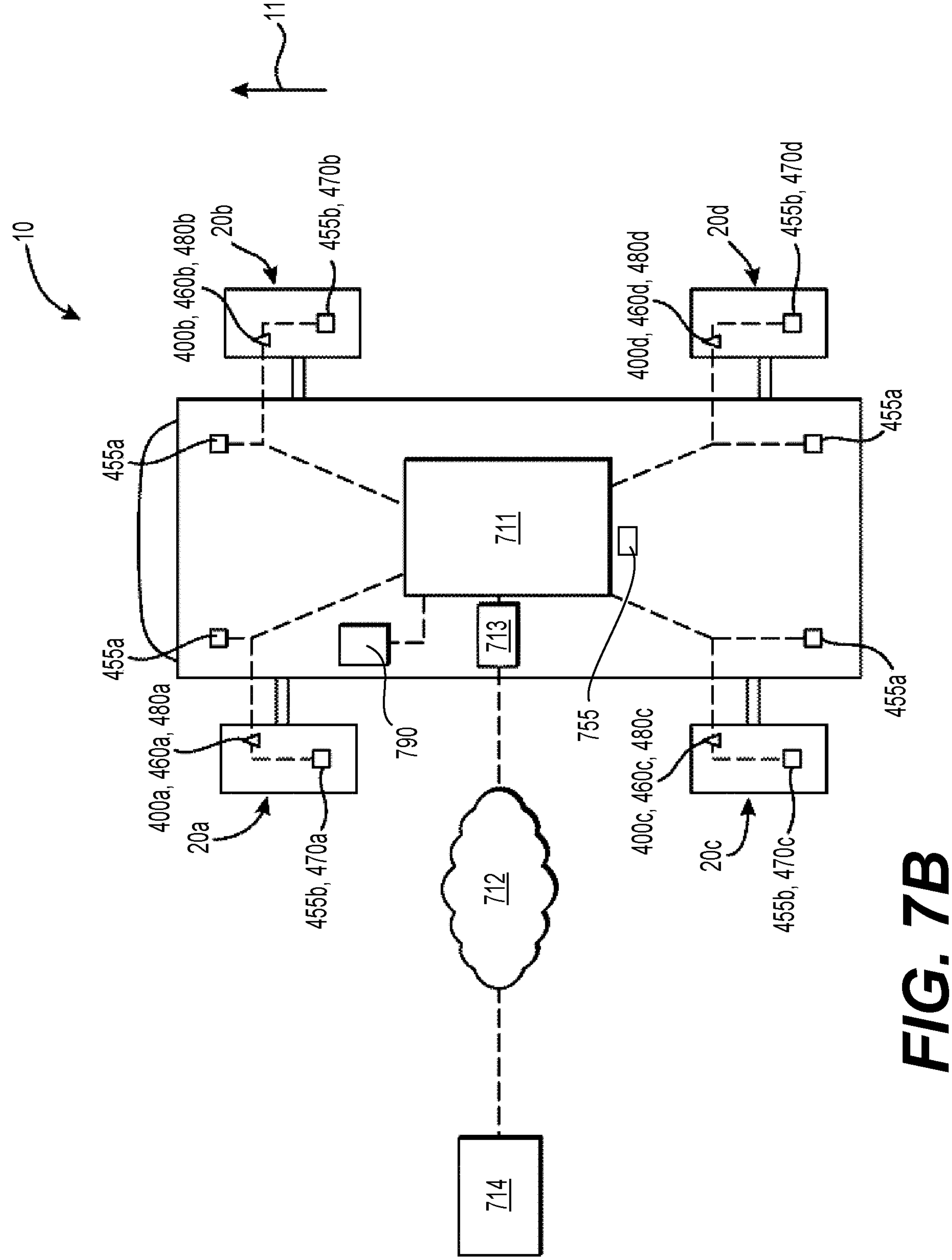
FIG. 7B is a schematic top plan view of the vehicle of FIG. 7A further having a master controller unit, a remote network and a remote processing unit according to embodiments of the present technology.

Referring now to FIGS. 7A and 7B, the vehicle 10 is schematically represented with the track systems 20*a*, 20*b*, 20*c*, 20*d*, according to an embodiment of the present technology. ACSs 400*a*, 400*b*, 400*c*, 400*d*, schematically represented by a triangle in FIGS. 7A and 7B, are operatively connected to respective track system 20*a*, 20*b*, 20*c*, 20*d*, and control, respectively, the operation of the motor 410*a*, 410*b*, 410*c*, 410*d*. It is understood that the ACS 400*n* can be any of the embodiments described above, and that a description is not repeated herein for brevity. As such, each ACS 400*n* is programmable and capable of running predetermined sequences and actions so as to control the operation of the motor 410*n* of its corresponding track system 20*n* automatically and/or using manual override in accordance with a predetermined objective.

In the embodiment illustrated in FIG. 7A, each of the ACSs 400*a*, 400*b*, 400*c*, 400*d* is powered by the electrical system of the vehicle 10, a common power source 700 and/or is self-powered via a specific power source 480*a*, 480*b*, 480*c*, 480*d*, respectively.

In this embodiment, each one of the motors 410*a*, 410*b*, 410*c*, 410*d* is operatively connected to a common controller unit 710 and a respective specific controller 460*a*, 460*b*, 460*c*, 460*d*. It is contemplated that in other embodiments, each one of the motors 410*a*, 410*b*, 410*c*, 410*d* could be connected to only the common controller unit 710, or each of the motors 410*a*, 410*b*, 410*c*, 410*d* could be connected to only the respective specific controller unit 460*a*, 460*b*, 460*c*, 460*d*. Each of the controller units 710, 460*a*, 460*b*, 460*c*, 460*d* may include a memory element and a processing element capable of receiving and sending signals. The dashed lines in FIG. 7A indicate that the ACSs 400*a*, 400*b*, 400*c*, 400*d* are operatively interconnected to one another. In some embodiments, the ACSs 400*a*, 400*b*, 400*c*, 400*d* are all interconnected. In other embodiments, the ACSs 400*a*, 400*b* are interconnected to one another and the ACSs 400*c*, 400*d* are interconnected to one another. In yet other embodiments, the ACSs 400*a*, 400*c* are interconnected to one another, and the ACS 400*b*, 400*d* are interconnected to one another. Different such combinations are contemplated without departing from the scope of the present technology. It is to be noted that vehicle 10 could be asymmetrical in that there could be an odd number of track system or an odd number of track systems having an ACS 400.

As described, each ACS 400*n* controls the operation of its motor 410*n* depending on various input signals received from the user of the vehicle 10 and/or from at least one of the angular monitoring device 455*n* and the rotational speed monitoring device 470*n* (schematically represented in FIGS. 7A and 7B as squares).

As described above, each of the angular monitoring device 455*n* provides a vehicle angle Vn via at least one vehicle angle monitoring device 455*a* disposed on the vehicle 10 and a track system angle TSn via a track system angle monitoring device 455*b* of corresponding track system 20*n*.

In some embodiments, the vehicle angle monitoring device 455*a* may be embodied as a common vehicle angle monitoring device 755*a* shared by each ACS 400*n*. In some embodiments, the vehicle angle monitoring device 455*a* includes a plurality of vehicle angle monitoring devices 455*a*, e.g., one being disposed on each corner of the vehicle 10.

Similarly, each of the rotational monitoring device 470*n* provides a RS1n of a corresponding wheel to which the motor 410*n* is at least indirectly coupled to and a RS2n of a corresponding motor 410*n* of the corresponding track system 20*n*.

In the present embodiment, the track system angle monitoring devices 455*b* are mounted on each one of the track systems 20*n*. As described, the track system angle monitoring devices 455*b* are used for determining at least indirectly the angle of each one of the track systems 20*n* relative to the vehicle 10 and/or a condition of the ground surface on which the vehicle 10 travels. It is to be understood that the track system angle monitoring devices 455*b* can be embedded within, affixed, mounted or connected to any suitable component of the track systems 20*n*. The track system angle monitoring devices 455*b* may be operatively connected to the controller units 710, 460*n* via a wired correction or a wireless connection. The operative connection between the track system angle monitoring devices 455*b* and the controller units 710, 460*n* is illustrated by the dashed lines in FIGS. 7A and 7B.

Referring to FIG. 7B, a master controller unit 711 is provided on the vehicle 10. The controller units 460*n* of the track systems 20*n* and at least some of the angular monitoring devices 455*n* and the rotational speed monitoring devices 470*n* are operatively connected to the master controller unit 711. The master controller unit 711, which includes a processing element and a memory element, is programmable and is configured to send and receive signals from and to the controller units 460*n*. In some embodiments, the master controller unit 711 can replace the specific controller units 460*n*.

In this embodiment, as the master controller unit 711 is operatively connected to the controller units 460*n*, data provided by said controller units 460*n* is taken into account by the master controller unit 711 and can assist in providing a more complete representation of the status (i.e., operating case) of the vehicle 10 and track systems 20*n*.

In some embodiments, a master user interface 790 is provided on the vehicle 10. The master user interface 790 can replace specific user interfaces 490*n* is some cases and allows a user to modify some parameters of the ACSs 400*n* as a whole, and/or individually of one specific ACS 400*n*. In some embodiments, the master user interface 790 is part of the vehicle 10 (i.e., operatively connected to a dashboard of the vehicle 10). In other embodiments, the master user interface 790 is a remote master user interface 790. For example, in some embodiments, the master user interface 790 could be a computer or a smartphone.

With continued reference to FIG. 7B, the master controller unit 711 can be connected to a remote network 712 via a communication device 713. Thus, data provided by the controller units 460*n* can be collected by the master controller unit 711, can be uploaded to the remote network 712 by the communication device 713 and can processed by a remote processing unit 714. Processed data and/or control signals for the controller units 460*n* obtained from the remote processing unit 714 can be downloaded to the master controller unit 711 via the remote network 712 and communication device 713 so that the master controller unit 711 controls the controller units 460*n* according to this processed data and/or control signals. For example, the remote device 714 can be a portable electronic device such as a smartphone, a tablet, or a computer. It is contemplated that in some embodiments, there could be the master controller unit 711 provided along with the common controller unit 710, where the common controller unit 710 can also provide data to the master controller unit 711.

It is understood that each of the track systems 20*n*, equipped with their respective ACS 400*n*, are at least indirectly in communication with all or at least some of the other track systems 20*n* via their specific controller units 710, 460*n* and/or by the master controller unit 711. Thus, the track systems 20*n* can cooperate to optimize the overall performance of the vehicle 10. More particularly, where the vehicle 10 has a plurality of track systems 20*n* including for instance a first track system 20*a* and a second track system 20*c*, the ACS 400*a* of the first track system 20*a* can be in communication with the ACS 400*c* of the second track system 20*c* such that the ACSs 400*a*, 400*c* can cooperate together to optimize the overall performance of the vehicle 10. For example, at least one of the ATSV and the ASR of the ACS 400*a* of the first track system 20*a* is used by the controller unit 460*c* of the ACS 400*c* of the second track system 20*c* for performing an operation on the second track system 20*c*.

Controller Method—General

Figure 8:
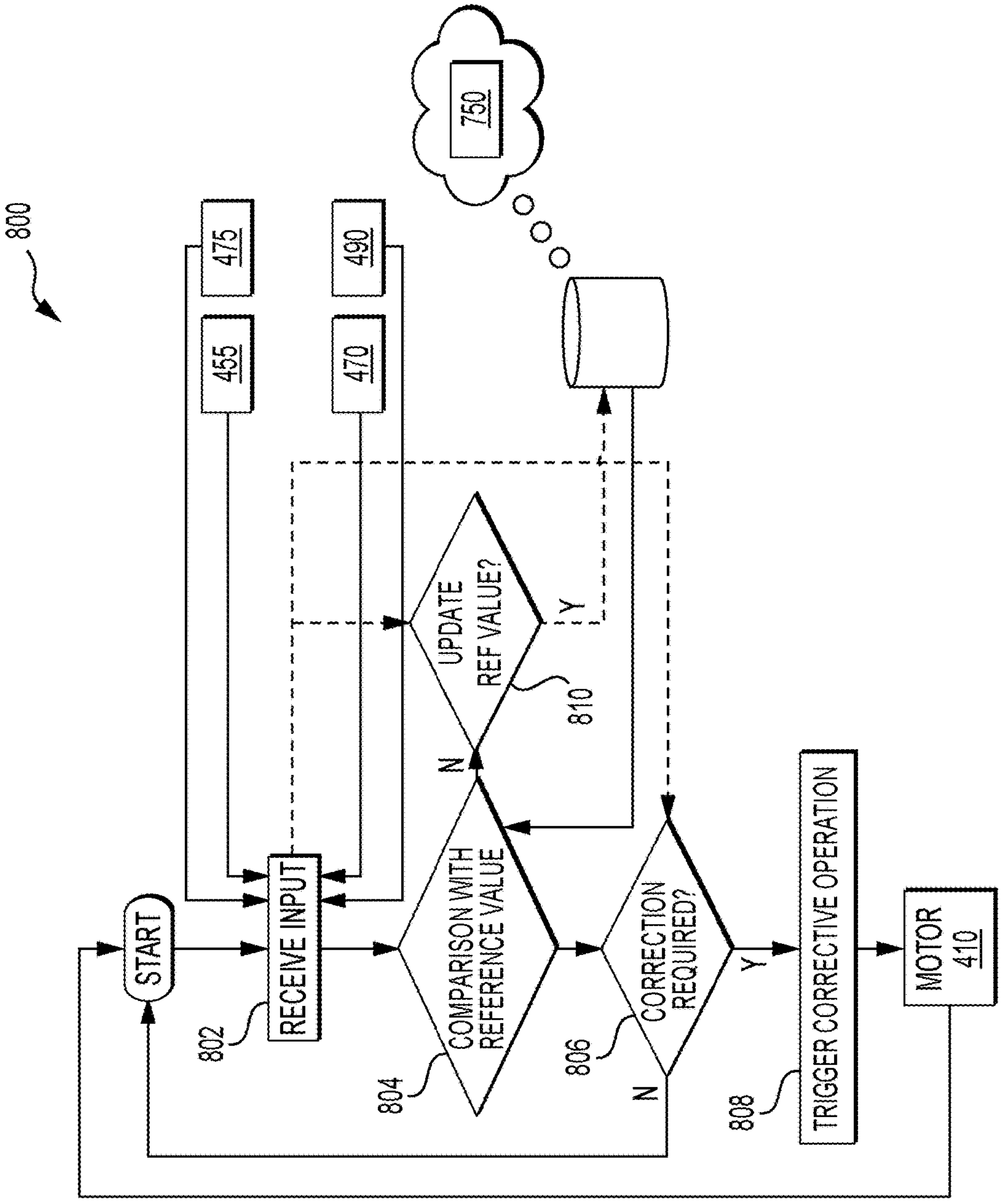
FIG. 8 is a flowchart of a method executable by a controller assembly of FIG. 5 according to an embodiment of the present technology.

With reference to the FIG. 8, there is depicted a scheme-block representation of a computer-method 800 executable by a controller unit as contemplated in some non-limiting embodiments of the present technology. Although one or more steps of the method 800 will be described with reference to the controller unit 460, it is contemplated that one or more steps of the method 800 may be executed by a processing element of at least one of the controller units 460, 710, and/or 711. In one embodiment, one or more steps of the method 800 may be executable by the processor 610 of the computing environment 600 (see FIG. 6).

At step 802, the controller unit 460 is configured to receive input signal(s) from various components of the controller assembly 430. For example, the controller unit 460 may receive any combination of: input signal(s) from the angular monitor device(s) 455, input signal(s) from the rotational monitoring device(s) 470, input signal(s) from the other monitoring device(s) 475, and input signal(s) from the user interface 490.

In some embodiments, the input signals can be indicative of an actual track system angle TS, an actual vehicle angle V, the ATSV, the actual RS1, the actual RS2, and/or the ASR. In other embodiments, the input signals can be indicative of an actual acceleration, an actual steering angle, and/or an actual speed of the vehicle 10 and/or of a corresponding track system. In further embodiments, the input signals can be indicative of a manual input from the user.

It is contemplated that the controller unit 460 is configured to process data acquired via the input signals and, in response, trigger angular control of the track system 20 for providing anti-rotation capabilities and/or in accordance with one or more modes for increasing performance of the track system in a variety of operational conditions.

At step 804, the controller unit 460 is configured to compare data acquired via the input signals against one or more reference values. It is contemplated that a plurality of reference values 750 can be stored in a memory element of the controller unit 460. In one embodiment, the plurality of reference values 750 may be stored in the solid-state drive 620 and/or in the memory 630 of the computing environment 600 (see FIG. 6).

Generally speaking, the plurality of reference values 750 may be part of operational parameters of the track system 20*n* which have an impact on the function and performance of the track system 20*n* operatively connected to said controller unit 460*n*. As will be described below, it should be noted that the user is able to enter manual inputs that can override at least some operational parameters of the controller units 460*n*. In some embodiments, this override can be temporary.

In some embodiments, the plurality of reference values 750 may comprise inter alia the PTSV, the PSR, an angle threshold value (ATV), a speed ratio threshold value (SRTV), a vehicle weight value (VWV), a soil type (ST), an overload threshold value (OTV), an operating case value, a manually inputted threshold value, an acceleration threshold value, a steering threshold value, a speed threshold value, a geometry of the track system, a spatial clearance between the track system and the vehicle (e.g., clearance C is identified in FIG. 4C between a rear part of the endless track 124 and the frame 14 of the vehicle 10), and a nominal ground clearance between the vehicle and the ground (the nominal ground being changeable based on a configuration of the track systems).

In some embodiments, the ATV may be a threshold value that is compared to the ATSV by the controller unit 460*n* to determine whether to send a notification to the user (e.g., via the user interface 490*n* and/or the master user interface 790) indicating that the current usage of the vehicle 10 may cause damage or premature wear of the track systems 20*n* or vehicle 10. In other embodiments, however, the ATV may be a threshold value that is compared to a difference between the ATSV and the PTSV by the controller unit 460*n* to determine if a corrective operation is to be triggered. It is contemplated that more than one ATV may be stored and used by the controller unit 460*n* during operation of the ACS 400*n*.

In some embodiments, the SRTV can be a threshold value that is compared to the ASR by the controller unit 460*n* to determine whether to send a notification to the user (e.g., via the user interface 490*n* and/or the master user interface 790) indicating that the current usage of the vehicle 10 may cause damage or premature wear of the track systems 20*n* or vehicle 10. In other embodiments, however, the SRTV may be a threshold value that is compared to a difference between the ASR and the PSR by the controller unit 460*n* to determine if a corrective operation is to be triggered. It is contemplated that more than one SRTV may be stored and used by the controller unit 460*n* during operation of the ACS 400*n*.

In some embodiment, the VWV can include the weight of the vehicle 10 plus the weight of the track systems 20*n*. In other embodiments, the VWV can, in addition to the weight of the vehicle 10 and the weight of the track systems 20*n*, include the weight of an implement (e.g., a plow, a snowblower, a trailer, etc.). In further embodiments, the VWV can include a weight distribution input to allow the user to specify if there is more weight or load applied on the front track systems 20*a*, 20*b* or on the rear track systems 20*c*, 20*d*, for example. It is understood that the VWV can change over a period time while the vehicle is in use (e.g., a harvester collecting crops).

In some embodiments, the ST can include at least one quality of the ground surface on which the vehicle 10 travels, such as whether the soil is generally one of snow, mud, earth, rocks, pavement, etc. In some embodiments, the approximative hardness of the soil can be included in the ST, such as “high hardness”, “moderate hardness”, “low hardness”, as well as “varying hardness”.

In some embodiments, the operating case value can be indicative of specific operating cases. If known in advance (e.g., the operating case is sidehill), the operating case can be selected by the user and the specific predetermined values associated to said operating case can be communicated to the controller units 460*n* for operating in accordance with the selected operating case. If not known in advance, the operating case can be determined or recognized automatically or autonomously as described in greater detail below.

Without being bound to any theory, the motor 410*n* can be overloaded (i.e., running over its normal operating conditions or capacity) when a load higher than a threshold value applied thereto. In some embodiments, the OTV can be a threshold value that is compared to an actual power required value by the controller unit 460*n* to determine whether to send a notification to the user (e.g., via the user interface 490*n* and/or the master user interface 790) indicating that the current usage of the vehicle 10 may cause damage or premature wear of the track systems 20*n* or vehicle 10. In some embodiments, the OTV can include a delay that takes in account the capacity of the motor 410*n* before triggering a notification. In other embodiments, the OTV is used by the controller units 460*n* to determine if a corrective operation is required.

Additionally, some of the plurality of reference values 750 can be grouped to form a mode-specific set of reference values that can be cooperatively adjusted in order to selectively modify the operation of the ACS 400*n* in accordance with a pre-determined objective. For example, the pre-determined objective can be one of an increased traction mode (e.g. by modifying the size of the contact patch of the track system, by modifying the orientation of the track system to better follow the ground, etc.), an increased ride comfort quality mode (e.g. by orienting the track system to prepare it for overcoming an obstacle and thus minimizing its impact, or by modifying the orientation of the track system to better follow the ground and thus minimizing vibrations and shocks), an increased obstacle overcoming mode (e.g. by orienting the track system to prepare it for overcoming an obstacle and to increase ground clearance and thus enhance ability of the track system to overcome the obstacle and minimizing risk of contact between the vehicle and the obstacle, etc.), an increased speed mode (e.g. by modifying threshold values of the ACS to make it more reactive thereby enhancing maneuverability of the vehicle), an increased ground clearance mode (e.g. by orienting the track system(s) into a heel or a toe configuration and thus causing a lifting effect of the vehicle), etc. It is noted that the set of reference values that cooperatively adjusts the operation of the ACS in accordance with the pre-determined objective can be a combination of different threshold values, settings or computer-implemented methods that will be described in greater detail below through different embodiments and modes. It is also noted that in some cases, the selection of reference values can be performed by an artificial intelligence infrastructure, as will be described below.

Broadly, the controller unit 460 is configured to compare data acquired from an input signal with at least one reference value, and if there is a material difference therebetween, determine at step 806 whether a corrective operation is required to at least minimize the difference therebetween. As will be described in greater detail below, a difference is considered to be material if the difference is greater than a predetermined value.

In some embodiments, the controller unit 460 may determine a type of and/or magnitude of a corrective operation to be performed based on a comparison of the data acquired from input signal(s) and one or more reference values. In some cases, the material difference between the input and the at least one reference value can be a discrete value (e.g., "1"), a range of values (e.g., "[−1;1]"), or a value with a margin (e.g., "1+/−5%"). It is understood that the range of values and the value with a margin define a sensitivity level of correction of the ACS 400, such that the controller unit 460 is more or less responsive.

At step 808, the controller unit 460 is configured to trigger the corrective operation by transmitting a control signal to the motor 410*n* that triggers the motor 410*n* to perform the corrective operation. Alternatively, the control signal may be transmitted to a power source for triggering the motor 410*n* to perform the corrective operation.

As it will be described in greater details herein further below, in some embodiments, at step 810, the controller unit 460 may be configured to determine, based on data acquired via the input signals whether one or more reference values from the plurality of reference values 750 are to be updated, at least temporarily, for modifying an angular control logic according to one or more operational modes of the track system 20.

Additionally, or alternatively, it is contemplated that the controller unit 460 may be configured to determine whether or not a corrective operation is required based on input data, without necessarily performing a comparison step against reference values, according to one or more operational modes of the track system 20 described herein further below.

Default Mode

With reference to the track system 20*a*, the controller unit 460 may selectively supply the required power from the power source 480 to the motor 410*a* for operating the track system 20*a* in a "default" mode, during which the ACS 400*a* performs anti-rotation control of the track system 20*n*, i.e. as an ARS.

Operation of the track system 20*a* according to four operating cases in the default mode will now be described in greater details with reference to FIGS. 10A to 10D. It is understood that the operation of the track systems 20*b*, 20*c*, 20*d* are generally similar, and thus will not be described in detail herewith. It is understood that examples in FIGS. 10A to 10D are not limitative and other operating cases are contemplated as well. A particular operating case may be defined in terms of one or more of: an orientation of the vehicle 10 and an orientation of the track system 20*a* relative to the vehicle 10, where the orientations are subject to be influenced by, among other things, the quality of the ground surface on which the track system 20*a* is disposed, and the operation of the vehicle 10, and being relative to one of the gravity vector G used herein as a reference and at least one of the pitch, roll, and yaw axes, for instances. In some cases, the controller unit 460 can be configured to perform at least some tasks automatically (i.e., in accordance with programmed algorithms that form procedural instructions) or autonomously (i.e., in accordance with programmed algorithms that parse data, learn from that data, and apply that learning to make informed decisions) without manual inputs from the user. In some cases, the controller unit 460 can be configured to have an artificial intelligence infrastructure (e.g., machine learning, deep learning, etc.) allowing it to perform at least some tasks based on provided data/inputs and to improve the way said at least some tasks are performed over time with additional data/inputs. Some examples of tasks performed automatically or autonomously can be, without being limited to, processing data, recognizing an operating case, identifying a corrective operation, comparing received inputs with reference values, predicting operating cases, adapting the angular controlling system for particular operating cases, generating notifications, etc. For example, if the ground surface is inclined or if the ground surface has convex obstacles (e.g., rocks) or concave obstacles (e.g., potholes), it will likely influence the orientation of the track system 20*a* relative to the vehicle 10. Similarly, if the vehicle 10 accelerates or decelerates considerably, it will likely influence the orientation of the vehicle 10 relative to the track system 20*a*. In addition, in some cases, the artificial intelligence may create new computer-implemented methods and/or to modify existent computer-implemented methods (e.g. to tune/ameliorate/optimize them) to address specific issues based on experience and acquired data. For instance, these new computer-implemented methods may be created in response to a pre-determined objective and may use a set of reference values to cooperatively adjust the operation of the ACS to meet said pre-determined objective, as previously mentioned.

Figure 10A:
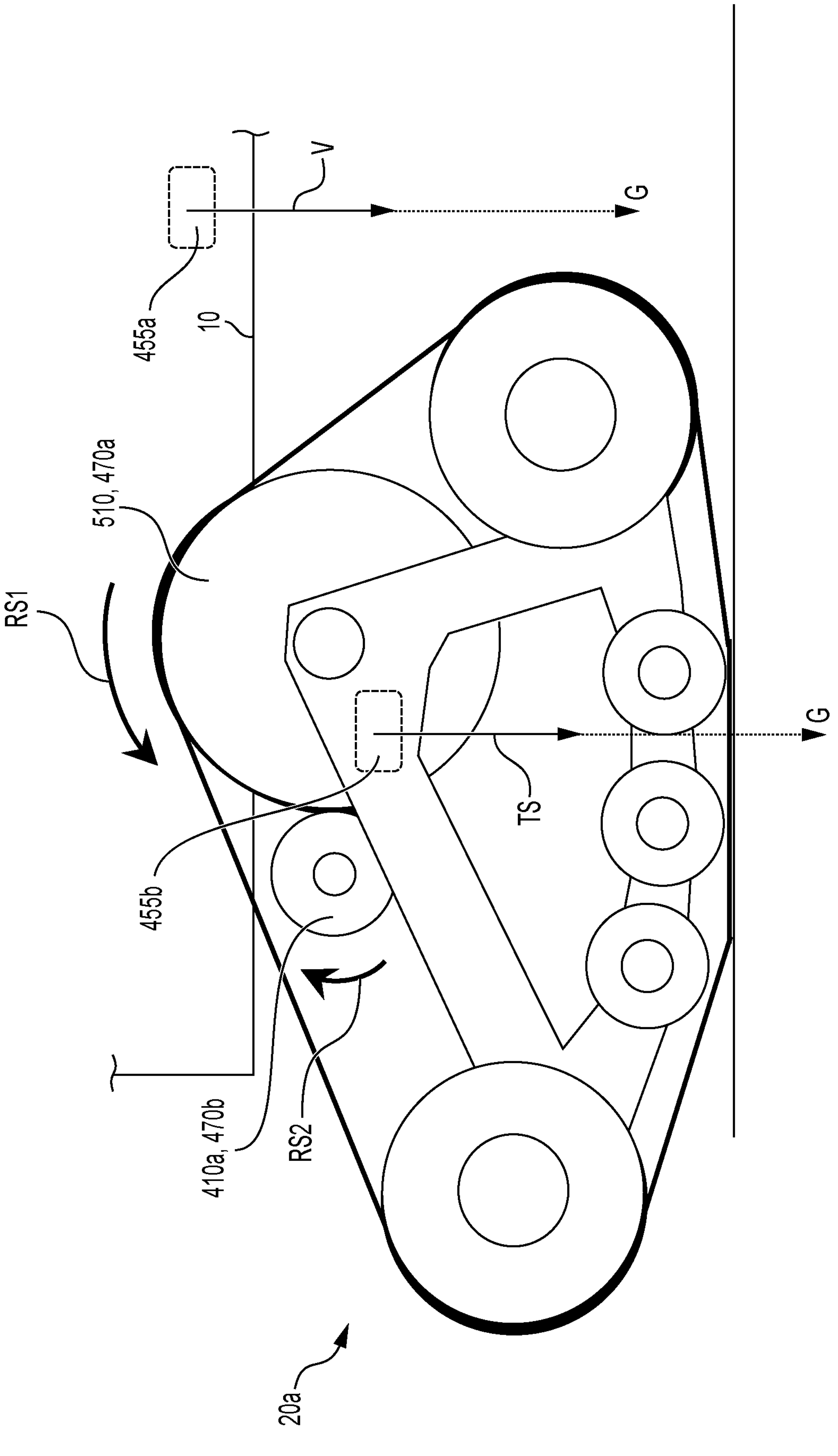
FIG. 10A is a schematic left side elevation view of the front track system of FIG. 4B, where the angular relationship between the track system and the vehicle is according to a first operating case.

In FIG. 10A, there is depicted an operating case where the ground surface is generally flat and the track system 20*a* and the vehicle 10 are generally in the same orientation (i.e., generally parallel). This case can generally represent a situation where the vehicle 10 is either static or where the vehicle 10 is moving at a constant speed. Thus, the track system angle TS is generally equal to the vehicle angle V, and are generally parallel to the gravity vector G, which is used herein as an exemplary reference. It is understood that the controller unit 460*a* may be configured not to trigger an operation on the track system 20*a*, since the ATSV is within a pre-determined threshold value from the PTSV. In some embodiments, this pre-determined threshold value may be about "0" degrees. In some embodiments, this pre-determined threshold value may be a pre-determined threshold range that ranges between about "−3" and about "1" degrees to account for small discrepancies. In other embodiments, the pre-determined threshold value may be the ATV mentioned above.

Similarly, the ASR is generally equal to the PSR since the vehicle is either static or moving at a constant speed, such that the actual RS1, RS2 are constant as well. It is understood that the controller unit 460 may be configured not to trigger an operation to the track system 20, since the difference between the ASR is within a pre-determined threshold value from the PSR. In some embodiments, this pre-determined threshold value may be about "0". In some embodiments, this pre-determined threshold value may be a pre-determined threshold range that ranges between about "0" to about "0.3" to account for small discrepancies. In other embodiments, this pre-determined threshold value may be the SRTV mentioned above.

Figure 10B:
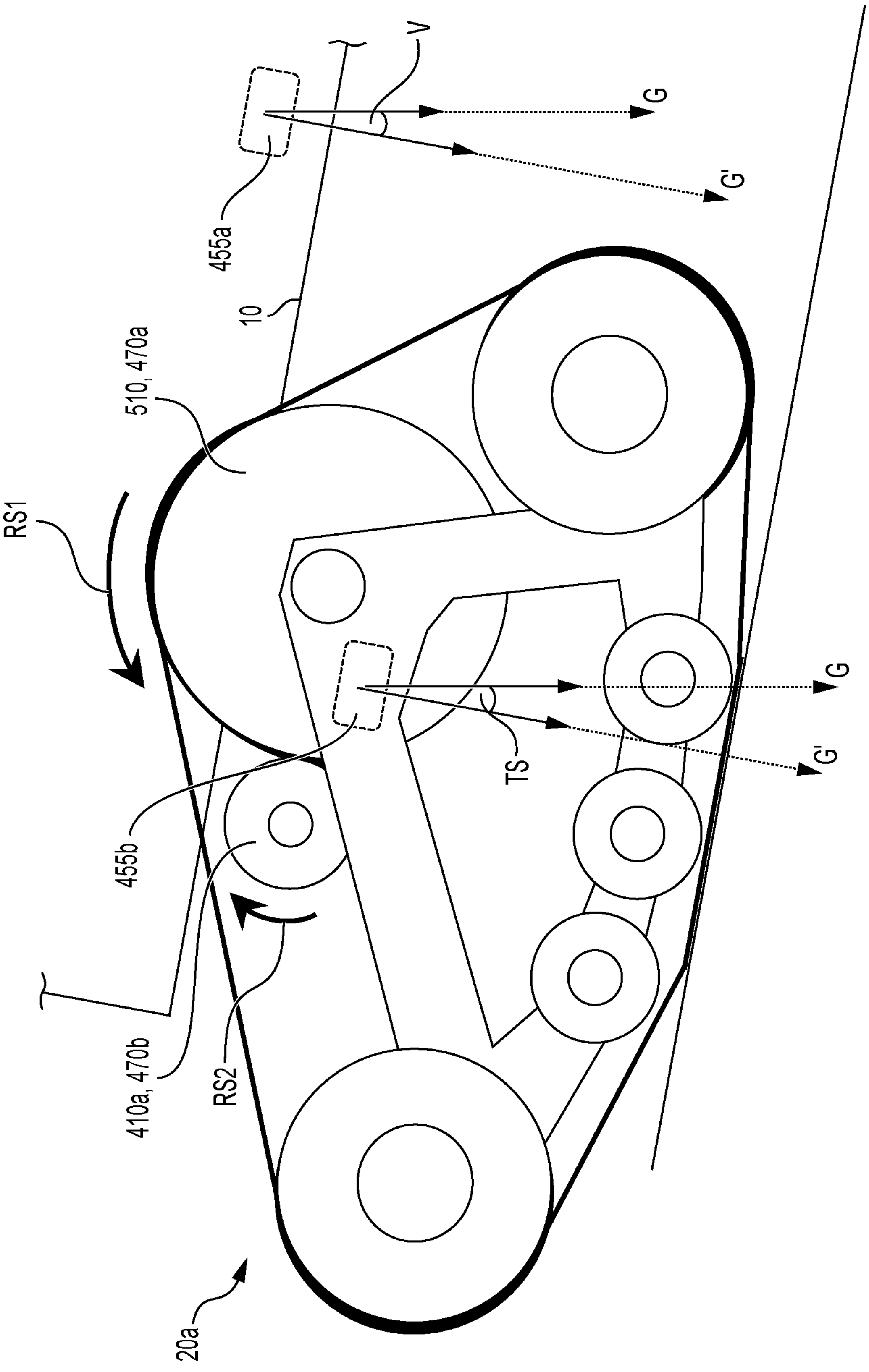
FIG. 10B is a schematic left side elevation view of the front track system of FIG. 4B, where the angular relationship between the track system and the vehicle is according to a second operating case.

In FIG. 10B, there is depicted an operating case where the ground surface is inclined (at least about the pitch axis) and the track system 20 and the vehicle 10 are generally in the same orientation (i.e., generally parallel). This case can correspond to when the vehicle 10 is climbing uphill, for instance. Thus, the track system angle TS is generally equal to the vehicle angle V, and both the track system angle TS and the vehicle angle V are inclined (illustrated as gravity vector G') compared to the gravity vector G used herein as a reference. It is understood that the controller unit 460 may be configured not to trigger an operation to the track system 20*a*, since the difference between the ATSV and the PTSV is within a pre-determined threshold value.

Similarly, the ASR is generally equal to the PSR since the vehicle 10 is either static or moving at a constant speed, such that the RS1, RS2 are constant as well. It is understood that the controller unit 460 may be configured not to trigger an operation to the track system 20, since the difference between the ASR and the PSR is within a pre-determined threshold.

Figure 10C:
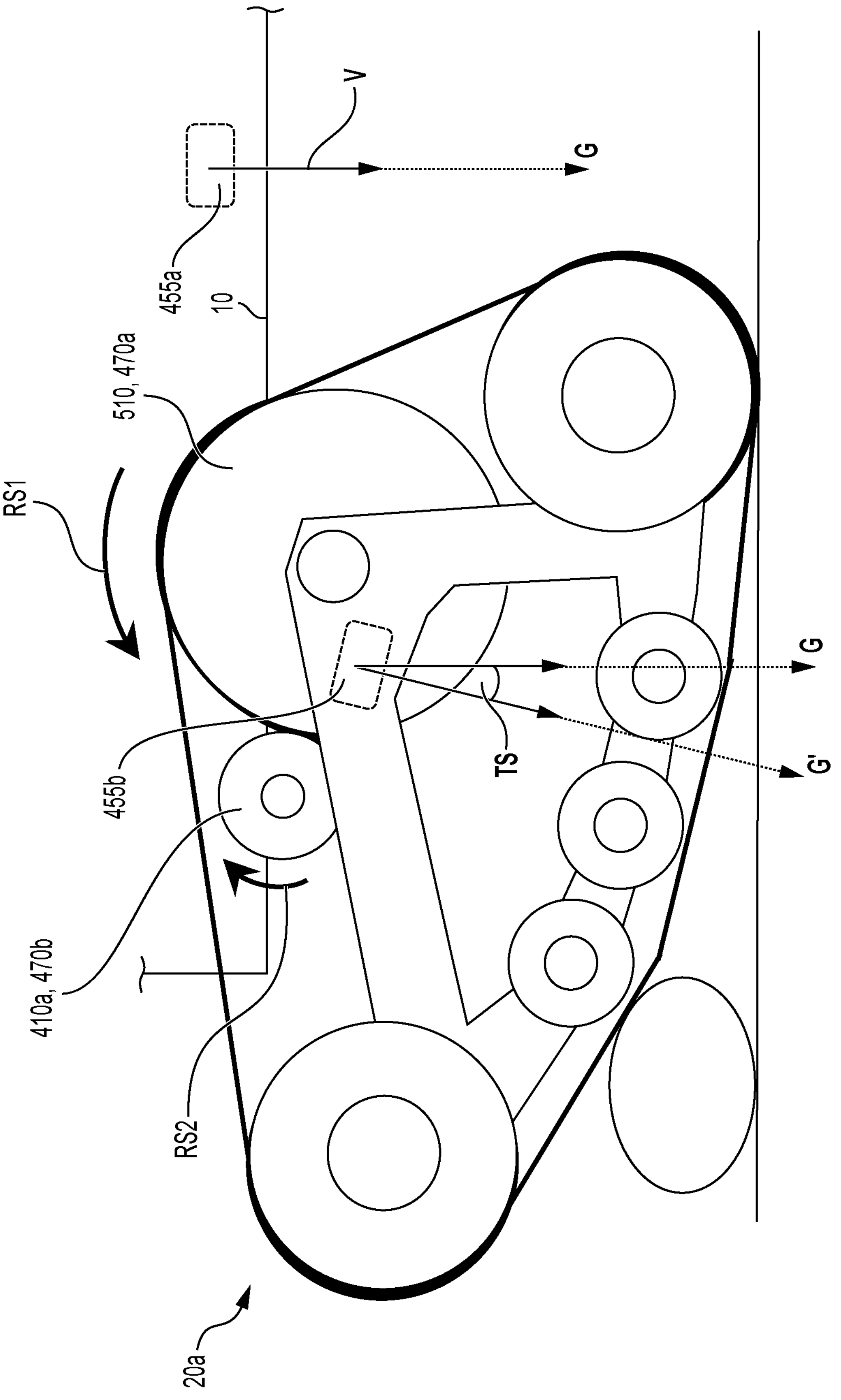
FIG. 10C is a schematic left side elevation view of the front track system of FIG. 4B, where the angular relationship between the track system and the vehicle is according to a third operating case.

In FIG. 10C, there is depicted an operating case where the ground surface is generally flat but presents an obstacle (e.g., rock) and where the vehicle 10 is moving at a constant speed. In this operating case, the track system 20*a* and the vehicle 10 are not in the same orientation. Thus, the track system angle TS is different from the vehicle angle V and is inclined (illustrated as gravity vector G') compared to the gravity vector G used herein as a reference, whereas the vehicle angle V is generally parallel to the gravity vector G used herein as a reference (at the point in time shown in FIG. 10C). It is understood that the controller unit 460 may be configured to trigger an operation to the track system 20*a*, if the difference between the ATSV and the PTSV is beyond a pre-determined threshold. If triggered, the operation of the motor 410*a* can assist in correcting the orientation of the track system 20*a* relative to the vehicle 10.

Similarly, the ASR differs from the PSR since the actual RS1 is constant but the actual RS2 is momentarily modified (e.g., increased in the case shown in FIG. 10C). It is understood that the controller unit 460 may be configured to trigger an operation on the track system 20*a*, if the difference between the ASR and the PSR is beyond a pre-determined threshold value. If triggered, the operation of the motor 410*a* can assist in correcting the orientation of the track system 20*a* relative to the vehicle 10.

Figure 10D:
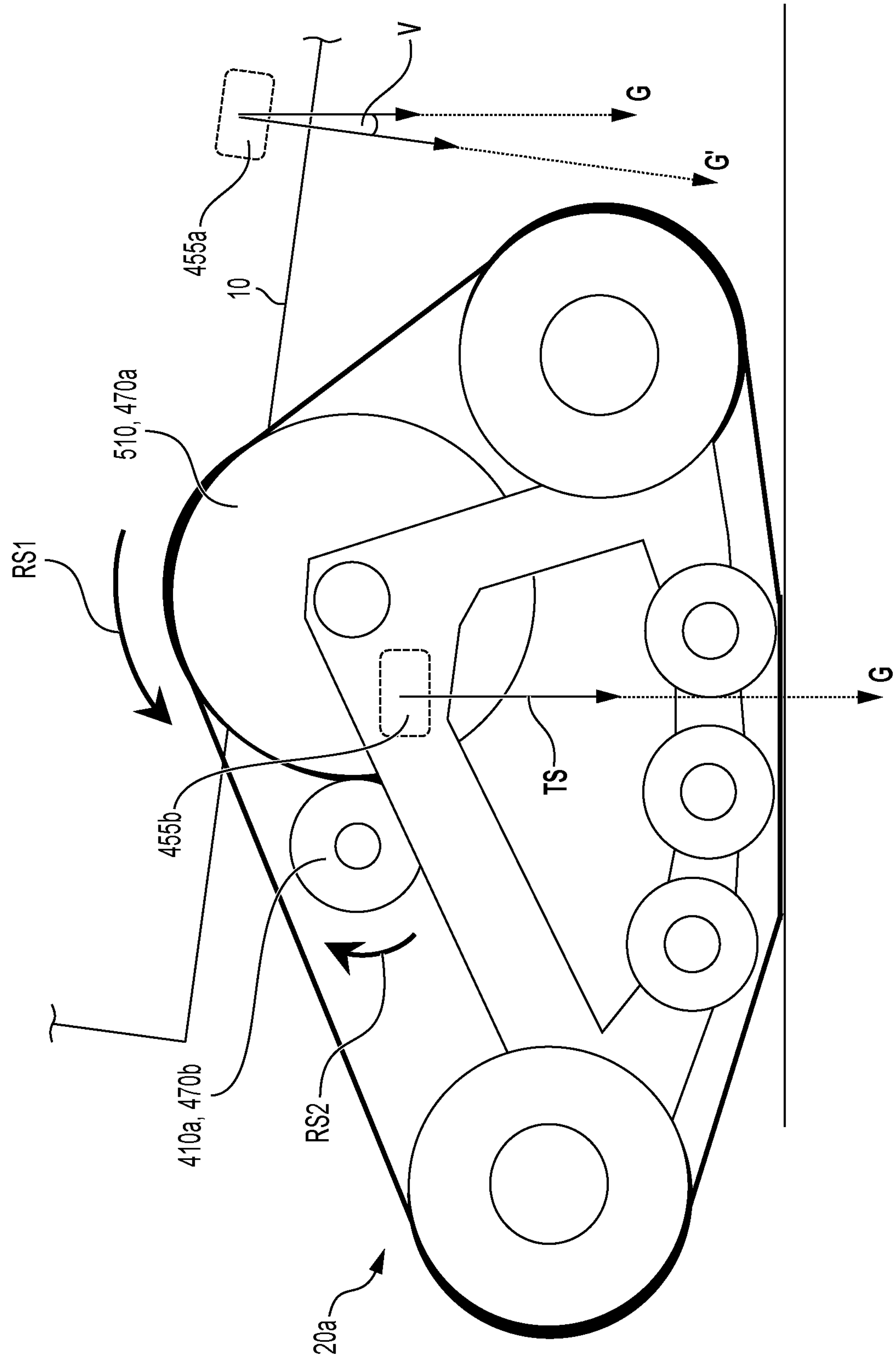
FIG. 10D is a schematic left side elevation view of the front track system of FIG. 4B, where the angular relationship between the track system and the vehicle is according to a fourth operating case.

In FIG. 10D, there is depicted an operating case where the ground surface is generally flat and where the vehicle 10 is not moving a constant speed (e.g., accelerating). The track system 20*a* and the vehicle 10 are thus not in the same orientation. Specifically, the track system angle TS is different from the vehicle angle V which is inclined (illustrated as gravity vector G') compared to the gravity vector G used herein as a reference. It is understood that the controller unit 460 may be configured to trigger an operation on the track system 20*a*, if the difference between the ATSV and the PTSV is beyond a pre-determined threshold value. If triggered, the operation of the motor 410*a* can assist in correcting the orientation of the track system 20*a* relative to the vehicle 10.

Similarly, the ASR differs from the PSR since the RS1 is momentarily modified (e.g., decreased in the case shown on FIG. 10D) while the RS2 is constant. It is understood that the controller unit 460 may be configured to trigger an operation on the track system 20*a*, if the difference between the ASR and the PSR is beyond a pre-determined threshold value. If triggered, the operation of the motor 410*a* can assist in correcting the orientation of the track system 20*a* relative to the vehicle 10.

The controller unit 460 may be configured to determine which operating case is occurring based on a comparison of received input. Then, the controller unit 460 may be configured to determine the required operation to apply to the motor 410*a*, such as sending a notification to the user (i.e., via the user interface 490 and/or the master user interface 790) and/or selectively triggering supply of the required power from the power source 480 to the motor 410*a* to generate a corrective angular movement the track system 20*a* relative to the vehicle 10.

For example, the corrective angular movement can be the result of a corrective torque from the motor 410*a*, by a variation of its rotational speed for instance. It should be noted that an increase of power provided to the motor 410*a* from the power source 480 can generate a positive torque acting in the same rotational direction than the wheel to which the motor 410*a* is at least indirectly coupled to. Conversely, a decrease of power provided to the motor 410*a* from the power source 480 can generate a negative torque opposing or counteracting the rotational direction of the wheel to which the motor 410 is at least indirectly coupled to. Depending of the configuration of the motor 410*a* relative to the axis of rotation 41 of the drive wheel assembly 40*a*, i.e., if the motor 410*a* is mounted on the frame 30 at a location that is longitudinally in front or behind said axis of rotation 41, the corrective torque can result in a rotational movement of the track system 20*a* about the rotation axis 41 of the drive wheel assembly 40*a*, in a clockwise direction (CW) or a counter clockwise direction (CCW).

Broadly and without being bound to any theory, in some embodiments, the controller unit 460 may be embodied as a Proportional Integral Derivative (PID) controller configured to automatically adjust the corrective operation based on the difference between the PTSV and the ATSV. In some embodiments, a magnitude of the corrective operation may be proportional to the magnitude of said difference itself. However, as previously alluded to, although the magnitude of the corrective operation may be proportional to the magnitude of the difference itself, in at least some embodiments, the controller unit 460 may trigger the operation only if the difference between the ATSV and the PTSV is above a pre-determined threshold value.

Figure 9A:
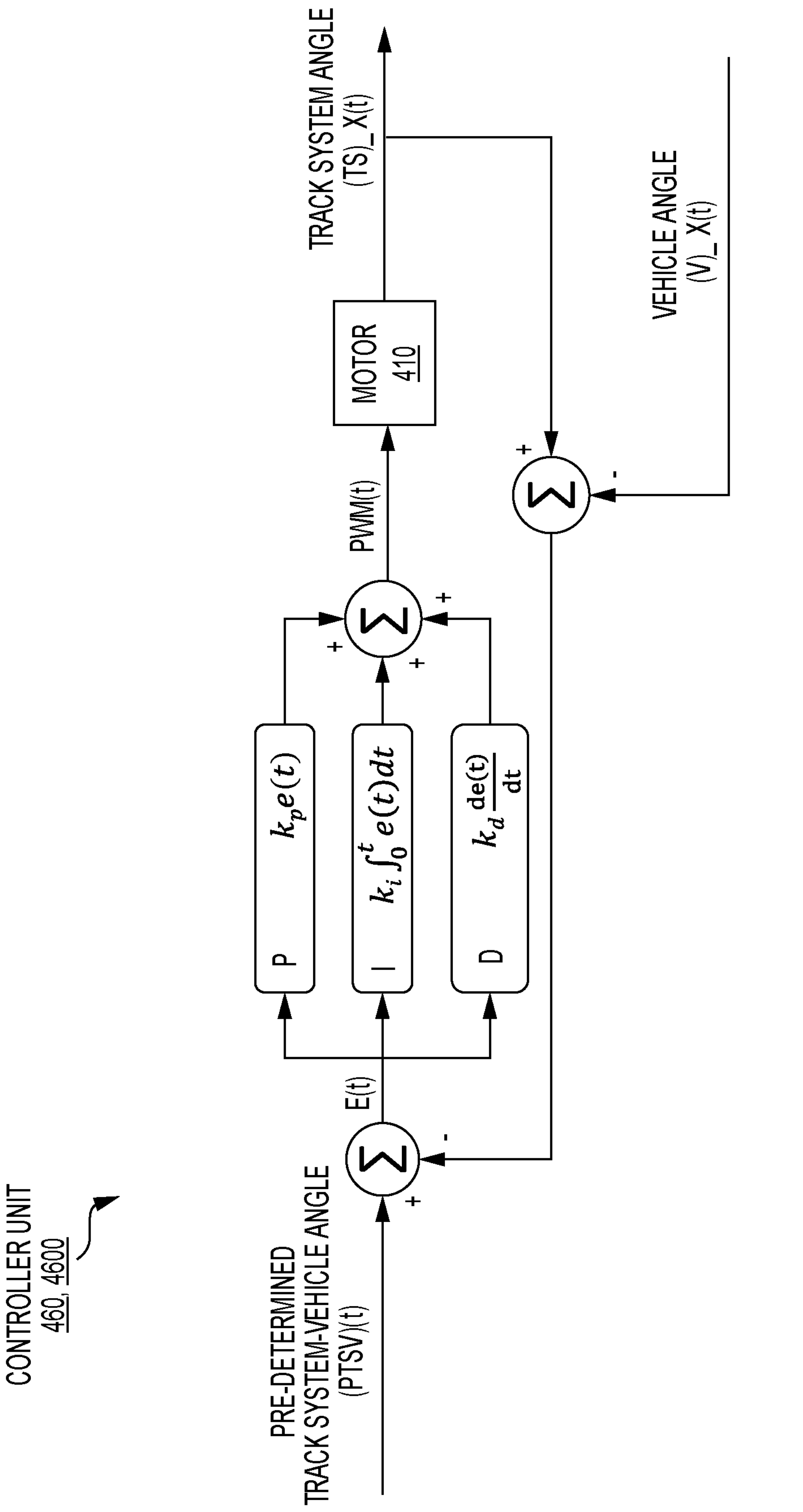
FIG. 9A is a block-diagram representation of the controller unit of FIG. 5 according to an embodiment of the present technology.
Figure 9B:
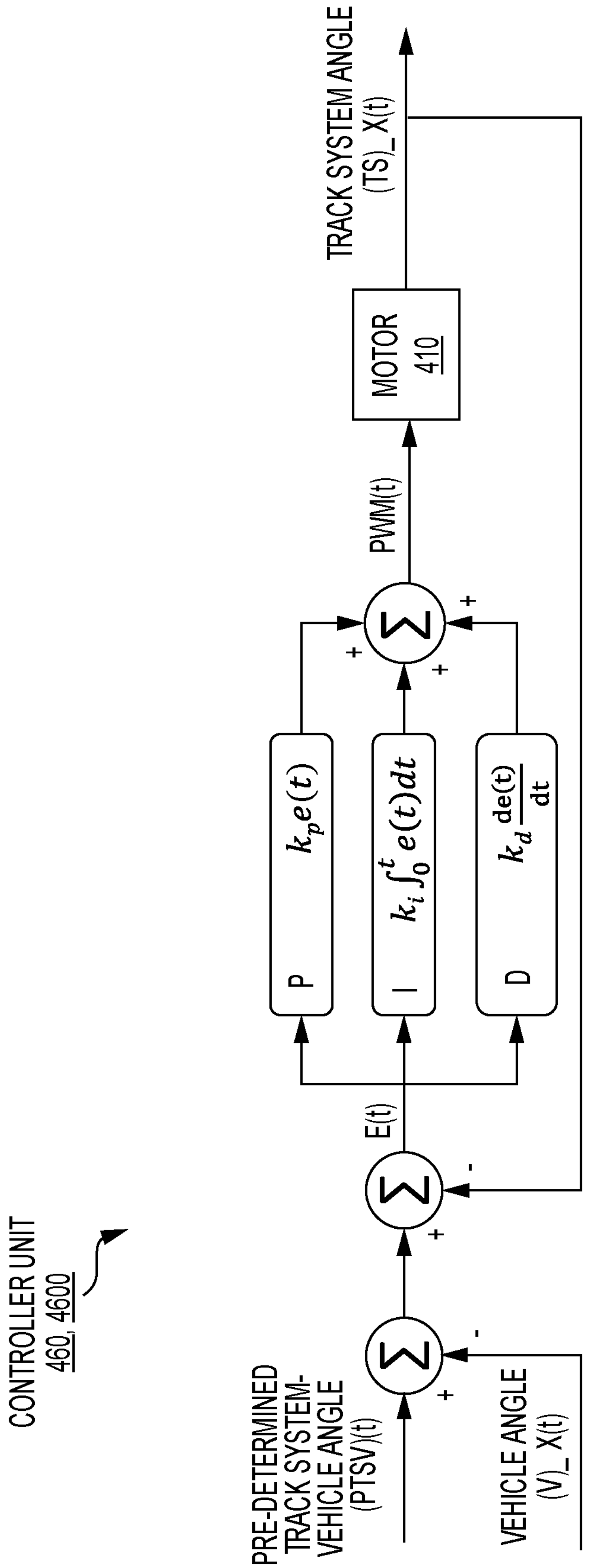
FIG. 9B is a block-diagram representation of the controller unit of FIG. 5 according to an other embodiment of the present technology.

Broadly, a PID controller is a feedback control system used for industrial control applications to regulate process variables such as temperature, pressure, flow rate, and speed. The PID controller uses a three control actions, namely "proportional", "integral", and "derivative" actions. The proportional control action provides a control output proportional to an error, which is the difference between a desired setpoint and a measured process variable. The integral control action provides a control output proportional to an integral of an error over time, which helps to eliminate steady-state errors in the system. The derivative control action provides a control output proportional to a rate of change of the error, which helps to reduce overshoot and damping in the system. The PID controller combines these three control actions to generate an output signal that drives the control system towards the desired setpoint. The PID controller may continuously measure the error and adjusts the output signal to maintain the process variable at the setpoint. In FIGS. 9A and 9B, there is depicted block diagrams of two different PID configurations as contemplated in some embodiments of the present technology. Other configurations are contemplated as well.

In FIG. 9A the Vehicle Angle V_X(t) is directly subtracted from the Track System Angle TS_X(t). The result is sent via the feedback loop for comparison with the PTSV(t). The difference therebetween e(t) is transmitted to generate a pulse-width modulated signal PWM(t).

In FIG. 9B, the Vehicle Angle V_X(t) is directly subtracted from the PTSV(t). The result becomes a new value to compare with the track system angle TS_X(t) that is provided by the feedback loop. The difference therebetween e(t) is transmitted to generate a pulse-width modulated signal PWM(t).

Performance Modes

As previously alluded to, in addition to the default mode, the controller unit 460 may trigger operation of the track system 20*a* in accordance with one or more other modes for increasing performance of the track system 20*a*, and/or other track systems 20*b*, 20*c*, 20*d* of the vehicle 10.

In some embodiments, the controller unit 460 may trigger operation of one or more track systems 20*a*, 20*b*, 20*c*, 20*d* of the vehicle 10 in accordance with one or more performance modes. The performance modes may include, but are not limited to: a Front Wheel Drive (FWD) mode, a Rear Wheel Drive (RWD) mode, Four Wheel Drive (4WD) mode, and a technical course mode. In the FWD mode, the engine's power may be selectively transmitted to the front track systems 20*a*, 20*b* of the vehicle 10. The front track systems 20*a*, 20*b* provide propulsion for the vehicle 10. In the RWD mode, the engine's power is transmitted to the rear track system 20*c*, 20*d* of the vehicle 10. The rear track systems 20*c*, 20*d* provide propulsion for the vehicle 10. In the 4WD mode, the engine's power is transmitted to all four track systems 20*a*, 20*b*, 20*c*, 20*d* of the vehicle 10. This provides better traction and propulsion in slippery or off-road conditions. The 4WD mode can be selected by the user for off-roading and other challenging driving conditions where extra traction is necessary. In the technical course mode, one or more sensibility parameters of a PID controller and/or of one or more thresholds may be adjusted for performance suited for a technical course.

Other Modes

As previously alluded to, in addition to the default mode, the controller unit 460 may trigger operation of the track system 20*a* in accordance with one or more other modes for increasing performance of the track system 20*a*, and/or other track systems 20*b*, 20*c*, 20*d* of the vehicle 10. With reference to FIGS. 10 to 29, a plurality of additional modes will be described in greater detail. Various operating modes will now be described. Though there will sometimes be references to the default mode, it is contemplated that the ACS 400 could work without performing any anti-rotation mode (i.e., not have a default mode).

The plurality of other modes will be described with reference to the track system 20*a* having the ACS 400*a*, and track systems 20*n*' having corresponding ACS. Although the general shape of the track systems 20*n*' is different from the general shape of the track systems 20*n*, the track systems 20*n*' may operate in a similar manner as the track system 20*n*, without departing from the scope of the present technology. In some embodiments, the track systems 20*a*', 20*b*' 20*c*', 20*d*' may be operatively connected to a frame 12' of a vehicle 10', as shown in FIG. 11A. The vehicle 10' may be embodied similarly to the vehicle 10 of FIG. 1. In other embodiments, the track systems 20*a*', 20*b*' 20*c*', 20*d*' may be operatively connected to an articulated vehicle 10" that is similar to the articulated vehicle 250 described hereabove in FIG. 2B. Thus, the vehicle 10' has a front body 12*a*", a rear body 12*b*" and an articulated mechanism 12*c*" interconnecting the front and rear bodies 12*a*", 12*b*". It should also be noted that the ACS of the track systems 20*n*' may operate in a similar manner as the ACS 400*a* of the track system 20*a*, without departing from the scope of the present technology. It is to be noted that features of the track system 20*n*' similar to those of the track system 20*n* have been labeled with the same reference numerals, and will not be described in detail herewith.

In FIGS. 10 to 29, the plurality of other modes will be described with reference to the processor 610 of the computer environment 600. In some embodiments, the processor 610 may be the processing element of the controller unit 460 of the ACS 400. In other embodiments, the processor 610 may be the processing element of the controller unit 710 and/or of the controller unit 711. In further embodiments, the processor 610 may be the processing element of a controller unit of the ACS of the track system 1000.

In FIGS. 10 to 29, the plurality of other modes will be described with reference to simplified 2D representations of at least one of the vehicles 10, 10', 10" and simplified 2D representations of at least one of the track systems 20*a* with the ACS 400*a*, and the track system 20*n*' with the corresponding ACS. It is understood that angular data acquired by the processor 610 may be in 3D (e.g., pitch, yaw, and roll dimensions). It should also be noted that one or more 3D coordinate systems of respective track systems may be, at least temporarily, misaligned with one or more 3D coordinate systems of the vehicle during operation.

As a result, in at least some embodiments, the processor 610 may be configured to determine and apply a "transformation matrix" for comparing angular data acquired from a given angular monitoring device mounted to a given track system with angular data acquired from a given angular monitoring device mounted to a given vehicle body. This may allow to compensate for a potential misalignment between the said 3D coordinate systems.

Broadly, a transformation matrix is a mathematical tool used to convert a point in one coordinate system to its equivalent point in another coordinate system. In the case of a pair of coordinate systems, a transformation matrix can include elements that relate to a translation operation, a rotation operation, and/or a scaling operation of the coordinate systems. The transformation matrix can be obtained by concatenating the matrices representing the individual transformations (translation, rotation, and scaling) between the two coordinate systems. The resulting matrix can then be used to transform any point in the original coordinate system to its corresponding point in the new coordinate system.

As an example, to perform the transformation, the point in the original coordinate system (e.g., track system coordinate system) may be represented as a vector including a pitch value, a roll value, and a yaw value of the track system. The transformation matrix is then multiplied with this vector to obtain the transformed point in the new coordinate system (e.g., vehicle body coordinate system). Transformation matrices can be applied to represent and manipulate points in 3D space, allowing for a wide range of applications in fields such as robotics, or other computer systems necessitating projection of data from one coordinate system to another. It should be understood that application of one or more transformation matrices on acquired angular data may result in different operations applied on the different track systems, especially when a vehicle is operating on a side hill and/or when braking during a turn (i.e., operations applied to track system 20*a* may be different from operations applied to track system 20*b*, because track systems 20*a*, 20*b* may be disposed in different three dimensional planes). Other mathematical operations are contemplated as well.

Without wishing to be bound to any specific theory, when a given vehicle is braking during a turning maneuver, the front track systems experience different loads due to the combination of at least two forces including a braking force and a centrifugal force. A braking force is applied to the track systems to slow down the given vehicle. When braking during a turn, the breaking force may be distributed between the front and rear track systems, with more force being applied to the front track systems because the weight of the vehicle shifts forward during braking. The breaking force may be determined using an accelerometer for example and may be proportionate to a longitudinal acceleration value of the given vehicle. A centrifugal force pushes the given vehicle outward during a turn. It can be proportional to the speed of the vehicle and a sharpness of the turn, for example. During a turn, the centrifugal force acts on the vehicle's center of mass, causing the weight of the given vehicle to shift to the outside track systems of the turn. The centrifugal force may be determined using an accelerometer for example and may be proportionate to a lateral acceleration value of the given vehicle. This means that the outside front track system experiences a greater load than the inside front track system. This effect may be amplified when operating on a side hill and turning towards higher ground. The combination of these two forces causes the front track systems to experience different loads during braking and/or turning manoeuvres. The outside front track system can experience a greater load due to the centrifugal force. The inside front track system can experience a smaller load due to the braking force. This can affect the vehicle's stability and handling during braking, especially in situations where the turn is sharp or the road surface is slippery. Therefore, it is contemplated that angular control of a first track system and of a second track system may be different under some circumstances. It is contemplated that a given processor may be configured to acquire a signal indicative of a longitudinal acceleration, and/or of a lateral acceleration of the vehicle during a turning maneuver and/or breaking maneuver, and/or when operating on a side hill. The given processor may use this data, as well as one or more transformation matrices for performing different corrective movements on track systems of the given vehicle during a turning maneuver and/or breaking maneuver, and/or when operating on a side hill.

Contact Patch Modification Mode

As previously alluded to, the processor 610 of the controller unit 460 may be configured to control the track system 20*a* in accordance with the default mode of operation, which has been described hereabove. For example, with reference to the track system 20*a* and the vehicle 10, when operating in the default mode, the processor 610 may be configured to trigger angular control the track system 20*a* to attempt aligning the track system angle TS with the vehicle angle V, thereby maintaining a "parallel relationship" between the track system 20*a* and the vehicle 10.

However, in some cases, it is contemplated that the processor 610 may be configured to control the track system 20*a* such that, in the default mode, an angular relationship between the track system 20*a* and the body of the vehicle 10 is not parallel. This can, inter alia, modifying weight distribution of the track system 20*a* on the ground surface. In these cases, the processor 610 may be configured to control the track system 20*a* in accordance with a contact patch modification mode. The processor 610 may trigger the contact patch modification mode automatically and/or in response to a user input.

In some embodiments of the present technology, the processor 610 may be configured to acquire and/or monitor one or more signals for triggering operation of the track system 20*a* in the contact patch modification mode. In one embodiment, the processor 610 may monitor a signal indicative of a vehicle weight value. In another embodiment, the processor 610 may monitor, inter alia, a signal indicative of an actual angular position of the track system 20*a*, such as the actual track system angle TS. It should be noted that the processor 610 may be configured to determine an effective contact patch size of the track system 20*a* on the ground surface for respective angular positions of the track system 20*a*. For example, data indicative of respective angular positions of the track system 20*a* and corresponding contact patch sizes of the track system 20*a* may be stored in memory.

As a broad description, and referring to the track system 20*a* and the vehicle 10, in some embodiments, the processor 610 may be configured to acquire a signal generated in response to a user input indicating that the size of the contact patch of the track system 20*a* is to be changed. For example, the user may provide via a user interface 490*a* a user input indicative of a desire to increase the size of the contact patch of the track system 20*a* on the ground surface. In another example, the user may provide via the user interface 490*a* a user input indicative of a desire to reduce the size of the contact patch of the track system 20*a* on the ground surface.

It is contemplated that the user input may be indicative of a desire to at least one of increasing and reducing the size of the contact patch of at least one track system amongst a plurality of track systems of a corresponding vehicle. In some embodiment, the user may select via the user interface 490*a* a manual input indicative of a desired angular position of the track system 20*a*. Additionally or alternatively, the user may provide via the user interface 490*a* a manual input indicative a desire to transfer load to at least one of a leading portion of the track system 20*a* (i.e. a front portion of the bottom run BR) and a trailing portion of the track system 20*b* (i.e. a rear portion of the bottom run BR).

The processor 610 may be configured to determine based on one or more received signals that the actual angular position of the track system 20*a* is to be changed to an other angular position in which the track system 20*a* provides a different size of the contact patch on the ground surface. In response, the processor 610 may be configured to send a signal to the motor 410*a* (and/or to a power source of the motor 410*a*) of the ACS 400*a* for changing the actual angular position of the track system 20*a* to the other angular position and to maintain said other angular position over time, at least temporarily and/or until the contact patch modification mode is cancelled as will be described in further detail below.

In some embodiments, the processor 610 may determine a given angular position of the track system 20*a* corresponding to a target size of the contact patch on the ground surface and send the signal to the motor 410*a* (and/or to a power source of the motor 410*a*) for moving the track system 20*a* to the given angular position. In other embodiments, the processor 610 may determine an updated reference angular value for the track system corresponding to the target size of the contact patch and send a signal to the motor 410 (and/or to a power source of the motor 410*a*) for performing a corrective movement of the track system 20*a* relative to the vehicle 10. For example, the processor 610 may be configured to update the PTSV.

Figure 10E:
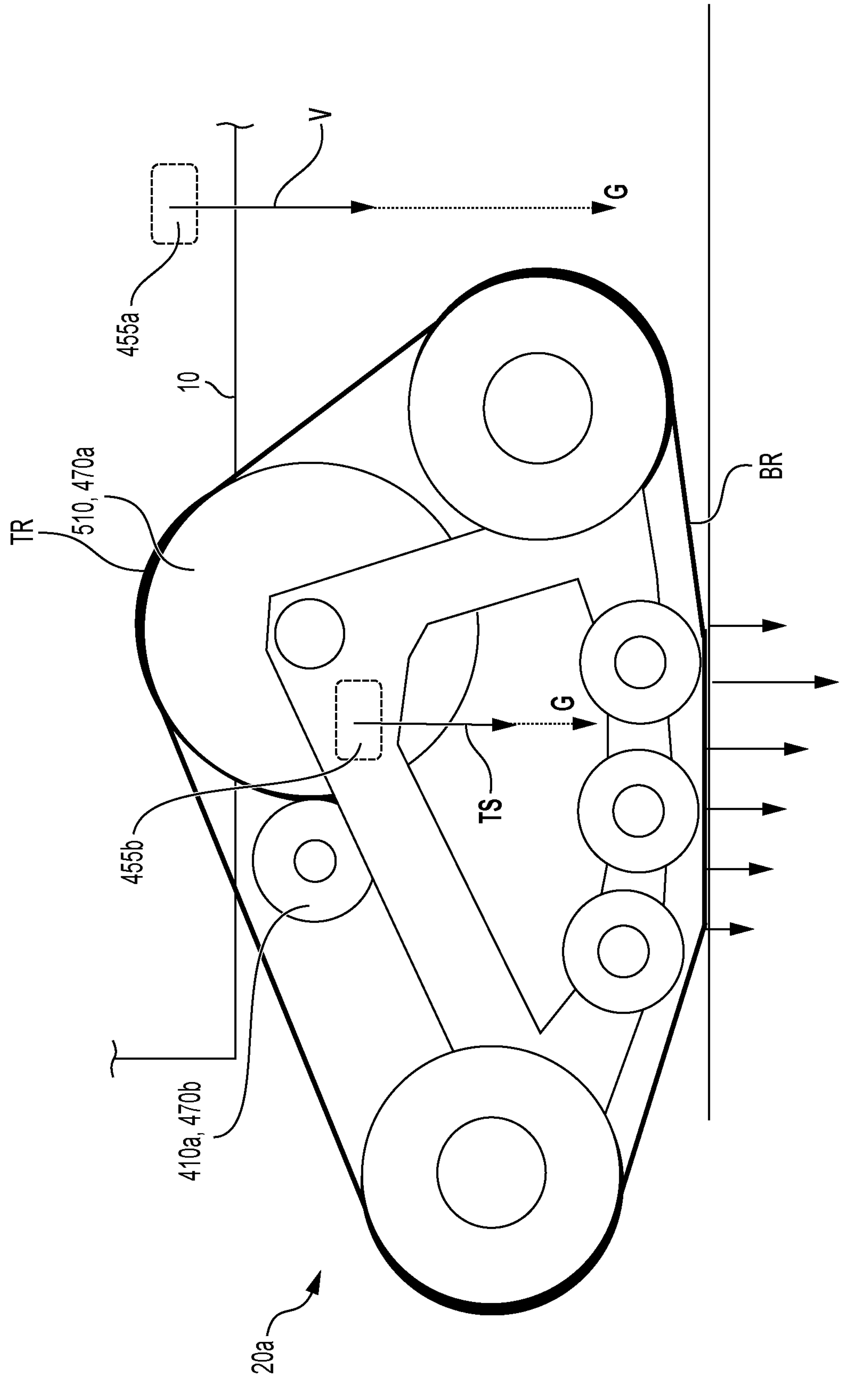
FIG. 10E is a schematic left side elevation view of the front track system of FIG. 4B, the track system being in a first position relative to the vehicle.

With reference to FIG. 10E, which depicts the track system 20*a* connected to the vehicle 10 the track system 20*a* operating in the default mode (similar to FIG. 10A). In response to determining that the actual angular position of the track system 20*a* is to be changed to an other angular position having a comparatively smaller contact patch size, the processor 610 may send a signal to the motor 410*a* (and/or to a power source of the motor 410*a*) for operating the track system 20*a* in a "heel configuration" or a "toe configuration" shown in, respectively, FIGS. 10F and 10G. It is noted that when the angular position of the track system 20*a* is changed, the distance between the vehicle and the ground (i.e. 'ground clearance') is modified as well. In some cases, as will be described below, this can assist in enhancing some characteristics of the track system 20*a*, and can help to overcome different issues. It is noted that although only heel and toe configurations are shown herein, it is understood that a plurality of orientations of the track system 20*a* are contemplated, the various orientations being capable of providing different contact patch sizes and ground clearances.

Figure 10F:
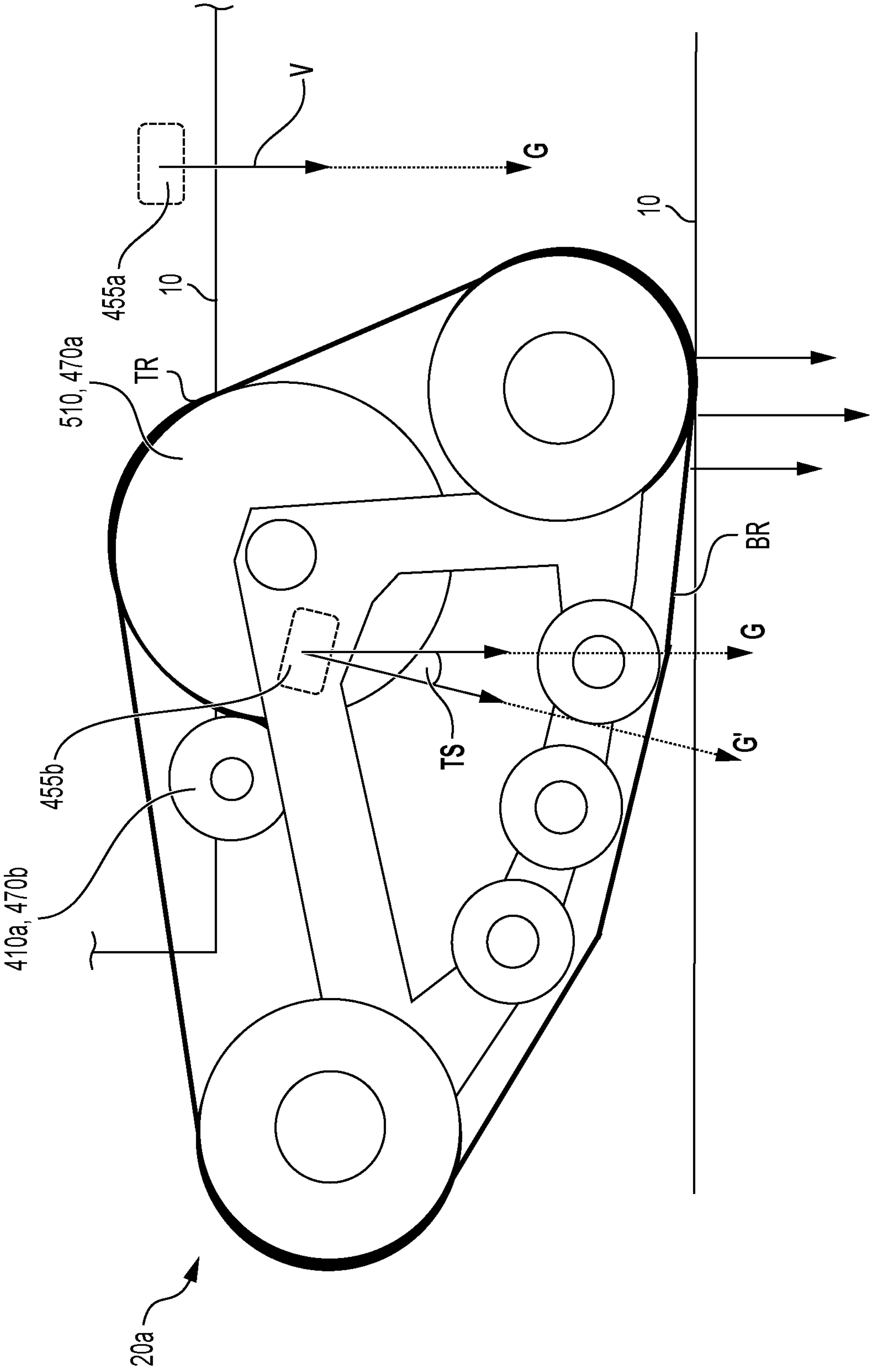
FIG. 10F is a schematic left side elevation view of the front track system of FIG. 4B, the track system being in a second position relative to the vehicle.

With reference to FIG. 10F, which depicts the track system 20*a* in a heel configuration, a trailing portion of the bottom run BR is contacting the flat ground surface and the actual track system angle TS is non-null (illustrated as gravity vector G') relative to the gravity vector G used herein as a reference.

Figure 10G:
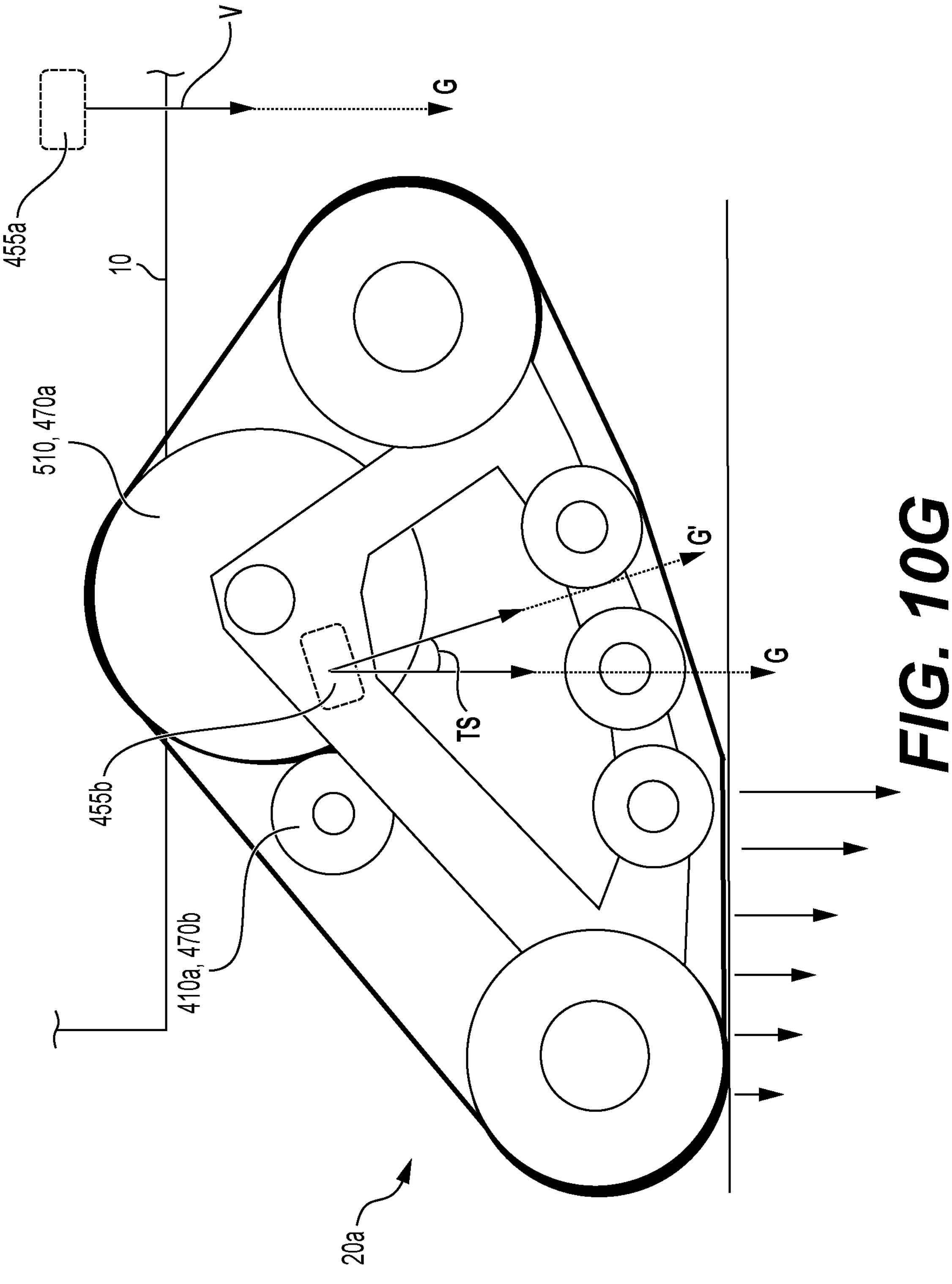
FIG. 10G is a schematic left side elevation view of the front track system of FIG. 4B, the track system being in a second position relative to the vehicle.

With reference to FIG. 10G, which depicts the track system 20*a* in a toe configuration, a leading portion of the bottom run BR is contacting the flat ground surface and the track system angle TS is non-null (illustrated as gravity vector G') relative to the gravity vector G used herein as a reference. It should be noted that the track system 20*a* may be operating in a heel or toe configuration on inclined ground surfaces as well.

Figure 10H:
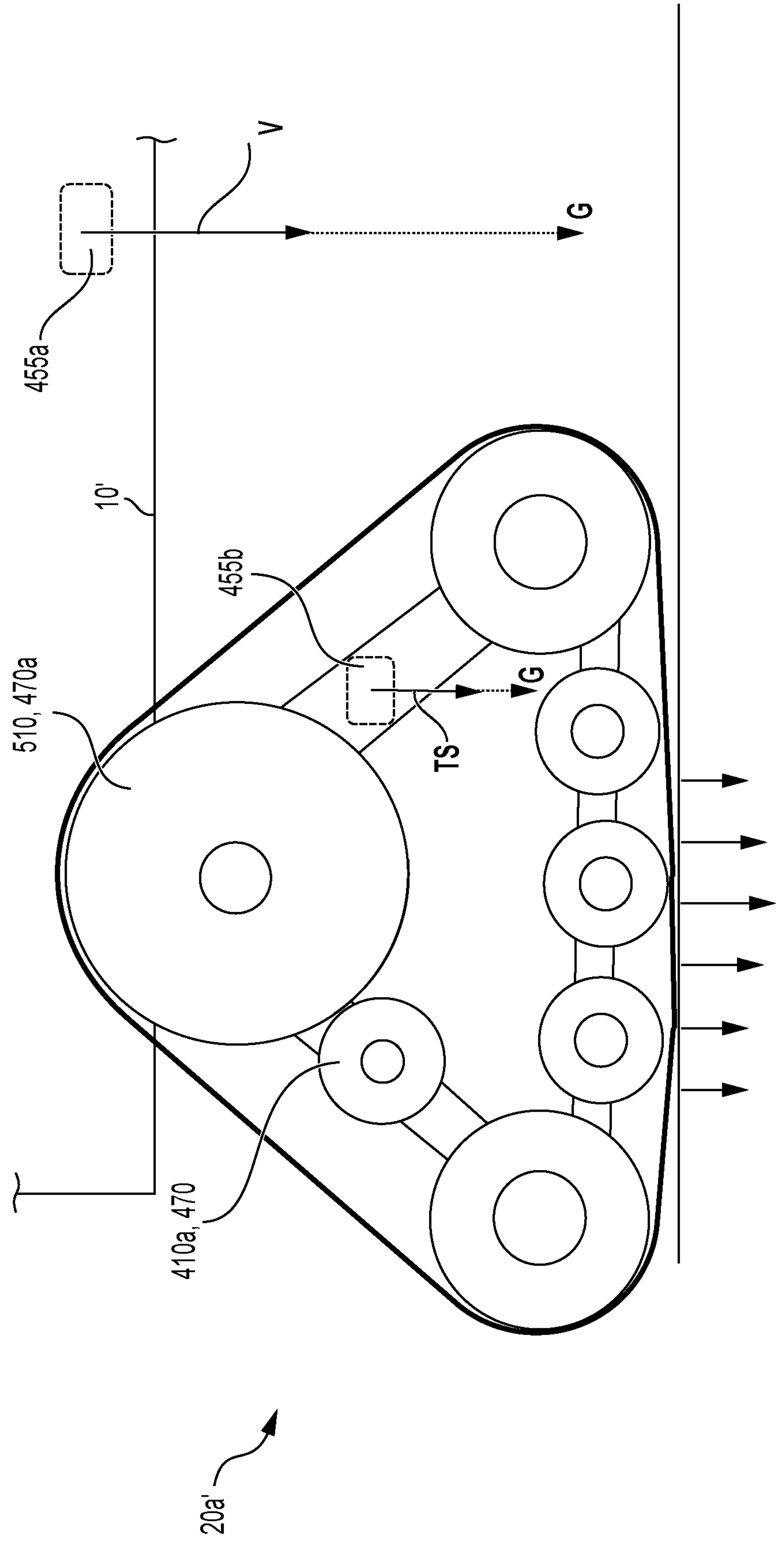
FIG. 10H is a schematic left side elevation view of another track system having an ACS according to embodiments of the present technology, and being in a default configuration.
Figure 10I:
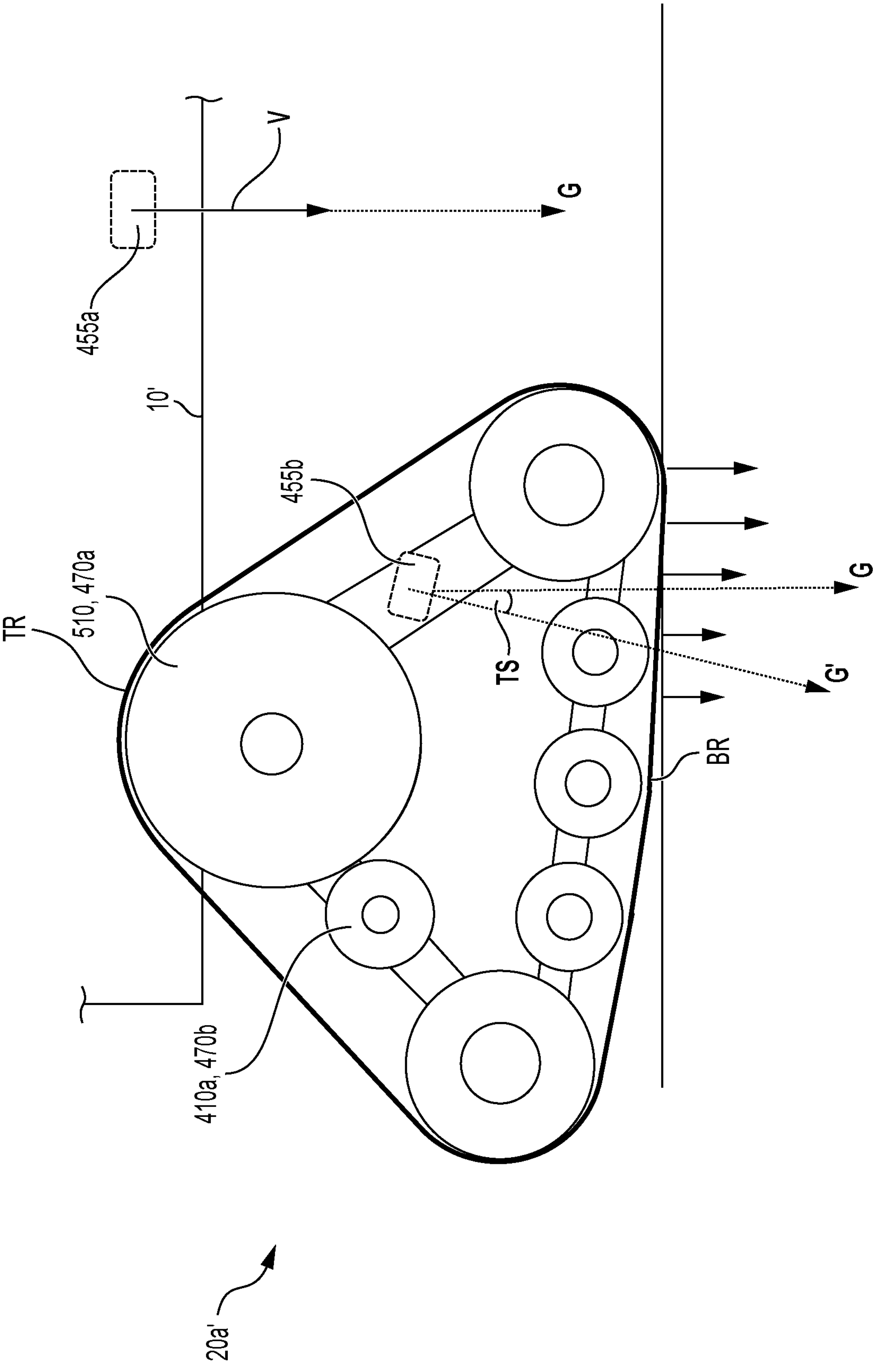
FIG. 10I is a schematic left side elevation view of the track system of FIG. 10H, the track system being in a heel configuration.
Figure 10J:
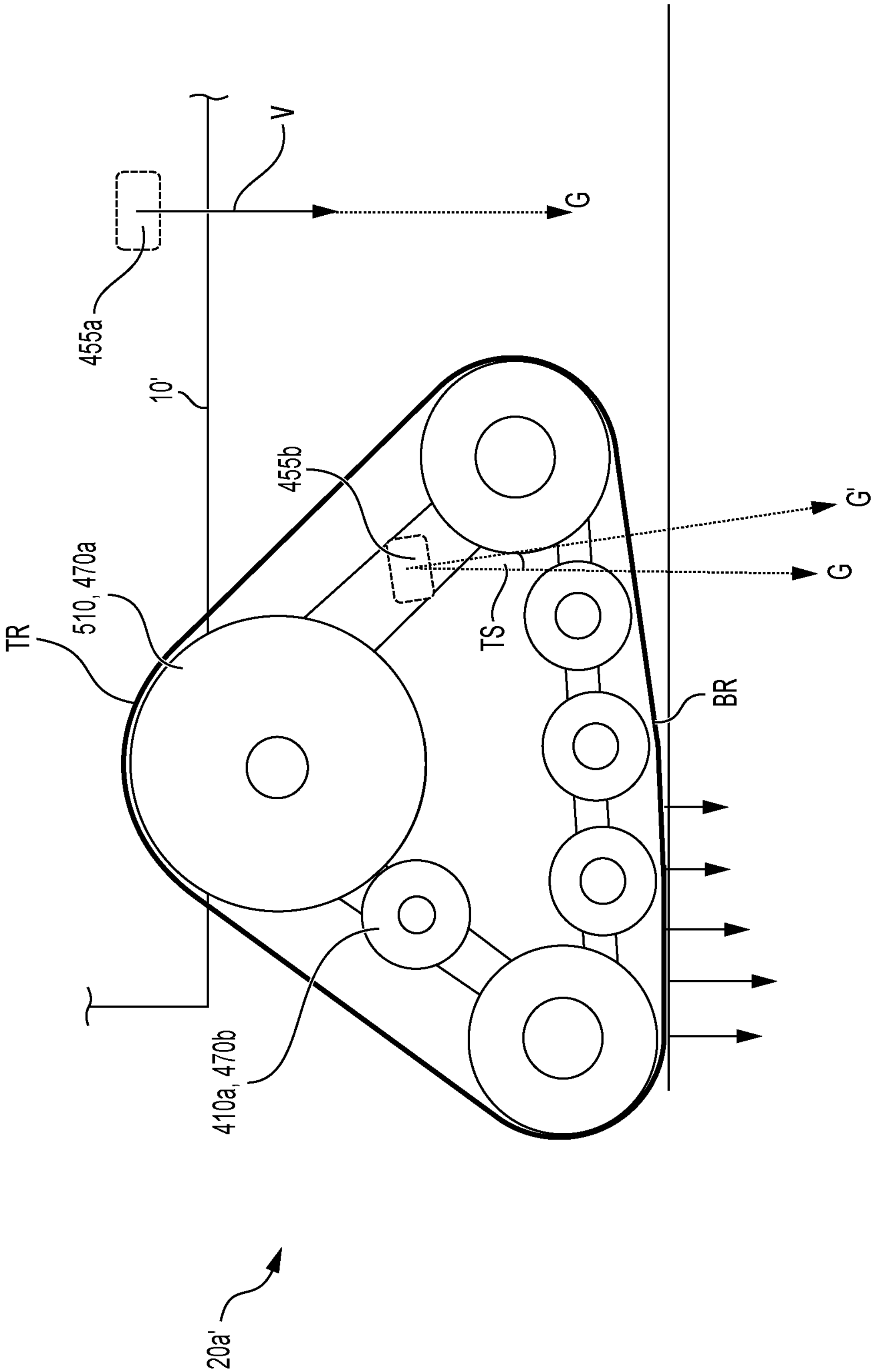
FIG. 10J is a schematic left side elevation view of the track system of FIG. 10H, the track system being in a toe configuration.

Similarly to FIG. 10E, in FIG. 10H, there is depicted the track system 20*a*' connected to the vehicle 10', the track system 20*a*' operating in the default mode. In response to determining that the actual angular position of the track system 20*a*' is to be changed to an other angular position having a comparatively smaller contact patch size, the processor 610 may send a signal to the motor 470 (and/or to a power source of the motor 470) for selectively operating the track system 20*a*' in a "heel configuration" or a "toe configuration" shown in, respectively, FIGS. 10I and 10J. Similar to FIGS. 10F and 10G, in FIG. 10I, a trailing portion of the bottom run BR is contacting the flat ground surface, whereas in FIG. 10J, it is the leading portion of the bottom run BR that is contacting the flat ground surface.

In some embodiments, the processor 610 may be configured to stop operation of the track system 20*a* and/or of the track system 1000 in the contact patch modification mode upon acquiring one or more signals (e.g., reverting to the default mode). For example, the processor 610 may be configured to acquire a signal generated in response to a user input indicative of the user cancelling the contact patch modification mode and/or of the user selecting the default mode. It is contemplated that once the processor 610 receive the one or more signals, the processor 610 may revert to controlling the track system 20*a* and/or the track system 1000*a* in accordance to the default mode of operation described above.

Aggressive Turn Mode

Referring to FIGS. 11A to 11D, which depicts the track systems 20*n*' and the vehicles 10', 10", developers of the present technology have realized that maintaining, at least temporarily, a given track system in a heel and/or toe configuration(s) during operation of the corresponding vehicle may be advantageous in a variety of operating conditions. In some embodiments of the present technology, the processor 610 may be configured to control the track system 20*n*' in accordance with an "aggressive turn" mode, during which the processor 610 triggers the motor 410*n* (e.g., via the power source of the motor 410*n*) to maintain the track system 20*n*' in one of a heel and toe configuration during a turning manoeuvre. The processor 610 may be configured to perform angular control of the track system 20*n*' in the aggressive turn mode automatically and/or in response to a user input.

In some embodiments, the processor 610 may be configured to acquire a signal generated in response to a user input indicating that the processor 610 is to operate the track system 20*n*' in the aggressive turn mode. For example, the user may provide via the user interface 490*aa* user input indicative of a desire to operate in the aggressive turn mode. In other embodiments of the present technology, the processor 610 may be configured to acquire and/or monitor one or more signals for triggering operation of the track system 20*n*' in the aggressive turn mode.

In one embodiment, the processor 610 may monitor inter alia a signal indicative of an actual steering angle of a corresponding vehicle and/or of a corresponding track system (e.g. yaw angle). In response to a comparison of the actual steering angle against a pre-determined threshold (e.g., a steering angle threshold), the processor 610 may trigger the motor 410*n* to maintain the track system 20*n*' in one of a heel and toe configurations during the turning manoeuvre.

It is contemplated that in the aggressive turn mode, the processor 610 may be configured to trigger angular control of rear track systems (e.g., track systems 20*c*', 20*d*') for maintaining at least one rear track system in a heel or toe configuration. For example, with reference to the vehicle 10', if the at least one signal received by the processor 610 is indicative of a left turning manoeuvre, the processor 610 may trigger the motor 410*c* to maintain the rear left track system 20*c*' in one of a heel and toe configurations. In another example, still with reference to the vehicle 10', if the at least one signal received by the processor 610 is indicative of a right turning manoeuvre, the processor 610 may trigger the motor 410*d* to maintain the rear right track system 20*d*' in one of a heel and toe configurations during the turning manoeuvre.

With reference to FIG. 11A, the vehicle 10' is depicted as it is attempting a right turning manoeuvre. The vehicle 10', as mentioned above, includes the track systems 20*a*', 20*b*', 20*c*', 20*d*'. The processor 610 may be configured to trigger the motor 410*d* of the ACS 400 of the rear right track system 20*d*' to, at least temporarily, maintain the rear right track system 20*d*' in a toe configuration, such that a contact patch 11*d*' is disposed at a front of the bottom run (bottom run not shown in FIG. 11A). It should be understood that while so-controlling the angular position of the rear right track system 20*d*', the processor 610 may further perform angular control of the other track systems 20*a*', 20*b*', 20*c*' during the right turning manoeuvre. For example, the processor 610 may operate the other track systems 20*a*', 20*b*', 20*c*' in accordance with the default mode of operation.

Figure 11B:
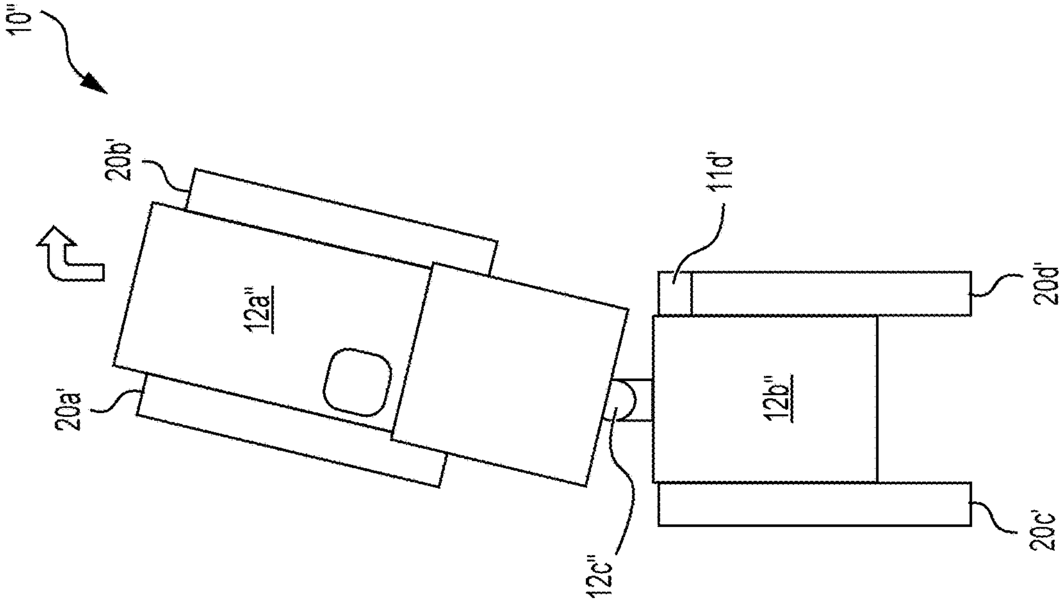
FIG. 11B is a schematic top plan view of an articulated vehicle having track systems according to embodiments of the present technology, the vehicle attempting a right turn.
Figure 11A:
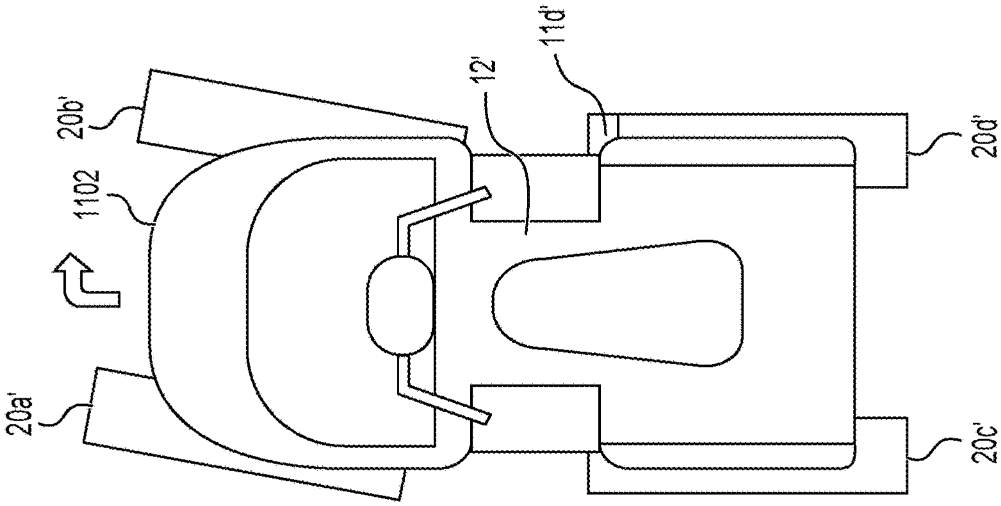
FIG. 11A is a schematic top plan view of a vehicle having track systems according to embodiments of the present technology, the vehicle attempting a right turn.

With reference to FIG. 11B, the vehicle 10" is depicted as it is attempting a right turning manoeuvre. The vehicle 10", as mentioned above, includes the track systems 20*a*', 20*b*', 20*c*', 20*d*'. The processor 610 may be configured to trigger the motor 410*d* of the ACS 400 of the rear right track system 20*d*' to, at least temporarily, maintain the rear right track system 20*d*' in a toe configuration, such that a contact patch 11*d*' is disposed at a front of the bottom run (bottom run not shown in FIG. 11A). It should be understood that while so-controlling the angular position of the rear right track system 20*d*', the processor 610 may further perform angular control of the other track systems 20*a*', 20*b*', 20*c*' during the right turning manoeuvre. For example, the processor 610 may operate the other track systems 20*a*', 20*b*', 20*c*' in accordance with the default mode of operation.

Figure 11C:
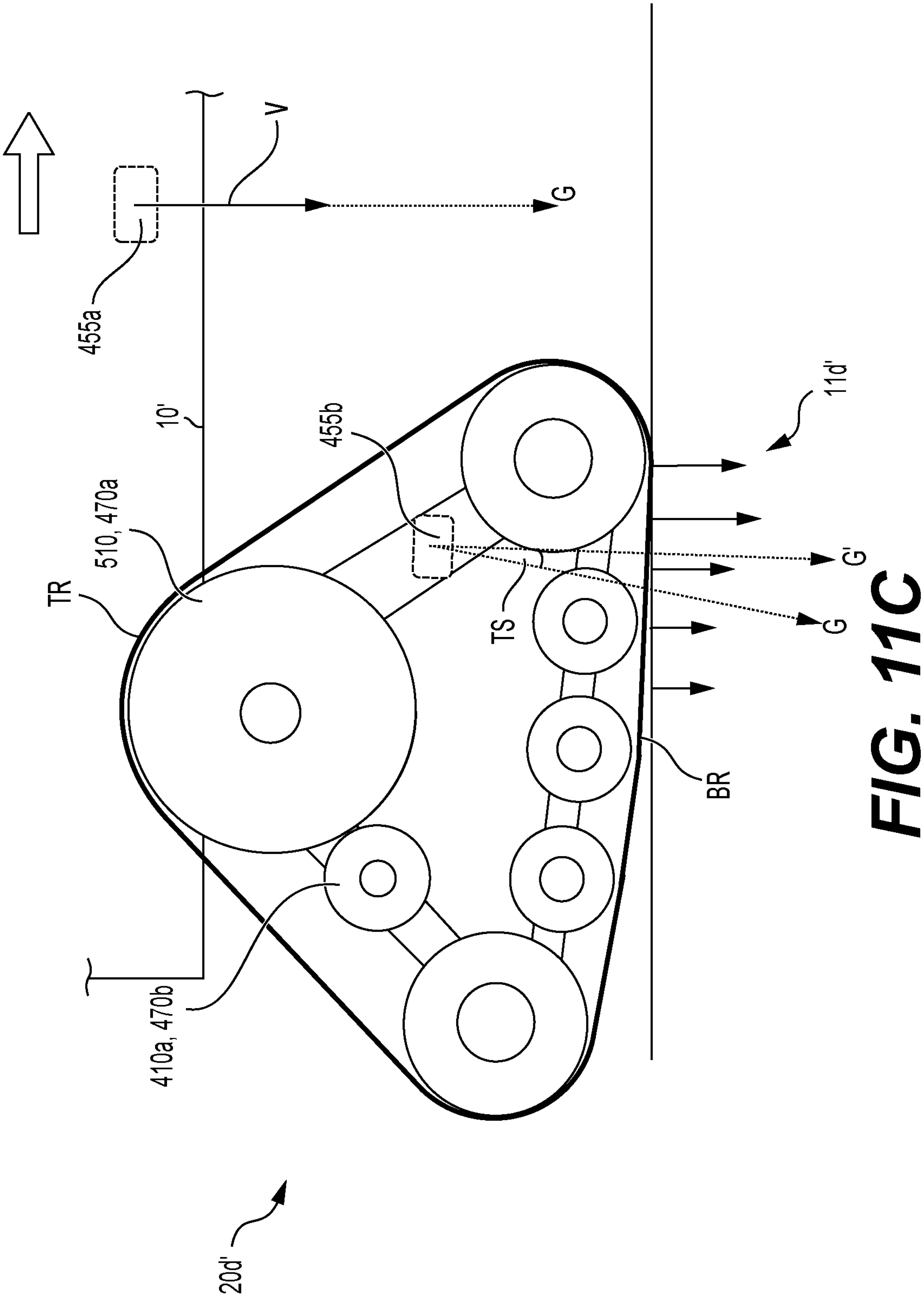
FIG. 11C is a schematic side view of a rear track system of the vehicle of FIG. 11A, the rear track system being in a toe configuration.

With reference to FIG. 11C, which the rear right track system 20*d*' in the toe configuration during the right turning manoeuvre with the contact patch 11' having a reduced size. The other track systems 20*a*', 20*b*', 20*c*' are generally parallel to the vehicle 10".

Developers of the present technology have realized that maintaining a given rear track system in a heel or toe configuration during a turning manoeuvre can assist the user in controlling the vehicle during the turning manoeuvre and/or may reduce wear of a corresponding endless track.

In some embodiments, the processor 610 may be configured to stop operation of a given track system in the aggressive turning mode upon acquiring one or more signals. For example, the processor 610 may be configured to acquire a signal generated in response to a user input indicative of the user cancelling the aggressive turning mode and/or of the user selecting the default mode. In another example, the processor 610 may be configured to monitor the actual steering angle of the vehicle or of the track system (e.g. yaw angle), and in response actual steering angle no longer meeting the steering angle threshold value, the processor 610 may revert to controlling the corresponding track system in accordance with the default mode of operation described above.

Low-Speed-Tight Turn Mode

Referring to FIGS. 12A to 12D, which depicts the vehicles 10', 10" and the track systems 20*n*', developers of the present technology have realized that simultaneously maintaining, at least temporarily, more than one track system in heel and/or toe configuration(s) during use of the corresponding vehicle may be advantageous in a variety of operating conditions. In some embodiments of the present technology, the processor 610 may be configured to control the track systems 20*n*' in accordance with an "low-speed-tight turn" mode, during which the processor 610 triggers the motor 410*n* to maintain more than one track system in one of a heel and toe configuration during a turning manoeuvre performed at low speeds. The processor 610 may be configured to perform angular control of a track system in the low-speed-tight turn mode automatically and/or in response to a user input.

In some embodiments, the processor 610 may be configured to acquire a signal generated in response to a user input indicating that the processor 610 is to operate in the low-speed-tight turn mode. For example, the user may provide via a user interface 490*a* a user input indicative of a desire to operate in the low-speed-tight turn mode. In other embodiments of the present technology, the processor 610 may be configured to acquire and/or monitor one or more signals for triggering operation of a track system in the low-speed-tight turn mode.

In one embodiment, with reference to the vehicle 10', the processor 610 may monitor inter alia a signal indicative of (i) an actual speed of a vehicle 10' and/or of one or more of the track systems 20*n*', and (ii) an actual steering angle of the vehicle 10' and/or one or more of the track systems 20*n*' (e.g. yaw angle). In response to a comparison of the actual steering angle against a pre-determined threshold (e.g., a steering angle threshold), and to a comparison of the actual speed of the vehicle 10' and/or of the track systems 20*n*' against an other pre-determined threshold (e.g., a vehicle speed threshold and/or a track system speed threshold), the processor 610 may trigger motors of respective ACSs of the track systems to maintain the respective track systems in one of a heel and toe configuration during the turning manoeuvre.

Figure 12B:
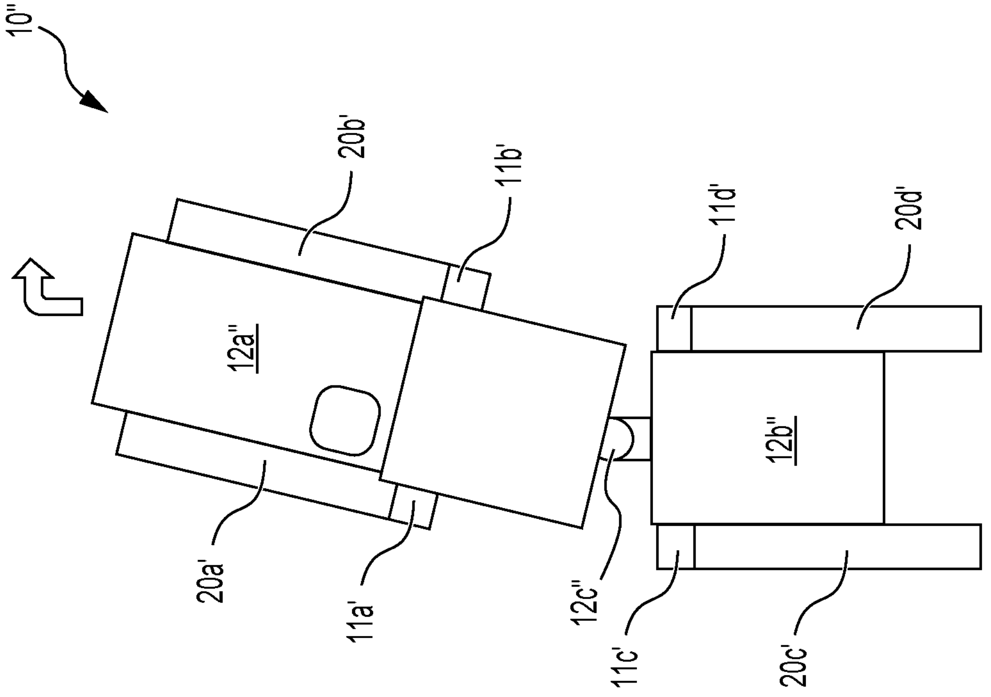
FIG. 12B is a schematic top plan view of an articulated vehicle having track systems according to embodiments of the present technology, the vehicle attempting a low speed tight right turn.
Figure 12A:
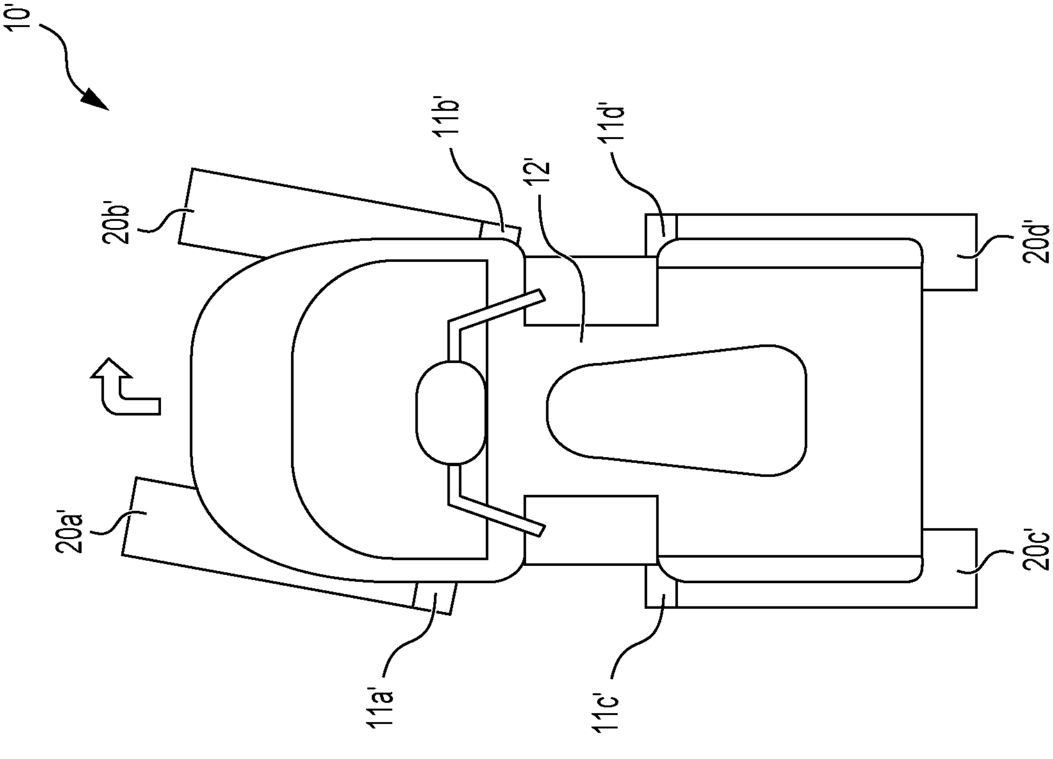
FIG. 12A is a schematic top plan view of a vehicle having track systems according to embodiments of the present technology, the vehicle attempting an aggressive right turn.

With reference to FIG. 12A, the vehicle 10' is depicted as it is attempting a right turning manoeuvre at a vehicle speed and/or a track system speed that is below a corresponding pre-determined threshold. The vehicle 10', as mentioned above, includes the track systems 20*a*', 20*b*', 20*c*', 20*d*'. The processor 610 may be configured to trigger the motors of the ACSs of the rear left and right track systems 20*c*', 20*d*' to at least temporarily maintain the rear left and right track systems 20*c*', 20*d*' in a toe configuration, such that contact patches 11*c*', 11*d*' thereof are disposed at a front of the bottom run (bottom run not shown in FIG. 12A). The processor 610 may be configured to trigger the motors of the ACSs of the front left and right track systems 20*a*', 20*b*' to at least temporarily maintain the front left and right track systems 20*a*', 20*b*' in a heel configuration during the turning manoeuvre, such that contact patches 11*c*', 11*d*' thereof disposed at a rear of the bottom run (bottom run not shown in FIG. 12A).

However, it should be noted that the processor 610 may be configured to trigger the 410*n* motors of the ACSs of the track systems 20*n*' to simultaneously maintain respective ones of the track systems 20*n*' in one of heel or toe configuration.

With reference to FIG. 12B, the vehicle 10" is depicted as it is attempting a right turning manoeuvre at a vehicle speed and/or a track system speed that is below a corresponding pre-determined threshold.

Developers of the present technology have realized that maintaining respective ones amongst the track systems 20*a*', 20*b*', 20*c*', 20*d*' in at least one of heel and toe configuration during a turning manoeuvre at a low speed may aid the user in controlling the vehicle 10" during the turning manoeuvre and/or may reduce wear of a corresponding endless track and/or reduce a turning radius of the vehicle 10". In some cases, it can reduce the damage to the ground as well.

Figure 12C:
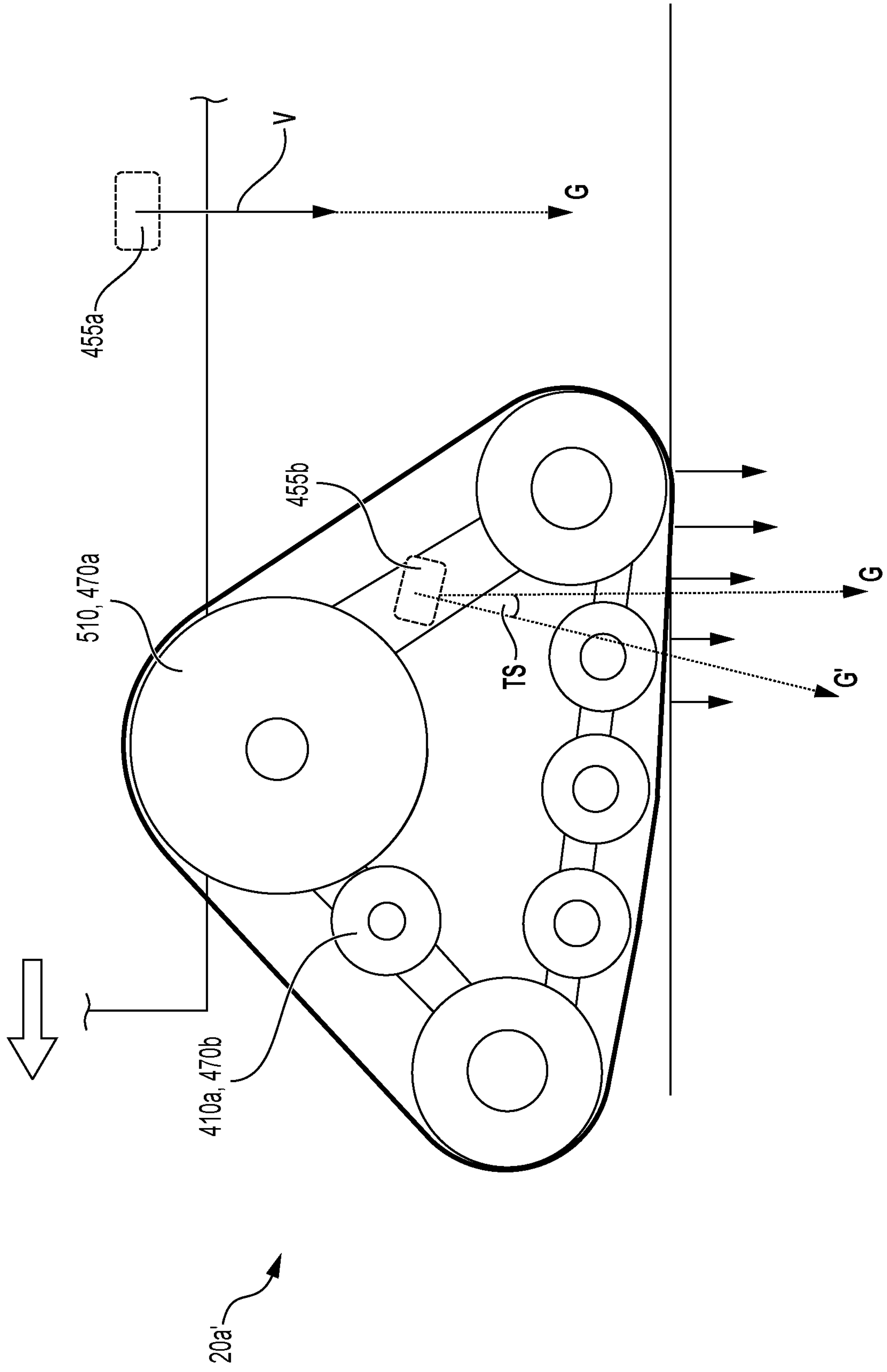
FIG. 12C is a schematic left side view of a front track system of the vehicle of FIG. 12A, the front track system being in a heel configuration.

With reference to FIG. 12C, there is depicted a representation of the front left right track systems 20*a*', 20*b*' (only front left track system 20*a*' is seen) in the heel configuration during the right turning manoeuvre, in which the contact patches 11*a*', 11*b*' (only contact patch 11*a*' is seen) have a reduced size and are disposed at a trailing portion of the bottom run BR.

Figure 12D:
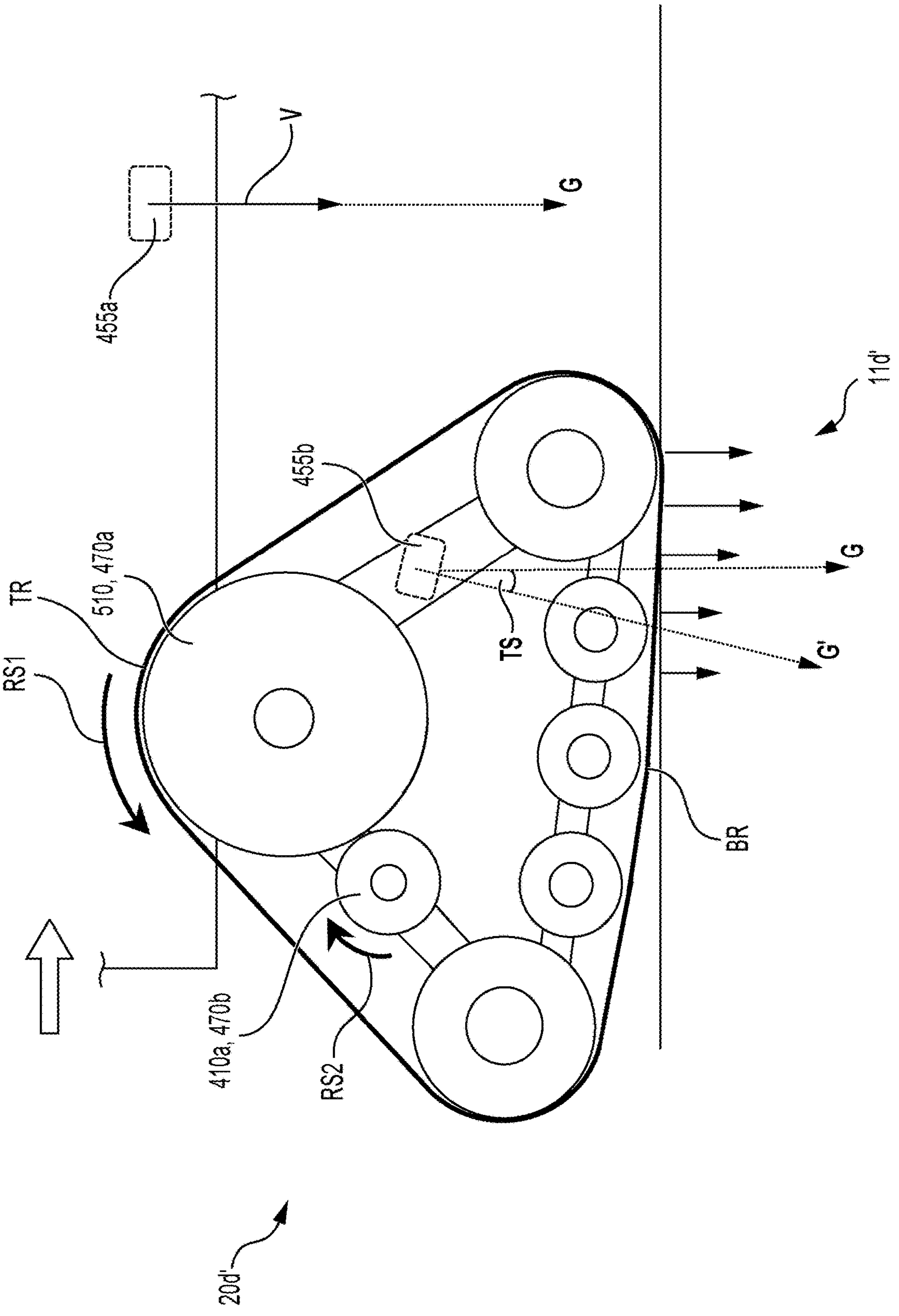
FIG. 12D is a schematic side view of a rear track system of the vehicle of FIG. 12A, the rear track system being in a toe configuration.

With reference to FIG. 12D, there is depicted a representation of the rear left right track systems 20*c*', 20*d*' (only right track system 20*d*' is seen) in the toe configuration during the right turning manoeuvre, in which the contact patches 11*c*', 11*d*' (only contact patch 11*d*' is seen) have a reduced size and are disposed at a leading portion of the bottom run BR.

In some embodiments, with reference to the vehicle 10' and the track systems 20*a*', 20*b*', 20*c*', 20*d*', the processor 610 may be configured to stop operation of the track systems 20*a*', 20*b*', 20*c*', 20*d*' in the low-speed-tight turn mode upon acquiring one or more signals. For example, the processor 610 may be configured to acquire a signal generated in response to a user input indicative of the user cancelling the low-speed-tight turn mode and/or of the user selecting the default mode. In another example, the processor 610 may be configured to monitor the actual steering angle of the vehicle 10' or of the track systems 20*a*', 20*b*', 20*c*', 20*d*' (e.g. yaw angle), and the actual speed of the vehicle 10' and/or of the track systems 20*a*', 20*b*', 20*c*', 20*d*', and in response to at least one of (i) the actual steering angle no longer meeting the pre-determined threshold value, or (ii) at least one of the actual vehicle speed and/or the current track system speed no longer meeting the other pre-determined threshold value, the processor 610 may revert to controlling the track systems 20*a*', 20*b*', 20*c*', 20*d*' in accordance with the default mode of operation described above.

Figure 13:
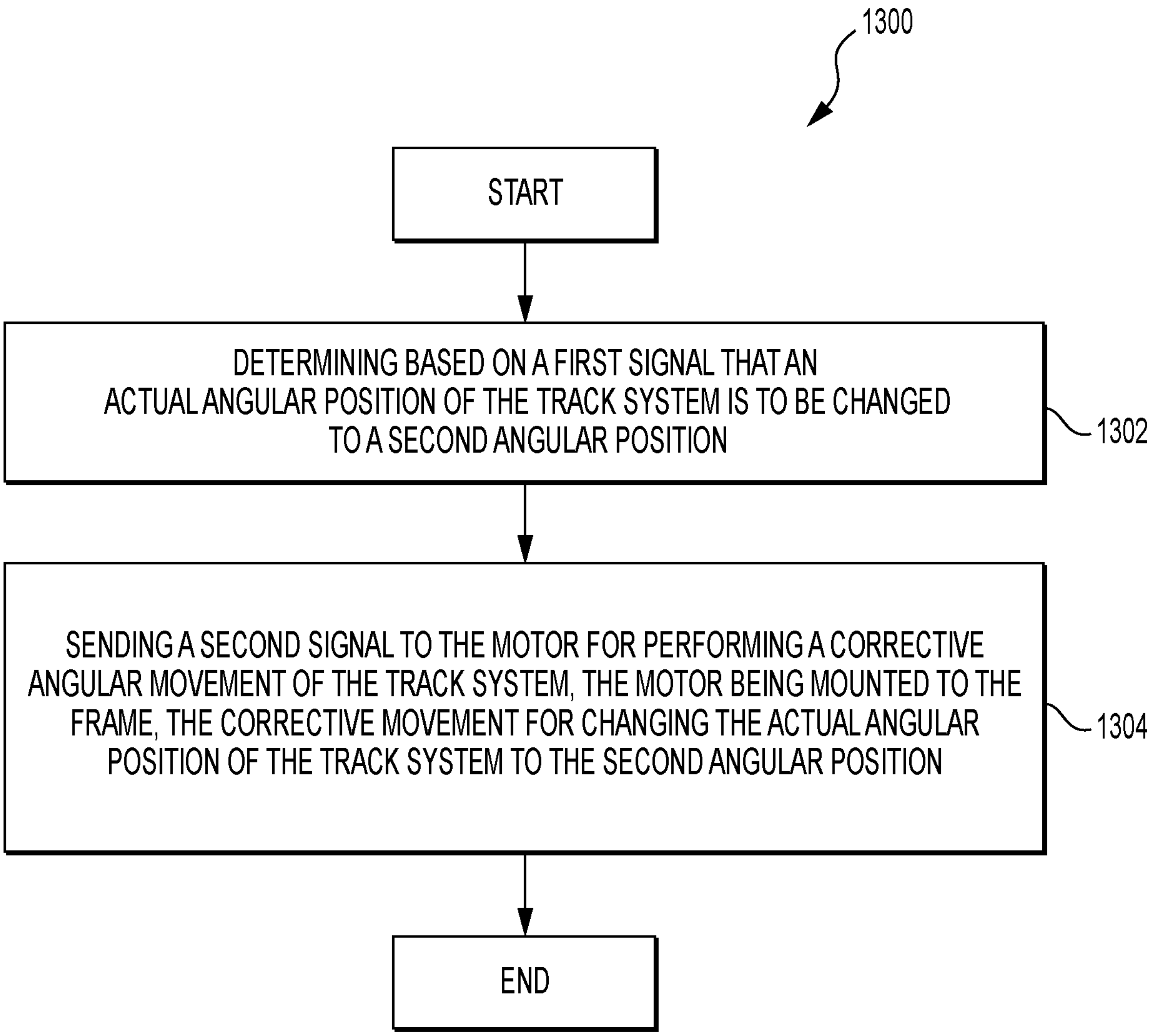
FIG. 13 is a flowchart of a method executable by a controller assembly of FIG. 5 according to an embodiment of the present technology.

In some embodiments of the present technology, with reference to FIG. 13, the processor 610 may be configured to execute a method 1300 for controlling an angular position of a given track system. It should be noted that the method 1300 may be executed by the processor for performing angular control of one or more track systems described herein. In some embodiments, the method 1300 may be executed by the processor 610 for performing angular control of track system(s) of one or more vehicles described herein. Various steps of the method 1300 will now be described in greater detail.

STEP 1302: Determining Based on a First Signal that an Actual Angular Position of the Track System is to be Changed to a Second Angular Position At step 1302, the processor 610 is configured to determine, based on a first signal, that an actual angular position of the track system 20*a*' is to be changed to a second angular position. It should be noted that the track system 20*a*' in the second angular position has a different contact patch on a ground surface than when in the actual (current) angular position. It is contemplated that a given angular position of the track system 20*a*' may comprise any combination of an actual roll angle, an actual yaw angle, and an actual pitch angle of the track system 20*a'*.

In some embodiments, the track system 20*a*' in the second angular position has a smaller contact patch on a ground surface than when in the actual angular position. In other embodiments, the track system 20*a*' may have a different approach angle in the second angular position than in the actual angular position. In further embodiments, the track system may have a smaller approach angle in the second angular position than in the actual angular position. For example, the track system 20*a*' may be in a heel configuration when moved to the second angular position. In additional embodiments, the track system 20*a*' may have a larger approach angle in the second angular position than in the actual angular position. For example, the track system 20*a*' may be in a toe configuration when moved to the second angular position.

In some embodiments, the method 1300 may further comprise a step of acquiring, by the processor 610, the first signal.

In one embodiment, the first signal acquired by the processor 610 may be indicative of an actual steering angle of the track system 20*a*' (and/or of the corresponding yaw angle). In this embodiment, the processor 610 may be configured to compare the actual steering angle of the track system 20*a*' against a steering angle threshold. It is contemplated that the steering angle threshold may be pre-determined by the user of the vehicle 10' and/or the manufacturer of the ACS, and stored in memory accessible by the processor 610. In this embodiment, the processor 610 may be configured to execute the step 1302 in response to the comparison between the actual steering angle and the steering angle threshold. For example, the processor 610 may be configured to compare the actual steering angle and the steering angle threshold when the vehicle 10' is performing a turning maneuver.

In some embodiments, the method 1300 may comprise a step of acquiring, by the processor 610, a third signal.

In one embodiment, the third signal may be indicative of an actual speed of the vehicle 10' (linear speed, for example).

In this embodiment, the processor 610 may be configured to compare the actual speed against a speed threshold. It is contemplated that the speed threshold may be pre-determined by the user of the vehicle 10' and/or the manufacturer of the ACS, and stored in memory accessible by the processor 610. In this embodiment, the processor 610 may be configured to execute the step 1302 in response to the comparison between the actual steering angle (e.g., from the first signal) and the steering angle threshold, and to the comparison of the actual speed (e.g., from the third signal) against the speed threshold. For example, the processor 610 may be configured to compare the actual steering angle and the steering angle threshold, and compare the actual speed against a speed threshold when the vehicle 10' is performing a turning maneuver at a low speed.

In some embodiments, it is also contemplated that the first signal may be indicative of a user input. For example, instead of or in addition to, acquiring a given signal indicative of the actual steering angle, the processor 610 may also be configured to acquire a signal from a user-interface component (e.g., an actuable component of the user interface). For example, the user input may be indicative of that the size of the contact patch is to be changed. In another example, the user input may be indicative of a desire to increase the size of the contact patch from an actual size to a second size (e.g., value provided by the user via the user-interface component).

It should be noted that the method 1300 may be performed by the processor 610 for more than one track systems of the vehicle 10'. In some embodiments, the processor 610 may perform angular control of more than one track systems of the vehicle 10'. With reference to the vehicle 10 (see FIG. 1), for example, the processor 610 may be configured to perform angular control of one or more of the track systems 20*a*, 20*b*, 20*c*, 20*d*. Therefore, in some embodiments, it can be said that the processor 610 may execute the method 1300 for performing angular control of one or more of a front track system of a given vehicle, a rear track system of the given vehicle, a left track system of the given vehicle, and a right track system of the given vehicle.

Furthermore, it should be noted that the method 1300 may be performed by the processor 610 for more than one track systems of an other vehicle than the vehicle 10' or the vehicle 10. In some embodiments, it can be said that the processor 610 may execute the method 1300 for performing angular control of one or more track systems of the harvesting vehicle 200, such as of the track systems 210, 220, for example (see FIG. 2A). In other embodiments, it can be said that the processor 610 may execute the method 1300 for performing angular control of one or more track systems of the articulated vehicle 250, such as of the track systems 260, 270, for example (see FIG. 2B).

STEP 1304: Sending a Second Signal to a Motor for Performing a Corrective Angular Movement of the Track System, the Motor being Mounted to the Frame, the Corrective Movement for Changing the Actual Angular Position of the Track System to the Second Angular Position The method 1300 continues to step 1304, with the processor 610 configured to send a second signal to a motor 410*a* mounted to the track system 20*a*'. The processor 610 is configured to send the second signal for performing a corrective angular movement of the track system 20*a*'. It is contemplated that the second signal may be sent to a given power source of a given motor. The motor 410*a* is configured to perform the corrective movement for changing the actual angular position of the track system 20*a*' to the second angular position.

In some embodiments, the processor 610 may be configured to send the second signal for performing a CW rotation of the track system 20*a*' relative to the vehicle 10'. In other embodiments, the processor 610 may be configured to send the second signal for performing a CCW rotation of the track system 20*a*' relative to the vehicle 10'.

In some embodiments, the method 1300 may comprise a step of determining, by the processor 610, the second angular position of the track system 20*a*' based on data stored in memory. The data stored in memory may be indicative of a relationship between potential angular positions of the track system 20*a*' and corresponding sizes of the contact patch of the track system 20*a*'. The processor 610 may select the second angular position amongst the potential angular positions by identifying a given potential angular position that is associated with a desired size of the contact patch.

In some embodiments, a magnitude of the corrective movement of the track system 20*a*' relative to the vehicle 10' may be determined by the processor 610 based on stored data. It is contemplated that data indicative of a relationship between a potential angular position of the track system 20*a*' and a corresponding size of the contact patch may be stored in memory accessible by the processor 610. In some embodiments, a given size of the contact patch for a given angular position of the track system 20*a*' may be determined by the processor 610 and/or pre-computed using one or more parameters describing the geometry of the track system 20*a*', without departing from the scope of the present technology.

Obstacle Mode

Figure 14A:
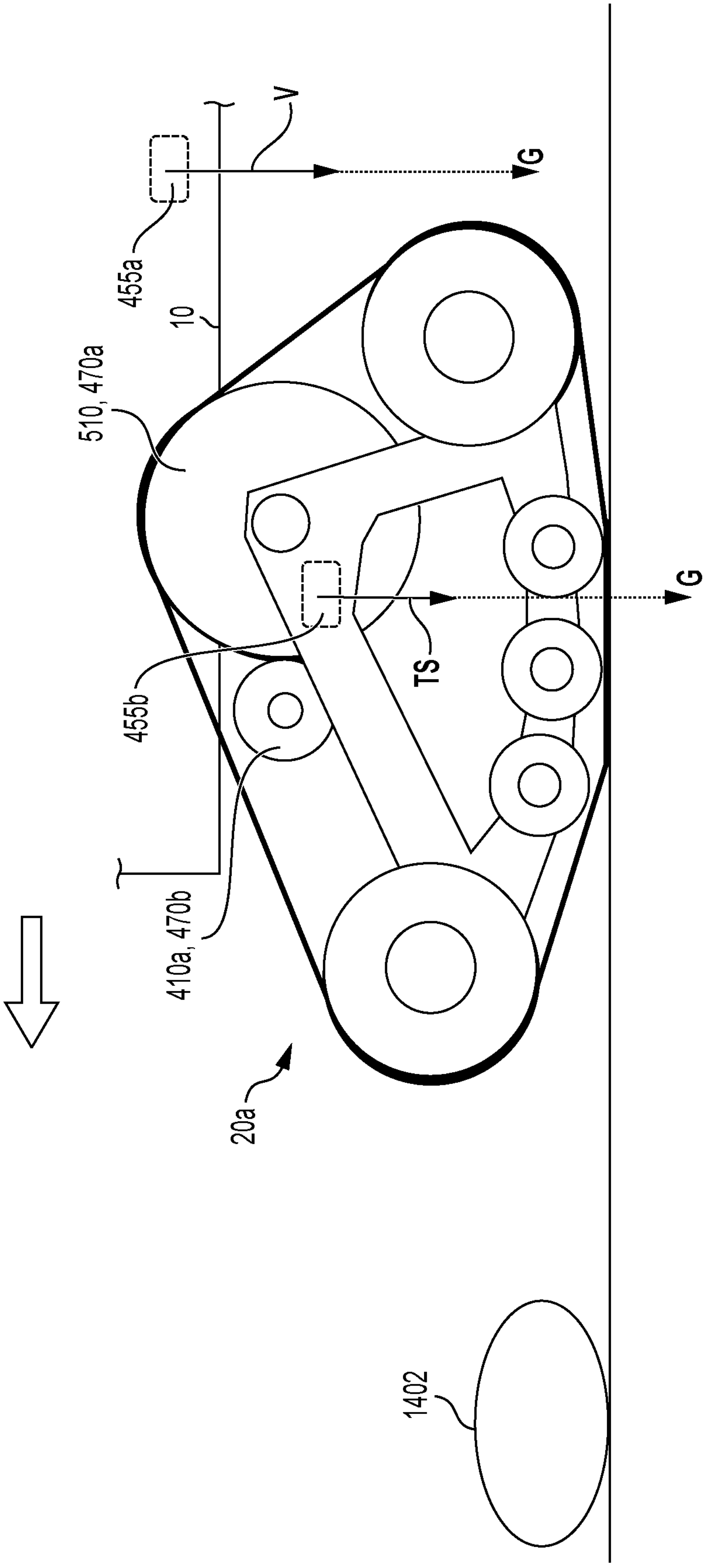
FIG. 14A is a left side schematic view of a track system according to an embodiment of the present technology in a default configuration.
Figure 14B:
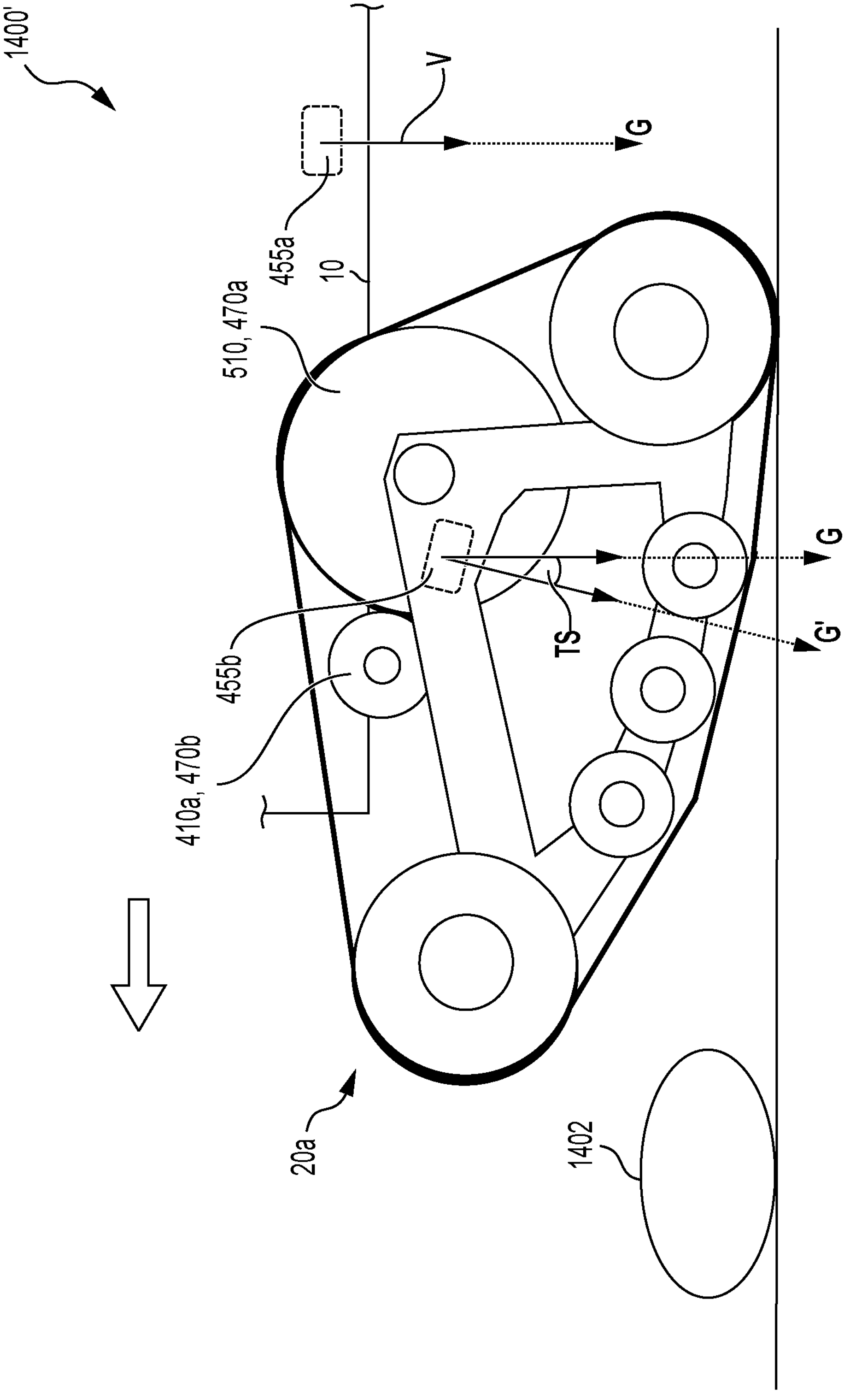
FIG. 14B is a left side schematic view of the track system of FIG. 14A in heel configuration.
Figure 14C:
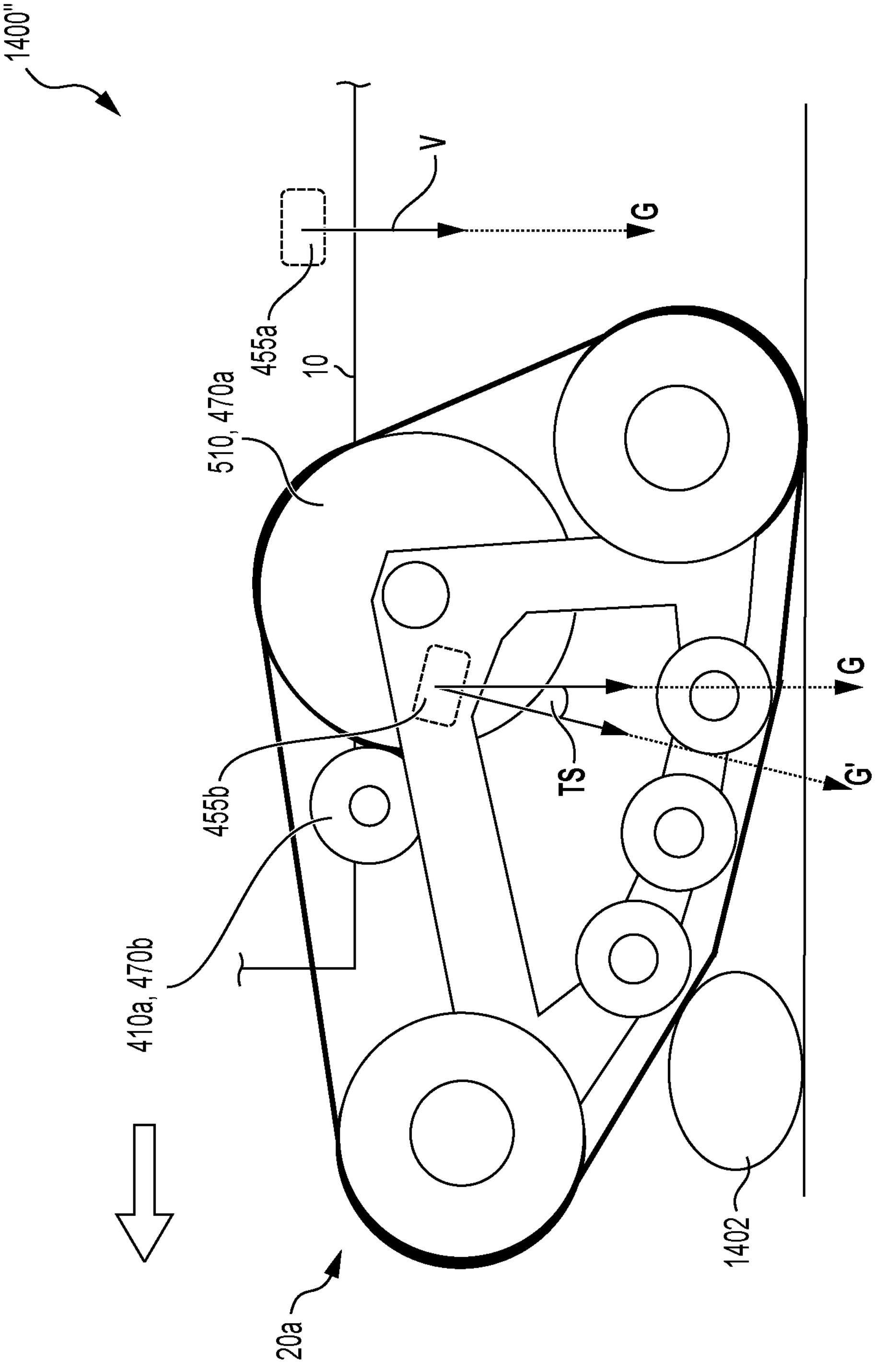
FIG. 14C is a left side schematic view of the track system of FIG. 14A in heel configuration, and overcoming an obstacle.
Figure 15A:
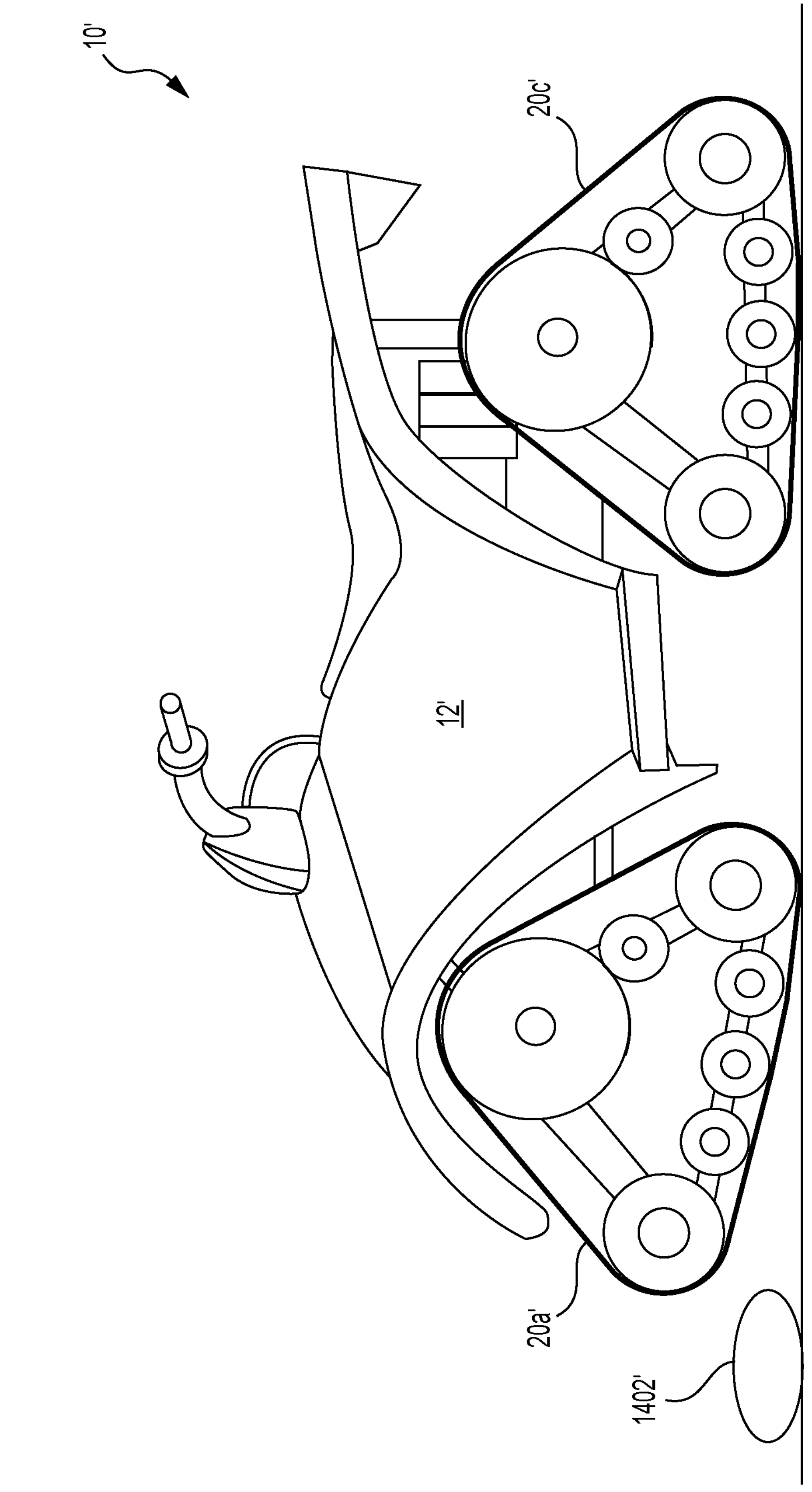
FIG. 15A is a left side schematic view of a vehicle having track systems according to embodiments of the present technology, the front track systems being in a heel configuration.
Figure 15B:
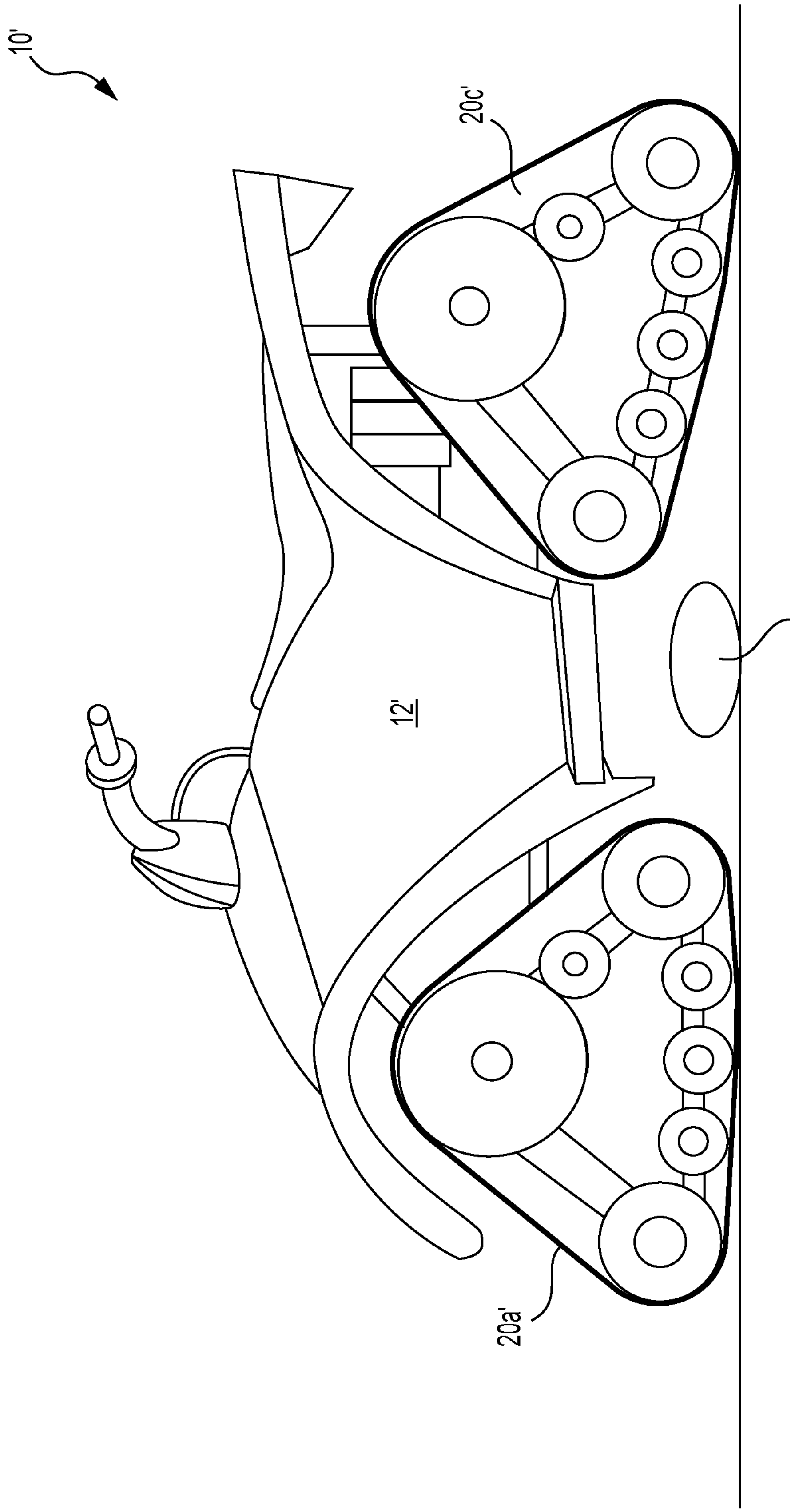
FIG. 15B is a left side schematic view of a vehicle having track systems according to embodiments of the present technology, the front track systems being in a heel configuration.
Figure 15C:
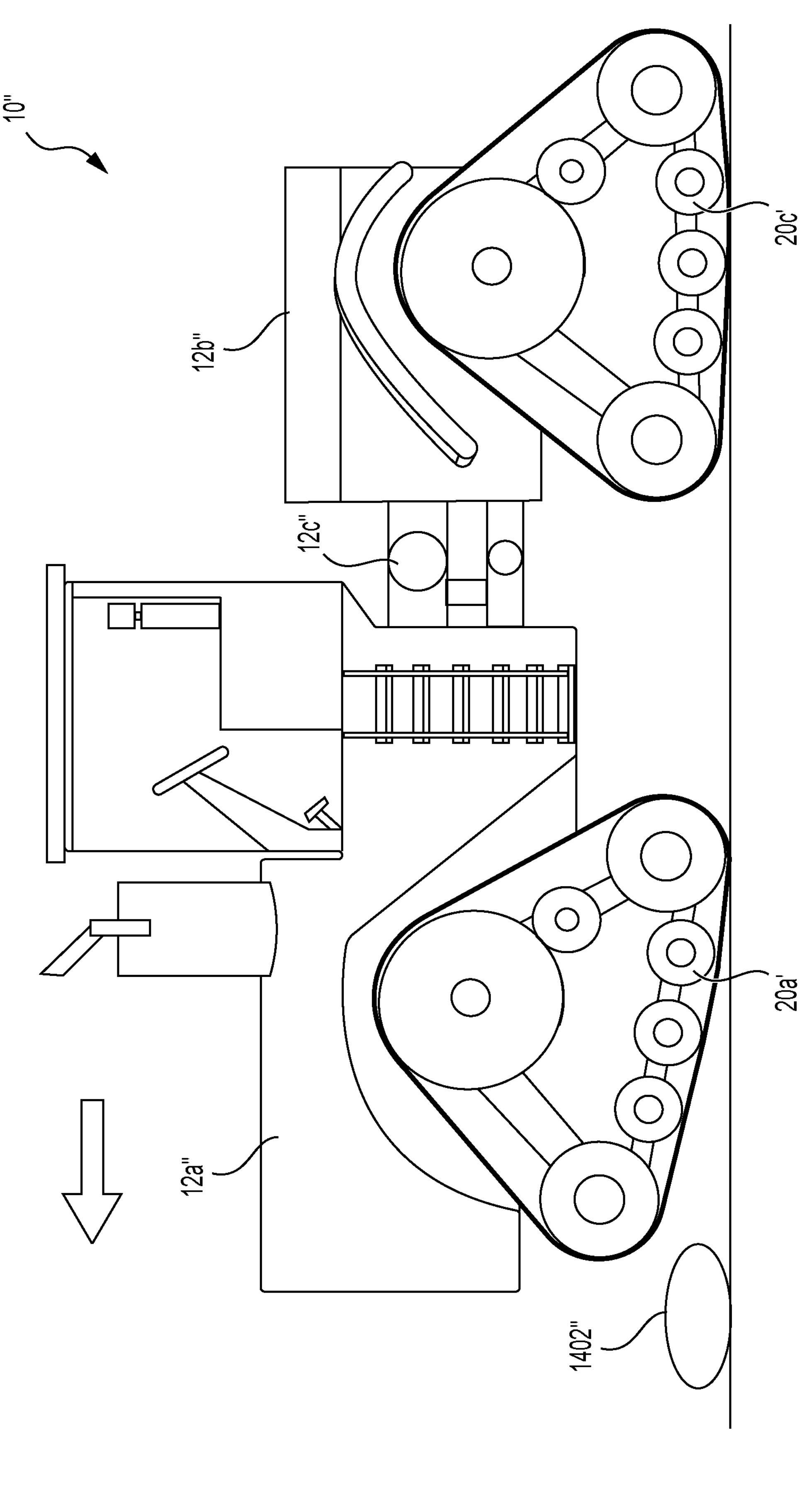
FIG. 15C is a left side schematic view of an articulated vehicle having track systems according to embodiments of the present technology, the front track systems being in a heel configuration.
Figure 15D:
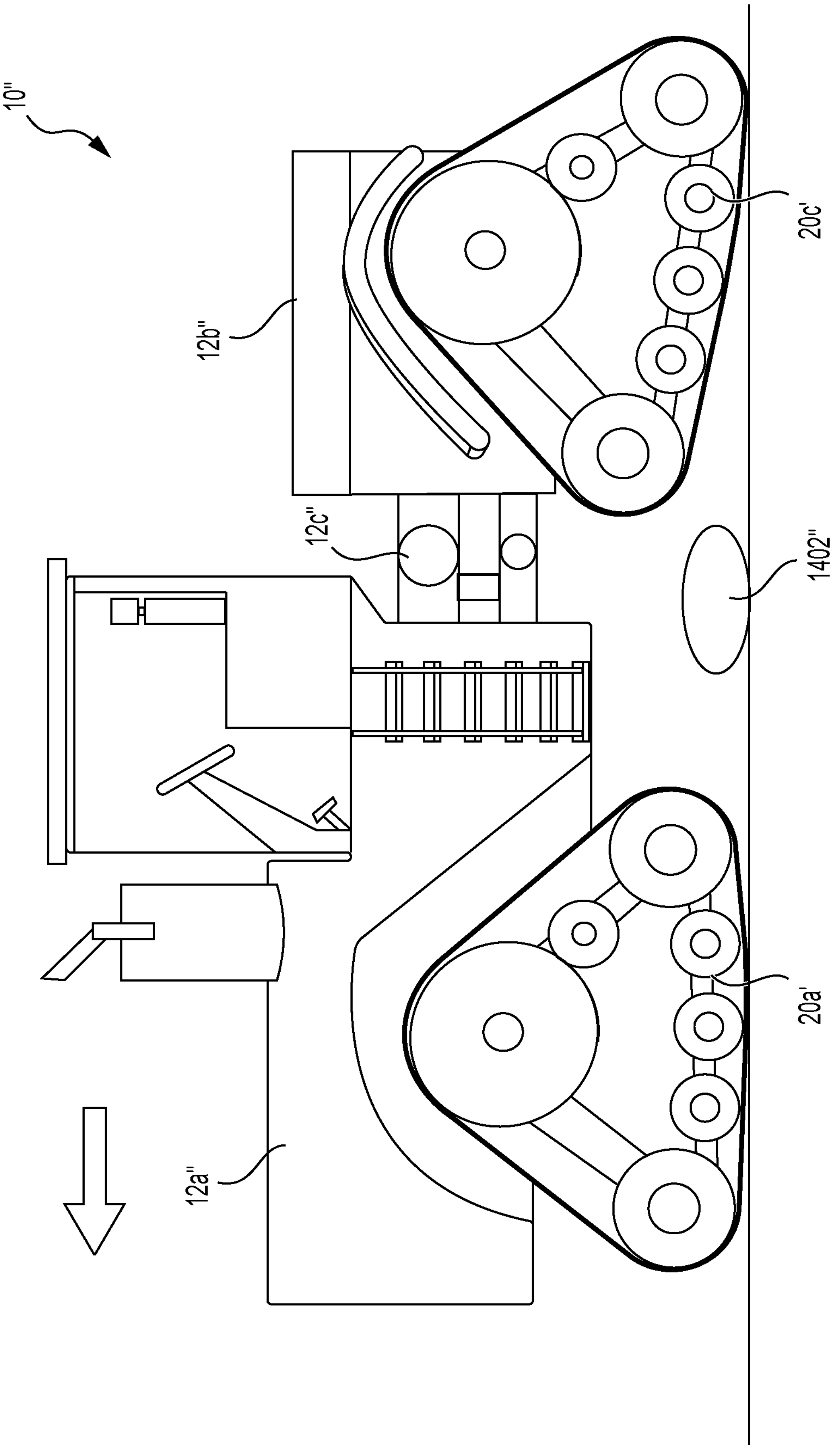
FIG. 15D is a left side schematic view of an articulated vehicle having track systems according to embodiments of the present technology, the front track systems being in a heel configuration.

Referring to FIGS. 14A to 14C, which depicts the track system 20*a* connected to the vehicle 10, FIGS. 15A and 15B, which depicts the track systems 20*n*' (only track systems 20*a*', 20*c*' are seen) connected to vehicle 10', and FIGS. 15C and 15D, which depicts the track systems 20*n*' (only track systems 20*a*', 20*c*' are seen) connected to vehicle 10", developers of the present technology have realized that maintaining, at least temporarily, one or more track systems in a heel and/or toe configuration(s) during operation of the corresponding vehicle may be advantageous in a variety of operating conditions. In some embodiments of the present technology, with reference to track system 20*a* connected to the vehicle 10, the processor 610 may be configured to control the track system 20*a* of the vehicle 10 in accordance with an "obstacle" mode, during which the processor 610 triggers the motor 410 of the ACS 400 to maintain the track system 20*a* in a heel configuration when approaching and/or when overcoming an obstacle. The processor 610 may be configured to perform angular control of the track system 20*a* in the obstacle mode automatically and/or in response to a user input. It is understood that in some instances, the processor 610 could cause one or more of the track systems 20*a* to be adjusted to the heel configuration, depending on the obstacle being overcome (e.g., obstacle extends laterally across an entire width of the vehicle).

In some embodiments, the processor 610 may be configured to acquire a signal generated in response to a user input indicating that the processor 610 is to operate in the obstacle mode. For example, the user may provide via the user interface 490*a* a user input indicative of a desire to operate in the obstacle mode. In other embodiments of the present technology, the processor 610 may be configured to acquire and/or monitor one or more signals for triggering operation of the track system 20*a* in the obstacle mode.

In one embodiment, the processor 610 may monitor inter alia a signal indicative of a presence of an obstacle on a vehicle path. For example, the vehicle 10 may be equipped with one or more sensors (e.g., part of other monitoring devices of a controller assembly and/or of the vehicle) for performing object detection such as for example, radar sensors, cameras, lidar sensors or the like. Object detection of one or more obstacles in the surroundings of the vehicle 10, and more particularly along the vehicle path, may be performed via a variety of computer-implemented algorithms as is known in the art. In response to detecting an upcoming obstacle, the processor 610 may trigger the motors of one or more track systems to maintain the respective track systems in the heel configuration.

With reference to FIG. 14A, there is depicted a schematic representation of the front left track system 20*a* of the vehicle 10 approaching an obstacle 1402. In response to a received signal, the processor 610 may be configured to trigger the motor 410*a* of the ACS 400 of the track system 20*a* to move, and at least temporarily maintain, the track system 20*a* in the heel configuration as depicted in FIG. 14B in advance to prepare the track system for overcoming the obstacle effectively (i.e., before the track system 20*a* encounters the obstacle 1402).

As seen in FIG. 14C, when the track system 20*a* contacts the obstacle 1402 while it is in the heel configuration. In this configuration, the track system 20*a* has an increased approaching angle, which can assist the track system 20*a* to overcome the obstacle 1402 with more ease than if the track system 20*a* were in the default configuration.

Additionally, developers of the present technology have realized that moving a given track system in a heel configuration when approaching and/or overcoming an obstacle can assist the user in controlling the vehicle when overcoming said obstacle and/or reducing the likelihood of damaging the track system when overcoming said obstacle.

Although not depicted, it should be noted that the processor 610 may also trigger corrective movement on the rear track systems 20*c*, 20*d*, for at least temporarily operating the rear track systems 20*c*, 20*d* in the heel configuration while overcoming the obstacle 1402. Steps executed by the processor 610 for triggering corrective movement on the track systems 20*b*, 20*c*, and/or 20*d*, during operation in the obstacle mode may be similar to how the processor 610 is configured to trigger corrective movement on the track system 20*a*, without departing from the scope of the present technology.

With reference to FIG. 15A as the vehicle 10' approaches an obstacle 1402', the track systems 20*a*', 20*b*' (only track system 20*a*' is shown) is adjusted into the heel configuration. Once the track systems 20*a*', 20*b*' have overcome the obstacle 1402', as seen in FIG. 15B, the track systems 20*a*', 20*b*' may be adjusted back to their operation prior to being moved into the heel configuration (e.g. in the default mode). In some cases, the track system 20*a*', 20*b*' may stay in the heel configuration to increase the ground clearance to minimize risks of contact between a bottom of the vehicle 10' and the obstacle 1402'. Additionally, as the obstacle 1402' approaches the rear track systems 20*c*', 20*d*', the rear track systems 20*c*', 20*d*' are adjusted to the heel configuration in anticipation of the obstacle 1402' and to increase ground clearance as well. It is contemplated that in some embodiments where the obstacle 1402' is only disposed along the left side of the vehicle 10', only the left track systems 20*a*', 20*b*' may be adjusted to the heel configuration.

In an other example, with reference to FIG. 15C, as the vehicle 10" approaches an obstacle 1402", the track systems 20*a*', 20*b*' are moved into the heel configuration. Once the track systems 20*a*', 20*b*' have overcome the obstacle 1402", as seen in FIG. 15D, the track systems 20*a*', 20*b*' may return to their operation prior to being moved into the heel configuration (e.g. in the default mode). In some cases, the track system 20*a*', 20*b*' may stay in the heel configuration to increase the ground clearance to minimize risks of contact between the bottom of the vehicle 10' and the obstacle 1402". Additionally, as the obstacle 1402" approaches the rear track systems 20*c*', 20*d*', the rear track systems 20*c*', 20*d*' are adjusted to the heel configuration in anticipation of the obstacle 1402" and to increase ground clearance as well.

In some embodiments, the processor 610 may be configured to stop operation of a track system in the obstacle mode upon acquiring one or more signals. For example, the processor 610 may be configured to acquire a signal generated in response to a user input indicative of the user cancelling the obstacle mode and/or of the user selecting a default mode. In another example, in response to the processor 610 determining based on one or more signals that the track system overcame the obstacle, the processor 610 may revert to controlling the track system in accordance with the default mode of operation described above.

Deep Snow Mode

With reference to FIGS. 16A, 16B, 17A and 17B, developers of the present technology have realized that maintaining, at least temporarily, one or more track systems in a heel and/or toe configuration(s) during operation of the corresponding vehicle may be advantageous in a variety of operating conditions. In some embodiments of the present technology, the processor 610 may be configured to control one or more track systems of the vehicle in accordance with an "deep snow" mode, during which the processor 610 triggers the motor to maintain the track system in a heel configuration when the track system is operating in deep snow. The processor 610 may be configured to perform angular control of the track system in the deep snow mode automatically and/or in response to a user input.

In some embodiments, the processor 610 may be configured to acquire a signal generated in response to a user input indicating that the processor 610 is to operate in the deep snow mode. For example, the user may provide via a user interface component a user input indicative of a desire to operate in the deep snow mode. In other embodiments of the present technology, the processor 610 may be configured to acquire and/or monitor one or more signals for triggering operation of the track system in the deep snow mode.

In one embodiment, the processor 610 may monitor inter alia a signal indicative of the track system operating in deep snow. For example, the signal could acquired from a sensor and indicative that there is a loss of traction, an change in drag force, etc. In another example, the signal may be determined by one or more computer-implemented methods that can also be used for detecting slipping of a track system. More detail will be provided below.

Figure 16A:
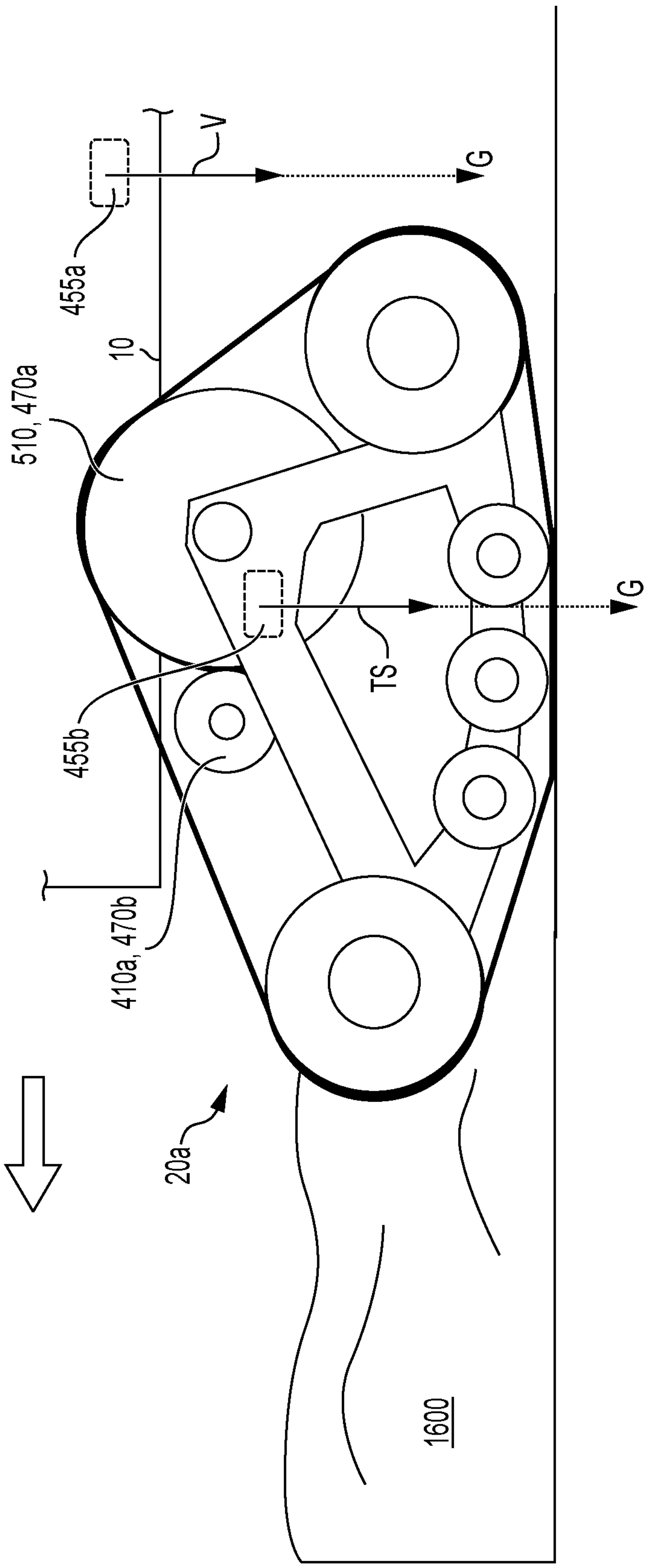
FIG. 16A is a left side schematic view of the track system travelling in deep snow.
Figure 16B:
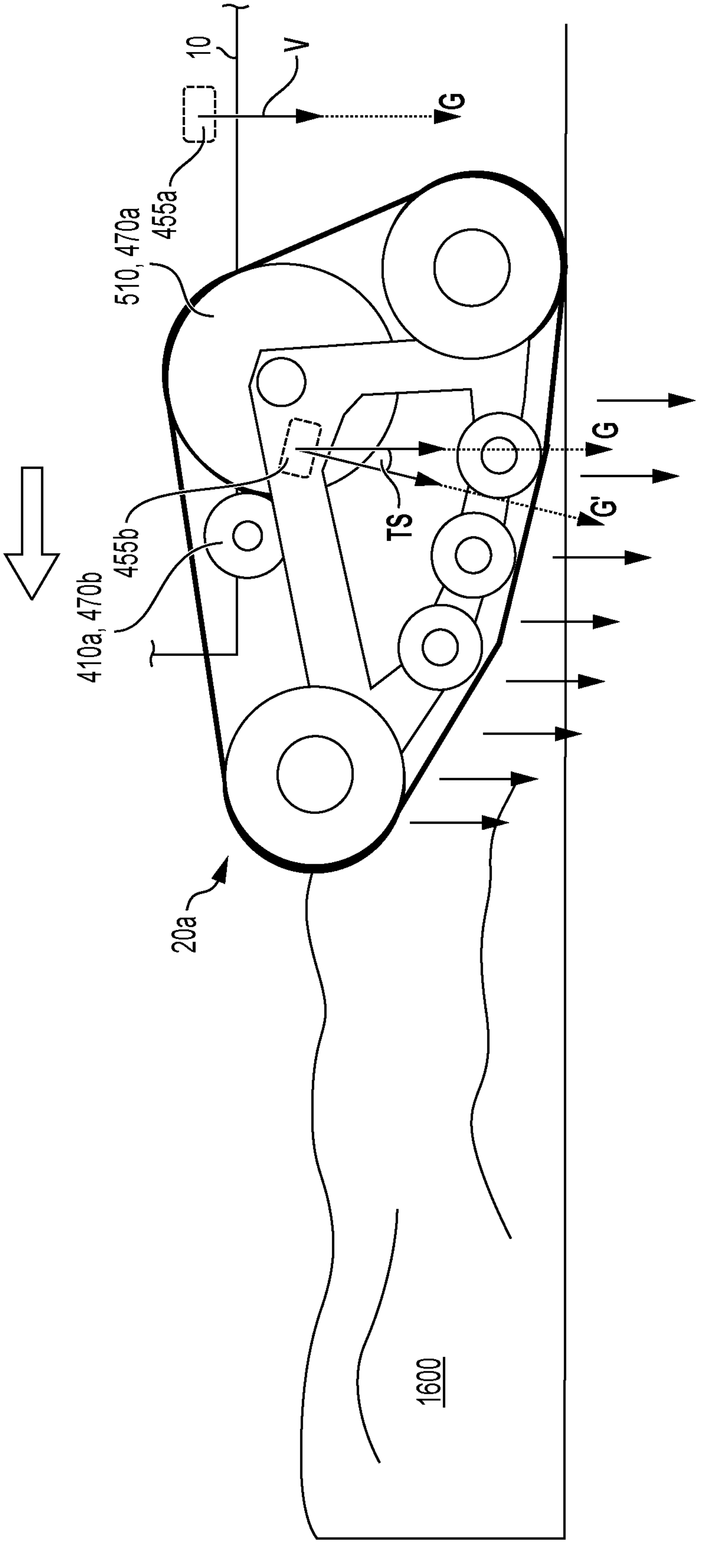
FIG. 16B is a left side schematic view of the track system of FIG. 16A in a heel configuration.

With reference to FIG. 16A, there is depicted a schematic representation of the track system 20*a* of the vehicle 10 operating in deep snow 1600. In response to a received signal, the processor 610 may be configured to trigger the motor 410*a* of the ACS 400 of the track system 20*a* to move, and at least temporarily maintain, the track system 20*a* in the heel configuration as depicted in FIG. 16B.

Developers of the present technology have realized that moving a given track system in a heel configuration when operating in deep snow 1600 can assist the user in controlling the vehicle in deep snow and/or reduce sinking of the vehicle, by, for instance, increasing the contact patch with the deep snow and/or increasing ground clearance.

Figure 17A:
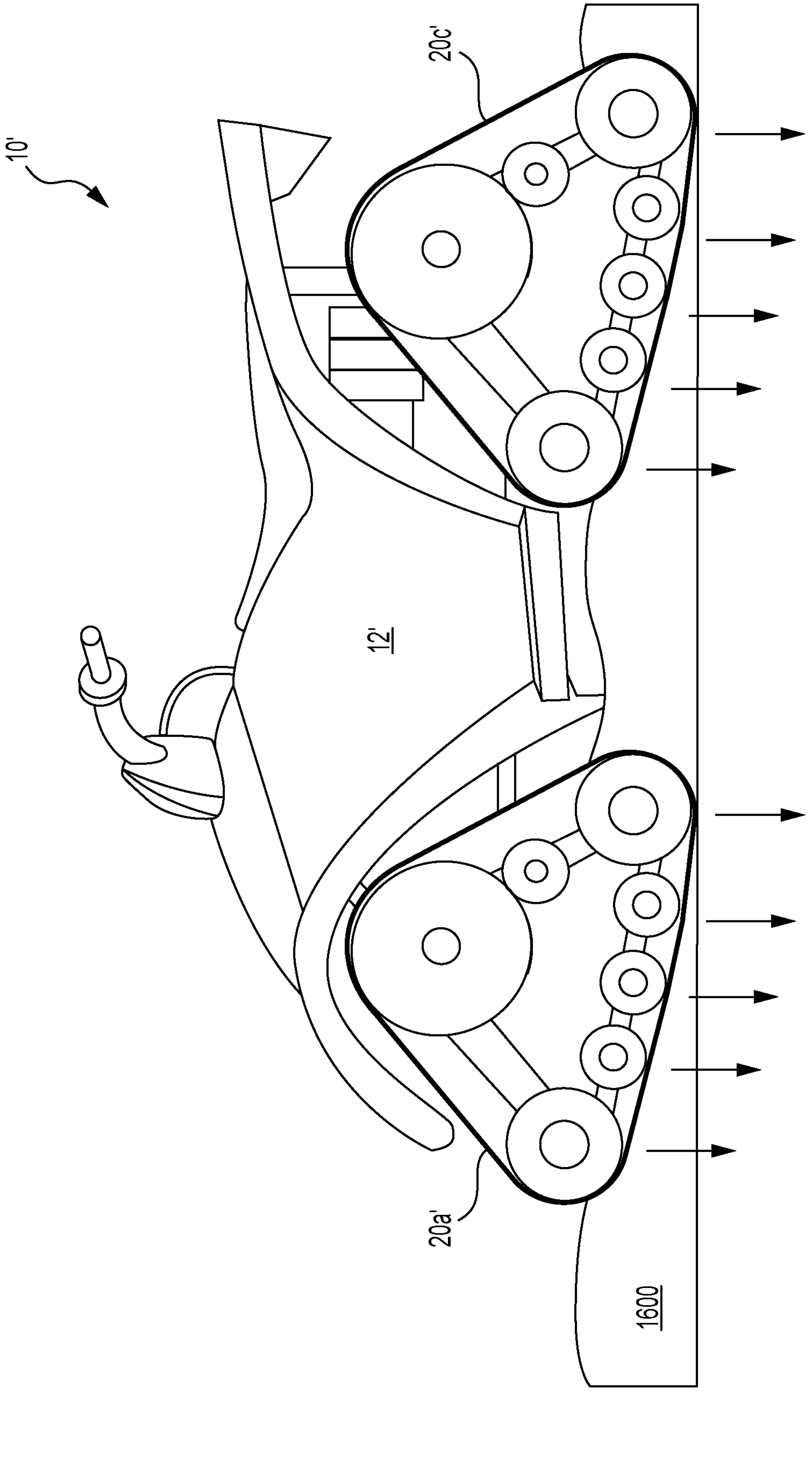
FIG. 17A is a left side schematic view of a vehicle having track systems according to embodiments of the present technology, the front track systems being in a heel configuration and the vehicle travelling in deep snow.

For example, with reference to FIG. 17A, the vehicle 10' is moving in the deep snow 1600. As the processor 610 determines that the vehicle 10' is operating in the deep snow 1600, the track systems 20*a*', 20*b*', 20*c*', 20*d* (only track systems 20*a*', 20*c*' shown) are moved into the heel configuration. It is contemplated that moving the track systems 20*a*', 20*b*', 20*c*', 20*d* into the heel configuration can be performed independently by the processor 610, for each respective track system 20*a*', 20*b*', 20*c*', 20*d* of the vehicle 10', without departing from the scope of the present technology.

Figure 17B:
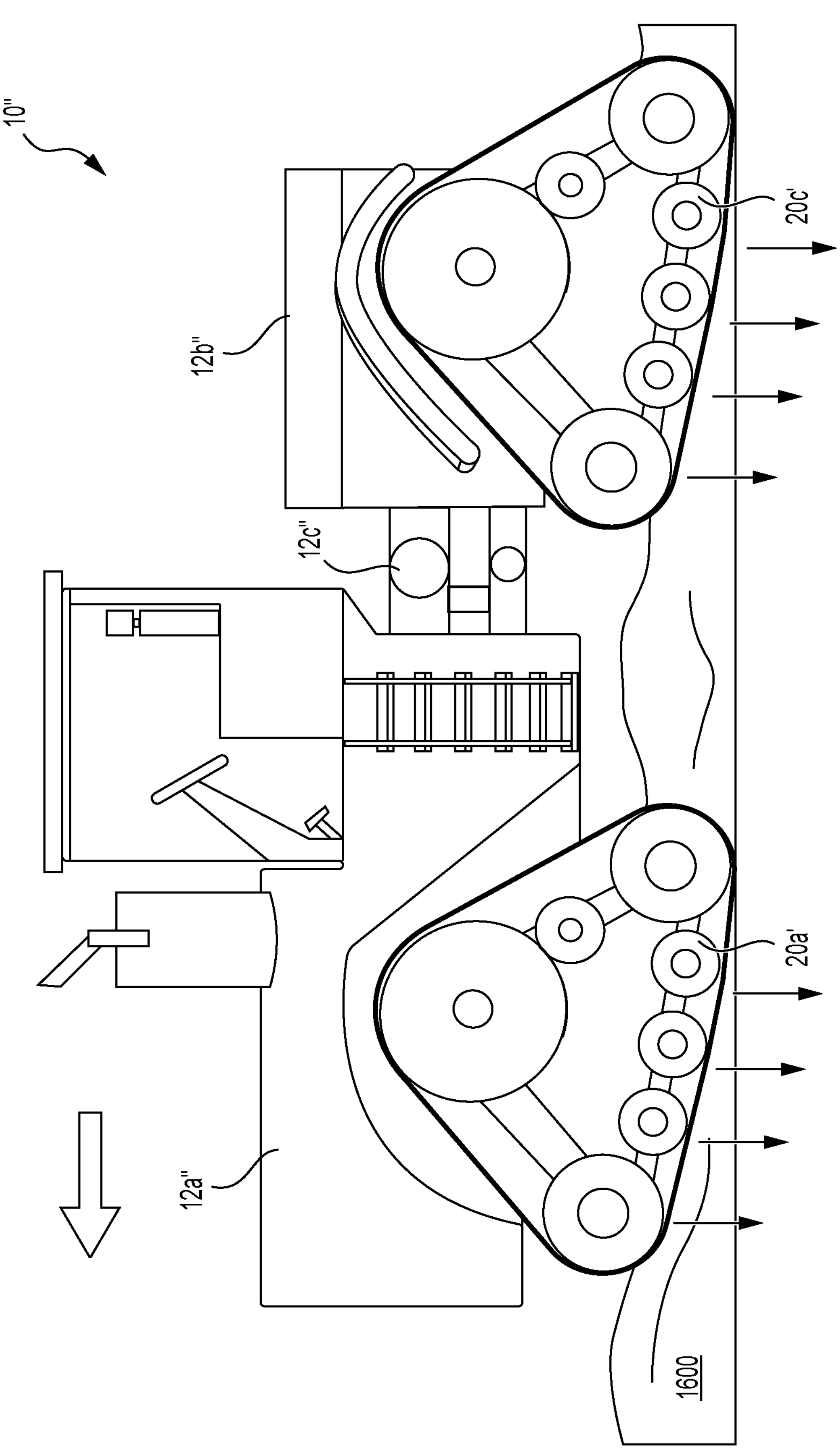
FIG. 17B is a left side schematic view of an articulated vehicle having track systems according to embodiments of the present technology, the front track systems being in a heel configuration and the vehicle travelling in deep snow.

In an other example, with reference to FIG. 17B, the vehicle 10" operating in the deep snow 1600. As the processor 610 determines that the vehicle 10" is operating in the deep snow 1600, the track systems 20*a*', 20*b*', 20*c*', 20*d* are moved into the heel configuration. It is contemplated that moving the track systems 20*a*', 20*b*', 20*c*', 20*d* into the heel configuration may be performed independently by the processor 610.

It is contemplated that in some embodiments, the deep snow mode could be used in other types of soils. For instance, the deep snow mode could be useful while a vehicle is travelling on very soft soil (e.g. mud), in which the vehicle is sinking.

In some embodiments, with reference to track systems 20*n*' and the vehicle 10', the processor 610 may be configured to stop operation of the track systems in the deep snow mode upon acquiring one or more signals. For example, the processor 610 may be configured to acquire a signal generated in response to a user input indicative of the user cancelling the deep snow mode and/or of the user selecting the default mode. In another example, in response to the processor 610 determining based on one or more signals that the track systems 20*a*', 20*b*', 20*c*', 20*d* are no longer operating in deep snow 1600, the processor 610 may revert to controlling the track systems 20*a*', 20*b*', 20*c*', 20*d* in accordance with the default mode of operation described above.

Figure 18:
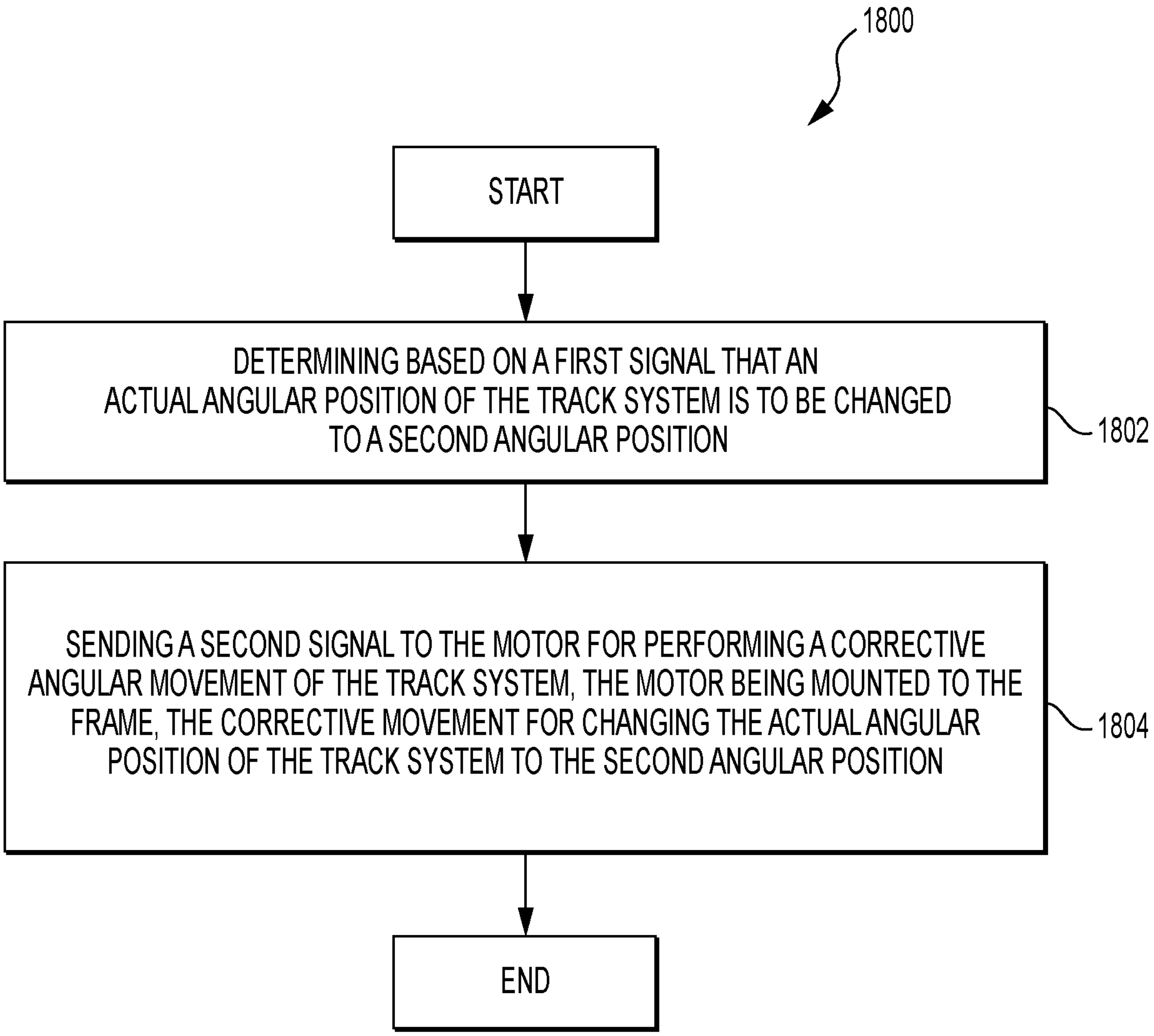
FIG. 18 is a flowchart of a method executable by a controller assembly of FIG. 5 according to an embodiment of the present technology.

In some embodiments of the present technology, with reference to FIG. 18, the processor 610 may be configured to execute a method 1800 for controlling an angular position of a given track system. It should be noted that the method 1800 may be executed by the processor for performing angular control of one or more track systems described herein. In some embodiments, the method 1800 may be executed by the processor 610 for performing angular control of track system(s) of one or more vehicles described herein. Various steps of the method 1800 will now be described in greater detail.

STEP 1802: Determining Based on a First Signal that an Actual Angular Position of the Track System is to be Changed to a Second Angular Position At step 1802, the processor 610 is configured to determine based on a first signal that an actual angular position of the track system 20*a*' is to be changed to a second angular position. It should be noted that the track system 20*a*' in the second angular position has a different approach angle on a ground surface than when in the actual (current) angular position. It is contemplated that a given angular position of the track system 20*a*' may comprise any combination of an actual roll angle, an actual yaw angle, and an actual pitch angle of the track system 20*a*'.

In some embodiments, the track system 20*a*' in the second angular position has a larger approach angle than when in the actual angular position. In other embodiments, the track system 20*a*' in the second angular position has a smaller approach angle than when in the actual angular position. In further embodiments, the track system 20*a*' may further have a different contact patch on a ground surface in the second angular position than in the actual angular position. For example, the track system 20*a*' may be in a heel configuration when moved to the second angular position. In another example, the track system 20*a*' may be in a toe configuration when moved to the second angular position.

In some embodiments, the method 1800 may further comprise a step of acquiring, by the processor 610, the first signal. In some embodiments, the first signal acquired by the processor 610 may be indicative of a presence of an obstacle in front of the track system 20*a'*.

In other embodiments, it is also contemplated that the first signal may be indicative of a user input. The processor 610 may be configured to acquire a signal from a user-interface component (e.g., an actuable component of the user interface). For example, the user input may be indicative of that a given obstacle is present in front of the track system 20*a'*.

It should be noted that the method 1800 may be performed by the processor 610 for more than one track systems of the vehicle 10'. In some embodiments, the processor 610 may perform angular control of more than one track systems of the vehicle 10'. With reference to the vehicle 10 (see FIG. 1), for example, the processor 610 may be configured to perform angular control of one or more of the track systems 20*a*, 20*b*, 20*c*, 20*d*. Therefore, in some embodiments, it can be said that the processor 610 may execute the method 1800 for performing angular control of one or more of: a front track system of a given vehicle, a rear track system of the given vehicle, a left track system of the given vehicle, and a right track system of the given vehicle.

In some embodiments, the processor 610 may be configured to perform corrective movements on all track systems of a given vehicle to bring all of them into tow configurations, and until at least when the given obstacle has been overcome by the given vehicle. It is contemplated that maintaining all the track system of the given vehicle may further increase a ground clearance of the given vehicle which may aid in overcoming the given obstacle.

Furthermore, it should be noted that the method 1800 may be performed by the processor 610 for more than one track systems of an other vehicle than the vehicle 10' or the vehicle 10. In some embodiments, it can be said that the processor 610 may execute the method 1300 for performing angular control of one or more track systems of the harvesting vehicle 200, such as of the track systems 210, 220, for example (see FIG. 2A). In other embodiments, it can be said that the processor 610 may execute the method 1800 for performing angular control of one or more track systems of the articulated vehicle 250, such as of the track systems 260, 270, for example (see FIG. 2B).

STEP 1804: Sending a Second Signal to a Motor for Performing a Corrective Angular Movement of the Track System, the Motor being Mounted to the Frame, the Corrective Movement for Changing the Actual Angular Position of the Track System to the Second Angular Position The method 1800 continues to step 1804, with the processor 610 configured to send a second signal to a motor 410*a* mounted to the track system 20*a*'. The processor 610 is configured to send the second signal for performing a corrective angular movement of the track system 20*a*'. It is contemplated that the second signal may be sent to a given power source of a given motor. The motor 410*a* is configured to perform the corrective movement for changing the actual angular position of the track system 20*a*' to the second angular position.

In some embodiments, the processor 610 may be configured to send the second signal for performing a CW rotation of the track system 20*a*' relative to the vehicle 10'. In other embodiments, the processor 610 may be configured to send the second signal for performing a CCW rotation of the track system 20*a*' relative to the vehicle 10'.

In some embodiments, the method 1800 may comprise a step of determining, by the processor 610, the second angular position of the track system 20*a*' based on data stored in memory. The data stored in memory may be indicative of a relationship between potential angular positions of the track system 20*a*' and corresponding approach angles of the track system 20*a*'. The processor 610 may select the second angular position amongst the potential angular positions by identifying a given potential angular position that is associated with a desired approach angle of the track system 20*a'*.

In some embodiments, a magnitude of the corrective movement of the track system 20*a*' relative to the vehicle 10' may be determined by the processor 610 based on stored data. It is contemplated that data indicative of a relationship between a potential angular position of the track system 20*a*' and a corresponding approach angle may be stored in memory accessible by the processor 610. In some embodiments, a given approach angle for a given angular position of the track system 20*a*' may be determined by the processor 610 and/or pre-computed using one or more parameters describing the geometry of the track system 20*a*', without departing from the scope of the present technology.

In some embodiments, it is contemplated that the processor 610 may control a given track system in accordance with the deep snow mode and the obstacle mode by employing the method 1300 and/or the method 1800, without departing from the scope of the present technology.

Emergency Braking Mode

Figure 19A:
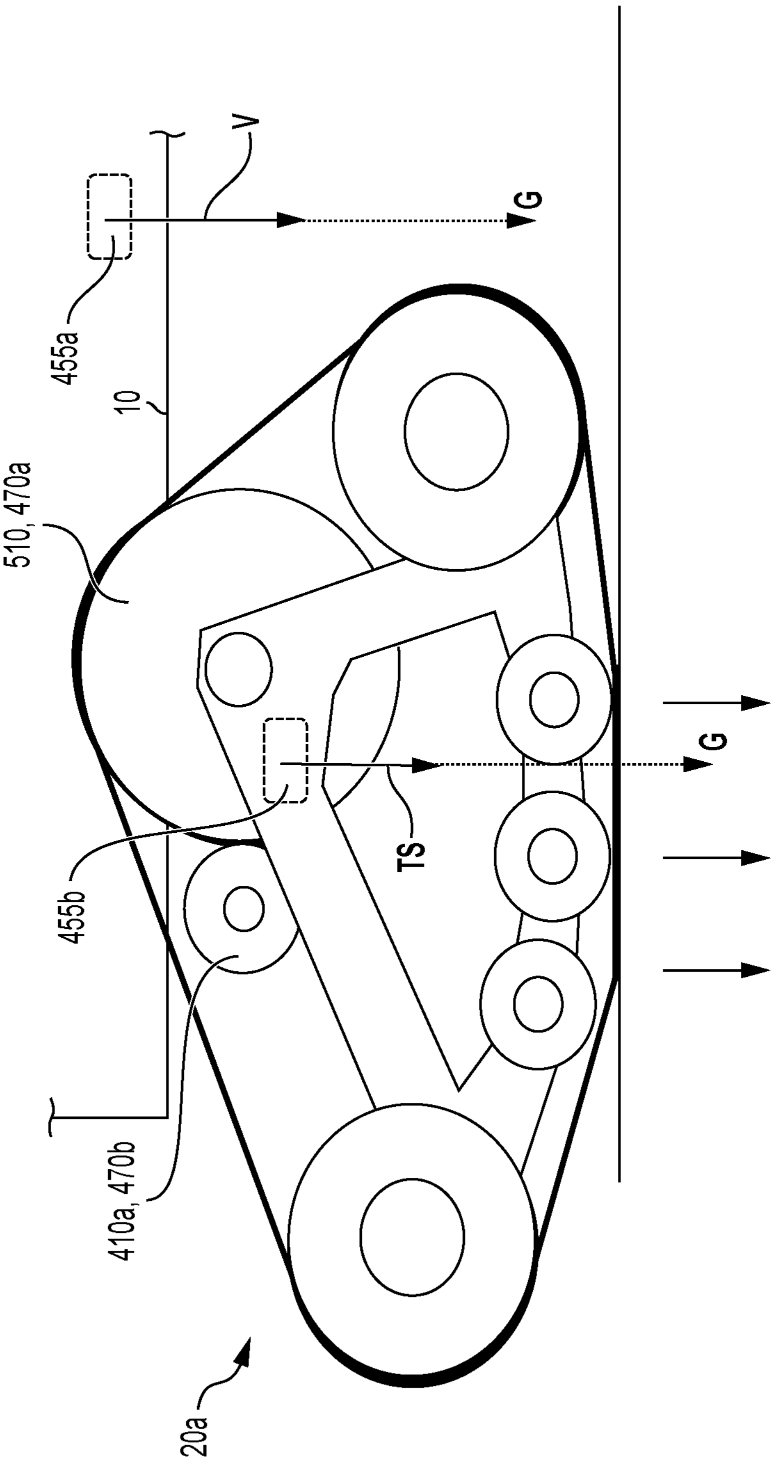
FIG. 19A is a left side schematic view of a track system according to an embodiment of the present technology.
Figure 19B:
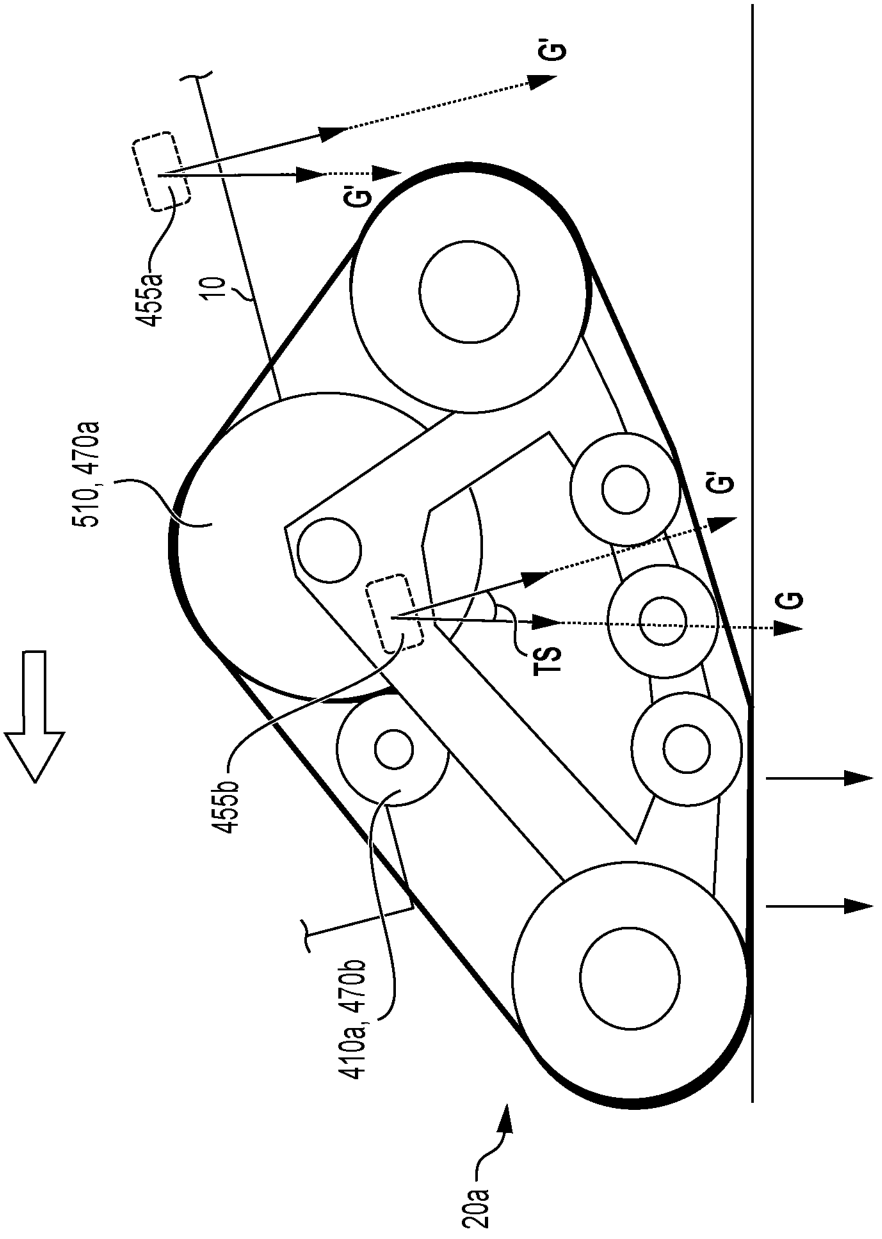
FIG. 19B is a left side schematic view of the track system of FIG. 19A undergoing sudden braking and an orientation of the track system being corrected with an old threshold value.
Figure 19C:
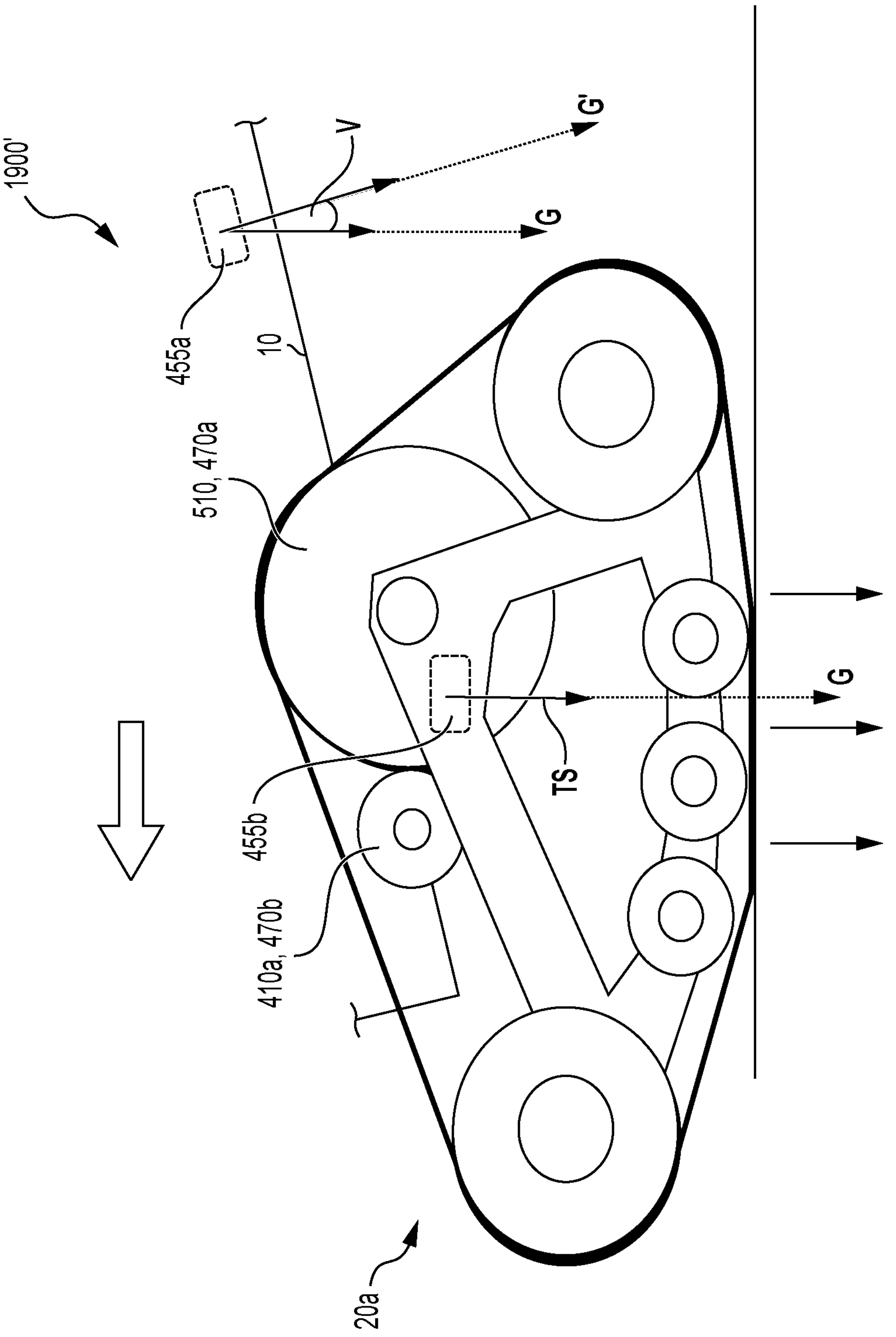
FIG. 19C is a left side schematic view of the track system of FIG. 19A undergoing sudden braking and the orientation of the track system being corrected with an updated threshold value.

Referring to FIGS. 19A to 19C, which depicts the track system 20*a* connected to the vehicle 10, developers of the present technology have realized that modifying, at least temporarily, one or more threshold values and/or one or more reference values of an ACS during operation of the corresponding vehicle may be advantageous in a variety of operating conditions. In some embodiments of the present technology, with reference to the track systems 20*n* and the vehicle 10, the processor 610 may be configured to control one or more track systems 20*n* of the vehicle 10 in accordance with an "emergency braking" mode, during which the processor 610 updates one or more threshold values and/or one or more reference values used by the processor 610 to control operation of the track systems 20*n* when performing emergency braking. For example, the processor 610 may be configured to update a pre-determined angular threshold value (e.g., the ATV) used by the ACS when performing corrective operations in some embodiments of the present technology. The processor 610 may be configured to perform angular control of the track systems 20*n* in the emergency braking mode automatically and/or in response to a user input.

In some embodiments, the processor 610 may be configured to acquire a signal generated in response to a user input indicating that the processor 610 is to operate in the emergency braking mode. For example, the processor 610 may be configured to acquire and/or monitor one or more signals for triggering operation of the track system in the emergency braking mode.

In one embodiment, with reference to the track system 20*a* and the vehicle 10, the processor 610 may monitor inter alia a signal indicative of the track system 20*a* and/or the vehicle 10 experiencing rapid and/or sudden deceleration (jerking deceleration), (e.g., speed change over a given time lapse is greater than a predetermined amount). Without being bound and/or limited thereto, by "sudden deceleration", it is meant that a ratio of a magnitude of the speed decrease over a given period of time is greater than a predetermined amount). For example, the processor 610 may monitor a actual acceleration value and orientation of the vehicle 10 and/or of the track systems 20*n*. In response to a comparison between the actual acceleration value and a pre-determined acceleration threshold and depending on the orientation of the acceleration, the processor 610 may be configured to update the pre-determined angular threshold value. It is contemplated that the processor 610 may update the pre-determined angular threshold value so that an updated angle threshold value is larger than the pre-determined angular threshold value.

With reference to FIG. 19A, there is depicted the track system 20*a* operating in the default mode (similarly to its operation in FIGS. 10A and/or 10E). As shown, the track system 20*a* is "level" relative to the ground surface and relative to the vehicle body of the vehicle 10. As mentioned above with reference to FIG. 8, in the default mode, the processor 610 is configured to receive inputs, compare values determined based on the received inputs with one/or more reference values, and decide whether to perform corrective operation on the motor 410.

In one embodiment, the processor 610 may be configured to determine a difference between an ATSV and a PTSV and compare the difference against the angular threshold value, such as the ATV described above, for example. In this embodiment, the processor 610 may trigger a corrective action if the difference between the ATSV and the PTSV is greater than the ATV.

In a first example, let it be assumed that under the default mode the ATV is 5 degrees. In this example, the processor 610 may trigger a corrective action if the ATSV is more than 5 degrees from the PTSV, and that the difference between the ATSV and the PTSV is 3 degrees. In this first example, the processor 610 may determine not to perform corrective movement since the difference between the ATSV and the PTSV is below the ATV.

In a second example, let it be assumed that under the default mode the angle threshold value is 5 degrees and that the difference between the ATSV and the PTSV is 7 degrees. In this second example, the processor 610 may determine to perform a corrective movement since the difference between the ATSV and the PTSV is greater than the ATV.

Returning to FIG. 19A, let it be assumed that the vehicle 10 rapidly and/or suddenly decelerates. It should be noted that during rapidly and/or suddenly deceleration, weight distribution of the vehicle 10 shifts forward towards the front track systems 20*a*, 20*b*, which can thereby cause an increase in weight and pressure on the front track systems 20*a*, 20*b*. This can result in reduced traction and stability for the vehicle 10, making it more difficult to control and increasing the risk of skidding or losing control. The shift in weight distribution during rapid and/or sudden deceleration may cause the front of the vehicle body "dip" and the rear of the vehicle body to "lift" off the ground.

Developers of the present technology have realized that when the vehicle body so-changes its relationship relative to the ground surface, the difference between the ATSV and the PTSV may increase, and the ACS 400*a* operating in the default mode may therefore decide to perform a corrective operation on the track system 20*a*. In such a scenario, the corrective operation during rapid deceleration may cause the track system 20*a* to change its angular position and find itself in a toe configuration as seen in FIG. 19B. However, the track system 20*a* in the toe configuration has a smaller contact patch in comparison to the track system 20*a* as seen in FIG. 19A, which can, in some instances, result in comparatively lower traction of the track system 20*a* during the emergency braking maneuver. In that case, it is understood that the correction based on the non-updated threshold can be detrimental to the vehicle and/or the track system. For example, adjustment of the orientation of the track system 20*a* relative to the vehicle 10 without updating the threshold can, in some instances, result in the track system 20*a* abutting the vehicle 10 (a rear side of the track system 20*a* can abut the vehicle 10).

As result, in some embodiments, the processor 610 that is configured to, at least temporarily, update the pre-determined angular threshold value (e.g., the ATV) when the vehicle 10 acceleration and/or the track system 20*a* actual acceleration values are indicative of a rapid deceleration, so that the updated angular threshold value is larger than the pre-determined angular threshold value.

Let it be assumed that the pre-determined angle threshold value is "5" degrees and, with reference to FIG. 19C, the front of the vehicle body dips due to rapid deceleration. The processor 610 may be configured to update the pre-determined angle threshold value from 5 degrees to 10 degrees, for example. Let it also be assumed that the difference between the ATSV and the PTSV becomes 7 degrees in FIG. 19C. As a result, due to the so-updated (in this case increased) angular threshold value, the processor 610 may be configured to determine that the difference between the ATSV and PTSV is below the updated angular threshold value and, therefore determines not to perform a corrective operation on the track system 20, thereby keeping a comparatively larger contact patch of the track system 20*a* during the emergency braking maneuver and a greater clearance between the track system and the vehicle.

In contrast, without the at least temporary update of the pre-determined angular threshold value, the processor 610 may determine that the difference between the ATSV and PTSV is greater than the pre-determined angular threshold value, and determines to perform a corrective movement on the track system 20*a*, thereby bringing it into the toe configuration as seen in FIG. 19B. In FIG. 19B, the track system 20*a* has a comparatively smaller contact patch and operates in a less desirable configuration of the front track system 20*a* during the emergency braking maneuver.

Figures 20A, 20B:
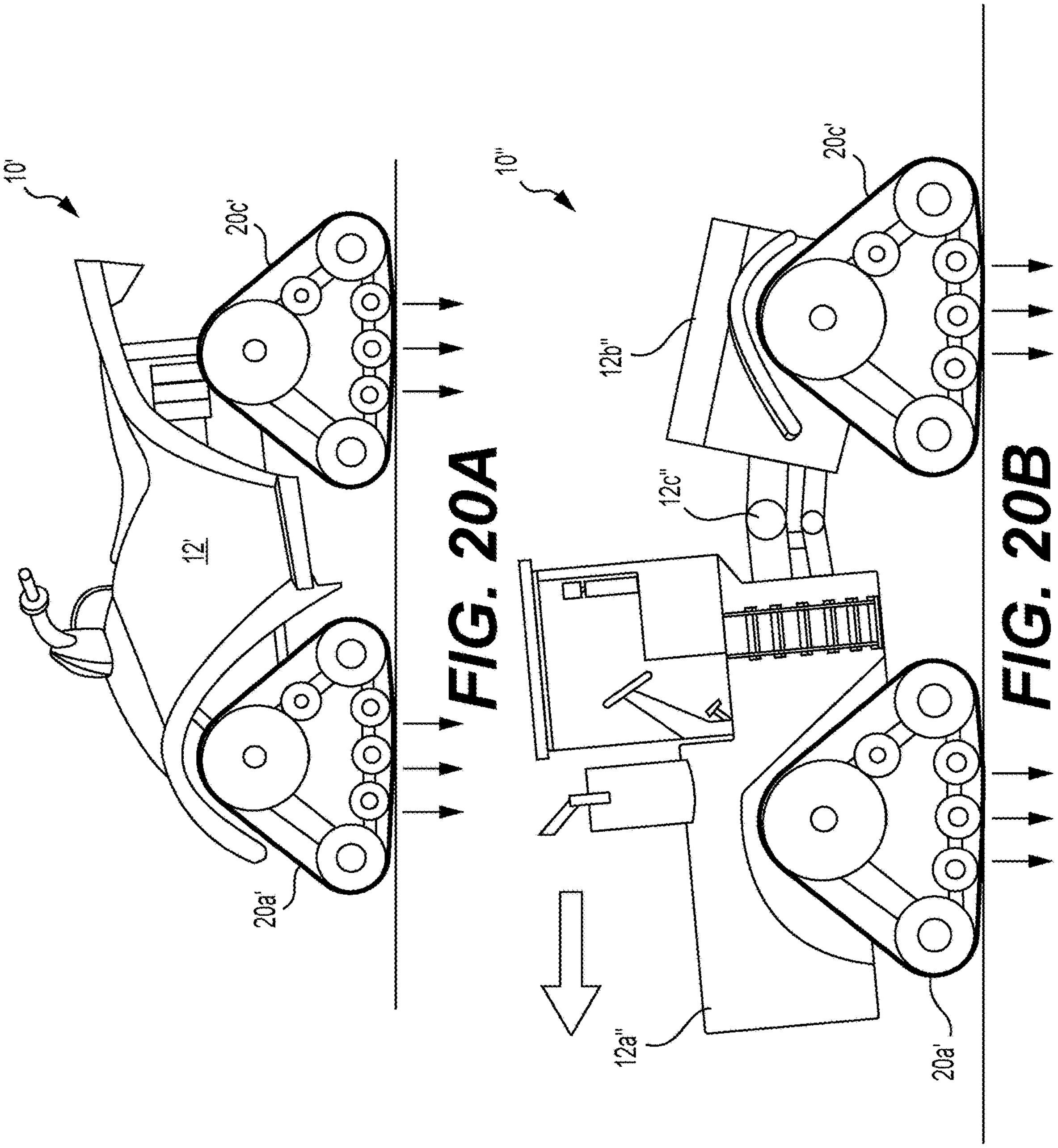
FIG. 20A is a left side schematic view of a vehicle having track systems according to embodiments of the present technology, the vehicle undergoing sudden and rapid braking.
FIG. 20B is a left side schematic view of an articulated vehicle having track systems according to embodiments of the present technology, the articulated vehicle undergoing sudden and rapid braking.

For example, with reference to FIG. 20A, the vehicle 10' is performing an emergency braking manoeuvre, as illustrated by the frame of the vehicle 10' leaning towards the front. The processor 610 is configured to adjust one or more reference values of the track systems 20*a*', 20*b*', 20*c*', 20*d*' so that, in response to the front of the vehicle body 12*a*' temporarily dipping and the rear of the vehicle body 12*a*' temporarily lifting (e.g., during emergency braking manoeuvre) corrective movement of the track systems 20*a*', 20*b*', 20*c*', 20*d*' maximizes the contact patch and ensures that there is no abutment between the track systems 20*a*', 20*b*', 20*c*', 20*d*' and the frame of the vehicle 10'.

In an other example, with reference to FIG. 20B, the vehicle 10" is performing an emergency braking manoeuvre. The processor 610 is configured to adjust one or more reference values of the track systems 20*a*', 20*b*', 20*c*', 20*d*', so that, in response to the front of the front vehicle body 12*a*" temporarily dipping and the rear of the rear vehicle body 12*b*" temporarily dipping, corrective movement of the track systems 20*a*', 20*b*', 20*c*', 20*d*' maximizes the contact patch and ensures that there is no abutment between the track systems 20*a*', 20*b*', 20*c*', 20*d*' and the vehicle 10'.

Once the acceleration value of the track systems 20*a*', 20*b*', 20*c*', 20*d*' and/or the vehicle 10' no longer meets the pre-determined threshold acceleration value, the processor 610 may be configured to revert to operation in the default mode and/or re-update and/or revert to the pre-determined angle threshold value of the default mode.

Load Calibration Mode

Figure 21A:
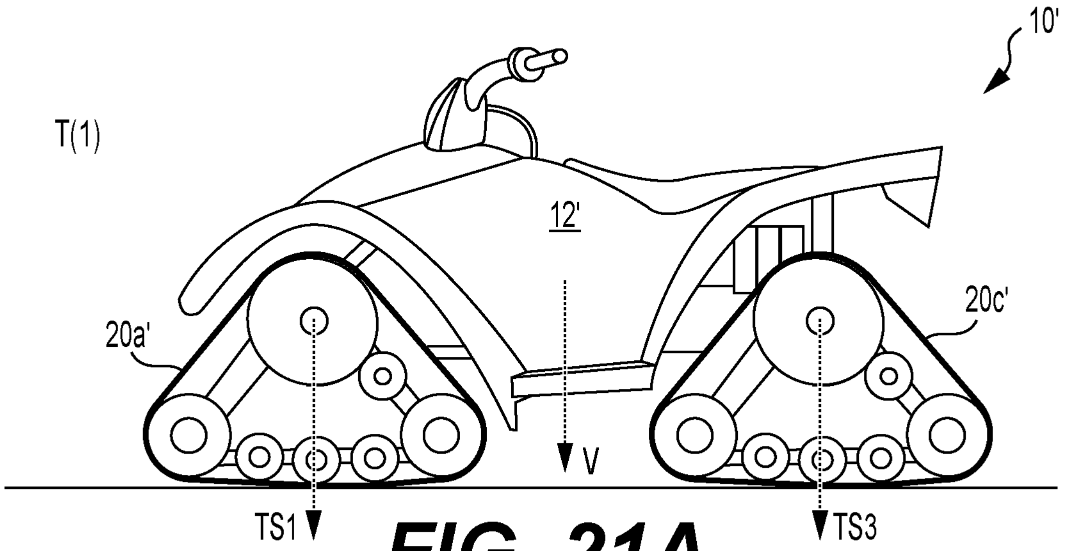
FIGS. 21A, 21B and 21C are left side schematic views of a vehicle undergoing load calibration, the vehicle having track systems according to embodiments of the present technology.
Figure 21B:
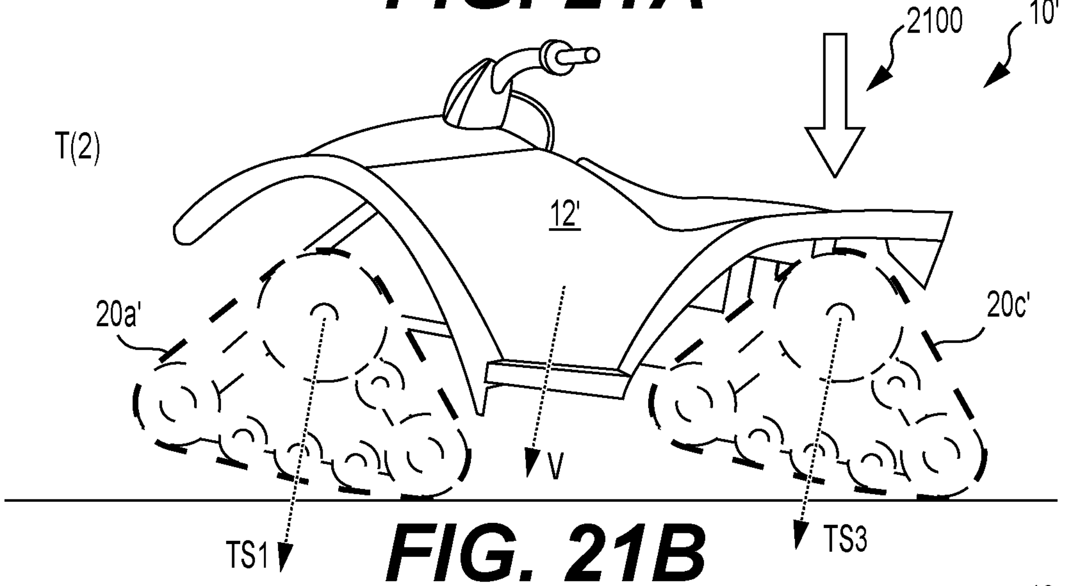
Figure 21C:
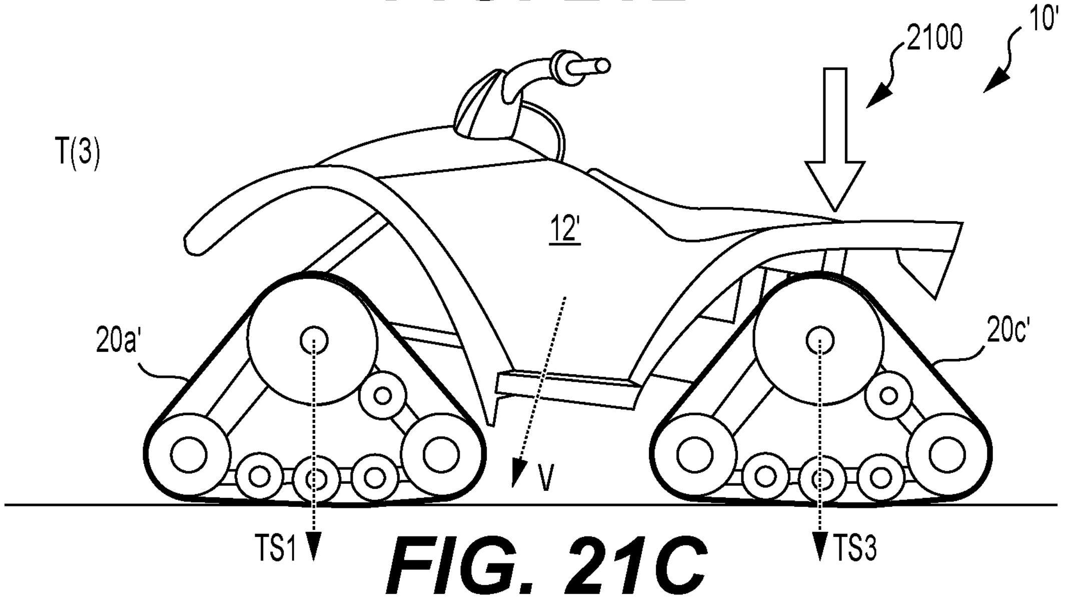

Referring to FIGS. 21A to 21C, which depicts the vehicle 10' and the track systems 20*a*', 20*b*', 20*c*', 20*d*', and 22A to 22C, which depicts the vehicle 10'' and the track systems 20*a*', 20*b*', 20*c*', 20*d*', developers of the present technology have realized that modifying, at least temporarily, one or more threshold values and/or one or more reference values of the ACS during operation of the corresponding vehicle may be advantageous in a variety of operating conditions. In some embodiments of the present technology, with reference to the vehicle 10', the processor 610 may be configured to control one or more track systems 20*a*', 20*b*', 20*c*', 20*d*' of the vehicle 10' in accordance with a "load calibration" mode, during which the processor 610 updates one or more threshold values and/or one or more reference values used by the processor 610 to control operation of the track systems 20*a*', 20*b*', 20*c*', 20*d*' when the vehicle 10' is carrying, at least temporarily, extra weight/load. For example, the processor 610 may be configured to update a pre-determined reference value (e.g. VWV and weight distribution of the vehicle 10 to change its orientation) used by the ACS when performing corrective operations in some embodiments of the present technology. The processor 610 may be configured to perform angular control of the track systems 20*a*', 20*b*', 20*c*', 20*d*' in the load calibration mode automatically and/or in response to a user input.

In some embodiments, the processor 610 may be configured to acquire a signal generated in response to a user input indicating that the processor 610 is to perform load calibration. For example, the user may provide via a user interface 490*a* a user input indicative of a desire to perform load calibration. In other embodiments of the present technology, the processor 610 may be configured to acquire and/or monitor one or more signals (e.g. from a load cell) for triggering the track systems 20*a*', 20*b*', 20*c*', 20*d*' to perform load calibration.

In one embodiment, the processor 610 may monitor inter alia a signal indicative of an actual speed and/or acceleration of the vehicle 10' and/or the track systems 20*a*', 20*b*', 20*c*', 20*d*', a signal indicative of an actual angular position of one or more vehicle bodies of the vehicle 10', and a signal indicative of an actual angular position of one or more the track systems 20*a*', 20*b*', 20*c*', 20*d*'. In response to the actual acceleration and/or speed value being constants (e.g., null), and in response to a comparison between actual angular position of the vehicle 10' and the actual angular position of the track systems 20*a*', 20*b*', 20*c*', 20*d*', the processor 610 may be configured to update the pre-determined reference value (e.g., the PTSV). It is contemplated that the processor 610 may update the PTSV value so that an updated PTSV value is at least one of greater or below in comparison to the PTSV value.

With reference to FIG. 21A, there is depicted the vehicle 10' with track systems 20*a*', 20*b*', 20*c*', 20*d*' (only track systems 20*a*', 20*c*' shown) operating under the default mode and moving at a constant speed (e.g., static). The track systems 20*a*', 20*b*', 20*c*', 20*d*' are "levelled" relative to the ground surface and relative to the body 12*a*' of the vehicle 10'.

Let it be assumed that the vehicle 10' receives an extra load inducing a force indicated in FIG. 21B by arrow 2100 at the back of the vehicle 10'. The new weight distribution may cause the front of the body 12*a*' of the vehicle 10' to "lift" and the rear of the body 12*a*' of the vehicle 10' to "dip".

Developers of the present technology have realized that when the body 12*a*' of the vehicle 10' so-changes its relationship relative to the ground surface, the difference between the ATSV and the PTSV may increase, and the ACS operating in the default mode may decide to perform a corrective movement on the track systems 20*a*', 20*b*', 20*c*', 20*d*'. In such a scenario, when load of the vehicle 10' so-increases, the corrective movement may cause the track systems 20*a*', 20*b*', 20*c*', 20*d*' to change their angular positions and find themselves in a heel configuration as seen in FIG. 21B. However, the track systems 20*a*', 20*b*', 20*c*', 20*d*' in the heel configuration has, in some embodiments, a smaller footprint in comparison to the track systems 20*a*', 20*b*', 20*c*', 20*d*' as seen in FIG. 21A, which can, in some instances, result in comparatively lower traction of the track systems 20*a*', 20*b*', 20*c*', 20*d*'. Also, maintaining the track systems 20*a*', 20*b*', 20*c*', 20*d*' in the heel configuration with extra load as seen in FIG. 21B may cause damage to one or more components receiving additional torque or cause premature wear of the endless track 24, among others.

As result, the processor 610 is configured to, at least temporarily, update the PTSV value so that the updated PTSV value is different from the PTSV value, when the vehicle 10' is stationary or moving at a constant speed and a track system angle is different from the vehicle body angle (e.g., track systems 20*a*', 20*b*', 20*c*', 20*d*' are level with the ground while the body 12*a*' of the vehicle 10' dips). In some cases, the processor 610 may update the PTSV value so that the updated PTSV value is equal to the then actual ATSV value, thereby "calibrating" the track systems to operate with a different weight distribution and/or extra load on the vehicle 10'.

With reference to FIG. 21C, the back of the body 12*a*' of the vehicle 10' dips. The processor 610 may be configured to update the PTSV value such that the updated PTSV value is equal to the then actual ATSV value. As a result, due to the so-updated PTSV, the processor 610 may be configured to determine that the difference between the ATSV and the updated PTSV is null and below the angular threshold value (e.g., ATV) and, therefore determines not to perform a corrective operation on one or more of the track systems 20*a*', 20*b*', 20*c*', 20*d*', thereby keeping a larger contact patch during the increased load operation. It can be said that the processor 610 may in a sense, "calibrate" the ACS of one or more of the track systems 20*a*', 20*b*', 20*c*', 20*d*' for carrying additional load during operation of the vehicle 10'.

In contrast, without the at least temporary update of the PTSV value, the processor 610 may determine that the difference between the ATSV and PTSV is greater than the pre-determined angular threshold value, and therefore perform a corrective movement on one or more of the track systems 20*a*', 20*b*', 20*c*', 20*d*', thereby bringing said one or more of the track systems 20*a*', 20*b*', 20*c*', 20*d*' into the heel configuration as seen in FIG. 21B, which is, as mentioned above, not desired.

Figure 22A:
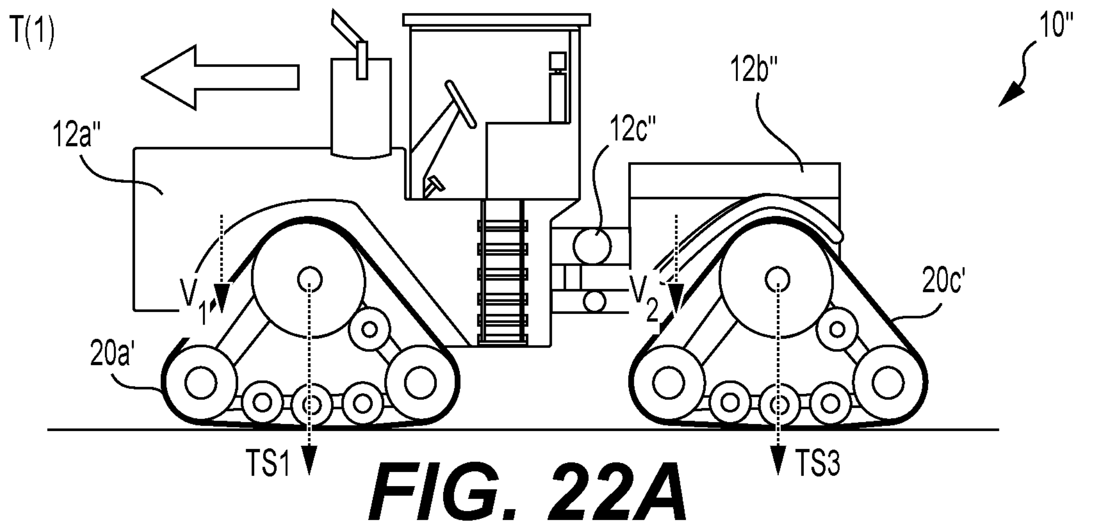
FIGS. 22A, 22B and 22C are left side schematic views of an articulated vehicle undergoing load calibration, the vehicle having track systems according to embodiments of the present technology.
Figure 22B:
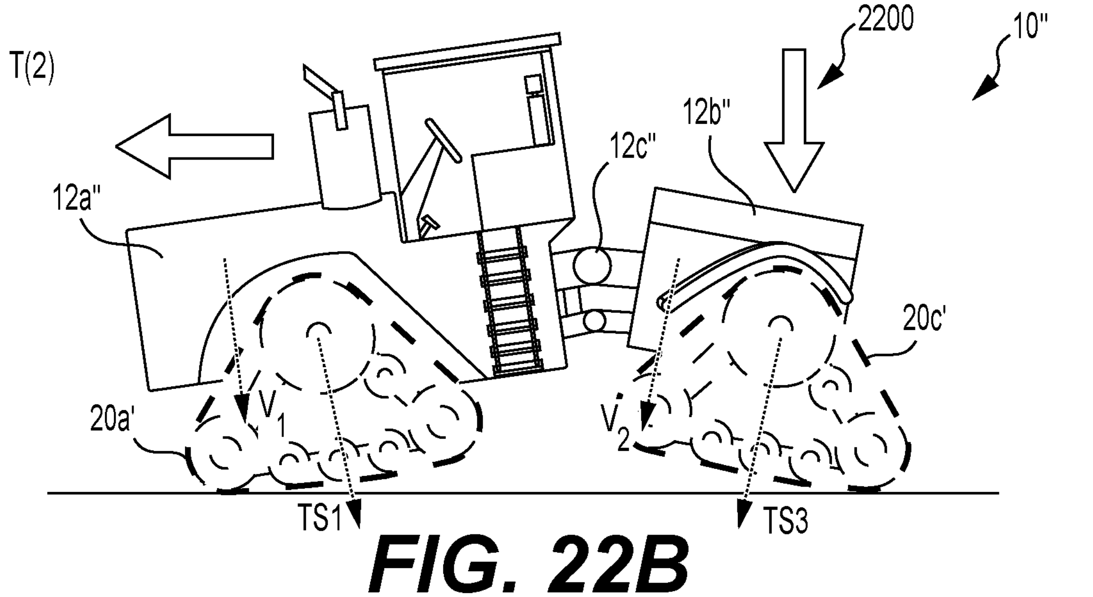
Figure 22C:
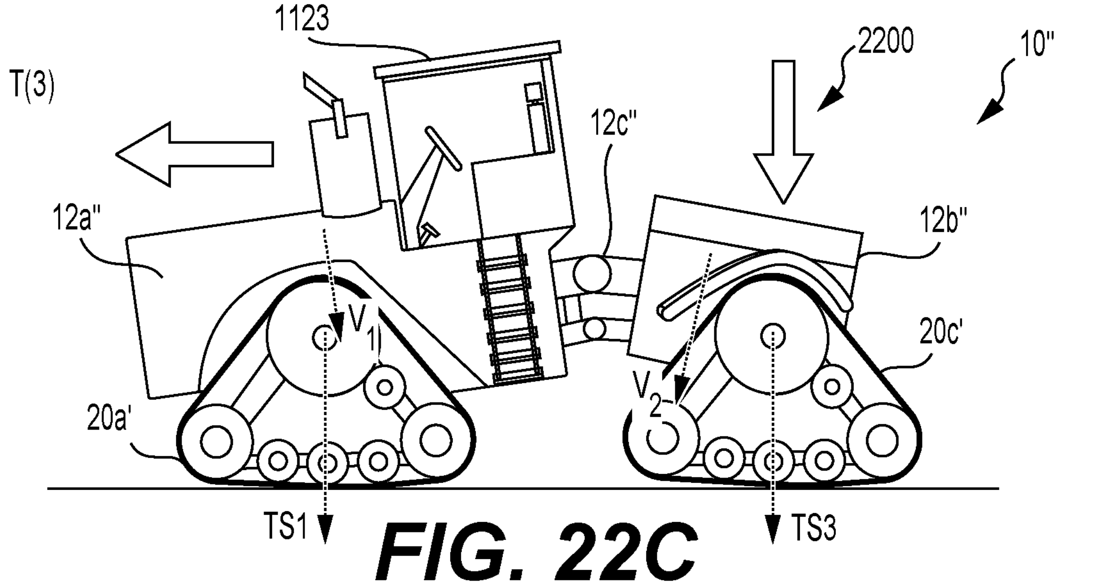

With reference to FIGS. 22A to 22C, the vehicle 10'' is moving at a constant speed and/or is static and receives an extra load as indicated in FIGS. 22B and 22C. In FIG. 22A, the track systems 20*a*', 20*b*', 20*c*', 20*d*' are "levelled" relative to the ground surface and relative to respective bodies 12*a*'', 12*b*'' of the vehicle 10''. As seen in FIG. 22B, without updating the PTSV for the track systems 20*a*', 20*b*', 20*c*', 20*d*', in response to the vehicle 10'' receiving the extra load, in some cases the processor 610 may perform corrective movement on the track systems 20*a*', 20*b*', 20*c*', 20*d*' thereby putting them in the toe and heel configurations due to the relative movement of the front vehicle body 12*a*" and of the rear vehicle body 12*b*".

As seen in FIG. 22C, by updating the PTSV as described above, the processor 610 may keep the track systems 20*a*', 20*b*', 20*c*', 20*d*' leveled with the ground surface even when the front vehicle body 12*a*" moves relative to the rear vehicle body 12*b*" (due to the articulation mechanism connecting the front and rear vehicle bodies) in response to the extra load.

In some instances, since the a load that the vehicle 10' is subjected to is continuously monitored, such that when a load is removed and/or added, the processor 610 may be configured to revert to operation in the default mode and/or re-update and/or revert to the PTSV value of the default mode. In other embodiments, a user can selectively turn the load calibration mode to turn on or off via the user interface 490*a*.

Figure 23:
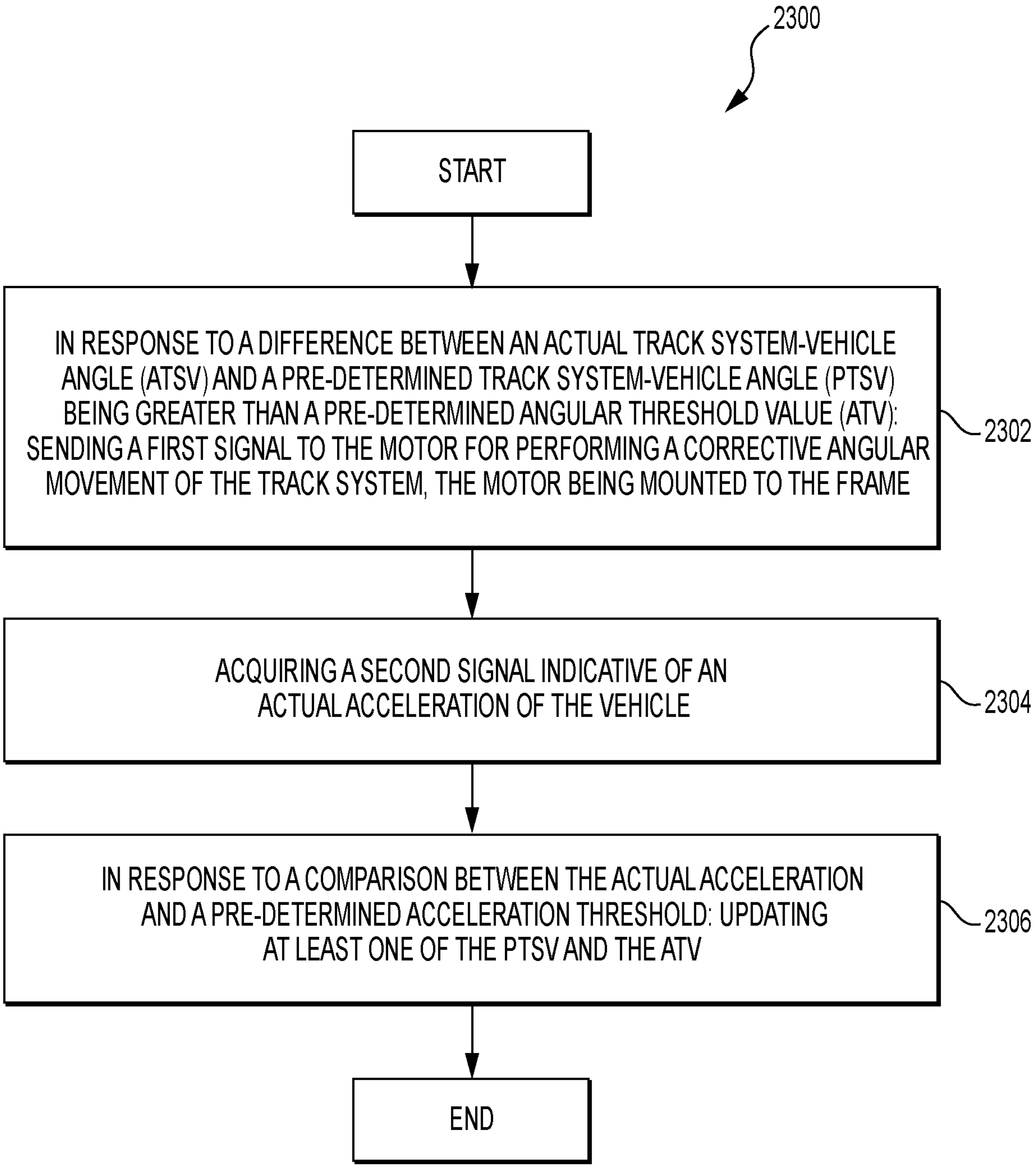
FIG. 23 is a flowchart of a method executable by a controller assembly of FIG. 5 according to an embodiment of the present technology.

In some embodiments of the present technology, with reference to FIG. 23, the processor 610 may be configured to execute a method 2300 for controlling an angular position of a given track system. It should be noted that the method 2300 may be executed by the processor for performing angular control of one or more track systems described herein. In some embodiments, the method 2300 may be executed by the processor 610 for performing angular control of track system(s) of one or more vehicles described herein. Various steps of the method 2300 will now be described in greater detail.

STEP 2302: In Response to a Difference Between an Actual Track System-Vehicle Angle (ATSV) and a Pre-Determined Track System-Vehicle Angle (PTSV) being Greater than a Pre-Determined Angular Threshold Value (ATV): Sending a First Signal to a Motor for Performing a Corrective Angular Movement of the Track System, the Motor being Mounted to the Frame At step 2302, the processor 610 is configured to send a first signal to the motor 410*a* for performing a corrective angular movement of the track system 20*a*', in response to a difference between an ATSV and a PTSV being greater than a ATV for the track system 20*a*'. As described above, in some embodiments, when the difference between the ATSV and the PTSV is above the ATV, the processor 610 may be configured to trigger a correcting movement on the track system 20*a*'.

In some embodiments, the method 2300 may comprise a step of acquiring, by the processor 610, a third signal indicative of an actual angular position of the vehicle 10' (V) and a fourth signal indicative of an actual angular position of the track system 20*a*' (TS). It is contemplated that the ATSV is a difference between the actual angular position of the vehicle 10' and the actual angular position of the track system 20*a*'.

It is contemplated that the PTSV and the ATV for the track system 20*a*' may be stored in memory accessible by the processor 610. The processor 610 may be configured to acquire the PTSV and the ATV for the track system 20*a*' from memory.

In some embodiments, the step 2302 may be executed periodically and in a looped configuration, so as to maintain the difference between the ATSV and the PTSV below the ATV during use of the vehicle 10'. For example, the step 2302 may be performed at a first moment in time, and repeated at an other moment in time after the first moment in time.

STEP 2304: Acquiring a Second Signal Indicative of an Actual Acceleration of the vehicle The method 2300 continues to step 2304, with the processor 610 configured to acquire a second signal indicative of an actual acceleration of the vehicle 10'. It is contemplated that the second signal may be acquired by the processor 610 from one or more monitoring devices described above (e.g., an accelerometer). In some embodiments, the second signal indicative of the actual acceleration may be indicative of at least one of a longitudinal acceleration, and a lateral acceleration of the vehicle 10'.

STEP 2306: In Response to a Comparison Between the Actual Acceleration and a Pre-Determined Acceleration Threshold: Updating at Least One of the PTSV and the ATV The method 2300 continues to step 2306, with the processor 610 configured to updated at least one of the PTSV and the ATV for the track system 10*a*', in response to a comparison between the actual acceleration and a given pre-determined acceleration threshold.

In some embodiments, in response to a comparison between the actual acceleration and the pre-determined acceleration threshold, the processor 610 is configured to update the ATV of the track system 10*a*' so that an updated ATV is greater than the ATV.

In some embodiments, the method 2300 may comprise a step of storing the updated ATV in addition to, or instead of the (non-updated) ATV in memory accessibly by the processor 610. It is contemplated that the updated ATV may stored at least temporarily for further processing performed by the processor 610. For example, the processor 610 may be configured to update the ATV in response to a rapid and/or sudden deceleration of the vehicle 10'. In this example, the updated ATV of the track system 20*a*' may be used by the processor 610 during an emergency braking manoeuvre. It should be noted that if the updated ATV is greater than the (non-updated) ATV, the processor 610 may in a sense permit greater differences between the ATSV and the PTSV before performing the corrective movement.

In some embodiments, the processor 610 may be configured to determine the updated ATV based on at least one of: the ATV, the PTSV, and a track system-vehicle body clearance parameter. It is contemplated that the processor 610 may determine the updated ATV such that when the difference between the ATSV and the PTSV is equal to the updated ATV, the track system 20*a*' does not collide against the vehicle body of the vehicle 10'.

In some embodiments, the method 2300 may comprise a step of determining, by the processor 610, the updated ATV of the track system 20*a*' based on data stored in memory. In some embodiments, a magnitude of the updated ATV of the track system 20*a*' may be determined by the processor 610 based on stored data. It is contemplated that the magnitude of the updated ATV may be determined by the processor 610 and/or pre-computed using one or more parameters describing the geometry of the track system 20*a*', the geometry of the vehicle body of the vehicle 10', the track system-vehicle body clearance parameter, and the like, without departing from the scope of the present technology.

In other embodiments, in response to a comparison between the actual acceleration and the pre-determined acceleration threshold, the processor 610 is configured to update the PTSV of the track system 20*a*' so that an updated PTSV is equal to the ATSV.

In some embodiments, the method 2300 may comprise a step of storing the updated PTSV in addition to, or instead of the (non-updated) PTSV in memory accessibly by the processor 610. It is contemplated that the updated PTSV may stored at least temporarily for further processing performed by the processor 610. For example, the processor 610 may be configured to update the PTSV in response to anew weight distribution of the vehicle 10'. In this example, the updated PTSV of the track system 20a' may be used by the processor 610 during load calibration as explained above. It should be noted that if the updated PTSV is equal to the ATSV, the processor 610 may in a sense "calibrate" the track system 10a to a new angular relationship between the vehicle body of the vehicle 10' and the track system 20a' due to extra weight and/or a different weight distribution of the vehicle 10'.

In some embodiments, the method 2300 may comprise a step of determining, by the processor 610, the updated PTSV of the track system 20a' based on data stored in memory. In some embodiments, a magnitude of the updated PTSV of the track system 20a' may be determined by the processor 610 based on stored data. It is contemplated that the magnitude of the updated PTSV may be determined by the processor 610 and/or pre-computed using one or more parameters describing the geometry of the track system 20a', the geometry of the vehicle body of the vehicle 10', the track system-vehicle body clearance parameter, and the like, without departing from the scope of the present technology.

It should be noted that the method 2300 may be performed by the processor 610 for more than one track systems of the vehicle 10'. In some embodiments, the processor 610 may perform angular control of more than one track systems of the vehicle 10'. With reference to the vehicle 10 (see FIG. 1), for example, the processor 610 may be configured to perform angular control of one or more of the track systems 20a, 20b, 20c, 20d. Therefore, in some embodiments, it can be said that the processor 610 may execute the method 2300 for performing angular control of one or more of: a front track system of a given vehicle, a rear track system of the given vehicle, a left track system of the given vehicle, and a right track system of the given vehicle.

Furthermore, it should be noted that the method 1300 may be performed by the processor 610 for more than one track systems of an other vehicle than the vehicle 10' or the vehicle 10. In some embodiments, it can be said that the processor 610 may execute the method 2300 for performing angular control of one or more track systems of the harvesting vehicle 200, such as of the track systems 210, 220, for example (see FIG. 2A). In other embodiments, it can be said that the processor 610 may execute the method 2300 for performing angular control of one or more track systems of the articulated vehicle 250, such as of the track systems 260, 270, for example (see FIG. 2B). The processor 610 may be configured to execute the method 2300 on one or more track systems of a given vehicle independently from one another.

Hill Mode for Vehicle

Referring to FIGS. 24A to 25D, developers of the present technology have realized that modifying, at least temporarily, one or more threshold values and/or one or more reference values of the ACS during operation of the corresponding vehicle may be advantageous in a variety of operating conditions. In some embodiments of the present technology, with reference to the vehicle 10', the processor 610 may be configured to control one or more track systems 20a', 20b', 20c', 20d' of the vehicle 10' in accordance with a "hill" mode, during which the processor 610 updates one or more threshold values and/or one or more reference values used by the processor 610 to control operation of the track systems 20a', 20b', 20c', 20d' when operating on an inclined and/or declined ground surface. For example, the processor 610 may be configured to update a pre-determined threshold value used by the ACS for perform corrective operations in some embodiments of the present technology. The processor 610 may be configured to perform angular control of the track systems 20a', 20b', 20c', 20d' in the hill mode automatically and/or in response to a user input.

In some embodiments, the processor 610 may be configured to acquire a signal generated in response to a user input indicating that the processor 610 is to operate in the hill mode. For example, the user may provide via the user interface 490a user input indicative of a desire to operate in the hill mode. In other embodiments of the present technology, the processor 610 may be configured to acquire and/or monitor one or more signals for triggering operation of the track systems 20a', 20b', 20c', 20d' in the hill mode.

In one embodiment, the processor 610 may monitor inter alia a signal indicative of an actual angular position of the vehicle 10'. For example, the processor 610 may monitor the actual angular position of the vehicle 10' (e.g., vehicle angle V). In response to a comparison between the actual angular position of the vehicle and a pre-determined vehicle angle threshold, the processor 610 may be configured to update a pre-determined angle threshold value (e.g., ATV). It is contemplated that the processor 610 may update the pre-determined angular threshold value so that an updated angular threshold value is greater than the pre-determined angle threshold value. For example, an updated ATV may be greater than the ATV.

Figure 24A:
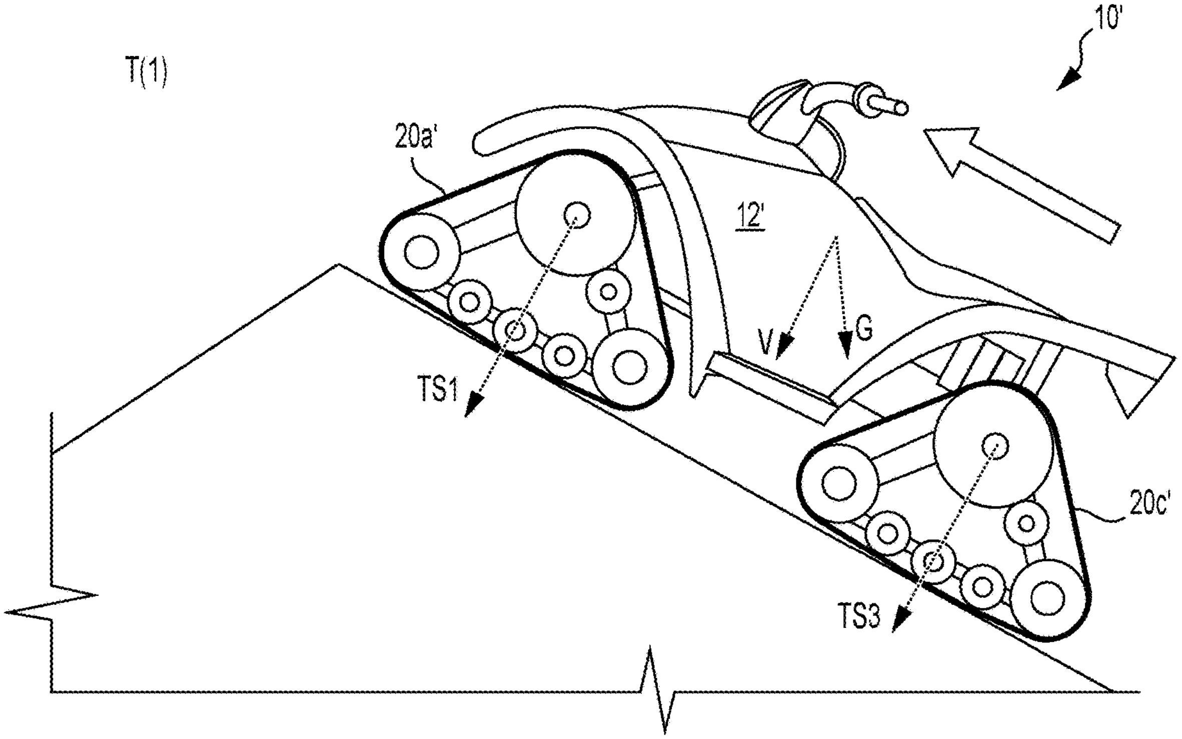
FIGS. 24A, 24B, 24C and 24D are left side schematic views of a vehicle in use on a hill, the vehicle having track systems according to embodiments of the present technology.
Figure 25A:
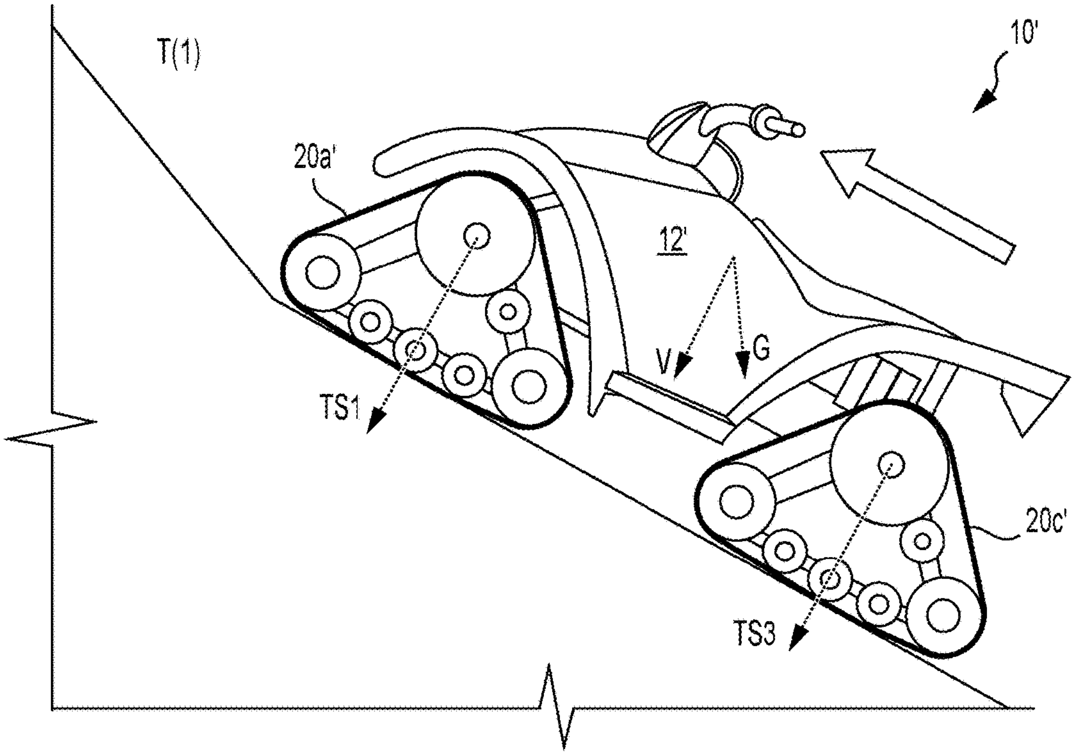
FIGS. 25A, 25B, 25C and 25D are left side schematic views of a vehicle in use on another hill, the vehicle having track systems according to embodiments of the present technology.

With reference to FIGS. 24A and 25A, there is depicted the vehicle 10' (only track systems 20a', 20c' are seen) operating on a hill. The track systems 20a', 20b', 20c', 20d' are "level" relative to the ground surface and relative to the body 12a' of the vehicle 10'.

It should be noted that the actual angular position of the vehicle V is different from the gravity vector G used herein as a reference. In response to this difference being greater than the pre-determined vehicle angle threshold, the processor 610 may be configured to determine that the vehicle 10' is currently operating in a hill environment and that a slope change is to be anticipated. To better operate during an upcoming slope change, the processor 610 may be configured to update the pre-determined angle threshold value of respective track systems 20a', 20b', 20c', 20d' so that an updated angle threshold value is greater than the pre-determined angle threshold value. For example, the processor 610 may be configured to update the ATV in this mode similarly how the processor 610 can update the ATV in the emergency braking mode, for example.

As a result, when the front track systems 20a', 20b' encounters the slope change, resulting in a larger difference between the ATSV and PTSV for those front track systems 20a', 20b', the processor 610 may be configured not to perform a corrective movement on said front track systems 20a', 20b', thereby allowing them to maintain a larger contact patch on the ground surface.

In one embodiment, the processor 610 may monitor inter alia a signal indicative of an actual angular position of the vehicle 10' and signal(s) indicative of actual angular positions of one or more of the front track systems 20a', 20b', and signal(s) indicative of actual angular positions of one or more of the rear track systems 20c', 20d'. In response to a comparison between the actual angular position of the vehicle V and a pre-determined vehicle angle threshold, and in response to various combinations of comparison between actual angular positions of the front track system(s), actual angular positions of the rear track system(s) and the actual angular position of the vehicle 10', the processor 610 may be configured to update pre-determined angle threshold value (s) of one or more of the front and rear track systems 20a', 20b', 20c', 20d'. It is contemplated that the processor 610 may update the pre-determined angle threshold value of a given track system so that an updated angle threshold value is different than the pre-determined angle threshold value for the given track system.

Figure 24B:
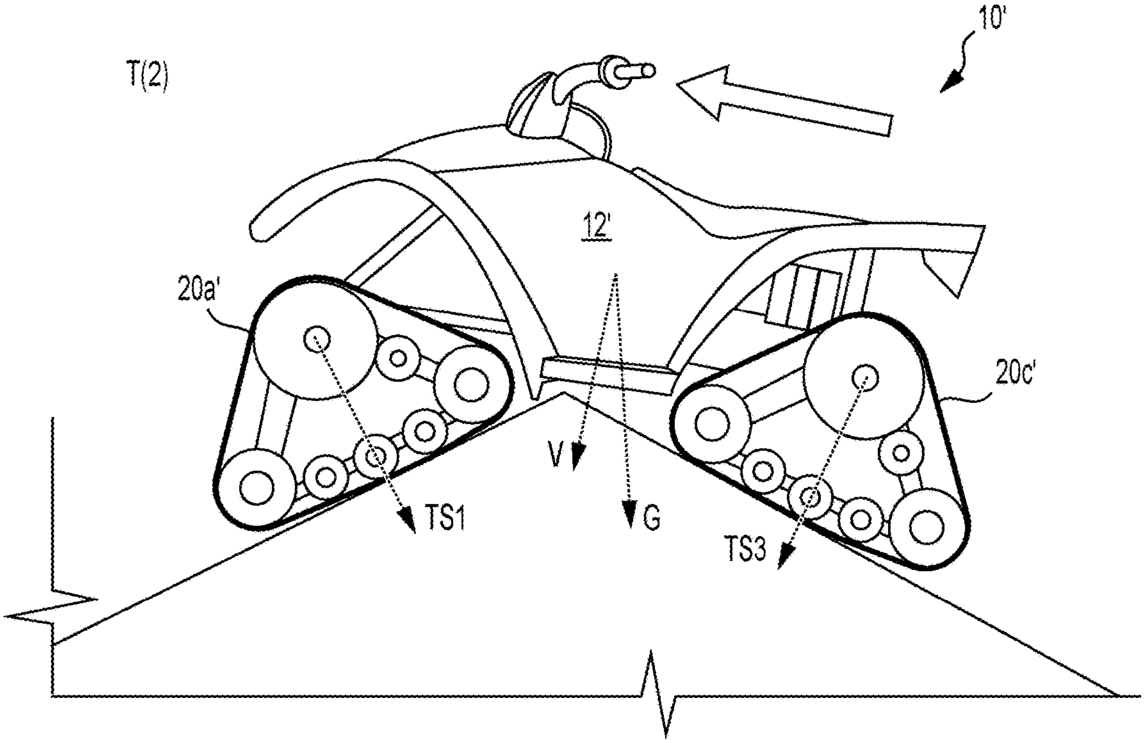
Figure 25B:
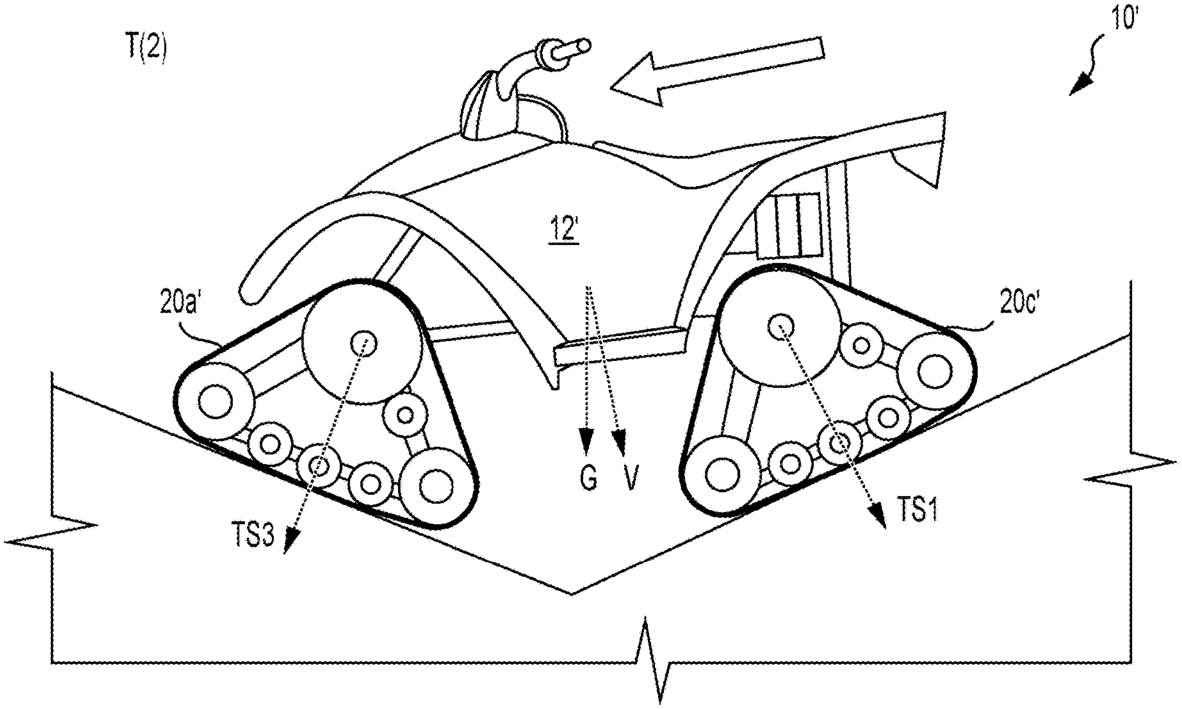

With reference to FIGS. 24B and 25B, there is depicted the vehicle 10' operating on a slope changing portion of the ground surface.

It should be noted that the actual angular position of the vehicle V is different from the gravity vector G used herein as a reference. It should also be noted that the actual angular position TS1 of the front track systems 20*a*', 20*b*' are different from the actual angular position V of the vehicle 10', the actual angular position TS3 of the rear track systems 20*c*', 20*d*' is different from the actual angular position V of the vehicle 10', and the actual angular position TS1 of the front track systems 20*a*', 20*b*' is different from the actual angular position TS3 of the rear track systems 20*c*', 20*d*'. As a result, the processor 610 may be configured to determine that the vehicle 10' is currently in use on a slope changing portion (i.e. a transition) of the ground surface. To better operate on the slope changing portion, the processor 610 may be configured to update the pre-determined angular threshold value (ATV) of front track systems 20*a*', 20*b*' so that an updated angle threshold value is greater than the pre-determined angle threshold value, while maintaining the pre-determined angular threshold value of rear track systems 20*c*', 20*d*'.

As a result, in some embodiments, when the vehicle 10' operates on the slope changing portion, a larger difference between the ATSV and PTSV for that front track systems 20*a*', 20*b*' may be tolerated before the processor 610 performs a corrective movement on the front track systems 20*a*', 20*b*', and thereby allowing it to maintain a larger contact patch on the ground surface.

In one embodiment, the processor 610 may monitor inter alia a signal indicative of an actual angular position of the vehicle 10' and signal(s) indicative of actual angular positions of one or more front track systems 20*a*', 20*b*', and signal(s) indicative of actual angular positions of one or more rear track systems 20*c*', 20*d*'. In response to a comparison between the actual angular position of the vehicle 10' and a pre-determined vehicle angular threshold, and in response to various combinations of comparison between actual angular positions of the front track system(s), actual angular positions of the rear track system(s) and the actual angular position of the vehicle, the processor 610 may be configured to update pre-determined angle threshold value(s) of one or more of the front and rear track systems 20*a*', 20*b*', 20*c*', 20*d*'. It is contemplated that the processor 610 may update the pre-determined angle threshold value of a given track system so that an updated angle threshold value is different than the pre-determined angle threshold value for the given track system.

Figure 24C:
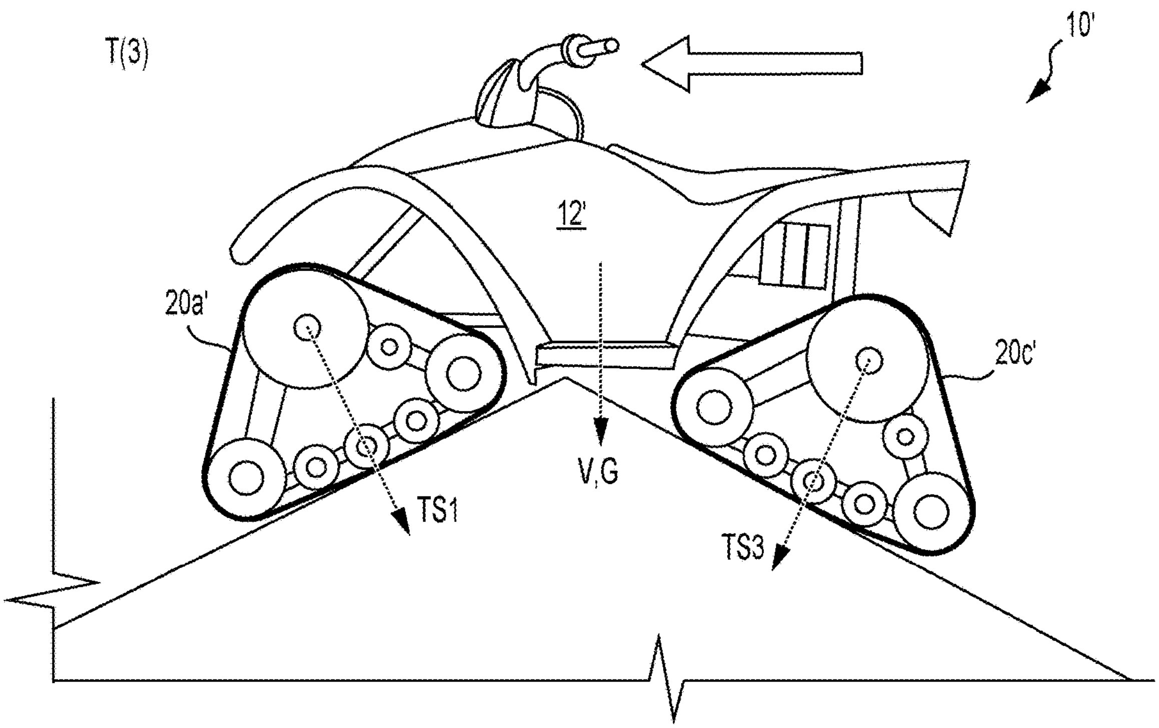
Figure 25C:
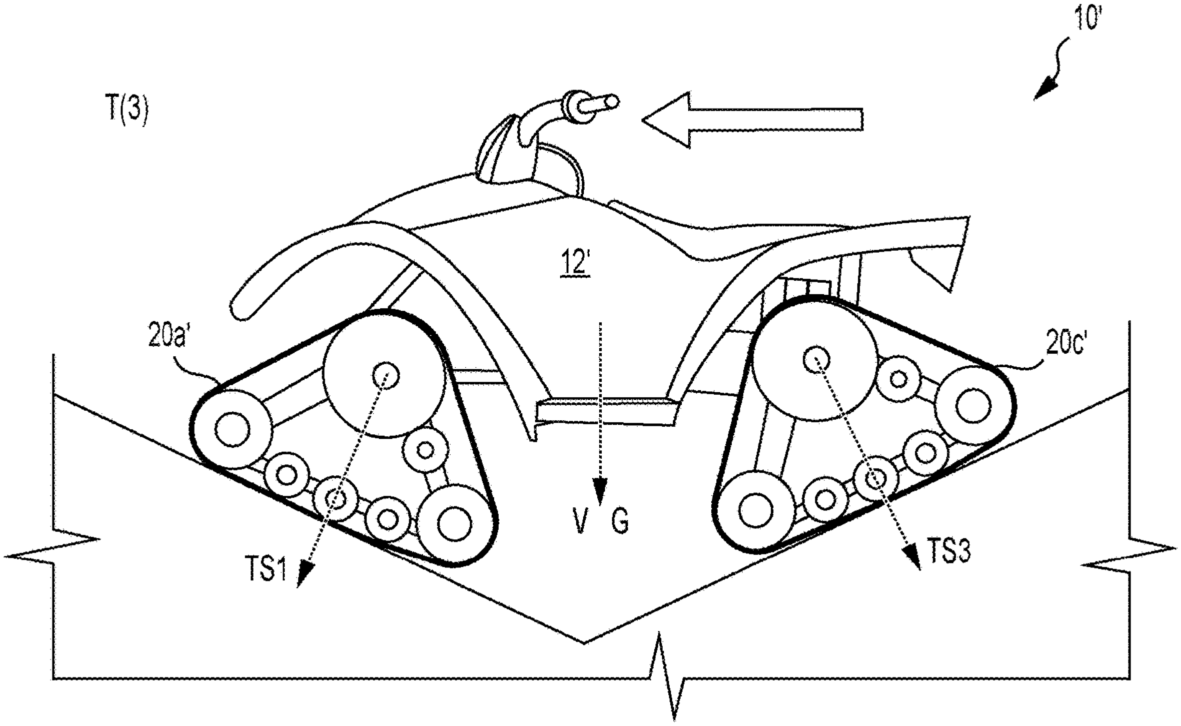

With reference to FIGS. 24C and 25C, there is depicted the vehicle 10' operating on a slope changing portion of the ground surface.

It should be noted that the actual angular position V of the vehicle 10' is aligned to the gravity vector G used herein as a reference. It should also be noted that the actual angular position TS1 of the front track systems 20*a*', 20*b*' are different from the actual angular position V of the vehicle 10' (let it be assumed that this difference is beyond a threshold value), the actual angular position TS3 of the rear track systems 20*c*', 20*d*' are different from the actual angular position V of the vehicle 10', and the actual angular position TS1 of the front track systems 20*a*', 20*b*' are different from the actual angular position TS3 of the rear track systems 20*c*', 20*d*'. As a result, the processor 610 may be configured to determine that the vehicle 10' is currently operating on a slope changing portion of the ground surface. To better operate on the slope changing portion, the processor 610 may be configured to update the pre-determined angular threshold value (e.g., the ATV) of the front track systems 20*a*', 20*b*' and the pre-determined angular threshold value (e.g., the ATV) of the rear track systems 20*c*', 20*d*' so that the updated angle threshold values larger than the corresponding pre-determined angle threshold values.

As a result, as the vehicle 10' operates on the slope changing portion, a greater difference between the ATSV and PTSV for the front and rear track systems 20*a*', 20*b*', 20*c*', 20*d*' may be tolerated without the processor 610 performing a corrective movement on the front and rear track systems 20*a*', 20*b*', 20*c*', 20*d*', and thereby allowing them to maintain larger contact patches on the ground surface.

In one embodiment, the processor 610 may monitor inter alia a signal indicative of an actual angular position of the vehicle 10' and signal(s) indicative of actual angular positions of one or more front track systems 20*a*', 20*b*', and signal(s) indicative of actual angular positions of one or more rear track systems 20*c*', 20*d*'. In response to a comparison between the actual angular position of the vehicle 10' and a pre-determined vehicle angle threshold, and in response to various combinations of comparison between actual angular positions of the front track system(s), actual angular positions of the rear track system(s) and the actual angular position of the vehicle, the processor 610 may be configured to update pre-determined angle threshold value(s) of one or more of the front and rear track systems 20*a*', 20*b*', 20*c*', 20*d*'. It is contemplated that the processor 610 may update the pre-determined angular threshold value of a given track system so that an updated angle threshold value is different than the pre-determined angular threshold value for the given track system.

Figure 24D:
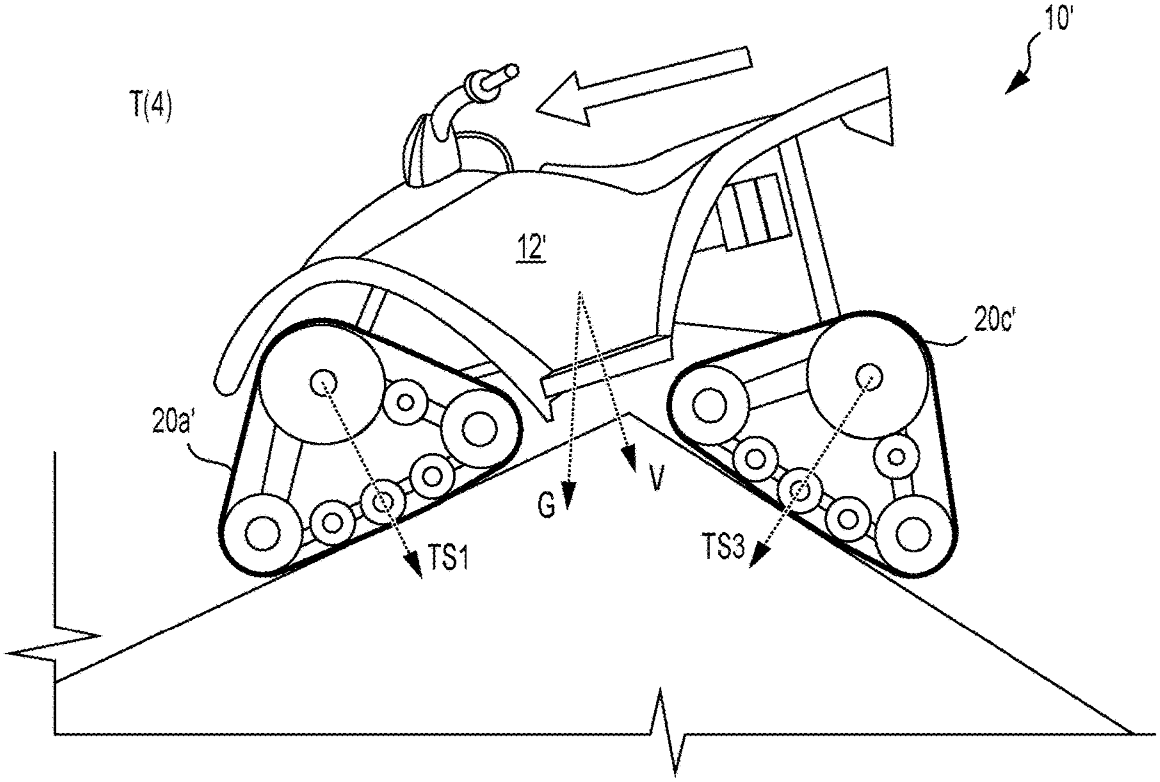
Figure 25D:
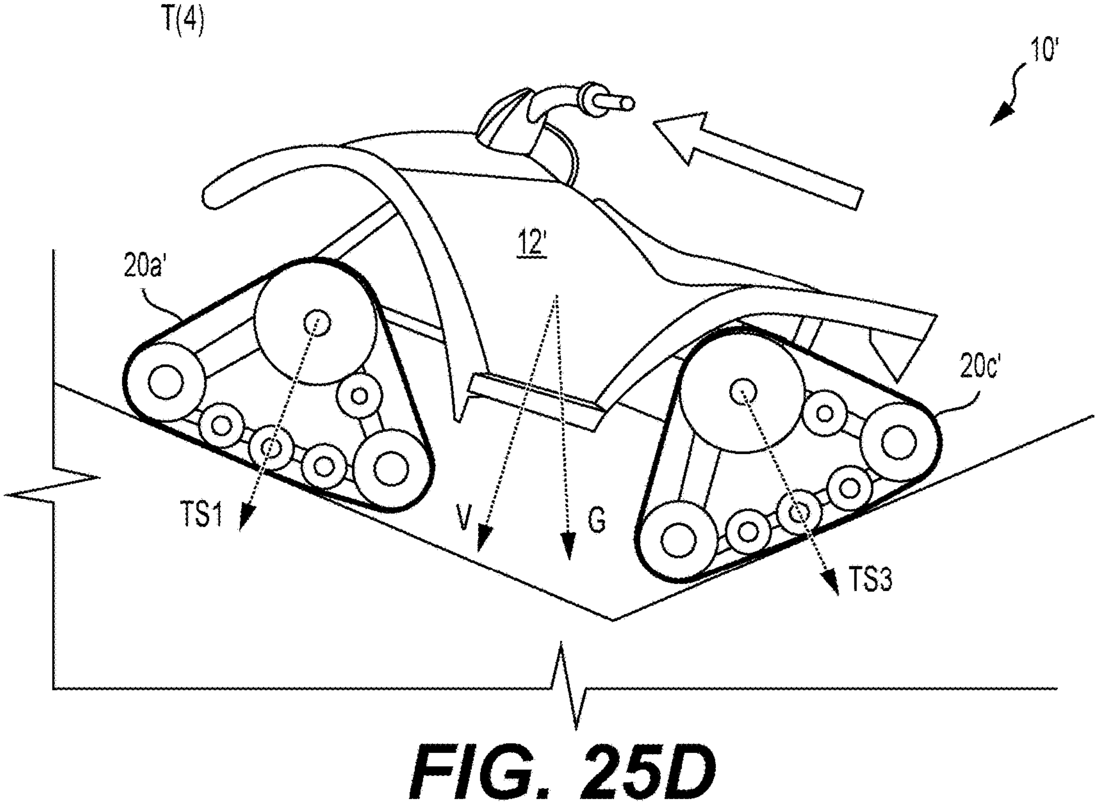

With reference to FIGS. 24D and 25D, there is depicted the vehicle 10' operating on a slope changing portion of the ground surface.

It should be noted that the actual angular position V of the vehicle 10' is different from the gravity vector G used herein as a reference, and in a different direction than on FIGS. 24A and 25A (positive vs negative differences). It should also be noted that the actual angular position TS1 of the front track systems 20*a*', 20*b*' are different from the actual angular position V of the vehicle 10', the actual angular position TS3 of the rear track systems 20*c*', 20*d*' are different from the actual angular position V of the vehicle 10', and the actual angular position TS1 of the front track systems 20*a*', 20*b*' are different from the actual angular position TS3 of the rear track systems 20*c*', 20*d*'. As a result, the processor 610 may be configured to determine that the vehicle 10' is currently operating on a slope changing portion of the ground surface. To better operate on the slope changing portion, the processor 610 may be configured to update the pre-determined angular threshold value (e.g., the ATV) of the rear track systems 20*c*', 20*d*' so that an updated angle threshold value is greater than the pre-determined angle threshold value, while maintaining the pre-determined angle threshold value (e.g., the ATV) of front track systems 20*a*', 20*b*'.

As a result, at the vehicle 10' operates on the slope changing portion, a larger difference between the ATSV and PTSV for that rear track system 20*c*', 20*d*' may be tolerated without the processor 610 performing a corrective movement on the rear track systems 20*c*', 20*d*', and thereby allowing them to maintain a larger contact patch on the ground surface.

Hill Mode for Articulated Vehicle

Referring to FIGS. 27A to 27D and 28A to 28B, developers of the present technology have realized that modifying, at least temporarily, one or more threshold values and/or one or more reference values of the ACS during operation of the corresponding articulated vehicle may be advantageous in a variety of operating conditions. In some embodiments of the present technology, the processor 610 may be configured to control one or more track systems 20*a*', 20*b*', 20*c*', 20*d*' of the vehicle 10" in accordance with a "articulated hill" mode, during which the processor 610 updates one or more threshold values and/or one or more reference values used by the processor 610 to control operation of the track systems 20*a*', 20*b*', 20*c*', 20*d*' when operating on an inclined and/or declined environment. For example, the processor 610 may be configured to update a pre-determined threshold value used by the ACS when performing corrective operations in some embodiments of the present technology. The processor 610 may be configured to perform angular control of the track systems 20*a*', 20*b*', 20*c*', 20*d*' in the articulated hill mode automatically and/or in response to a user input.

In some embodiments, the processor 610 may be configured to acquire a signal generated in response to a user input indicating that the processor 610 is to operate in the articulated hill mode. For example, the user may provide via a user interface 490*a* a user input indicative of a desire to operate in the articulated hill mode. In other embodiments of the present technology, the processor 610 may be configured to acquire and/or monitor one or more signals for triggering operation of the track systems 20*a*', 20*b*', 20*c*', 20*d*' in the articulated hill mode.

In one embodiment, with reference to the vehicle 10" having the front and rear bodies 12*a*", 12*b*", the processor 610 may monitor inter alia a signal indicative of an actual angular position of the front body 12*a*", and an actual angular position of the rear body 12*b*". For example, the processor 610 may monitor the actual angular positions of the front and rear bodies 12*a*", 12*b*". In response to a comparison between the actual angular position of the front body 12*a*" and a pre-determined vehicle angle threshold, and a comparison between the actual angular position of the rear body 12*b*" and the predetermined vehicle angle threshold, the processor 610 may be configured to update the pre-determined angular threshold value. It is contemplated that the processor 610 may update the pre-determined angular threshold value so that an updated angular threshold value is larger than the pre-determined angular threshold value.

Figure 27A:
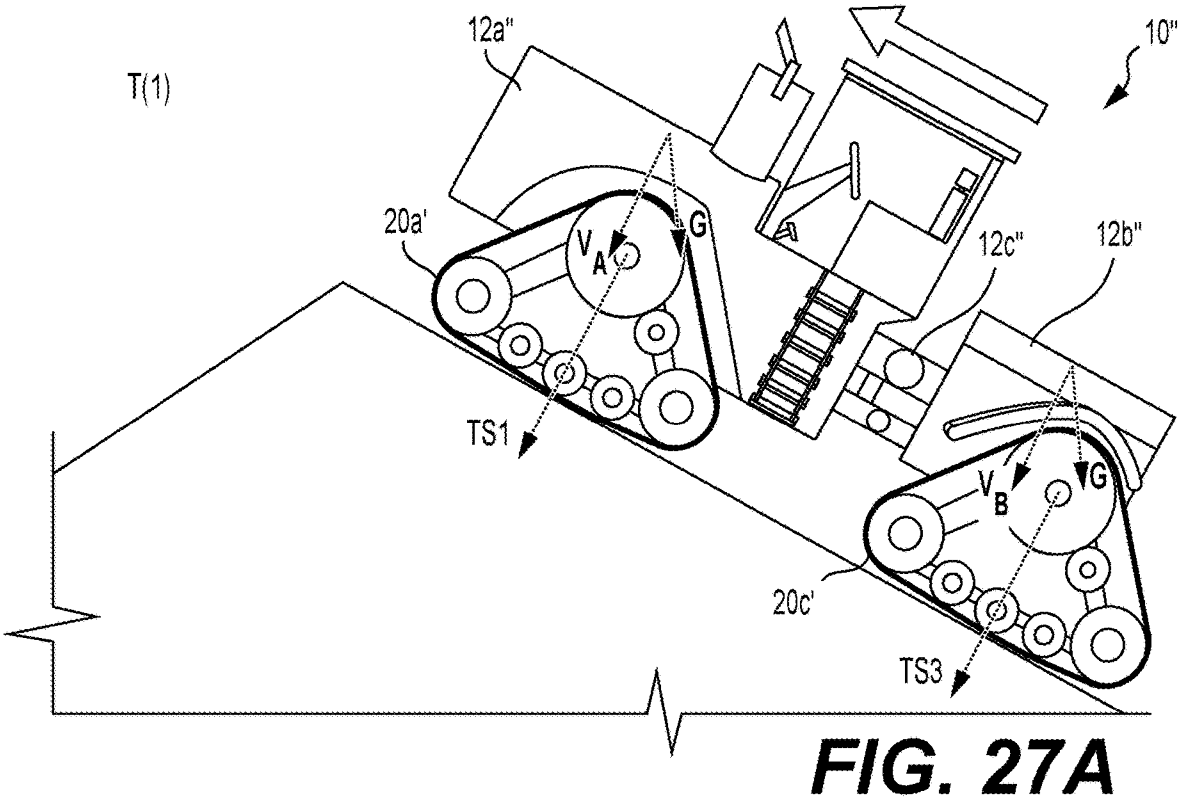
FIGS. 27A, 27B, 27C and 27D are left side schematic views of an articulated vehicle in use on a hill, the articulated vehicle having track systems according to embodiments of the present technology.
Figure 28A:
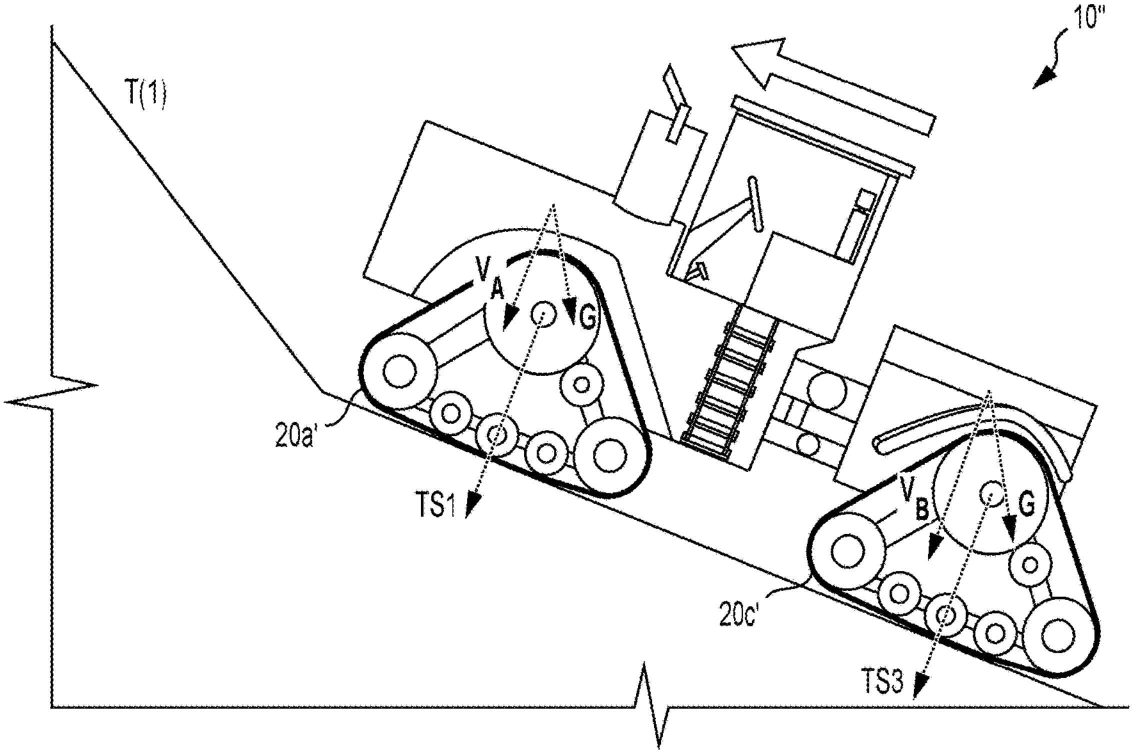
FIGS. 28A, 28B, 28C and 28D are left side schematic views of an articulated vehicle in use on another hill, the articulated vehicle having track systems according to embodiments of the present technology.

With reference to FIGS. 27A and 28A, there is depicted the vehicle 10" operating on a hill. The track systems 20*a*', 20*b*', 20*c*', 20*d*' are "level" relative to the ground surface and relative to the respective vehicle bodies 12*a*", 12*b*". lkkl It should be noted that the actual angular position Va of the front body 12*a*" is different from the gravity vector G used herein as a reference. Also, the actual angular position Vb of the rear body 12*a*" is different from the gravity vector G used herein as a reference. In response to at least one of a first difference (G vs Va) and a second difference (G vs Vb) being greater than the pre-determined vehicle angular threshold, the processor 610 may be configured to determine that the vehicle 10" is currently operating in a hill environment and that a slope change is to be anticipated. To better operate during an upcoming slope change, the processor 610 may be configured to update the pre-determined angular threshold value of respective track systems 20*a*', 20*b*', 20*c*', 20*d*' so that an updated angular threshold value is greater than the pre-determined angle threshold value. For example, the processor 610 may update the ATV of the track systems 20*a*', 20*b*', 20*c*', 20*d*' so that the updated ATV is greater than the respective ATV.

As a result, when the front track systems 20*a*', 20*b*' encounter the slope change, resulting in a greater difference between the ATSV and PTSV for the front track systems 20*a*', 20*b*', the processor 610 may be configured not to perform a corrective movement on the front track systems 20*a*', 20*b*', thereby allowing it to maintain a larger contact patch footprint on the ground surface.

In one embodiment, the processor 610 may monitor inter alia a signal indicative of an actual angular position of the vehicle 10" and signal(s) indicative of actual angular positions of one or more front track systems 20*a*', 20*b*', and signal(s) indicative of actual angular positions of one or more rear track systems 20*c*', 20*d*'. In response to a comparison between the actual angular position of the front body 12*a*" and the actual angular position of the rear body 12*b*", and in response to various combinations of comparison between actual angular positions of the front track system(s) 20*a*', 20*b*', actual angular positions of the rear track system(s) 20*c*', 20*d*', the actual angular position of the front body 12*a*", and the actual angular position of the rear body 12*b*", the processor 610 may be configured to update pre-determined angle threshold value(s) of one or more of the front and rear track systems 20*a*', 20*b*', 20*c*', 20*d*'. It is contemplated that the processor 610 may update the pre-determined angle threshold value of a given track system so that an updated angle threshold value is different than the pre-determined angle threshold value for the given track system.

Figure 27B:
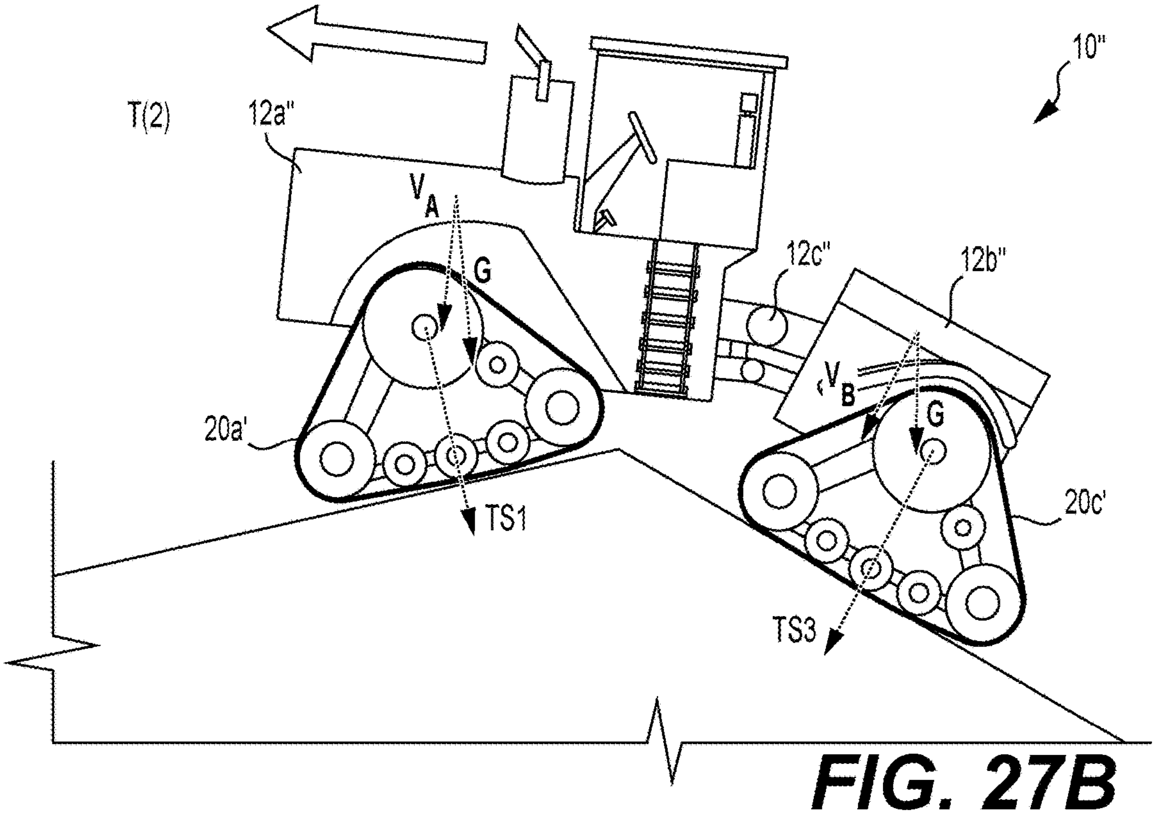
Figure 28B:
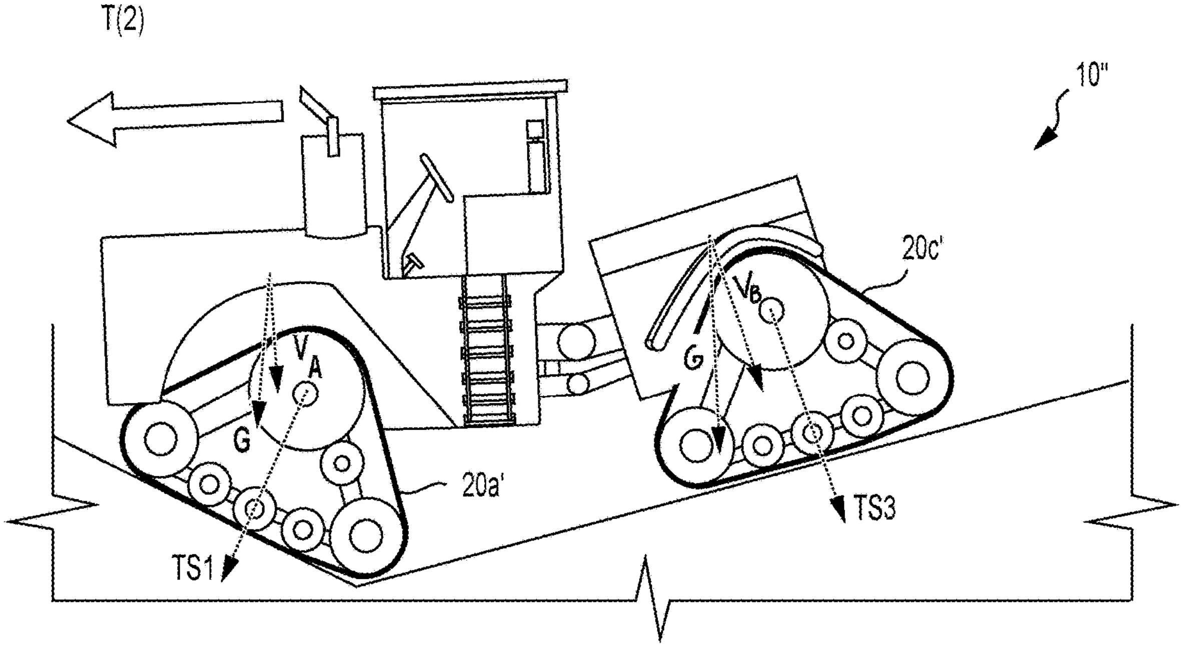

With reference to FIGS. 27B and 28B, there is depicted the vehicle 10" operating on a slope changing portion of the ground surface.

It should be noted that the actual angular position Va of the front body 12*a*" is different from the gravity vector G used herein as a reference. It should be noted that the actual angular position Vb of the rear body 12*b*" is different from the gravity vector G used herein as a reference. Furthermore, it should be noted that the actual angular position Va of the front body 12*a*" is different from the actual angular position Vb of the rear body 12*b*". Let it be assumed that the processor 610 determines that the difference between Va and Vb is above a pre-determined threshold.

It should also be noted that the actual angular position TS1 of the front track systems 20*a*', 20*b*' are different from the actual angular position Va of the front body 12*a*". Also, the actual angular position TS2 of the rear track systems 20*c*', 20*d*' are different from the actual angular position Vb of the rear body 12*b*", and the TS1 is different from TS2.

As a result, the processor 610 may be configured to determine that the vehicle 10" is currently operating on a slope changing portion (i.e. a transition) of the ground surface. To better operate on the slope changing portion, the processor 610 may be configured to update the pre-determined angular threshold value of the front track systems 20*a*', 20*b*' so that an updated angular threshold value is larger than the pre-determined angular threshold value (e.g., the ATV), while maintaining the pre-determined angle threshold value of the rear track systems 20*c*', 20*d*'(e.g., the ATV).

As a result, in some embodiments, when the vehicle 10" operates on the slope changing portion, a larger difference between the ATSV and PTSV for the front track systems 20*a*', 20*b*' may be tolerated without the processor 610 performing a corrective maneuver on those front track system 20*a*', 20*b*', and thereby allowing them to maintain a larger contact patch on the ground surface.

In one embodiment, with reference to the vehicle 10", the processor 610 may monitor inter alia a signal indicative of an actual angular position of the vehicle 10" and signal(s) indicative of actual angular positions of one or more front track systems 20*a*', 20*b*', and signal(s) indicative of actual angular positions of one or more rear track systems 20*c*', 20*d*' and signal(s) indicative of actual angular positions of the front and rear bodies 12*a*", 12*b*". In response to a comparison between the actual angular positions of the front and rear vehicle bodies 12*a*", 12*b*", a comparison between the actual angular positions of the front track systems 20*a*', 20*b*' and the front body 12*a*", a comparison between the actual angular positions of the rear track systems 20*c*', 20*d*' and the rear body 12*b*", and a comparison between the actual angular positions of the front and the rear track systems 20*a*', 20*b*', 20*c*', 20*d*', the processor 610 may be configured to update pre-determined angle threshold value(s) of one or more of the front and rear track systems 20*a*', 20*b*', 20*c*', 20*d*'. It is contemplated that the processor 610 may update the pre-determined angular threshold value of a given track system so that an updated angular threshold value is different than the pre-determined angular threshold value for the given track system.

Figure 27C:
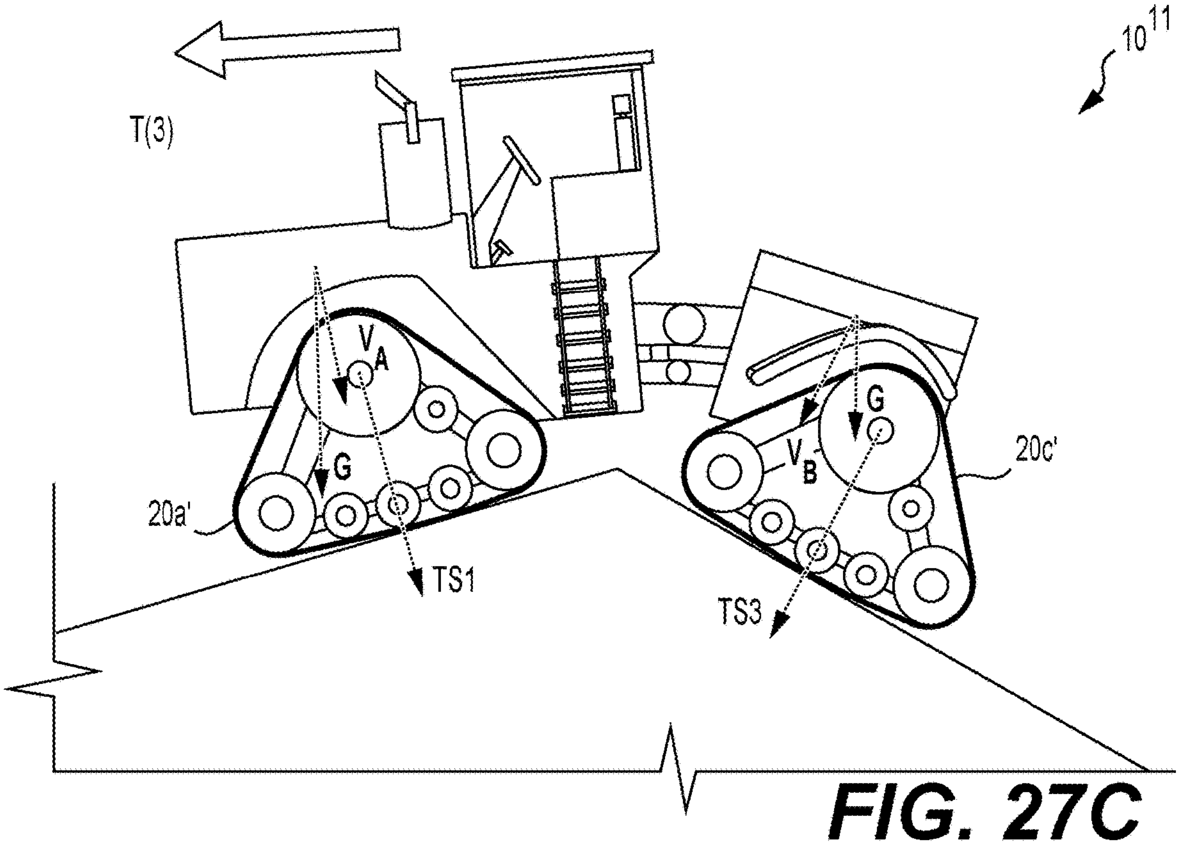
Figure 28C:
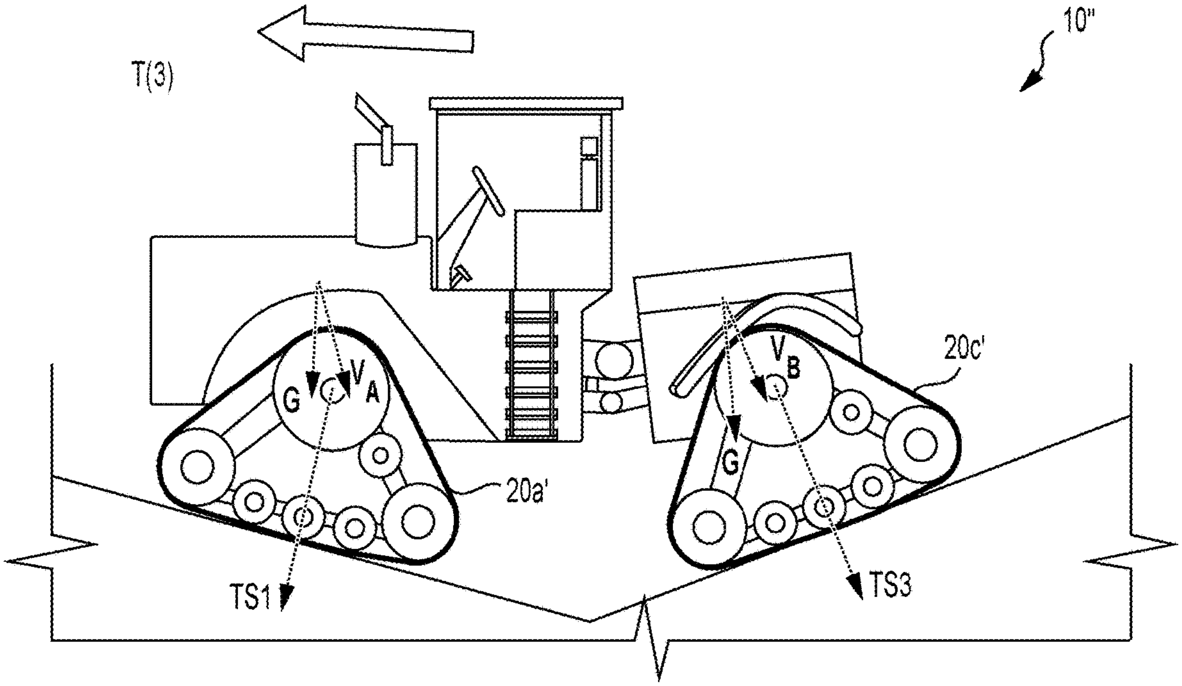

With reference to FIGS. 27C and 28C, there is depicted the vehicle 10" operating on a slope changing portion of the ground surface.

It should be noted that the actual angular position Va of the front body 12*a*" is similar (within a pre-determined threshold) to the actual angular position Vb of the rear body 12*a*". It should also be noted that the actual angular position TS1 of the front track systems 20*a*', 20*b*' different from the actual angular position Va of the front body 12', the actual angular position TS3 of the rear track systems 20*c*', 20*d*' is different from the actual angular position Vb of the rear body 12*b*", and the actual angular position TS1 of the front track systems 20*a*', 20*b*' are different from the actual angular position TS2 of the rear track systems 20*c*', 20*d*'. As a result, the processor 610 may be configured to determine that the vehicle 10" is currently operating on a slope changing portion of the ground surface. To better operate on the slope changing portion, the processor 610 may be configured to update the pre-determined angular threshold value of the front and rear track systems 20*a*', 20*b*', 20*c*', 20*d*' so that the updated angular threshold values larger than the corresponding pre-determined angular threshold values.

As a result, in some embodiments, when the vehicle 10" operates on the slope changing portion, a larger difference between the ATSV and PTSV for the track systems 20*a*', 20*b*', 20*c*', 20*d*' may be tolerated without the processor 610 performing a corrective movement on the track systems 20*a*', 20*b*', 20*c*', 20*d*', and thereby allowing them to maintain larger contact patches on the ground surface.

In one embodiment, with reference to the vehicle 10", the processor 610 may monitor inter alia signal(s) indicative of an actual angular positions of the front body 12*a*", and the rear body 12*b*", signal(s) indicative of actual angular positions of one or more front track systems 20*a*', 20*b*', and signal(s) indicative of actual angular positions of one or more rear track systems 20*c*', 20*d*'. In response to a comparison between the actual angular positions of the front and rear bodies 12*a*", 12*b*", a comparison between the actual angular positions of the front track systems 20*a*', 20*b*' and the front body 12*a*", a comparison between the actual angular positions of the rear track systems 20*c*', 20*d*' and the rear body 12*b*", and a comparison between the actual angular positions of the front rear track systems 20*a*', 20*b*', 20*c*', 20*d*', the processor 610 may be configured to update pre-determined angular threshold value(s) of one or more of the front and rear track systems 20*a*', 20*b*', 20*c*', 20*d*'. It is contemplated that the processor 610 may update the pre-determined angular threshold value of a given track system so that an updated angular threshold value is different than the pre-determined angular threshold value for the given track system.

Figure 27D:
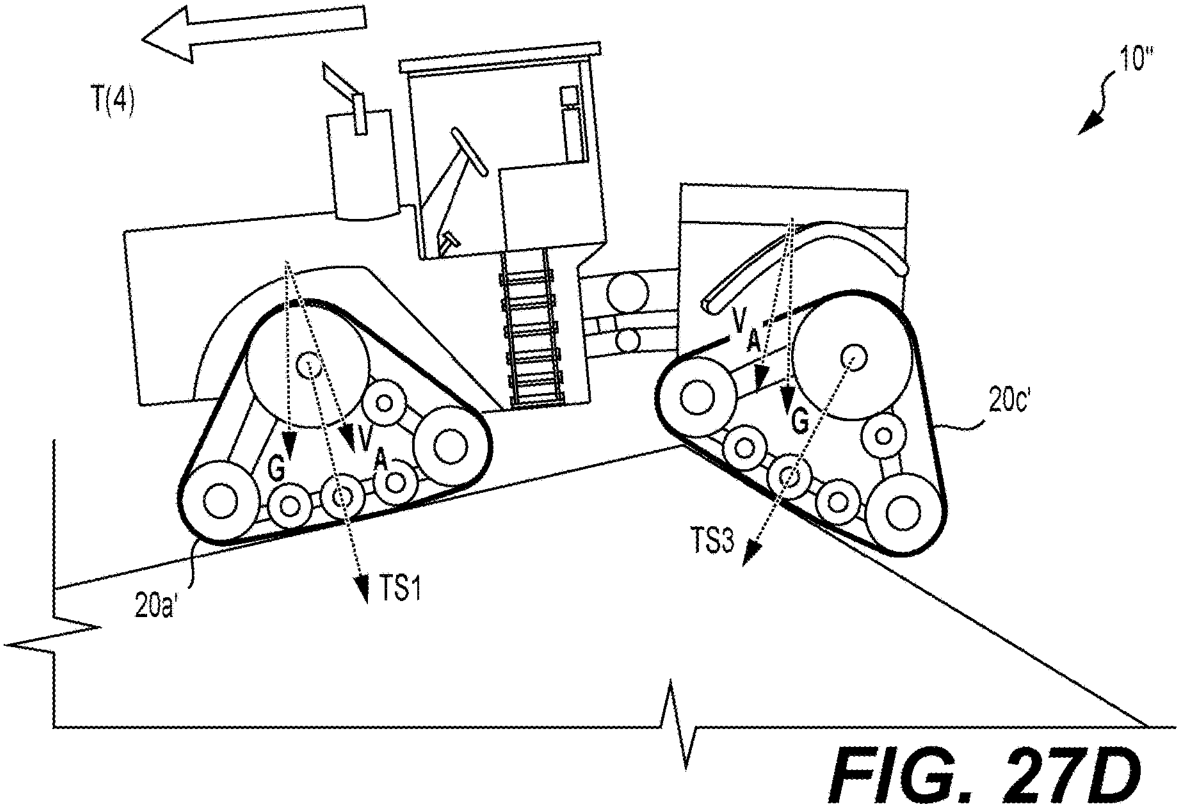
Figure 28D:
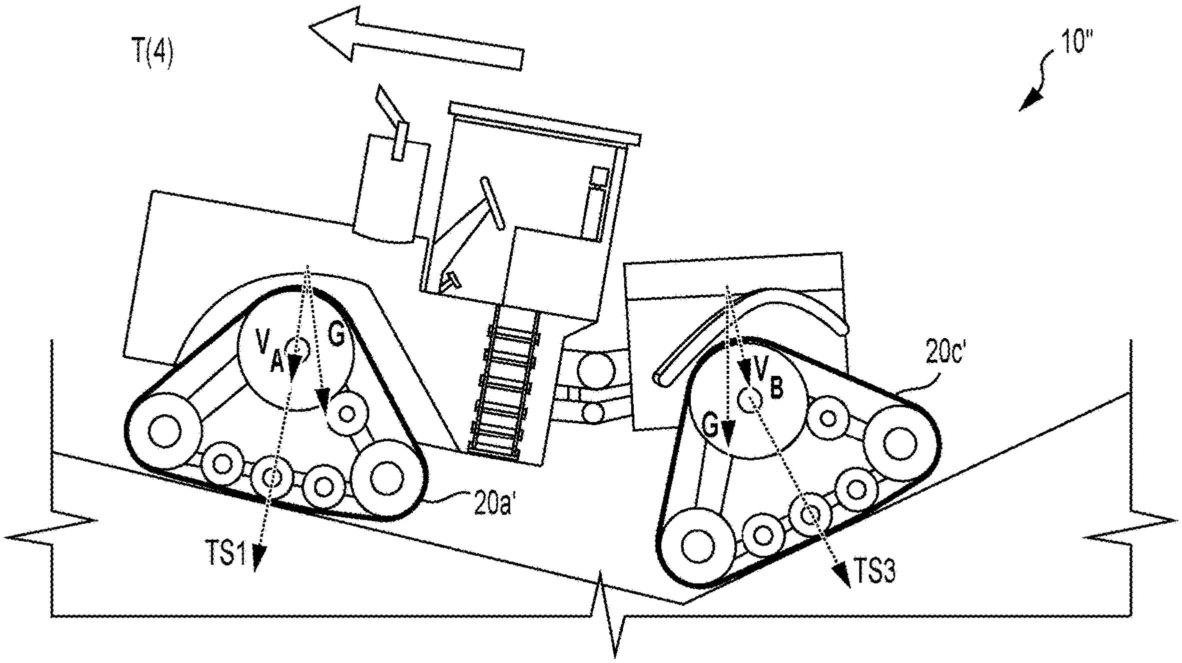

With reference to FIGS. 27D and 28D, there is depicted the vehicle 10" operating on a slope changing portion of the ground surface.

It should be noted that the actual angular position Va of the front body 12*a*" is different from the actual angular position Vb of the rear body 12*b*". It should be noted that the difference between Va and VB in this embodiment is in a different direction from the difference between Va and Vb in FIGS. 27B and 28B (positive difference vs negative difference).

It should also be noted that the actual angular position TS1 of the front track systems 20*a*', 20*b*' are different from the actual angular position Va of the front body 12*a*", the actual angular position TS2 of the rear track systems 20*c*', 20*d*' are different from the actual angular position VB of the rear body 12*b*", and the actual angular position TS1 of the front track systems 20*a*', 20*b*' are different from the actual angular position TS2 of the rear track systems 20*c*', 20*d*'. As a result, the processor 610 may be configured to determine that the vehicle 10" is currently operating on a slope changing portion (i.e. a transition) of the ground surface. To better operate on the slope changing portion, the processor 610 may be configured to update the pre-determined angular threshold value of rear track systems 20*c*', 20*d*' so that an updated angular threshold value is larger than the pre-determined angular threshold value, while maintaining the pre-determined angular threshold value of the front track systems 20*a*', 20*b*'.

As a result, in some embodiments, when the vehicle 10" operates on the slope changing portion, a larger difference between the ATSV and PTSV for the rear track systems 20*c*', 20*d*' may be tolerated without the processor 610 performing a corrective movement on the rear track systems 20*c*', 20*d*' and thereby allowing them to maintain a larger contact patch on the ground surface.

Figure 26:
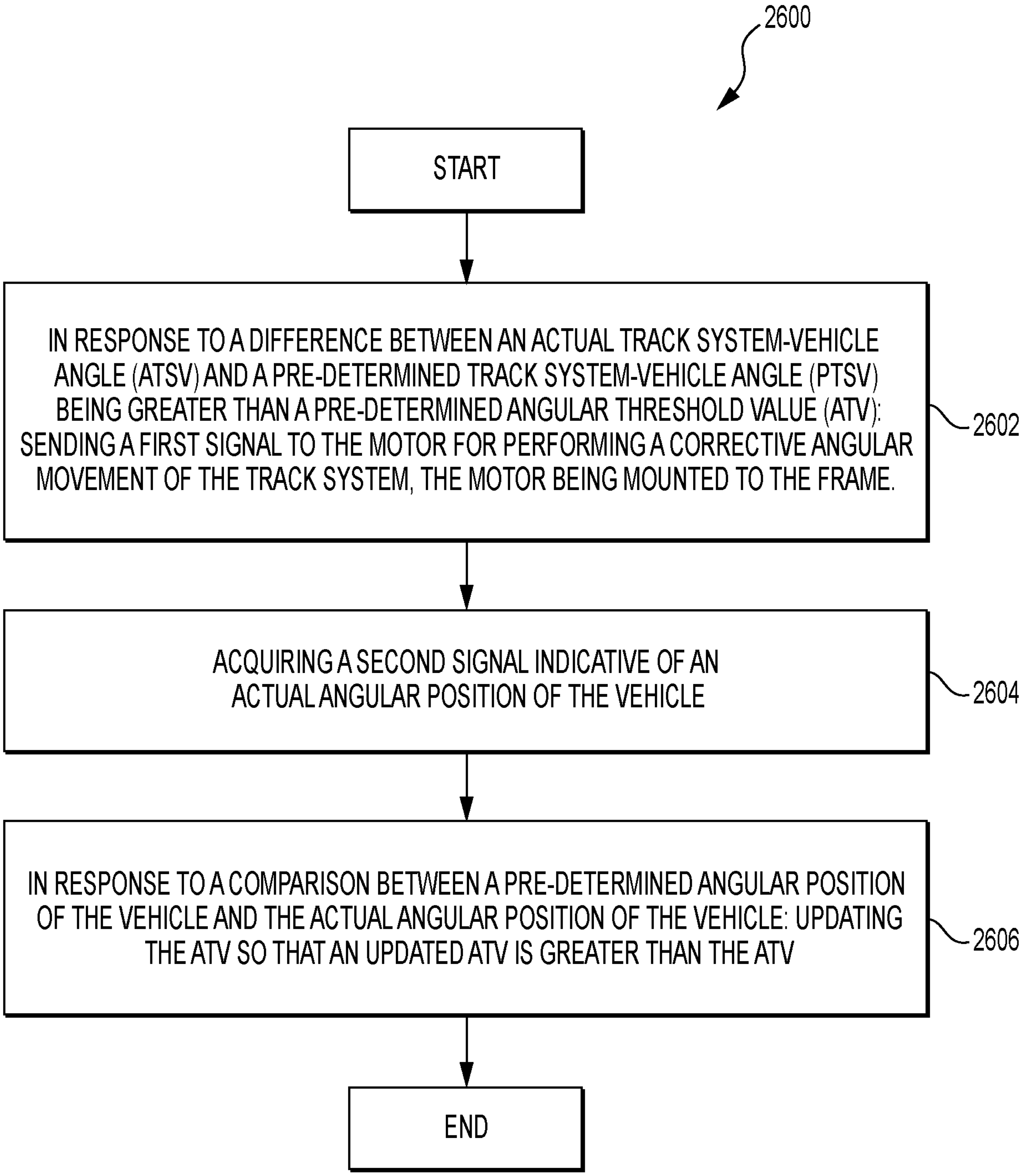
FIG. 26 is a flowchart of a method executable by a controller assembly of FIG. 5 according to an embodiment of the present technology.

In some embodiments of the present technology, with reference to FIG. 26, the processor 610 may be configured to execute a method 2600 for controlling an angular position of a given track system. It should be noted that the method 2600 may be executed by the processor for performing angular control of one or more track systems described herein. In some embodiments, the method 2600 may be executed by the processor 610 for performing angular control of track system(s) of one or more vehicles described herein. Various steps of the method 2600 will now be described in greater detail.

STEP 2602: In Response to a Difference Between an Actual Track System-Vehicle Angle (ATSV) and a Pre-Determined Track System-Vehicle Angle (PTSV) being Greater than a Pre-Determined Angular Threshold Value (ATV): Sending a First Signal to a Motor for Performing a Corrective Angular Movement of the Track System, the Motor being Mounted to the Frame At step 2602, the processor 610 is configured to send a first signal to the motor 410*a* for performing a corrective angular movement of the track system 20*a*', in response to a difference between an ATSV and a PTSV being greater than an ATV for the track system 20*a*'. As described above, in some embodiments, when the difference between the ATSV and the PTSV is above the ATV, the processor 610 may be configured to trigger a correcting movement on the track system 20*a*'.

In some embodiments, the method 2600 may comprise a step of acquiring, by the processor 610, a third signal indicative of an actual angular position of the vehicle 10' (V) and a fourth signal indicative of an actual angular position of the track system 20*a*' (TS). It is contemplated that the ATSV is a difference between the actual angular position of the vehicle 10' and the actual angular position of the track system 20*a*'.

It is contemplated that the PTSV and the ATV for the track system 20*a*' may be stored in memory accessible by the processor 610. The processor 610 may be configured to acquire the PTSV and the ATV for the track system 20*a*' from memory.

In some embodiments, the step 2602 may be executed periodically and in a looped configuration, so as to maintain the difference between the ATSV and the PTSV below the ATV during use of the vehicle 10'. For example, the step 2602 may be performed at a first moment in time, and repeated at an other moment in time after the first moment in time.

STEP 2604: Acquiring a Second Signal Indicative of an Actual Angular Position of the Vehicle At step 2604, the processor 610 is configured to acquire a second signal indicative of an actual angular position of the vehicle 10'. It is contemplated that a given angular position of the vehicle 10' may comprise any combination of an actual roll angle, an actual yaw angle, and an actual pitch angle of the vehicle body of the vehicle 10'.

STEP 2606: In Response to a Comparison Between a Pre-Determined Angular Position of the Vehicle and the Actual Angular Position of the Vehicle: Updating the ATV so that an Updated ATV is Greater than the ATV The method 2604 continues to step 2606 with the processor 610 configured to update the ATV so that an updated ATV is greater than the ATV, in response in response to a comparison between a pre-determined angular position of the vehicle 10' and the actual angular position of the vehicle 10'.

In some embodiments, the processor may be configured to determine an actual angular position of the vehicle 10' when the vehicle 10' is on a flat surface, and select this actual angular position as the pre-determined angular position of the vehicle 10'. The processor 610 may be configured to store the pre-determined angular position of the vehicle 10' in memory.

In other embodiments, if a difference between the pre-determined angular position of the vehicle 10' and the actual angular position of the vehicle 10', the processor 610 may be configured to determine that the vehicle 10' is currently operating on a sloped ground surface (e.g., going up or down a hill) as seen in FIGS. 24A and 25A.

In some embodiments, the processor 610 may also be configured to acquire a third signal indicative of an actual angular position of the track system 20*a*', and a fourth signal indicative of an actual angular position of an other track system of the vehicle 10'. In this embodiment, the processor 610 may be configured to update the ATV of the track system 20*a*', and/or of the other track system of the vehicle 10' further in response to: (i) a comparison between the actual angular position of the vehicle 10' and the actual angular position of the track system 20*a*', a comparison between the actual angular position of the vehicle 10' and the actual angular position of the other track system, and a comparison between the actual angular position of the track system 20*a*' and the actual angular position of the other track system, such as described in greater details with reference to FIGS. 24B to 24D and FIGS. 25B to 25D. In some embodiments, the other track system may be a front track system of the vehicle 10' and/or a rear track system of the vehicle 10'.

In other embodiments, the method 2600 may be executed by the processor 610 for controlling the angular position of a given track system of a given articulated vehicle comprising a first vehicle body and a second vehicle body. In these embodiments, the track system may be operatively connected to the first vehicle body, and the second signal is indicative of the actual angular position of the first vehicle body. In these embodiments, the processor 610 may further be configured to acquire a third signal indicative of an actual angular position of the track system, acquire a fourth signal indicative of an actual angular position of an other track system of the articulated vehicle operatively connected to the second vehicle body, and acquire a fifth signal indicative of an actual angular position of the second vehicle body. In these embodiments, the processor 610 may be configured to update the ATV of at least one of the track system and the other track system of the articulated vehicle further in response to: a comparison between the actual angular position of the first vehicle body and the actual angular position of the second vehicle body, a comparison between the actual angular position of the first vehicle body and the actual angular position of the track system, a comparison between the actual angular position of the second vehicle body and the actual angular position of the other track system, and a comparison between the actual angular position of the track system and the actual angular position of the other track system, as described in greater details above with reference to FIGS. 27A to 27D and FIGS. 28A to 28D.

Slipping Mode

Figure 29A:
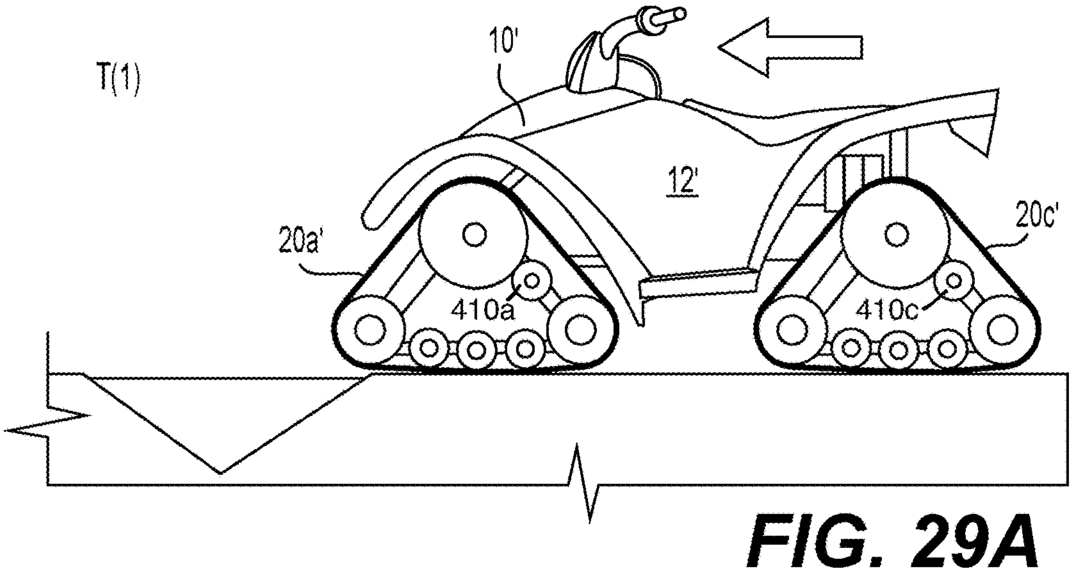
FIGS. 29A, 29B and 29C are left side schematic views of a vehicle having track systems according to embodiments of the present technology, one of the track systems undergoing slipping.
Figure 29B:
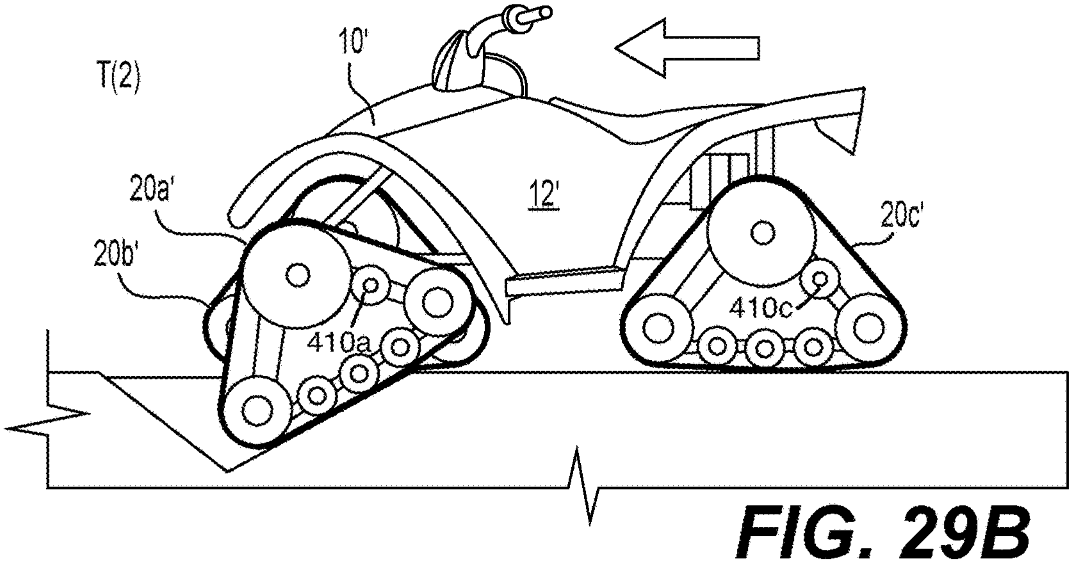
Figure 29C:
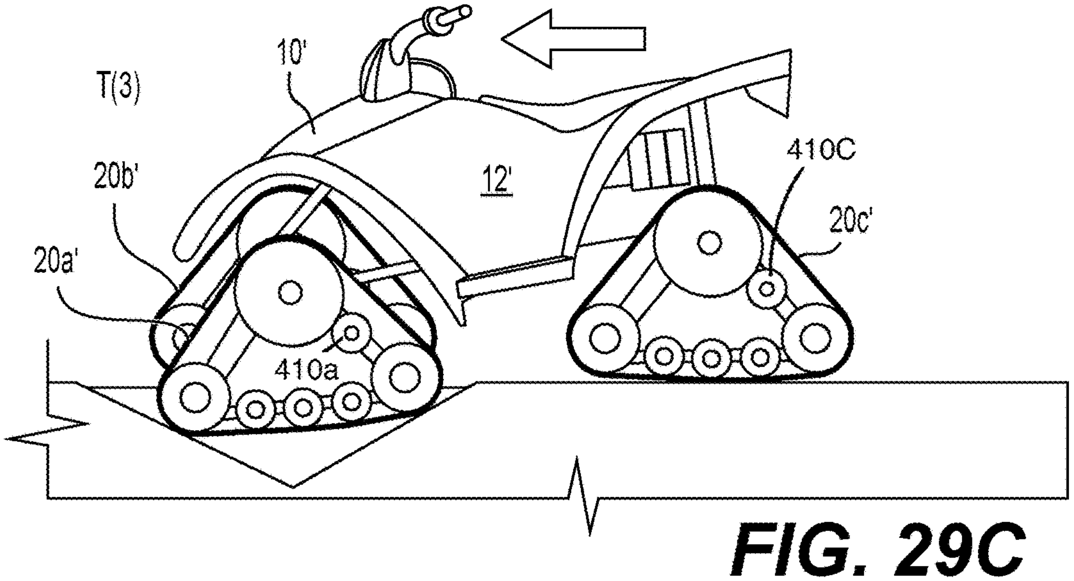

Referring to FIGS. 29A to 29C, which depicts the vehicle 10', developers of the present technology have realized that performing angular control of a given track system in a heel and/or toe configuration(s) during operation of the corresponding vehicle may be advantageous in a variety of operating conditions. In some embodiments of the present technology, with reference to the vehicle 10', the processor 610 may be configured to control one or more track systems 20*a*', 20*b*', 20*c*', 20*d*' of the vehicle 10' in accordance with a "slipping" mode, during which the processor 610 triggers the motor 410*n* to provide angular control of one of the track systems 20*a*', 20*b*', 20*c*', 20*d*' for increasing traction thereof in a soft ground surface. Broadly speaking, "slipping" of track systems refers to a scenario where at least one track system of a vehicle is wedged into soft ground surface, such as mud or snow, for example, and where at least a portion of the vehicle body is supported by the soft ground surface. In such a scenario, the track systems traction is reduced and may prevent the vehicle from moving on its path. In such a scenario, the traction provided by other track system(s) of the vehicle may also be negatively impacted due to the supported vehicle body. The user may typically need to perform specific manoeuvres with the vehicle to free the wedged track system such as shaking, going back and forth, and the like. The processor 610 may be configured to perform angular control of the track system in the slipping mode automatically and/or in response to a user input.

In some embodiments, the processor 610 may be configured to acquire a signal generated in response to a user input indicating that the processor 610 is to operate in the slipping mode. For example, the user may provide via a user interface 490*a* a user input indicative of a desire to operate in the slipping mode. In other embodiments of the present technology, the processor 610 may be configured to acquire and/or monitor one or more signals for triggering operation of the track system in the slipping mode.

It should be noted that one or more track systems may be operating in accordance with the default mode. Developers of the present technology have realized that, initially, the one or more track systems may have same or at least similar pitch and roll angular orientations and/or same or at least similar torque values, rotational speed values, linear speed values, and/or angular speed values. Developers have also realized that once one or more track systems begin to "slip" into the soft ground surface, one or more track systems have different pitch and roll angular orientations from the initial ones. Developers have also realized that once one or more track systems begin to "slip" into the soft ground surface, one or more track systems have different similar torque values, rotational speed values, linear speed values, and/or angular speed values than from the initial ones. The beginning of "slipping" typically generates a drag force that impacts at least some of the above-mentioned values. In some cases, as will be described below, this drag force can be interpreted as an obstacle or deep snow by the processor 460. It is also noted that, as mentioned above, since the load distribution and/or the clearance between the vehicle 10' and the ground is/are part of the 'slipping' phenomenon, some of the modes described hereabove, which cause a change in a size and/or location of the contact patch of the track system(s) and/or cause change in the ground clearance of the track systems may be used, at least to some extent, to overcome the slipping issue.

As it will become apparent from the description herein further below, the processor 610 may be configured to execute a plurality of distinct computer-implemented methods for performing angular control of a given track system in a slipping mode.

It is contemplated that the processor 610 may be configured to execute more than one distinct computer-implemented methods in parallel for performing angular control of a given track system in a slipping mode. Developers have realized that executing more than one distinct computer-implemented methods in parallel for triggering operation in the slipping mode may aid the processor 610 in differentiating the slipping scenario with other possible operational conditions such as when overcoming an obstacle, for example. In other words, it is contemplated that the processor 610 executing a combination of more than one distinct computer-implemented methods may provide a comparatively higher level of certainty in the detected operational condition.

In one embodiment, the processor 610 may monitor inter alia signal(s) indicative of: respective RS1 values of the track systems 20*a*', 20*b*', 20*c*', 20*d*', respective RS2 values of the track systems 20*a*', 20*b*', 20*c*', 20*d*', respective TS values of the track systems 20*a*', 20*b*', 20*c*', 20*d*', and an actual vehicle speed value.

In accordance with a first computer-implemented method, the processor 610 may be configured to perform a comparison of torque values of the motors 410 of a given pair of track systems. For example, the processor 610 may be configured to perform a comparison of torque values of the motors 410 of the front track systems (20*a*' vs 20*b*'). In another example, the processor 610 may be configured to perform a comparison of torque values of the motors 410 of the rear track systems (20*c*' vs 20*d*'). In a further example, the processor 610 may be configured to perform a comparison of torque values of the motors 410 of the left track systems (20*a*' vs 20*c*'). In an additional example, the processor 610 may be configured to perform a comparison of torque values of the motors 410 of the right track systems (20*b*' vs 20*d*'). In these embodiments, the processor 610 may be configured to trigger operation of one or more track systems 20*a*', 20*b*', 20*c*', 20*d*' in the slipping mode in response to a comparison between a difference between the torques of a given pair of track systems 20*a*', 20*b*', 20*c*', 20*d*' and a pre-determined torque difference threshold.

In accordance with a second computer-implemented method, the processor 610 may be configured to compare a temporal behaviour of RS1 of a given track system against a temporal behaviour of a linear speed of the vehicle. In some embodiments, the processor 610 may be configured to compare a temporal behaviour of RS2 compensated by a measure of the ATSV against the temporal behaviour of the linear speed of the vehicle. In these embodiments, the processor 610 may be configured to trigger operation of one or more track systems in the slipping mode if RS1 (and/or RS2 compensated via ATSV) behaves differently from the linear speed of the vehicle over time.

In accordance with a third computer-implemented method, the processor may be configured to perform a comparison between the linear speed of the vehicle and a linear speed of the system (e.g., processor may be configured to computer the linear speed of the track system as a weighted value of a given RS. It is contemplated that a combination of signals and/or combination of devices used for providing the signals in the third computer-implemented method may be different from the combination of the second computer-implemented method.

In accordance with a fourth computer-implemented method, the processor may be configured to perform a comparison between roll angular values and pitch angular values of the track system(s) and of the vehicle body. In these embodiments, the processor 610 may be configured to trigger operation of one or more track systems in the slipping mode in response to a difference between pitch angular value and/or roll angular values of the track system(s) and of pitch angular value and/or roll angular values of the vehicle body over a given period of time. It is contemplated that a combination of signals and/or combination of devices used for providing the signals in the third computer-implemented method may be different from the combination of the first computer-implemented method.

In some embodiments, the processor may be configured to execute the first and fourth computer-implemented methods to trigger operation of the vehicle in the obstacle mode and/or the slipping mode. In other embodiments, the processor may further execute at least one of the second and third computer-implemented methods for differentiating between whether to trigger the obstacle mode or the slipping mode.

With reference to FIGS. 29A to 29C, there is depicted the vehicle 10" operating during a sequence of moments in time.

In FIG. 29A, at t(1) the processor 610 may be configured to perform monitoring and comparison of one or more values. In a first embodiment, at t(1) the processor 610 may monitor torque values of motors 410*a*, 410*c* of the front left track system 20*a*' and of the rear left track system 20*c*'. Although, reference herewith is made to the front and rear left track systems 20*a*', 20*c*' it is understood that, as mentioned above, the processor 610 could monitor and compare torque of any one of the track systems 20*a*', 20*b*', 20*c*', 20*d*'. It should be noted that the processor 610 may determine that the torque values of motors 410*a*, 410*c* of the track systems 20*a*', 20*c*' are generally equal (e.g. below the pre-determined torque difference threshold value or the overload threshold value (OTV)). It is contemplated that the torque values of the track systems 20*a*', 20*b*' may vary depending on inter alia specific differential systems of the vehicle 10'. In a second embodiment, at t(1) the processor 610 may determine that RS1 of the track system 20*a*' is generally stable (e.g. variation below the speed ratio threshold value (SRTV)) and that the linear speed of the vehicle 10' is generally stable (e.g. constant speed). It should be noted that the processor 610 may determine that the variation of the RS1 and the variation of the linear speed of the vehicle 10' in time is similar. In a third embodiment, at t(1) the processor 610 may determine that RS2 of the track system 20*a*' multiplied by a pre-determined ratio is generally equal to the linear speed of the vehicle 10'. In a fourth embodiment, at t(1) the processor 610 may determine that roll and/or pitch angular values of the track system 20*a*' are generally equal to the roll and/or pitch angular values of the vehicle 10'. It should be noted that at t(1) the processor may be configured not to trigger the slipping mode of operation. As mentioned above, even when more than one computer-implemented method is combined, the processor may be configured not to trigger the slipping mode of operation.

In FIG. 29B, at t(2) the processor 610 may be configured to perform monitoring and comparison of one or more values. In a first embodiment, at t(2) the processor 610 may monitor torque values of motors of the track system 20*a*' and of the track system 20*c*'. It should be noted that the processor 610 may determine that the torque values of motors 410*a*, 410*c* of the track system 20*a*' and of the track system 20*c*' are not equal. The processor 610 may be configured to determine that the difference between the torque values is above a first torque threshold value. In a second embodiment, at t(2) the processor 610 may determine that RS1 of the track system 20*a*' is stable while the linear speed of the vehicle 10' is decreasing. It should be noted that the processor 610 may determine that the variation of the RS1 and the variation of the linear speed of the vehicle 10' in time are not similar. In a third embodiment, at t(2) the processor 610 may determine that RS2 of the track system 20*a*' multiplied by the pre-determined ratio is greater to the linear speed of the vehicle 10'. In a fourth embodiment, at t(2) the processor 610 may determine that roll and/or pitch angular values of the track system 20*a*' are not equal to the roll and/or pitch angular values of the vehicle 10' over a given period of time. The processor 610 may be configured to determine that the difference between roll and/or pitch angular values of the track system 20*a*' and the roll and/or pitch angular values of the vehicle 10' is above a pre-determined threshold. It should be noted that at t(2) the processor may be configured to notify the user about potential slipping of one or more track systems. It should also be noted that at t(2), each computer-implemented method may detect an obstacle and trigger the obstacle mode and/or detect a change in the soil type (ST) and trigger modification of the contact patch of the track system 20*a*'. In other embodiments, track system 20*a*' could be put into deep snow mode. In these cases, the applied corrective operation of the ACS, if any, may not negatively affect the overall performance of the track system(s). lkkl In FIG. 29C, at (t3) the processor 610 may be configured to perform monitoring and comparison of one or more values. In a first embodiment, at t(3) the processor 610 may monitor torque values of motors 410*a*, 410*c* of the track systems 20*a*', 20*c*'. In a second embodiment, at t(3) the processor 610 may determine that RS1 of the track system 20*a*' is increasing while the linear speed of the vehicle 10' is decreasing (even more than at t(1)). It should be noted that the processor 610 may determine that the variation of the RS1 and the variation of the linear speed of the vehicle 10' in time are not similar. In a third embodiment, at t(3) the processor 610 may determine that RS2 of the track system 20*a*' multiplied by the pre-determined ratio is greater to the linear speed of the vehicle 10'. For example, the processor 610 may be configured to determine that the difference between the RS2 of the track system 20*a*' multiplied by the pre-determined ratio and the linear speed of the vehicle 10' is above a pre-determined threshold. In a fourth embodiment, at t(3) the processor 610 may determine that the roll and/or pitch angular values of the track system 20*a*' are not equal to the roll and/or pitch angular values of the vehicle 10'. The processor 610 may be configured to determine that the difference between roll and/or pitch angular values of the track system 20*a*' and the roll and/or pitch angular values of the vehicle 10' is above a second pre-determined threshold (larger threshold than at t(2)).

It should be noted that at t(3) the processor 610 may be configured to notify the user about potential slipping of one or more track systems 20*a*', 20*b*', 20*c*', 20*d*'. In some embodiments, the processor 610 may trigger a corrective operation on one or more track systems 20*a*', 20*b*', 20*c*', 20*d*' for modifying the weight distribution of the vehicle 10'. For example, if the user is attempting forward movement at t(3), the processor 610 may be configured to operate the track systems 20*a*', 20*b*', 20*c*', 20*d*' in the heel configuration. In another example, if the user is attempting rearward movement at t(3), the processor 610 may be configured to operate the track systems 20*a*', 20*b*', 20*c*', 20*d*' in the toe configuration. As mentioned above, by changing the size of the contact patches of the track systems 20*a*', 20*b*', 20*c*', 20*d*', it may assist the track system in increasing traction and/or increasing the ground clearance with the ground, which may assist in getting out from the soft soil. It should also be noted that at t(3), each computer-implemented method may detect slipping and trigger the slipping mode. As mentioned above, by combining more than one computer-implemented methods, the level of certainty that the track system(s) is/are slipping is increased. By example, by combining the first and/or the fourth computer-implemented method(s) with at least one of the second and third computer-implemented methods, the slipping can be detected or confirmed with a high level of certainty. In some cases, once notified, the user can manually select different modes described above to overcome slipping issue, e.g. contact patch modification mode, deep snow mode, obstacle mode, hill mode, etc. as a user input to the processor. In some cases, it is noted that the artificial intelligence of the ACS may suggest some corrective operation to assist the user, based on previous learned experience and acquired data. It is also noted that a combination of different modes or parameters associated with different modes may be used to generate new corrective operations or temporary modes that could be fit to overcome slipping issue or other problematic situations.

Figure 37:
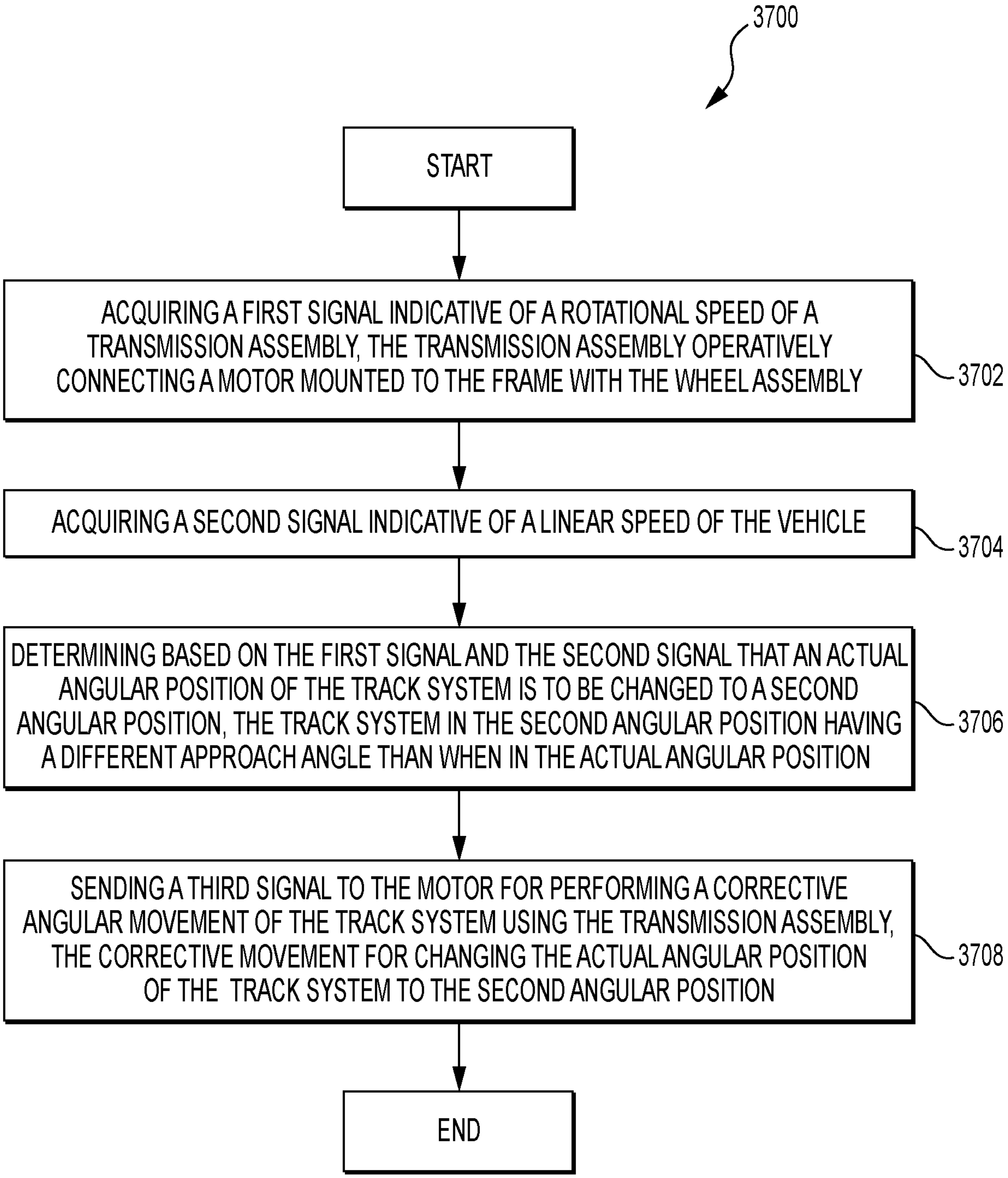
FIG. 37 is a flowchart of a method executable by a controller assembly of FIG. 5 according to an embodiment of the present technology.

In some embodiments of the present technology, with reference to FIG. 37, the processor 610 may be configured to execute a method 3700 for controlling an angular position of a given track system. It should be noted that the method 3700 may be executed by the processor for performing angular control of one or more track systems described herein. In some embodiments, the method 3700 may be executed by the processor 610 for performing angular control of track system(s) of one or more vehicles described herein. Various steps of the method 3700 will now be described in greater detail.

STEP 3702: Acquiring a First Signal Indicative of a Rotational Speed of a Transmission Assembly, the Transmission Assembly Operatively Connecting a Motor Mounted to the Frame with the Wheel Assembly At step 3702, the processor 610 is configured to acquire a first signal indicative of a given rotational speed of a transmission assembly of a given ACS of a given track system. For example, the processor 610 may be configured to acquire a first signal indicative of a given rotational speed of the transmission assembly 420 of the ACS 400*a* of the track system 20*a*.

In some embodiments, the transmission assembly 420 may comprise the first transmission part 510 being operatively coupled to a given wheel assembly of the track system 20*a*, and the second transmission part 520 being operatively coupled to the motor 410*a*, and where the first and second transmission parts 510, 520 are drivingly engaged with each other. In some embodiments, the first signal may be indicative of the rotational speed of the first transmission part 510 (i.e., RS1). In other embodiments, the first signal may be indicative of the rotational speed of the second transmission part 520 (i.e., RS2). Alternatively or additionally, the first signal may be indicative of the rotational speed of a transmission link linking a first transmission part and a second transmission part of a given transmission assembly (such as a transmission belt or chain, for example).

STEP 3704: Acquiring a Second Signal Indicative of a Linear Speed of the Vehicle The method 3700 continues to step 3704 with the processor 610 configured to acquire a second signal indicative of a linear speed of the vehicle 10. For example, the processor 610 may acquire the linear speed of the vehicle 10 from one or more sensing devices of the controller assembly 430.

STEP 3706: Determining Based on the First Signal and the Second Signal that an Actual Angular Position of the Track System is to be Changed to a Second Angular Position, the Track System in the Second Angular Position Having a Different Approach Angle than when in the Actual Angular Position The method 3700 continues to step 3706 with the processor 610 configured to determine, based on the first signal and the second signal, that an actual angular position of the track system is to be changed to a second angular position with a different approach angle than when in the actual angular position.

In some embodiments, the processor 610 may be configured to compare a temporal behaviour of RS1 of a given track system against a temporal behaviour of a linear speed of the vehicle. In some embodiments, the processor 610 may be configured to compare a temporal behaviour of RS2 compensated by a measure of the ATSV against the temporal behaviour of the linear speed of the vehicle. In these embodiments, the processor 610 may be configured to trigger operation of one or more track systems in the slipping mode if RS1 (and/or RS2 compensated via ATSV) behaves differently from the linear speed of the vehicle over time.

In other embodiments, the processor 610 may be configured to perform a comparison between the linear speed of the vehicle and a linear speed of the track system. For example, processor 610 may be configured to compute the linear speed of the track system as a weighted value of a rotational speed of a transmission assembly. It is contemplated that a combination of signals and/or combination of devices to provide signals indicative of a rotational speed and of the linear speed of the vehicle may be different depending on inter alia specific implementations of the present technology.

STEP 3708: Sending a Third Signal to the Motor for Performing a Corrective Angular Movement of the Track System Using the Transmission Assembly, the Corrective Movement for Changing the Actual Angular Position of the Track System to the Second Angular Position The method 3700 continues to step 3708, with the processor 610 configured to send a third signal to a motor mounted to the track system. For example, the processor 610 may send a third signal to the motor 410*a* mounted to the frame 30*a* of the track system 20*a*. The processor 610 is configured to send the third signal for performing a corrective angular movement of the track system 20*a*. It is contemplated that the third signal may be sent to a given power source of a given motor. The motor 410*a* is configured to perform the corrective movement via the transmission assembly 420 for changing the actual angular position of the track system 20*a* to the second angular position.

In some embodiments, the processor 610 may be configured to send the third signal for performing a CW rotation of the track system 20*a* relative to the vehicle 10. In other embodiments, the processor 610 may be configured to send the third signal for performing a CCW rotation of the track system 20*a* relative to the vehicle 10. In some embodiments, the corrective movement may be performed by the motor to bring the track system 20*a* in a heel or tow configuration.

In some embodiments, the method 3700 may comprise a step of determining, by the processor 610, the second angular position of the track system 20*a* based on data stored in memory. The data stored in memory may be indicative of a relationship between potential angular positions of the track system 20*a* and corresponding sizes of the contact patch of the track system 20*a* and/or corresponding approach angles of the track system 20*a*. The processor 610 may select the second angular position amongst the potential angular positions by identifying a given potential angular position that is associated with a desired size of the contact patch and/or a desired approach angle.

In some embodiments, a magnitude of the corrective movement of the track system 20*a* relative to the vehicle 10 may be determined by the processor 610 based on stored data. It is contemplated that data indicative of a relationship between a potential angular position of the track system 20*a* and a corresponding size of the contact patch and/or a corresponding approach angle may be stored in memory accessible by the processor 610. In some embodiments, a given size of the contact patch for a given angular position of the track system 20*a* may be determined by the processor 610 and/or pre-computed using one or more parameters describing the geometry of the track system 20*a*, without departing from the scope of the present technology.

Figure 38:
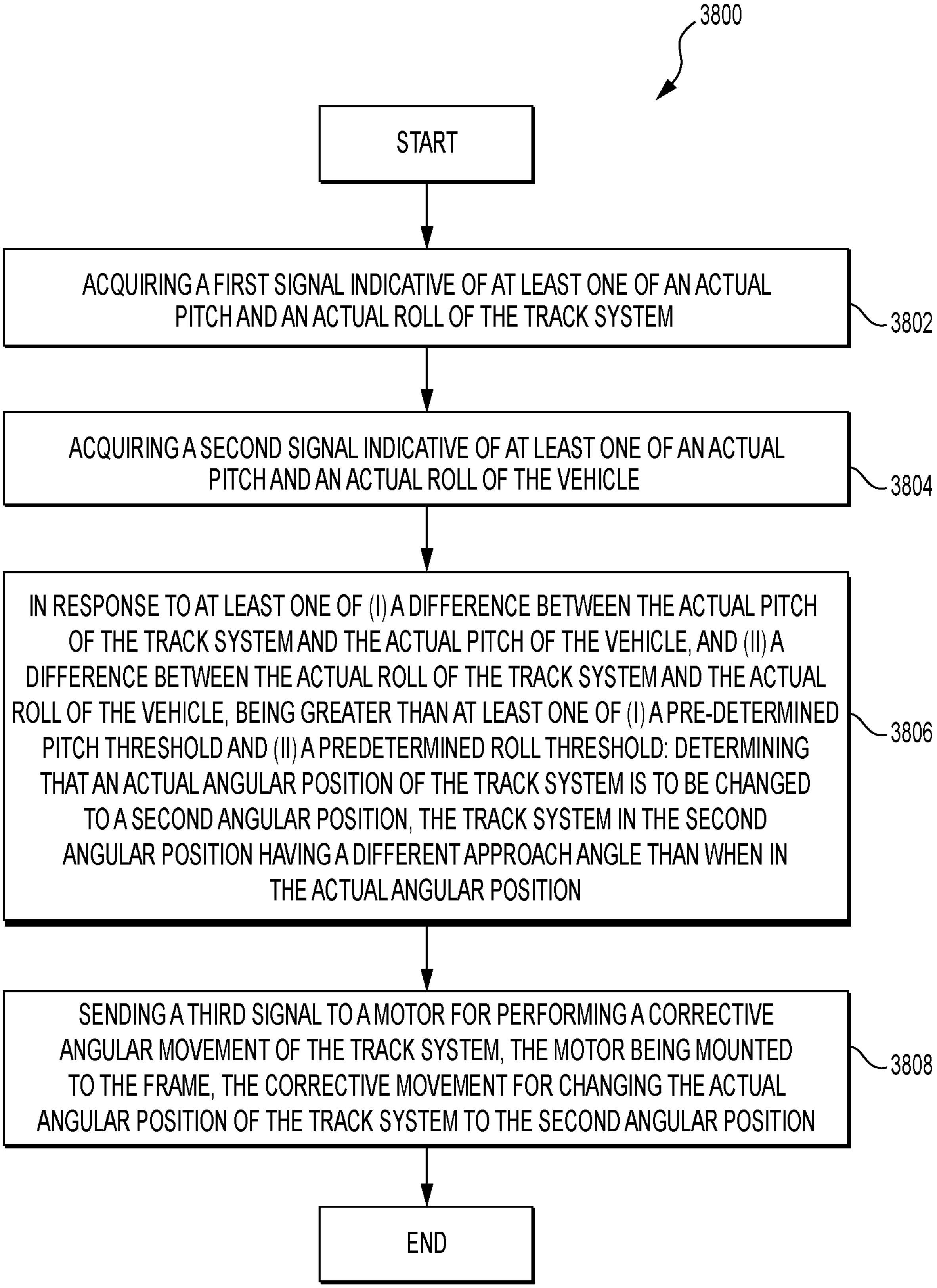
FIG. 38 is a flowchart of a method executable by a controller assembly of FIG. 5 according to an embodiment of the present technology.

In some embodiments of the present technology, with reference to FIG. 38, the processor 610 may be configured to execute a method 3800 for controlling an angular position of a given track system. It should be noted that the method 3800 may be executed by the processor for performing angular control of one or more track systems described herein. In some embodiments, the method 3800 may be executed by the processor 610 for performing angular control of track system(s) of one or more vehicles described herein. Various steps of the method 3800 will now be described in greater detail.

STEP 3802: Acquiring a First Signal Indicative of at Least One of an Actual Pitch and an Actual Roll of the Track System At step 3802, the processor 610 is configured to acquire a first signal indicative of at least one of an actual pitch and an actual roll of a track system. For example, the processor 610 may acquire a signal indicative of an actual track system angle (TS) which comprise an actual pitch and actual roll of the track system 20*a*. In some embodiments, it is contemplated that the processor 610 may be configured to monitor the first signal over a period of time.

STEP 3804: Acquiring a Second Signal Indicative of at Least One of an Actual Pitch and an Actual Roll of the Vehicle At step 3804, the processor 610 is configured to acquire a first signal indicative of at least one of an actual pitch and an actual roll of a vehicle. For example, the processor 610 may acquire a signal indicative of an actual vehicle angle (V) which comprise an actual pitch and actual roll of the vehicle 10. In some embodiments, it is contemplated that the processor 610 may be configured to monitor the first signal over a period of time.

STEP 3806: In Response to at Least One of (i) a Difference Between the Actual Pitch of the Track System and the Actual Pitch of the Vehicle, and (ii) a Difference Between the Actual Roll of the Track System and the Actual Roll of the Vehicle, being Greater than at Least One of (i) a Pre-Determined Pitch Threshold and (ii) a Pre-Determined Roll Threshold: Determining that an Actual Angular Position of the Track System is to be Changed to a Second Angular Position, the Track System in the Second Angular Position Having a Different Approach Angle than when in the actual angular position At step 3806, the processor is configured to, in response to at least one of (i) a difference between the actual pitch of the track system 20*a* and the actual pitch of the vehicle 10, and (ii) a difference between the actual roll of the track system 20*a* and the actual roll of the vehicle 10, being greater than at least one of (i) a pre-determined pitch threshold and (ii) a pre-determined roll threshold, determine that the actual angular position of the track system 20*a* is to be changed to a second angular position.

In some embodiments, the processor 610 may be configured to determine a difference between the actual pitch of the track system 20*a* and the actual pitch of the vehicle 10 and compare the difference to the pre-determined pitch threshold. It should be noted that the pre-determined pitch threshold may be stored in memory accessibly by the processor 610. In other embodiments, the processor 610 may be configured to determine a difference between the actual roll of the track system 20*a* and the actual roll of the vehicle 10 and compare the difference to the pre-determined roll threshold. It should be noted that the pre-determined roll threshold may be stored in memory accessibly by the processor 610.

In some embodiments, the processor 610 may be configured to monitor a temporal behavior of the actual pitch of the track system 20*a* and the actual pitch of the vehicle 10 over time. The processor 610 may be configured to determine a difference between the temporal behavior of the actual pitch of the track system 20*a* and the actual pitch of the vehicle 10, and compare the difference to a pre-determined pitch behavior threshold. It should be noted that the pre-determined pitch behavior threshold may be stored in memory accessibly by the processor 610. In other embodiments, the processor 610 may be configured to monitor a temporal behavior of the actual roll of the track system 20*a* and the actual roll of the vehicle 10 over time. The processor 610 may be configured to determine a difference between the temporal behavior of the actual roll of the track system 20*a* and the actual roll of the vehicle 10, and compare the difference to a pre-determined roll behavior threshold. It should be noted that the pre-determined roll behavior threshold may be stored in memory accessibly by the processor 610.

STEP 3808: Sending a Third Signal to a Motor for Performing a Corrective Angular Movement of the Track System, the Motor being Mounted to the Frame, the Corrective Movement for Changing the Actual Angular Position of the Track System to the Second Angular Position The method 3800 continues to step 3808, with the processor 610 configured to send a third signal to a motor mounted to the track system. For example, the processor 610 may send a third signal to the motor 410*a* mounted to the frame 30*a* of the track system 20*a*. The processor 610 is configured to send the third signal for performing a corrective angular movement of the track system 20*a*. It is contemplated that the third signal may be sent to a given power source of a given motor. The motor 410*a* is configured to perform the corrective movement for changing the actual angular position of the track system 20*a* to the second angular position in which the track system 20*a* has at least one of a different contact patch size and a different approach angle.

In some embodiments, the processor 610 may be configured to send the third signal for performing a CW rotation of the track system 20*a* relative to the vehicle 10. In other embodiments, the processor 610 may be configured to send the third signal for performing a CCW rotation of the track system 20*a* relative to the vehicle 10. In some embodiments, the corrective movement may be performed by the motor to bring the track system 20*a* in a heel or tow configuration.

In some embodiments, the method 3800 may comprise a step of determining, by the processor 610, the second angular position of the track system 20*a* based on data stored in memory. The data stored in memory may be indicative of a relationship between potential angular positions of the track system 20*a* and corresponding sizes of the contact patch of the track system 20*a* and/or corresponding approach angles of the track system 20*a*. The processor 610 may select the second angular position amongst the potential angular positions by identifying a given potential angular position that is associated with a desired size of the contact patch and/or a desired approach angle.

In some embodiments, a magnitude of the corrective movement of the track system 20*a* relative to the vehicle 10 may be determined by the processor 610 based on stored data. It is contemplated that data indicative of a relationship between a potential angular position of the track system 20*a* and a corresponding size of the contact patch and/or a corresponding approach angle may be stored in memory accessible by the processor 610. In some embodiments, a given size of the contact patch for a given angular position of the track system 20*a* may be determined by the processor 610 and/or pre-computed using one or more parameters describing the geometry of the track system 20*a*, without departing from the scope of the present technology.

Figure 39:
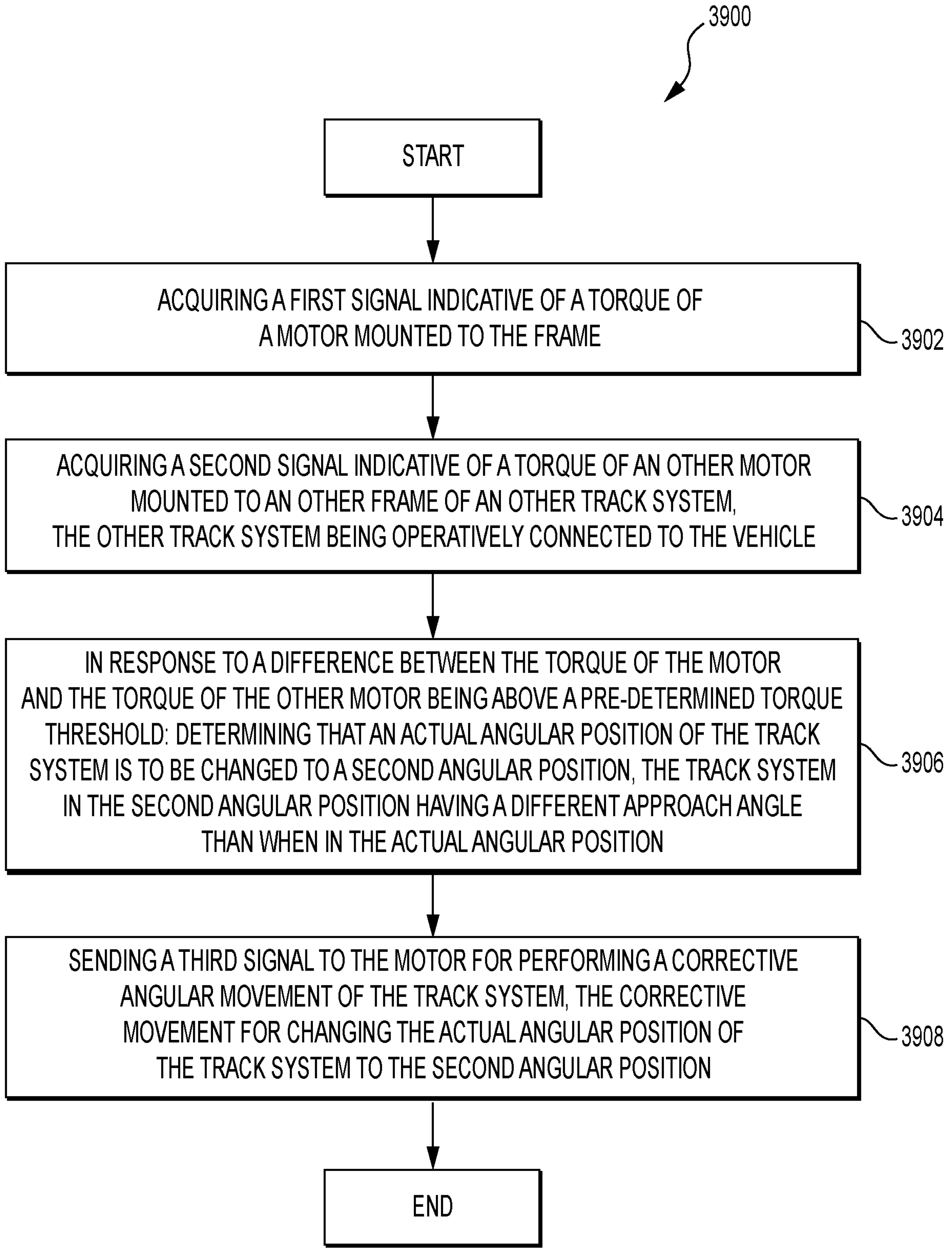
FIG. 39 is a of a method executable by a processor of FIG y, in accordance with at least some embodiments of the present technology.

In some embodiments of the present technology, with reference to FIG. 39, the processor 610 may be configured to execute a method 3900 for controlling an angular position of a given track system. It should be noted that the method 3900 may be executed by the processor for performing angular control of one or more track systems described herein. In some embodiments, the method 3900 may be executed by the processor 610 for performing angular control of track system(s) of one or more vehicles described herein. Various steps of the method 3900 will now be described in greater detail.

STEP 3902: Acquiring a First Signal Indicative of a Torque of a Motor Mounted to the Frame At step 3902, the processor 610 is configured to acquire a first signal indicative of a torque of a motor mounted to a frame of a first track system. For example, the processor 610 may be configured to acquire a first signal indicative of the torque of the motor 410*a* mounted to the frame 30*a* of the track system 20*a*.

STEP 3904: Acquiring a Second Signal Indicative of a Torque of an Other Motor Mounted to an Other Frame of an Other Track System, the Other Track System being Operatively Connected to the Vehicle At step 3904, the processor 610 is configured to acquire a second signal indicative of a torque of an other motor mounted to an other frame of a second track system. For example, the processor 610 may be configured to acquire a second signal indicative of the torque of the motor 410*b* mounted to the frame 30*b* of the track system 20*b*. In an other example, the processor 610 may be configured to acquire a second signal indicative of the torque of the motor 410*c* mounted to the frame 30*c* of the track system 20*c*. In a further example, the processor 610 may be configured to acquire a second signal indicative of the torque of the motor 410*d* mounted to the frame 30*d* of the track system 20*d*.

STEP 3906: In Response to a Difference Between the Torque of the Motor and the Torque of the Other Motor being Above a Pre-Determined Torque Threshold: Determining that an Actual Angular Position of the Track System is to be Changed to a Second Angular Position, the Track System in the Second Angular Position Having a Different Approach Angle than when in the Actual Angular Position At step 3906, the processor 610 is configured to, in response to a difference between the torque of the motor and the torque of the other motor being above a pre-determined torque threshold, determine that an actual angular position of the first track system is to be changed to a second angular position, in which the first track system has a different approach angle and/or different contact patch size.

In some embodiments, the processor 610 may be configured to compare the torque of the motor 410*a* against the torque of the motor 410*b* and/or of the motor 410*c* and/or of the motor 410*d*. In some embodiments, the processor 610 may be configured to compare a difference between the motor 410*a* and the torque of the motor 410*b* and/or of the motor 410*c* and/or of the motor 410*d* to the pre-determined torque threshold. It should be noted that the pre-determined torque threshold may be stored in memory accessibly by the processor 610.

In some embodiments, the processor 610 may be configured to monitor a temporal behavior of the torque of the motor 410*a* and a temporal behavior of at least one of the motors 410*b*, 410*c*, 410*d* over time. The processor 610 may be configured to determine a difference between the temporal behavior of the torque of the motor 410*a* and the temporal behavior of the torque of at least one of the motors 410*b*, 410*c*, 410*d*, and compare the difference to a pre-determined torque behavior threshold. It should be noted that the pre-determined torque behavior threshold may be stored in memory accessibly by the processor 610.

STEP 3908: Sending a Third Signal to the Motor for Performing a Corrective Angular Movement of the Track System, the Corrective Movement for Changing the Actual Angular Position of the Track System to the Second Angular Position The method 3900 continues to step 3908, with the processor 610 configured to send a third signal to a motor mounted to the track system. For example, the processor 610 may send a third signal to the motor 410*a* mounted to the frame 30*a* of the track system 20*a*. The processor 610 is configured to send the third signal for performing a corrective angular movement of the track system 20*a*. It is contemplated that the third signal may be sent to a given power source of a given motor. The motor 410*a* is configured to perform the corrective movement for changing the actual angular position of the track system 20*a* to the second angular position in which the track system 20*a* has at least one of a different contact patch size and a different approach angle.

In some embodiments, the processor 610 may be configured to send the third signal for performing a CW rotation of the track system 20*a* relative to the vehicle 10. In other embodiments, the processor 610 may be configured to send the third signal for performing a CCW rotation of the track system 20*a* relative to the vehicle 10. In some embodiments, the corrective movement may be performed by the motor to bring the track system 20*a* in a heel or tow configuration.

In some embodiments, the method 3900 may comprise a step of determining, by the processor 610, the second angular position of the track system 20*a* based on data stored in memory. The data stored in memory may be indicative of a relationship between potential angular positions of the track system 20*a* and corresponding sizes of the contact patch of the track system 20*a* and/or corresponding approach angles of the track system 20*a*. The processor 610 may select the second angular position amongst the potential angular positions by identifying a given potential angular position that is associated with a desired size of the contact patch and/or a desired approach angle.

In some embodiments, a magnitude of the corrective movement of the track system 20*a* relative to the vehicle 10 may be determined by the processor 610 based on stored data. It is contemplated that data indicative of a relationship between a potential angular position of the track system 20*a* and a corresponding size of the contact patch and/or a corresponding approach angle may be stored in memory accessible by the processor 610. In some embodiments, a given size of the contact patch for a given angular position of the track system 20*a* may be determined by the processor 610 and/or pre-computed using one or more parameters describing the geometry of the track system 20*a*, without departing from the scope of the present technology.

Prioritisation

In some embodiments of the present technology, the processor 610 may be configured to execute a prioritization routine to determine which mode is to be prioritized in a particular operating condition. For example, the processor 610 can use one or more sensors and other inputs to detect driving conditions and prioritize one more over an other. For example, the processor 610 may prioritize deep snow mode over other modes when operating on wet or snowy roads. It should be noted that prioritization of modes may be based on user safety. For example, the emergency braking mode may have a higher priority than the deep snow mode. It should also be noted that user preferences may used for prioritizing modes. For example, the user may customize riding modes to suit their individual preferences. For example, some drivers may prioritize fuel efficiency while others may prioritize performance or off-road capabilities.

Sprocket Motor Assembly

Referring now to FIG. 30, another aspect of the present technology, in which a motor 3570 is operatively connected to a drive wheel 3540, will be described with reference to a track system 3520. This aspect of the present technology can assist in maintaining an orientation of the track system 3520 relative to the vehicle to which it is connected. In some implementations, the present technology can assist in adjusting an orientation of the track system 3520 relative to the vehicle to enhance a given characteristic (e.g., traction, capacity to overcome obstacles, durability, etc.). In yet other implementations, the present technology can assist in propelling a non-motorized vehicle. In some other implementations, the present technology can assist in maintaining/adjusting the orientation of the track system 3520 relative to a vehicle, as well as propelling the vehicle.

The track system 3520, which is partially illustrated in FIG. 30, is, similarly to the track systems **20*n*, 1000*n* configured to connect to a variety of vehicles. For instance, the track system 3520 could be connected to a recreational vehicle such as an all-terrain vehicle or a snowmobile, or a heavy-duty vehicle such as a harvester or a tractor. Additionally, as will be described in greater detail below, the track system 3520 could also be connected to a non-motorized structure, where the non-motorized structure is configured to be propelled by one or more of the track systems 3520**.

The track system 3520 is connectable to a shaft of the vehicle by a hub assembly 3522. In the illustrated embodiment, the hub assembly 3522 is part of the track system 3520. However, in other embodiments, the hub assembly 3522 could be considered as being part of the vehicle. In yet other embodiments, the hub assembly 3522 could be omitted and the track system 3520 could be connected to the shaft without the hub assembly 3522.

The hub assembly 3522 has a shaft connecting portion 3524 and a drive wheel connecting portion 3526.

The shaft connecting portion 3524 is configured to fixedly connect to the shaft, such that when the shaft rotates, the hub assembly 3522 also rotates. In the illustrated embodiment, the hub assembly 3522 is removably connected to the shaft via fasteners (not shown). It is contemplated that the hub assembly 3522 could be connected to the shaft differently. In some instances, the hub assembly 3522 could be connected to the shaft in a non-removable manner. The shaft connecting portion 3524 includes a laterally extending segment 3528 that is configured to assist in connecting the track system 3520 to the vehicle.

The drive wheel connecting portion 3526, which is disposed radially outwardly from the shaft connecting portion 3524, has four tabs 3530 that are equally angularly spaced from one another. Each of the four tabs 3530 defines an aperture 3532 that is configured to receive a fastener (not shown) therein. The drive wheel connecting portion 3526 is configured to fixedly connect to a drive wheel 3540 of the track system 3520, such that when the hub assembly 3522 rotates, the drive wheel 3540 rotates as well. The hub assembly 3522 is removably connected to the drive wheel 3540 via fasteners (not shown) and the apertures 3532. It is contemplated that in other embodiments, the hub assembly 3522 could be non-removably connected to the shaft.

Still referring to FIG. 30, the drive wheel 3540, which is rotatable about a drive wheel axis 3542, is similar to the drive wheel assembly 40 described hereabove, and hence will only briefly be described.

The drive wheel 3540 has an inner portion 3544 and an outer portion 3546, where the outer portion 3546 is radially outwardly from the inner portion 3544.

The inner portion 3544 defines a center bore 3548 that is configured to, inter alia, receive part of the laterally extending segment 3528. Furthermore, the inner portion 3544 also defines four equally spaced apertures 3550 configured to receive fasteners (not shown) therein. More specifically, each one of the apertures 3550 is configured to align with one of the apertures 3532 of the hub assembly 3522 when the hub assembly 3522 and the drive wheel 3540 are connected to one another. The outer portion 3546 has a plurality of teeth 3552 disposed on a circumference of the drive wheel 3540. The teeth 3552, which extend laterally from a center plane of the drive wheel 3540, are engageable to an endless track (not shown in FIG. 30) of the track system 3520. It is contemplated that the configuration of the teeth 3552 could differ from one embodiment to another without departing from the scope of the present technology.

The track system 3520 also includes the frame assembly 3560 that is disposed laterally outwardly from the drive wheel 3540. The drive wheel 3540 is rotationally connected to the frame assembly 3560 by the laterally extending segment 3528. Specifically, the drive wheel 3540 is rotationally connected to the laterally extending segment 3528 via inter alia bearings (not shown), and the laterally extending segment 3528 is, in turn, connected thereto by bearings (not shown). Thus, the drive wheel 3540 is free to rotate relative to the frame assembly 3560.

The track system 3520 also includes front and rear idler wheel assemblies 3562 as well as four support wheel assemblies 3564, all of which are rotationally connected to the frame assembly 3560. The frame assembly 3560 is similar to the frame 30, the idler wheel assemblies 3562 are similar to the idler wheel assemblies 60, and the support wheel assemblies 3564 are similar to the support wheel assemblies 3566. Thus, the frame assembly 3560, the idler wheel assemblies 3562 and the support wheel assemblies 3564 will not be re-described herewith again.

The track system 3520 also includes an endless track 3566. Being that endless track 3566 is similar to the endless track 24, it will not be described in detail herewith again.

The track system 3520 includes a motor 3570 that is operatively connected to the drive wheel 3540 and to the frame assembly 3560. The motor 3570 includes an electromechanical part 3572, an electromechanical part 3574, and a power source 3576. As will be described below, the positions of the electromechanical parts 3572, 3574 on the track system 3520 can vary from one embodiment to another.

Figure 31:
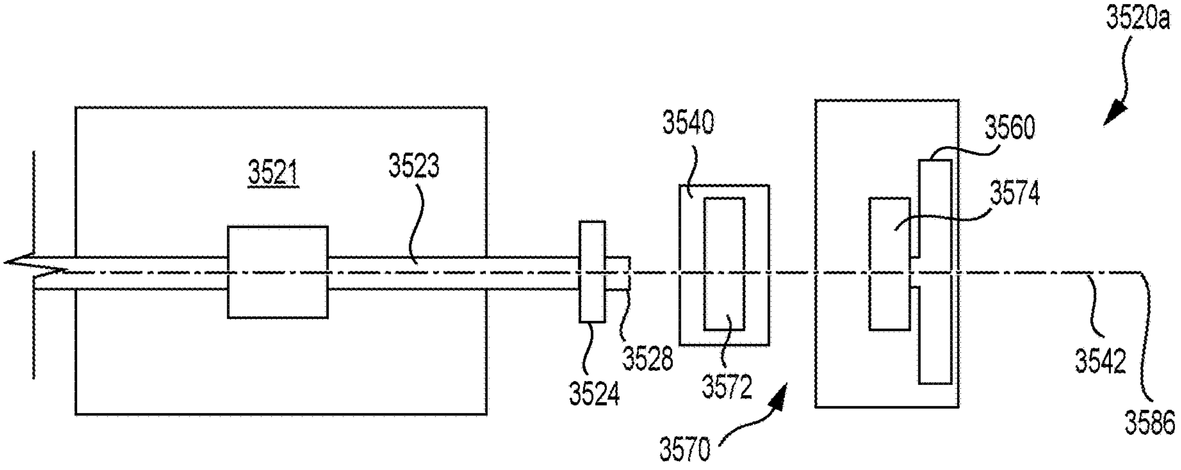
FIG. 31 is a schematic view of the track system of FIG. 30.

With reference to FIGS. 30 and 31, the track system 3520 according to a first embodiment of the present technology will be described. In this embodiment, the track system 3520 is connected to a powered vehicle 3521. Thus, the vehicle 3521 has a driving shaft 3523 (shown schematically in FIG. 31) that is configured to drive the drive wheel 3540. The motor 3570 is configured to apply a corrective torque to the drive wheel 3540, such that an orientation of the track system 3520 relative to the vehicle can be maintained in a given orientation relative to the vehicle 3521 or can be adjusted to a desired orientation relative to the vehicle 3521. Thus, the motor 3570 can replace anti-rotation rods.

The motor 3570 is an axial flux motor 3570, such that the electromechanical parts 3572, 3574 are laterally spaced from one another. In this embodiment, the electromechanical part 3572 is embedded into the drive wheel 3540, whereas the electromechanical part 3574 is a standalone part fixedly connected to the frame assembly 3560. It is contemplated that in other embodiments, the motor 3570 could be a radial flux motor, such that one of the electromechanical parts 3572, 3574 could be disposed radially from the other one of the electromechanical parts 3572, 3574.

With continued reference to FIGS. 30 and 31, the electromechanical part 3572 will now be described in greater detail. As mentioned above, the electromechanical part 3572 is embedded to the drive wheel 3540. Thus, the electromechanical part 3572 is fixedly connected to the drive wheel 3540 (i.e., when the drive wheel 3540 rotates, so does the electromechanical part 3572, and vice-versa). It is contemplated that in other embodiments, the electromechanical part 3572 could not be embedded into the drive wheel 3540. Instead, for example, the electromechanical part 3572 could be a disc-like part configured to be removably connected to the drive wheel 3540, for example, via fasteners. It is understood that the connection between the electromechanical part 3572 and the drive wheel 3540 could vary from one embodiment to another without departing from the scope of the present technology.

The electromechanical part 3572 has a series of a plurality of magnets 3580 that is disposed around the center bore 3544. It is contemplated that in other embodiments, there could be two or more series of pluralities of magnets 3580 disposed around the center bore 3544, with each of the two or more series being radially spaced from one another. Additionally, the two or more series of plurality of magnets 3580 could be circumferentially offset from one another. The magnets 3580 are permanent magnets 3580. In other embodiments, the magnets 3580 could be electromagnets. The permanent magnets 3580 are disposed to alternate in polarity in the lateral direction (i.e., a north pole of a given permanent magnet 3580 is oriented towards the vehicle 3521 whereas a south pole of the given permanent magnet 3580 is oriented away from the vehicle 3521, and a north pole of adjacent permanent magnets 3580 is oriented away the vehicle 3521 whereas a south pole of the adjacent permanent magnets 3580 is oriented towards the vehicle 3521). It is contemplated that the orientation of the magnets 3580 could vary. For instance, if the motor 3570 were to be a radial flux motor, the permanent magnets 3580 could be disposed such that an end of the permanent magnets 3580 oriented toward the drive wheel axis 3542 could alternate in polarity from one permanent magnet 3580 to another.

Turning now to the electromechanical part 3574, which, as mentioned above, is configured to be fixedly connected to the frame assembly 3560. The electromechanical part 3574 defines a center aperture 3588 that is sized to receive the laterally extending segment 3528 therein. The electromechanical part 3574 also defines four connecting apertures 3594 that are equally angularly spaced. The connecting apertures 3594 are configured to receive fasteners (not shown) therein to fasten the electromechanical part 3574 to the frame assembly 3560. It is contemplated that the electromechanical part 3574 could be removably or non-removably connected to the frame assembly 3560. The electromechanical part 3574, which is rotatable about a center axis 3586, has a plurality of magnets 3582. The magnets 3582 are electromagnets 3582 that are electrically connected to the power source 3576. It is contemplated that in other embodiments, the magnets 3582 could be permanent magnets if the magnets 3580 are electromagnets.

One will note that the center axis 3586, about which the electromechanical part 3574 is rotatable, is parallel to, and aligned with, the drive wheel axis 3542, about which the drive wheel 3540, and thus the electromechanical part 3572, is rotatable. As a result of the motor 3570 being co-axial with the drive wheel 3540, the number of parts required to adjust an orientation of the track system 3542 relative to the vehicle 3521 can be reduced. This is notably different from some of the angular control systems described hereabove, which include a motor having an output shaft that is offset from the drive wheel axis 3542, such that more components may be necessary.

The power source 3576, which is for powering the motor 3570, is housed in the electromechanical part 3574. It is contemplated that in other embodiments, the power source 3574 could be housed elsewhere, such as, for example, in the frame assembly 3560. In some other embodiments, the power source 3576 could be integrated to the vehicle 3521 and/or could be a vehicle power source (e.g., a battery, an alternator, etc.). In some embodiments, the power source 3576 could be an alternator operatively connected to the drive wheel 3540 of the track system 3520.

A controller 3578, which is also housed in the electromechanical part 3574, is electrically connected to the power source 3576, and is communicatively connected to the electromechanical part 3574. The controller 3578 is configured to selectively operate the motor 3570.

In one example of operation of the track system 3540, as the vehicle is travelling over uneven terrain, various forces may urge a change in the orientation of the track system 3520 relative to the vehicle 3521. In response to detecting that a corrective operation is required, the motor 3570 is operated (i.e., current is supplied from the power source 3576 to the electromagnets 3582 of the electromechanical part 3574). Thus, the motor 3570 applies a corrective torque to the drive wheel 3540. The corrective torque can be a positive torque, which acts in the same rotational direction as the rotation of the shaft 3523, or a negative torque, which acts in the opposite direction as the rotation of the shaft 3523. Since the electromechanical part 3574 is fixed relative to the frame assembly 3560 of the track system 3540, the corrective torque causes the frame assembly 3560 to pivot about the drive wheel axis 3542. Thus, the corrective torque applied by the motor 3570 can assist in maintaining the orientation of the track system 3520 relative to the vehicle 3521 (i.e., act as an anti-rotation device).

In other embodiments, the corrective torque applied by the motor 3570 can assist in changing the orientation of the track system 3520 to a desired orientation. For example, in some implementations of the present technology, the corrective torque can be applied by the motor 3570 to assist in changing the orientation of the track system 3520 to decrease contact footprint of the track system 3520.

Figure 32:
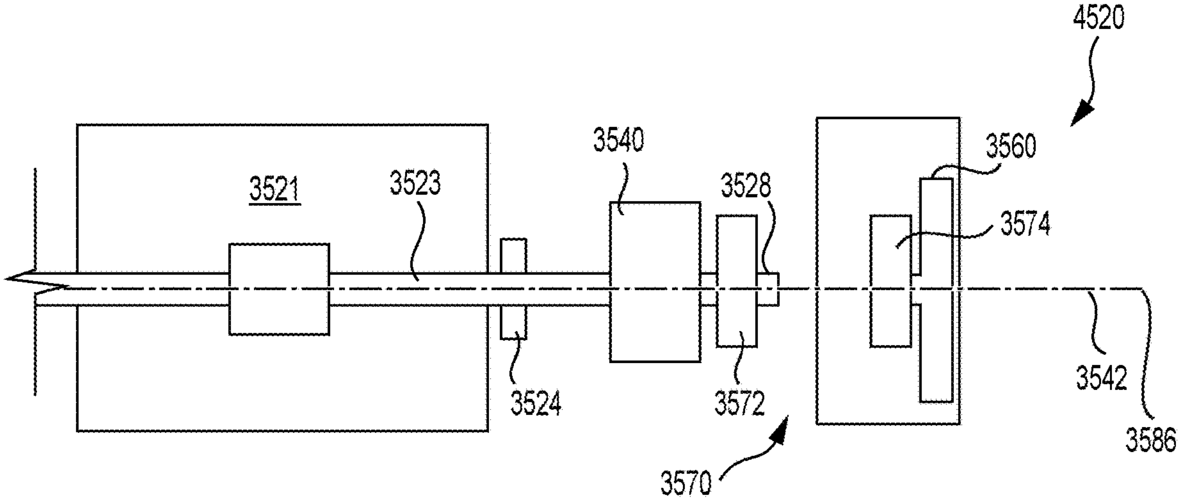
FIG. 32 is a schematic view of an alternative embodiment of a track system having a co-axial motor.

With reference to FIG. 32, an alternative embodiment of the present technology will be described with reference to a track system 4520. Features of the track system 4520 similar to those of the track system 4520 have been labeled with the same reference numerals, and will not be described in detail herewith.

In this embodiment, the vehicle 3521 is a powered vehicle and has the shaft 3523 that is a driving shaft configured to drive the drive wheel 3540. The motor 3570 is configured to apply a corrective torque to the drive wheel 3540 in order to adjust and/or maintain an orientation of the track system 4520 relative to the vehicle 3521.

The electromechanical part 3572 is connected to the shaft 3523 (rather than being directly connected to the drive wheel 3540). In some embodiments, the electromechanical part 3572 could be removably or non-removably connected to the shaft 3523. For instance, in some implementations, the electromechanical part 3572 could be welded to the shaft 3523. In the schematic illustration of this embodiment, the electromechanical part 3572 is shown as being disposed on a laterally outer side of the drive wheel 3540, but it is contemplated that in other embodiments, the electromechanical part 3572 could be disposed elsewhere, such as on a laterally inner side of the drive wheel 3540. It is to be noted that in this embodiment, the electromechanical part 3572 is still rotationally fixed relative to the drive wheel 3540.

The electromechanical part 3574, like in track system 3520, is fixedly connected to the frame assembly 3560. As this the track system 4520 and the motor 3570 operate similarly to the above-described embodiment, its operation will not be re-described. However, one will note that the motor 3570 can assist in adjusting and/or maintaining an orientation of the track system 4520 relative to the vehicle 3521.

Figure 33A:
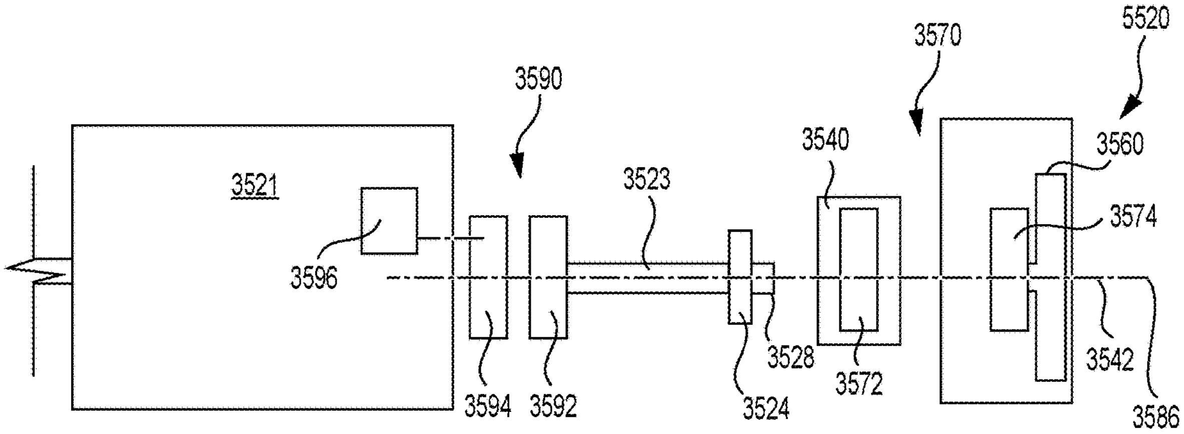
FIGS. 33A, 33B, 34A, and 34B are schematic views of alternative embodiments of a track system having a co-axial motor.

With reference to FIG. 33A, an alternative embodiment of the present technology will be described with reference to a track system 5520. Features of the track system 5520 similar to those of the track system 3520 have been labeled with the same reference numerals, and will not be described in detail herewith.

In this embodiment, the vehicle 3521 is a non-powered vehicle, such that the shaft 3523 is a not driven by a motor of the vehicle 3521. The shaft 3523 is fixedly connected to the drive wheel 3540, such that when the shaft 3523 rotates, the drive wheel 3540 also rotates.

The track system 5520 has, in addition to the motor 3570, a secondary motor 3590. As will become apparent from the foregoing, the motor 3570 is configured to maintain and/or adjust the orientation of the track system 5520 relative to the vehicle 3521, whereas the secondary motor 3590 is configured to propel the track system 5520 (and thus propel the vehicle 3521).

The electromechanical part 3572 of the motor 3570 is fixedly connected to the drive wheel 3540. In some instances, the electromechanical part 3572 could be embedded into the drive wheel 3540. The electromechanical part 3574, on the other hand, is fixedly connected to the frame assembly 3560. The electromechanical part 3574 is connected to the frame assembly 3560.

The motor 3590 includes an electromechanical part 3592, an electromechanical part 3594 and a power unit 3596. The motor 3590 is an axial flux motor, such that the electromechanical parts 3592, 3594 are laterally spaced from one another. It is contemplated that in other embodiments, the motor 3590 could be an axial motor, such that one of the electromechanical parts 3592, 3594 could be disposed within the other one of the electromechanical parts 3592, 3594.

The electromechanical parts 3592, 3594 and the power unit 3596 can be generally similar to the electromechanical parts 3572, 3574 and the power unit 3576, and thus will not be described in detail herewith again.

The electromechanical part 3592 is fixedly connected to the shaft 3523, whereas the electromechanical part 3594 is fixedly connected to a frame of the vehicle 3521. It is contemplated that the electromechanical part 3594 could be disposed elsewhere than the frame. It is to be noted that the motor 3590 is generally co-axial with the motor 3570, such that the motor 3590 is co-axial with the drive wheel 3540.

The motor 3590 can be selectively actuated to cause a rotation of the electromechanical part 3592. Since the electromechanical part 3592 is rotationally fixed to the shaft 3523, rotation of the electromechanical part 3592 results in a rotation of the drive wheel 3540. Thus, the motor 3590 can be operated to cause the vehicle 3521 to move.

It is to be noted that the motor 3570 can, as described above, assist in adjusting and/or maintaining an orientation of the track system 5520 relative to the vehicle 3521. To do so, the corrective torque is applied by the motor 3570 to the drive wheel 3540 in order to adjust and/or maintain an orientation of the track system 5520 relative to the vehicle 3521.

Figure 33B:
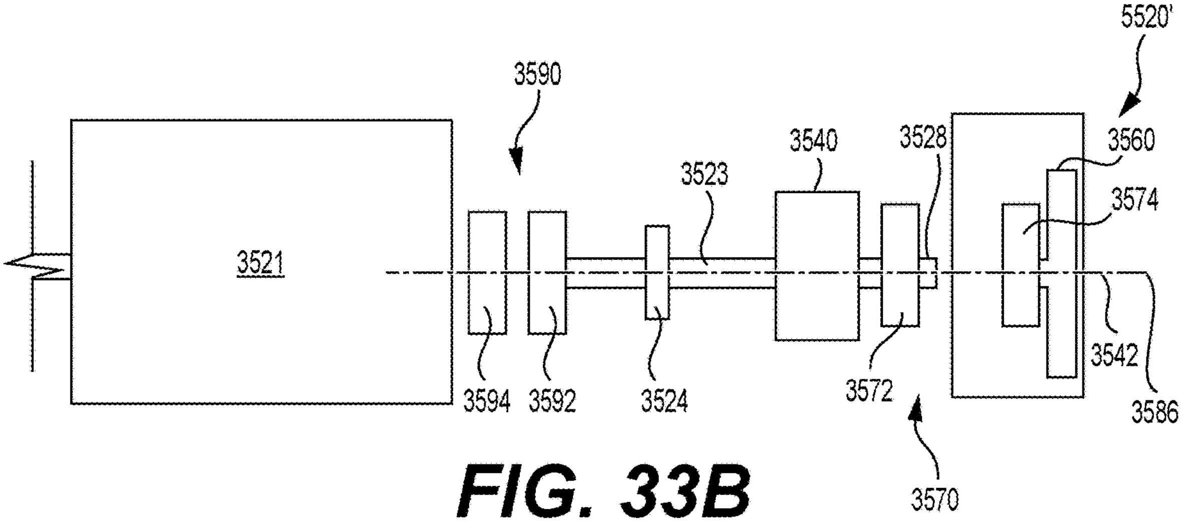

With reference to FIG. 33B, an alternative embodiment of the present technology will be described with reference to a track system 5520'. The track system 5520' differs from the track system 5520 in that the electromechanical part 3572 is connected to the axle 3523 instead of being directly connected to the drive wheel 3540.

Figure 34A:
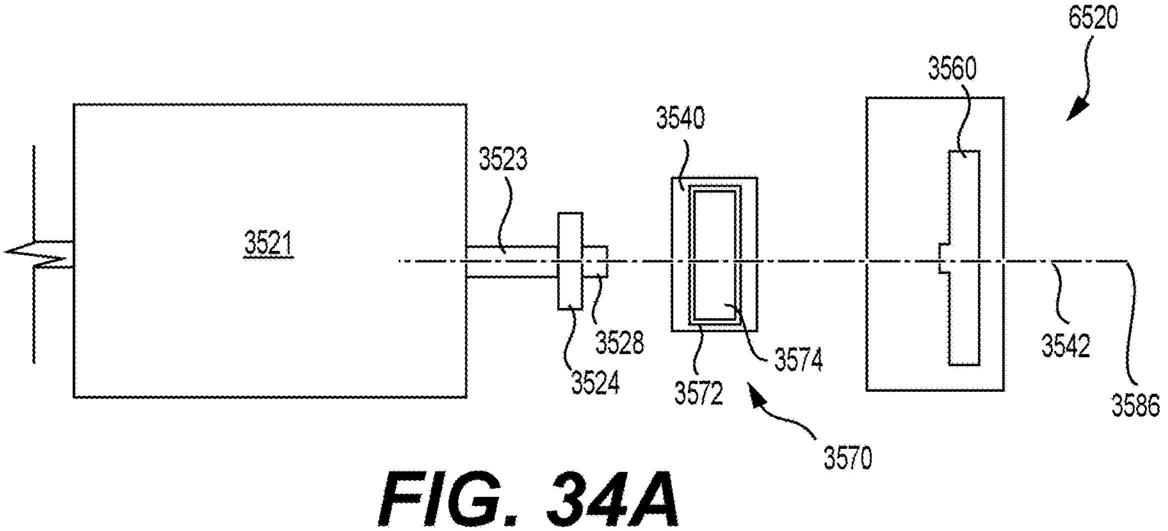

With reference to FIG. 34A, an alternative embodiment of the resent technology will be described with reference to a track system 6520. Features of the track system 6520 similar to those of the track system 3520 have been labeled with the same reference numerals, and will not be described in detail herewith.

In this embodiment, the vehicle 3521 is a non-powered vehicle, such that the shaft 3523 is a not driven by a motor of the vehicle 3521. The shaft 3523 may be fixedly connected to the drive wheel 3540 and rotationally connected to a frame of the vehicle 3521, or may instead be rotationally connected to the drive wheel 3540 and fixedly connected to the vehicle 3521.

As shown in FIG. 34A, the motor 3570 is an radial flux motor, such that the electromechanical part 3574, which is fixedly connected to the frame assembly 3560, is disposed radially inwardly from the electromechanical part 3572, which is rotationally fixed to the drive wheel 3540. The motor 3570 is configured such that when operated, the electromechanical part 3572 rotates about the drive wheel axis 3542. Since the electromechanical part 3572 is rotationally fixed to the drive wheel 3540, the drive wheel 3540 also rotates about the drive wheel axis 3542. Rotation of the drive wheel 3540 can propel the track system 3540, and thus the vehicle 3521. It is to be noted that in this embodiment, the motor 3570 cannot assist in adjusting and/or maintaining an orientation of the track system 6520 relative to the vehicle 3521. In such embodiments, it is contemplated that an anti-rotation device may not be required, or that anti-rotation properties may be provided by another device such as, for example, anti-rotation rods.

Figure 34B:
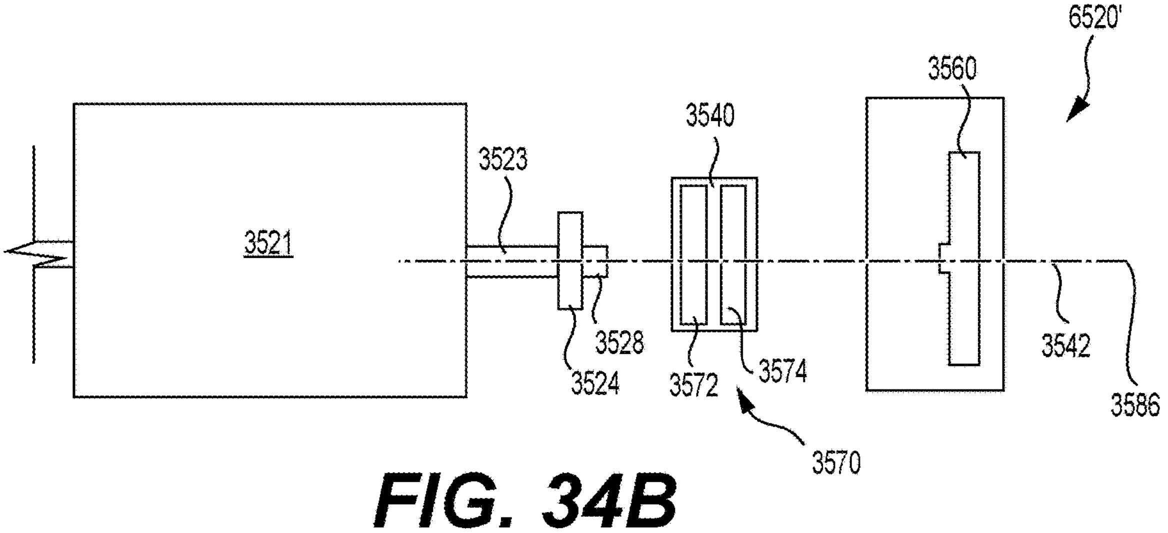

In FIG. 34B, an alternative embodiment of the present technology will be described with reference to a track system 6520'. The track system 6520' differs from the track system 6520 in that the motor 3570 is an axial flux motor. Thus, the electromechanical parts 3572, 3574 are laterally spaced from one another.

Figure 35:
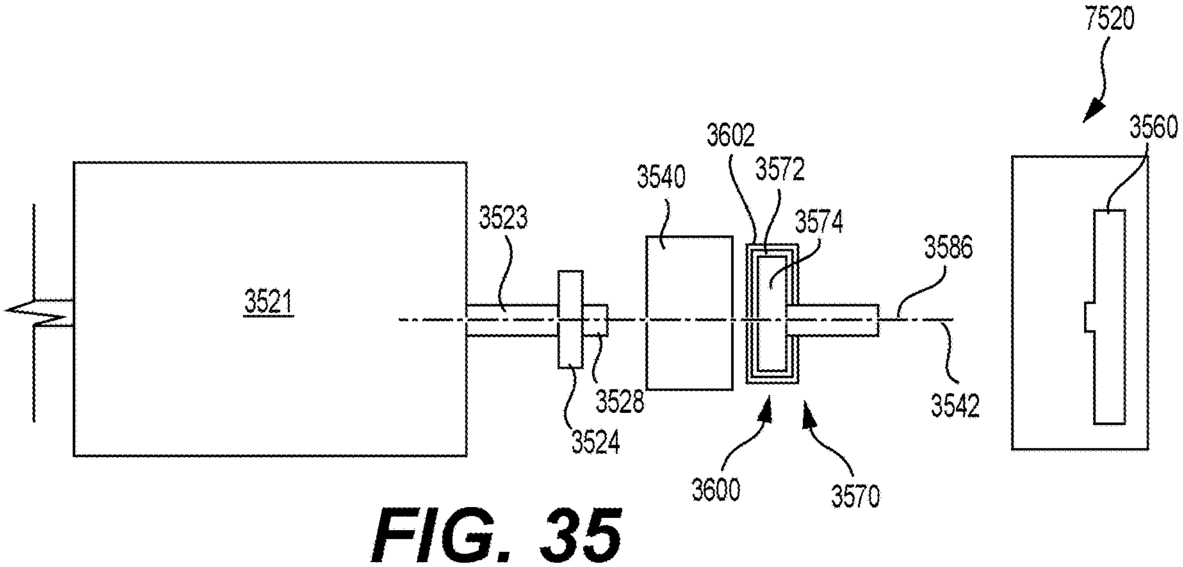
FIG. 35 is a schematic view of an alternative embodiment of a track system having two co-axial motor according to an embodiment of the present technology.
Figure 36A:
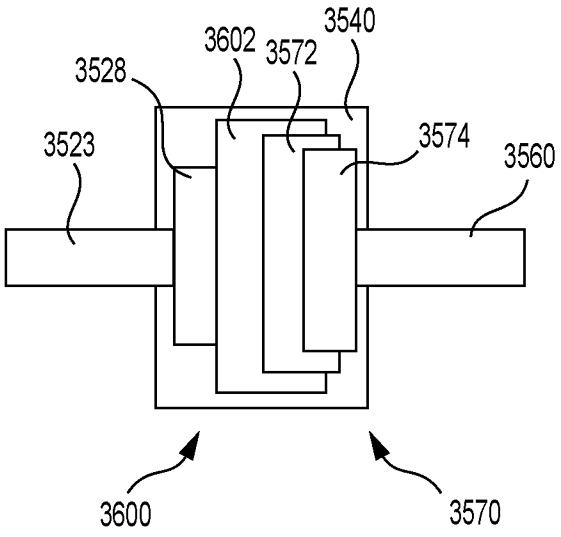
FIG. 36A is a schematic view of the two co-axial motors of the track system of FIG. 35.
Figure 36B:
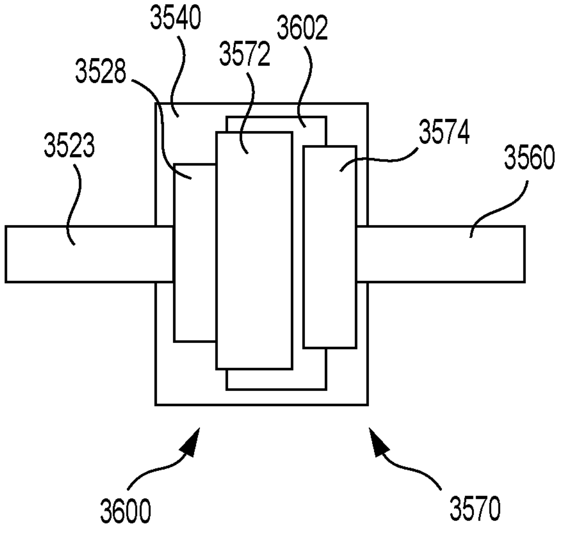
FIG. 36B is a schematic view of an alternative embodiment of the two co-axial motors of the track system of FIG. 35

With reference to FIGS. 35, 36A and 36B, an alternative embodiment of the present technology will be described with reference to a track system 7520. Features of the track system 7520 similar to those of the track system 3520 have been labeled with the same reference numerals, and will not be described in detail herewith.

In this embodiment, the vehicle 3521 is a non-powered vehicle, such that the shaft 3523 is a not driven by a motor of the vehicle 3521.

The track system 7520 has, in addition to the motor 3570, a motor 3600. As will become apparent from the foregoing, one of the motors 3570, 3600 is configured to maintain and/or adjust the orientation of the track system 7520 relative to the vehicle 3521, whereas the other one of the motors 3570, 3600 is configured to propel the track system 7520. The motors 3570, 3600, which are co-axial, have one common electromechanical part (i.e., the motors 3570, 3600 share an electromechanical part). It is contemplated that the motors 3570, 3600 could be axial flux motors or radial flux motors. It is also contemplated that in some embodiments, one of the motors 3570, 3600 could be an axial flux motor and the other one of the motors 3570, 3600 could be a radial flux motor.

Best seen in FIG. 36A, the motor 3570 has the electromechanical part 3574, which is fixedly connected to the frame assembly 3560, and the electromechanical part 3572, which is fixedly connected to the drive wheel 3540. The motor 3600 includes an electromechanical part 3602, which is connected to the vehicle 3521. The electromechanical part 3572 is also considered to be part of the motor 3600.

In operation, when the motor 3600 is actuated, the electromechanical part 3602 and the electromechanical part 3572 are configured such that electromechanical part 3572 rotates about the drive wheel axis 3542, thereby causing rotation of the drive wheel 3540. On the other hand, when the motor 3570 is actuated, the electromechanical parts 3572, 3574 are configured such that a corrective torque is applied to the electromechanical part 3572, thereby causing adjustment in an orientation of the track system 7520 relative to the vehicle 3521.

Referring to FIG. 36B, in an alternative embodiment, the electromechanical part 3574 is fixedly connected to the frame assembly 3560, the electromechanical part 3572 is connected to the shaft 3523, and the electromechanical part 3602 is connected to the drive wheel 3540.

Though not illustrated, other such connections are contemplated. In some instances, the motor 3570 is for propelling the track system 7520, whereas the motor 3600 is for correcting and/or adjusting an orientation of the track system 7520 relative to the vehicle 3521.

It is understood that, as mentioned above, the roles of the motors 3570, 3600 could be inversed. For example, the electromechanical part 3602 could be connected to the frame assembly 3560, and the electromechanical part 3572 could be connected to the vehicle 3521.

CONCLUSION

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

CLAUSES

First clause: According to one aspect, the present technology relates to an angular controlling system for a track system for a vehicle, the track system comprising a track system frame and a wheel assembly rotationally coupled to the track system frame, the vehicle comprising a vehicle frame, the angular controlling system comprising: a motor mounted to the track system frame, the motor being operatively coupled to the wheel assembly, the vehicle frame being at a vehicle angle relative to a ground surface; the track system frame being at a track system angle relative to the ground surface; the track system frame being at a pre-determined track system-vehicle angle (PTSV) relative to the vehicle frame when the vehicle is static, the track system frame being at an actual track system-vehicle angle (ATSV) relative to the vehicle frame when the vehicle is in use; a controller assembly including: an angular monitoring device configured for monitoring the ATSV; and a controller unit configured to perform an operation to the motor based on a comparison between the ATSV and the PTSV.

Second clause: According to one aspect, the present technology relates to the angular controlling system as defined in the first clause, wherein the vehicle angle corresponds to an inclination of the vehicle frame relative to a direction normal to the ground surface.

Third clause: According to one aspect, the present technology relates to the angular controlling system as defined in the first clause, wherein the track system angle corresponds to an inclination of the track system frame relative to a direction normal to a ground surface.

Fourth clause: According to one aspect, the present technology relates to the angular controlling system as defined in the of any one of the first to the third clauses, wherein the vehicle angle is a pitch angle of the vehicle frame.

Fifth clause: According to one aspect, the present technology relates to the angular controlling system as defined in any one of the first to the third clauses, wherein the vehicle angle is a roll angle of the vehicle frame.

Sixth clause: According to one aspect, the present technology relates to the angular controlling system as defined in any one of the first to the third clauses, wherein the vehicle angle is a yaw angle of the vehicle frame.

Seventh clause: According to one aspect, the present technology relates to the angular controlling system as defined in any one of the first to the sixth clauses, wherein the track system angle is a pitch angle of the track system frame.

Eight clause: According to one aspect, the present technology relates to the angular controlling system as defined in any one of the first to the sixth clauses, wherein the track system angle is a roll angle of the track system frame.

Nineth clause: According to one aspect, the present technology relates to the angular controlling system as defined in any one of the first to the sixth clauses, wherein the track system angle is a yaw angle of the track system frame.

Tenth clause: According to one aspect, the present technology relates to the angular controlling system as defined in any one of the first to the nineth clauses, wherein the angular monitoring device is configured to transmit at least one of the track system angle and the vehicle angle to the controller unit.

Eleventh clause: According to one aspect, the present technology relates to the angular controlling system as defined in the tenth clause, wherein the angular monitoring device is configured to transmit at least one of the track system angle and the vehicle angle by a wireless link.

Twelfth clause: According to one aspect, the present technology relates to the angular controlling system as defined in the tenth clause, wherein the angular monitoring device is configured to transmit at least one of the track system angle and the vehicle angle by a wired link.

Thirteenth clause: According to one aspect, the present technology relates to the angular controlling system as defined in any one of the first to the twelfth clauses, wherein the angular monitoring device includes (i) a vehicle angle monitoring device configured to monitor the vehicle angle and (ii) a track system angle monitoring device configured to monitor the track system angle.

Fourteenth clause: According to one aspect, the present technology relates to the angular controlling system as defined in the thirteenth clause, wherein the vehicle angle monitoring device is mounted to the vehicle frame.

Fifteenth clause: According to one aspect, the present technology relates to the angular controlling system as defined in the thirteenth and the fourteenth clauses, wherein the vehicle angle monitoring device includes at least one of: an inclinometer, an accelerometer, and a gyroscope, a pressure sensor, a magnetic sensor, and an encoder.

Sixteenth clause: According to one aspect, the present technology relates to the angular controlling system as defined in any one of the thirteenth to the fifteenth clauses, wherein the track system angle monitoring device is mounted to the track system frame.

Seventeenth Clause: According to one aspect, the present technology relates to the angular controlling system as defined in any one of the thirteenth to the sixteenth clauses, wherein the track system angle monitoring device includes at least one of an inclinometer, an accelerometer, a gyroscope, a pressure sensor, a magnetic sensor, and an encoder operatively coupled to the motor.

Eighteenth clause: According to one aspect, the present technology relates to the angular controlling system as defined in any one of the first to the seventeenth clauses, wherein the controller unit is mounted to the track system frame.

Nineteenth clause: According to one aspect, the present technology relates to the angular controlling system as defined in any one of the first to the seventeenth clauses, wherein the controller unit is mounted to the vehicle frame.

Twentieth clause: According to one aspect, the present technology relates to the angular controlling system as defined in any one of the first to the nineteenth clauses, wherein the controller unit is configured to compare the ATSV with the PTSV.

Twentieth-first clause: According to one aspect, the present technology relates to the angular controlling system as defined in any one of the first to the twentieth clauses, wherein the operation is to selectively actuate the motor for driving the wheel assembly, thereby generating a correcting angular movement of the track system relative to the vehicle.

Twentieth-second clause: According to one aspect, the present technology relates to the angular controlling system as defined in the twenty-first clause, wherein the selectively actuating the motor comprises selectively supplying power to the motor.

Twentieth-third clause: According to one aspect, the present technology relates to the angular controlling system as defined in the twenty-first clause, wherein the correcting angular movement of the track system is about an axis of the wheel assembly.

Twentieth-fourth clause: According to one aspect, the present technology relates to the angular controlling system as defined in any one of the first to the twenty-first clauses, wherein the angular controlling system further comprises a power source operatively connected to the controller unit.

Twentieth-fifth clause: According to one aspect, the present technology relates to the angular controlling system as defined in the twenty-second clause, wherein the power source is a battery integrated to the track system.

Twentieth-sixth clause: According to one aspect, the present technology relates to the angular controlling system as defined in the twenty-second clause, wherein the power source is a battery integrated to the vehicle.

Twentieth-seventh clause: According to one aspect, the present technology relates to the angular controlling system as defined in the twenty-second clause, wherein the vehicle has a battery and the power source is the battery of the vehicle.

Twentieth-eighth clause: According to one aspect, the present technology relates to the angular controlling system as defined in the twenty-second clause, wherein the vehicle has an alternator and the power source is the alternator of the vehicle.

Twentieth clause: According to one aspect, the present technology relates to the angular controlling system as defined in the twenty-first clause, wherein the correcting angular movement of the track system is in a clockwise direction.

Thirtieth clause: According to one aspect, the present technology relates to the angular controlling system as defined in the twenty-first clause, wherein the correcting angular movement of the track system is in a counter-clockwise direction.

Thirty-first clause: According to one aspect, the present technology relates to the angular controlling system as defined in any one of the first to the twenty-fourth clauses, wherein the controller unit is configured to generate a comparison value, the comparison value being a difference between the ATSV and the PTSV, and wherein the controller unit is configured to perform the operation based on the comparison value.

Thirty-second clause: According to one aspect, the present technology relates to the angular controlling system as defined in the twenty-fifth clause, wherein the controller unit is a Proportional Integral Derivative (PID) controller configured to automatically adjust the operation based on the comparison value.

Thirty-third clause: According to one aspect, the present technology relates to the angular controlling system as defined in any one of the first to the twenty-seventh clauses, wherein the motor is an electric motor.

Thirty-fourth clause: According to one aspect, the present technology relates to the angular controlling system as defined in any one of the first to the twenty-seventh clauses, wherein the motor is a generator configured to charge the power source.

Thirty-fifth clause: According to one aspect, the present technology relates to the angular controlling system as defined in any one of the first to the twenty-nineth clauses, wherein the motor has an output shaft parallel to an axle of the wheel assembly.

Thirty-sixth clause: According to one aspect, the present technology relates to the angular controlling system as defined in the thirtieth clause, wherein the output shaft is offset from the axle.

Thirty-seventh clause: According to one aspect, the present technology relates to the angular controlling system as defined in the thirtieth clause, wherein the output shaft is coaxial with the axle.

Thirty-eighth clause: According to one aspect, the present technology relates to the angular controlling system as defined in any one of the first to the twenty-nineth clauses, wherein the motor has an output shaft perpendicular to an axle of the wheel assembly.

Thirty-nineth clause: According to one aspect, the present technology relates to the angular controlling system as defined in any one of the first to the thirty-first clauses, wherein the angular controlling system further comprises a housing configured to receive at least one of the motor and the angular controlling device.

Fortieth clause: According to one aspect, the present technology relates to the angular controlling system as defined in the thirty-fourth clause, wherein the housing is mounted to the track system frame.

Forty-first clause: According to one aspect, the present technology relates to the angular controlling system as defined in the thirty-fifth clause, wherein the housing is removable from the track system frame.

Forty-second clause: According to one aspect, the present technology relates to the angular controlling system as defined in the thirty-fourth clause, wherein the housing includes a removable cover for providing access to the at least one of the motor and the angular controlling device.

Forty-third clause: According to one aspect, the present technology relates to the angular controlling system as defined in any one of the first to the thirty-seventh clauses, wherein the angular controlling system further comprises a user interface configured to receive a user input for adjusting at least one parameter of the angular controlling system.

Forty-fourth clause: According to one aspect, the present technology relates to the angular controlling system as defined in the thirty-eighth clause, wherein the at least one parameter is the PTSV.

Forty-fifth clause: According to one aspect, the present technology relates to the angular controlling system as defined in the thirty-eighth clause, wherein the user interface is further configured to display a warning notification to the user when the track system angle is equal to a threshold value.

Forty-sixth clause: According to one aspect, the present technology relates to the angular controlling system as defined in the fourteenth clause, wherein the controller unit automatically performs the operation.

Forty-seventh clause: According to one aspect, the present technology relates to a track system for a vehicle, the vehicle comprising a vehicle frame, the track system comprising: a track system frame defining a longitudinal center plane of the track system; a wheel assembly rotationally connected to the frame; an endless track surrounding the track system frame and the wheel assembly.

Forty-eighth clause: According to one aspect, the present technology relates to a vehicle, comprising: a vehicle frame; a seat disposed on the vehicle frame; a steering system operatively connected to the vehicle frame; a vehicle motor; and a track system operatively connected to the vehicle motor for driving the track system, the track system including: a track system frame defining a longitudinal center plane of the track system; a wheel assembly rotationally connected to the frame; an endless track surrounding the track system frame and the wheel assembly; an angular control system including: a motor mounted to the track system frame instead of the vehicle frame, the motor being operatively coupled to the wheel assembly, the vehicle frame being at a vehicle angle relative to a ground surface; the track system frame being at a track system angle relative to the ground surface; the track system frame being at a pre-determined track system-vehicle angle (PTSV) relative to the vehicle frame when the vehicle is static, the track system frame being at an actual track system-vehicle angle (ATSV) relative to the vehicle frame when the vehicle is in operation; a controller assembly including: an angular monitoring device configured for monitoring the ATSV; and a controller unit configured to perform an operation to the motor based on a comparison between the ATSV and the PTSV.

Forty-nineth clause: According to one aspect, the present technology relates to a method for controlling an inclination of a track system relative to a vehicle, the track system comprising a track system frame, the vehicle comprising a vehicle frame, the method being executable by a controller unit, the method comprising: acquiring, by the controller unit, a first signal indicative of a vehicle angle of the vehicle frame when the vehicle is in use; acquiring, by the controller, a second signal indicative of a track system angle of the track system frame when the vehicle is in use; determining, by the controller, an actual track system-vehicle angle (ATSV) between the vehicle frame and the track system frame based on a combination of the first signal and the second signal; and generating, by the controller unit, a comparison value between a pre-determined track system-vehicle angle (PTSV) and the ATSV, triggering, by the controller unit based on the comparison value, a motor to perform a correcting movement on the track system frame relative to the vehicle frame, the PTSV being based on a combination of the first signal and the second signal when the vehicle is static.

Fiftieth clause: According to one aspect, the present technology relates to the method as defined in the forty-nineth clause, wherein the method further comprises, updating by the controller unit, the PTSV to an updated PTSV value based on an input signal, wherein generating the comparison value comprises generating the comparison value between the updated PTSV and the ATSV.

Fifty-first clause: According to one aspect, the present technology relates to an angular controlling system for a track system for a vehicle, the track system comprising a track system frame and a wheel assembly rotationally coupled to the track system frame, the vehicle comprising a vehicle frame, the angular controlling system comprising: a transmission assembly including: a motor mounted to the track system frame; a first transmission part being operatively coupled to the wheel assembly and defining a first rotational speed; a second transmission part being operatively coupled to the motor and defining a second rotational speed; the first and second transmission parts being drivingly engaged with each other, the first rotational speed and the second rotational speed defining a predetermined speed ratio (PSR) when the vehicle is static, the first rotational speed and the second rotation speed defining an actual speed ratio (ASR) when the vehicle is in use; and a controller assembly including: a rotational speed monitoring device configured for monitoring the ASR; and a controller unit configured to perform an operation to the motor based on a comparison between the PSR and the ASR.

Fifty-second clause: According to one aspect, the present technology relates to the angular controlling system as defined in the fifty-first clause, wherein the first and second transmission parts are directly engaged with each other.

Fifty-third clause: According to one aspect, the present technology relates to the angular controlling system as defined in the fifty-first clause, wherein the first and second transmission parts are indirectly engaged with each other by a transmission link.

Fifty-fourth clause: According to one aspect, the present technology relates to the angular controlling system as defined in the fifty-third clause, wherein the transmission link is at least one of belt, a chain, or an intermediate pinion.

Fifty-fifth clause: According to one aspect, the present technology relates to the angular controlling system as defined in any one of the fifty-first to the fifty-fourth clauses, wherein the first transmission part is a first gear and the second transmission part is a second gear.

Fifty-sixth clause: According to one aspect, the present technology relates to the angular controlling system as defined in any one of the fifty-first to the fifty-fifth clauses, wherein the first and second transmission parts are parts of a planetary gear box.

Fifty-seventh clause: According to one aspect, the present technology relates to the angular controlling system as defined in any one of the fifty-first to the fifty-sixth clauses, wherein the PSR is 1.

Fifty-eighth clause: According to one aspect, the present technology relates to the angular controlling system as defined in any one of the fifty-first to the fifty-sixth clauses, wherein the PSRi s greater than 1.

Fifty-nineth clause: According to one aspect, the present technology relates to the angular controlling system as defined in any one of the fifty-first to the fifty-sixth clauses, wherein the PSR is lower than 1.

Sixtieth clause: According to one aspect, the present technology relates to the angular controlling system as defined in any one of the fifty-first to the fifty-nineth clauses, wherein the PSR is defined by one of: a number of teeth of the first transmission part over the number of teeth of the second transmission part; and a first diameter of the first transmission part over a second diameter of the second transmission part.

Sixty-first clause: According to one aspect, the present technology relates to the angular controlling system as defined in any one of the fifty-first to the sixtieth clauses, wherein the rotational speed monitoring device is configured to transmit the ASR by a wireless link to the controller unit.

Sixty-second clause: According to one aspect, the present technology relates to the angular controlling system as defined in any one of the fifty-first to the sixtieth clauses, wherein the rotational speed monitoring device is configured to transmit the ASR by a wired link to the controller unit.

Sixty-third clause: According to one aspect, the present technology relates to the angular controlling system as defined in any one of the fifty-first to the sixty-second clauses, wherein the controller unit is configured to generate a comparison value.

Sixty-fourth clause: According to one aspect, the present technology relates to the angular controlling system as defined in sixty-third clause, wherein the comparison value is a difference between the ASR with the pre-determined speed ratio, and wherein the controller unit is configured to perform the operation based on the comparison value.

Sixty-fifth clause: According to one aspect, the present technology relates to the angular controlling system as defined in the sixty-third or the sixty-fourth clauses, wherein the controlling unit is a Proportional Integral Derivative (PID) controller configured to automatically adjust the operation based on the comparison value.

Sixty-sixth clause: According to one aspect, the present technology relates to the angular controlling system as defined in any one of the fifty-first to the sixty-fifth clauses, wherein the motor is an electric motor.

Sixty-seventh clause: According to one aspect, the present technology relates to the angular controlling system as defined in the sixty-fifth clause, wherein the motor is a generator configured to charge the power source.

Sixty-eight clause: According to one aspect, the present technology relates to the angular controlling system as defined in any one of the fifty-first to the sixty-seventh clauses, wherein the motor has an output shaft parallel to an axle of the wheel assembly.

Sixty-nineth clause: According to one aspect, the present technology relates to the angular controlling system as defined in the sixty-seventh clause, wherein the output shaft is offset from the axle of the wheel.

Seventieth clause: According to one aspect, the present technology relates to the angular controlling system as defined in the sixty-seventh clause, wherein the output shaft is coaxial with the axle of the wheel.

Seventy-first clause: According to one aspect, the present technology relates to the angular controlling system as defined in any one of the first to the sixty-seventh clauses, wherein the motor has an output shaft perpendicular to the axle of the wheel.

Seventy-second clause: According to one aspect, the present technology relates to the angular controlling system as defined in any one of the first to the seventy-first clauses, wherein the operation is to selectively actuate the motor for driving the second transmission part, thereby generating a correcting angular movement of the track system relative to the vehicle.

Seventy-third clause: According to one aspect, the present technology relates to the angular controlling system as defined in the seventy-second clause, wherein the selectively actuating the motor comprises selectively supplying power to the motor.

Seventy-fourth clause: According to one aspect, the present technology relates to the angular controlling system as defined in the seventy-second clause, wherein the correcting angular movement of the track system is an angular movement about an axis of the wheel assembly.

Seventy-fifth clause: According to one aspect, the present technology relates to the angular controlling system as defined in the seventy-second clause, wherein the correcting angular movement of the track system is in a clockwise direction.

Seventy-sixth clause: According to one aspect, the present technology relates to the angular controlling system as defined in the seventy-second clause, wherein the correcting angular movement of the track system is in a counter-clockwise direction.

Seventy-seventh clause: According to one aspect, the present technology relates to the angular controlling system as defined in any one of the fifty-first to the seventy-sixth clauses, wherein the wheel assembly is a drive wheel assembly.

Seventy-eighth clause According to one aspect, the present technology relates to the angular controlling system as defined in any one of the fifty-first to the seventy-seventh clauses, wherein the angular controlling system further comprises a power source operatively connected to the controller unit.

Seventy-nineth clause: According to one aspect, the present technology relates to the angular controlling system as defined in the seventy-eighth clause, wherein the power source is a battery integrated to the track system.

Eightieth clause: According to one aspect, the present technology relates to the angular controlling system as defined in the seventy-eighth clause, wherein the power source is a battery integrated to the vehicle.

Eighty-first clause: According to one aspect, the present technology relates to the angular controlling system as defined in the seventy-eighth clause, wherein the vehicle has a battery and the power source is the battery of the vehicle.

Eighty-second clause: According to one aspect, the present technology relates to the angular controlling system as defined in the seventy-eighth clause wherein the vehicle has an alternator and the power source is the alternator of the vehicle.

Eighty-third clause: According to one aspect, the present technology relates to the angular controlling system as defined in any one of the fifty-first to the eighty-second clauses, wherein the angular controlling system further comprises a housing attached to the track system frame and configured to receive at least one of the motor and the controller unit.

Eighty-fourth clause: According to one aspect, the present technology relates to the angular controlling system as defined in the eight-eighth clause, wherein the housing is removably attached to track system frame.

Eighty-fifth clause: According to one aspect, the present technology relates to the angular controlling system as defined in the eight-eighth clause, wherein the housing includes a removable cover for providing access to the at least one of the motor and the controller unit.

Eighty-sixth clause: According to one aspect, the present technology relates to the angular controlling system as defined in in any one of the fifty-first to the eighty-fifth clauses, wherein the angular controlling system further comprises a user interface configured to receive a user input for adjusting at least one parameter of the angular controlling system.

Eighty-seventh clause: According to one aspect, the present technology relates to the angular controlling system as defined in the eighty-sixth clause, wherein the at least one parameter is the PSR.

Eighty-eighth clause: According to one aspect, the present technology relates to the angular controlling system as defined in the eighty-sixth clause, wherein the user interface is further configured to display a warning notification to the user when the ASR is equal to a threshold value.

Eighty-nineth clause: According to one aspect, the present technology relates to the angular controlling system as defined in the eighty-eighth clause, wherein the controller unit automatically performs the operation.

Ninetieth clause: According to one aspect, the present technology relates to the angular controlling system as defined in any one of the fifty-first to the eighty-nineth clauses, wherein the transmission assembly is mounted to the track system frame.

Ninety-first clause: According to one aspect, the present technology relates to the angular controlling system as defined in any one of the fifty-first to the ninetieth clauses, wherein the controller assembly is mounted to the track system frame.

Ninety-second clause: According to one aspect, the present technology relates to a track system for a vehicle, the vehicle comprising a vehicle frame, the track system comprising: a track system frame defining a longitudinal center plane of the track system; a wheel assembly rotationally connected to the frame; an endless track surrounding the track system frame and the wheel assembly; the angular controlling system as defined in any one of the fifty-first to the ninety-first clauses.

Ninety-third clause: According to one aspect, the present technology relates to a vehicle, comprising: a vehicle frame; a seat disposed on the vehicle frame; a steering system operatively connected to the vehicle frame; a vehicle motor; and a track system operatively connected to the vehicle motor for driving the track system, the track system including: a track system frame defining a longitudinal center plane of the track system; a wheel assembly rotationally connected to the frame; an endless track surrounding the track system frame and the wheel assembly; an angular control system including: a transmission assembly having: an other motor mounted to the track system frame instead of the vehicle frame; a first transmission part being operatively coupled to the wheel assembly and defining a first rotational speed; a second transmission part being operatively coupled to the other motor and defining a second rotational speed; the first and second transmission parts being drivingly engaged with each other, the first rotational speed and the second rotational speed defining a pre-determined speed ratio (PSR) when the vehicle is static, the first rotational speed and the second rotation speed defining an actual speed ratio (ASR) when the vehicle is in operation; and a controller assembly including: a rotational speed monitoring device configured for monitoring the ASR; and a controller unit configured to perform an operation to the other motor based on a comparison between the PSR and the ASR.

Ninety-fourth clause: According to one aspect, the present technology relates to a method for controlling an inclination of a track system relative to a vehicle, the track system including a transmission assembly, the method being executable by a controller unit, the method comprising: acquiring, by the controller unit, a first signal indicative of a first rotational speed of a first rotational component of the transmission assembly when the vehicle is in operation; acquiring, by the controller, a second signal indicative of a second rotational speed of a second rotational component of the transmission assembly when the vehicle is in operation; generating, by the controller, an actual speed ratio (ASR) between the first rotational component and the second rotational component based on a combination of the first signal and the second signal; generating, by the controller, a comparison value between a pre-determined speed ratio (PSR) and the ASR, the PSR being based on a combination of the first signal and the second signal when the vehicle is static; triggering, by the controller based on the comparison value, a motor of the transmission assembly to further drive at least one of the first rotational component and the second rotational component, thereby generating a correcting angular movement of the track system relative to the vehicle.

Ninety-fifth clause: According to one aspect, the present technology relates to the method as defined in the ninety-fourth clause, wherein the first rotational speed is a rotational speed of a wheel assembly of the track system, and the second rotational speed is a rotational speed of the motor.

Ninety-sixth clause: According to one aspect, the present technology relates to the method as defined in the ninety-fourth clause, wherein the first rotational component is a first gear coupled to the wheel assembly, and the second rotation component is a second gear coupled to the motor.

Ninety-seventh clause: According to one aspect, the present technology relates to a track system connectable to a vehicle, the track system comprising: a frame; a drive wheel rotationally connected to the frame assembly and operatively connectable to a shaft of the vehicle, the drive wheel being rotatable about a drive wheel axis; an electric motor co-axial with the drive wheel axis, the electric motor comprising: a first electromechanical part fixedly connected to the frame; a second electromechanical part operatively connected to the first electromechanical part, and operatively connected to the drive wheel; a power unit for powering the electric motor; and in response to the electric motor being operated, the first electromechanical part rotates relative to the second electromechanical part about the drive wheel axis, causing the frame assembly to move from a first position to a second position, and an endless track drivingly engaged with the drive wheel, and the endless track surrounding the frame assembly and the drive wheel.

Ninety-eighth clause: According to one aspect, the present technology relates to the track system as defined in the ninety-seventh clause, wherein the second electromechanical part is fixedly connected to the drive wheel.

Ninety-nineth clause: According to one aspect, the present technology relates to the track system as defined in the ninety-seventh clause, wherein the second electromechanical part is embedded in the drive wheel.

100th clause: According to one aspect, the present technology relates to the track system as defined in the ninety-seventh clause, wherein the second electromechanical part is removably connected to the drive wheel.

101st clause: According to one aspect, the present technology relates to the track system as defined in the ninety-seventh clause, wherein the second electromechanical part is removably connected to the drive wheel by fasteners.

102nd clause: According to one aspect, the present technology relates to the track system as defined in the ninety-seventh clause, wherein the second electromechanical part is configured to fixedly connect to the shaft of the vehicle.

103rd clause: According to one aspect, the present technology relates to the track system as defined in the ninety-seventh clause, wherein the second electromechanical part is configured to removably connect to the shaft of the vehicle.

104th clause: According to one aspect, the present technology relates to the track system as defined in any one of the 97th to the 103th clauses, wherein at least one of the first and second electromechanical parts includes at least one of: permanent magnets and coil magnets.

105th clause: According to one aspect, the present technology relates to the track system as defined in the 97th to the 104th clauses, wherein the electric motor is communicatively connected to a controller, the controller being configured to transmit a signal to the electric motor for operating the electric motor.

106th clause: According to one aspect, the present technology relates to the track system as defined in any one of the 97th to the 105th clause, wherein the electric motor is a first electric motor, and the track system further includes a second electric motor co-axial with the drive wheel axis, the second electric motor comprising: a third electromechanical part configured to be fixedly connected to the vehicle; and a fourth electromechanical part operatively connected to the third electromechanical part and operatively connected to the drive wheel; in response to the second electric motor being operated, the third and fourth electromechanical parts move relative to one another, causing the drive wheel assembly to rotate about the drive wheel axis.

107th clause: According to one aspect, the present technology relates to the track system as defined in the 106th clause, wherein the third electromechanical part is configured to fixedly connect to a frame of the vehicle.

108th clause: According to one aspect, the present technology relates to the track system as defined in the 106th clause, wherein the fourth electromechanical part is fixedly connected to the drive wheel.

109th clause: According to one aspect, the present technology relates to the track system as defined in the 106th clause, wherein the fourth electromechanical part is embedded in the drive wheel.

110th clause: According to one aspect, the present technology relates to the track system as defined in the 106th clause, wherein the fourth electromechanical part is removably connected to the drive wheel.

111th clause: According to one aspect, the present technology relates to the track system as defined in the 106th clause, wherein the fourth electromechanical part is removably connected to the drive wheel by fasteners.

112th clause: According to one aspect, the present technology relates to the track system as defined in the 106th clause, wherein the fourth electromechanical part is configured to fixedly connect to the shaft of the vehicle.

113th clause: According to one aspect, the present technology relates to the track system as defined in the 106th clause, wherein the fourth electromechanical part is configured to removably connect to the shaft of the vehicle.

114th clause: According to one aspect, the present technology relates to the track system as defined in any one of the 106th to the 113th clauses, wherein at least one of the third and fourth electromechanical parts includes at least one of permanent magnets and coil magnets.

115th clause: According to one aspect, the present technology relates to the track system as defined in the 97th clause, further comprising a third electromechanical part operatively connected to the second electromechanical part, and configured to connect to the vehicle, the second and third electromechanical parts forming a second motor, and in response to the second motor being actuated, a torque being applied to the drive wheel.

116th clause: According to one aspect, the present technology relates to a track system connectable to a vehicle, the track system comprising: a frame assembly; a drive wheel rotationally connected to the frame assembly and operatively connectable to a shaft of the vehicle, the drive wheel being rotatable about a drive wheel axis; an electric motor comprising: a first electromechanical part; and a second electromechanical part operatively connected to the first electromechanical part, and operatively connected to the drive wheel; in response to the electric motor being operated, the second electromechanical parts rotates about the drive wheel axis, causing rotation of the drive wheel; and an endless track in driving engagement with the drive wheel, and the endless track surrounding the frame assembly and the drive wheel.

117th clause: According to one aspect, the present technology relates to the track system connectable to the track system of the 116th clause, wherein the first electromechanical part is connected to the frame assembly.

118th clause: According to one aspect, the present technology relates to the track system connectable to the track system of the 116th clause, wherein the first electromechanical part is configured to connect to the vehicle.

119th clause: According to one aspect, the present technology relates to the track system connectable to the track system of any one of the 116th to the 118th clauses, wherein the second electromechanical part is fixedly connected to the drive wheel.

120th clause: According to one aspect, the present technology relates to the track system connectable to the track system of any one of the 116th to the 118th clauses, wherein the second electromechanical part is embedded in the drive wheel.

121th clause: According to one aspect, the present technology relates to the track system connectable to the track system of any one of the 116th to the 118th clauses, wherein the second electromechanical part is removably connected to the drive wheel.

122th clause: According to one aspect, the present technology relates to the track system connectable to the track system of any one of the 116th to the 118th clauses, wherein the second electromechanical part is removably connected to the drive wheel by fasteners.

123th clause: According to one aspect, the present technology relates to the track system connectable to the track system of any one of the 116th to the 118th clauses, wherein the second electromechanical part is configured to fixedly connect to the shaft of the vehicle.

124th clause: According to one aspect, the present technology relates to the track system connectable to the track system of any one of the 116th to the 118th clauses, wherein the second electromechanical part is configured to removably connect to the shaft of the vehicle.

125th clause: According to one aspect, the present technology relates to the track system connectable to the track system of any one of the 116th to the 118th clauses, wherein the second electromechanical part is connected to the drive wheel by fasteners.

126th clause: According to one aspect, the present technology relates to the track system connectable to the track system of any one of the 116th to the 118th clauses, wherein the second electromechanical part is embedded in the drive wheel.

127th clause: According to one aspect, the present technology relates to the track system connectable to the track system of any one of the 116th to the 118th clauses, wherein at least one of the first and second electromechanical parts includes at least one of: permanent magnets and coil magnets.

128th clause: According to one aspect, the present technology relates to the track system connectable to the track system of any one of the 116th to the 127th clauses, wherein the electric motor is communicatively connected to a controller, the controller being configured to transmit a signal to the electric motor for operating the electric motor.

129th clause: According to one aspect, the present technology relates to the track system connectable to the track system of any one of the 116th to the 128th clauses, further comprising a third electromechanical part operatively connected to the second electromechanical part, and configured to connect to the frame assembly, the second and third electromechanical parts forming a second motor, and in response to the second motor being actuated, a torque being applied to the drive wheel.

130th clause: According to one aspect, the present technology relates to a track system connectable to the track system of any one of the 116th to the 129th clauses, wherein the electric motor is a first electric motor, and the track system further includes a second electric motor comprising: a third electromechanical part connected to the frame and is fixed relative to the frame assembly; and a fourth electromechanical part operatively connected to the third electromechanical part, in response to the electric motor being operated, the third and fourth electromechanical parts move relative to one another, causing the frame assembly to move from a first position to a second position.

131th clause: According to one aspect, the present technology relates to the track system connectable to the track system of any one of the 116th to the 129th clauses, further including at least one of: an idler wheel assembly, and a support wheel assembly.

132th clause: According to one aspect, the present technology relates to a computer-implemented method of controlling angular movement of a track system, the track system comprising a frame, the track system being operatively connected to a vehicle, the method being executable by a processor, the method comprising: determining, by the processor, based on a first signal that an actual angular position of the track system is to be changed to a second angular position, the track system in the second angular position having a different contact patch on a ground surface than when in the actual angular position; and sending, by the processor, a second signal to a motor for performing a corrective angular movement of the track system, the motor being mounted to the frame, the corrective movement for changing the actual angular position of the track system to the second angular position.

133th clause: According to one aspect, the present technology relates to the method as defined in the 132th clause, wherein the track system in the second angular position has a smaller contact patch on a ground surface than when in the actual angular position.

134th clause: According to one aspect, the present technology relates to the method as defined in the 132th or the 133th clause, wherein the method further comprises acquiring, by the processor, the first signal indicative of an actual steering angle of the track system, the determining being executed in response to a comparison between the actual steering angle and a steering angle threshold.

135th clause: According to one aspect, the present technology relates to the method as defined in the 133th clause, wherein the method further comprises acquiring, by the processor, a third signal indicative of an actual speed of the vehicle, the determining being executed further in response to a comparison of the actual speed against a speed threshold.

136th clause: According to one aspect, the present technology relates to the method as defined in any one of the 132th or the 135th clauses, wherein the method further comprises acquiring, by the processor, the first signal from a user-interface component, the user-interface component having generated the first signal in response to a user input.

137th clause: According to one aspect, the present technology relates to the method as defined in any one of the 132th or the 136th clauses, wherein the track system has a different approach angle in the second angular position than in the actual angular position.

138th clause: According to one aspect, the present technology relates to the method as defined in any one of the 132th or the 137th clauses, wherein the track system has a smaller approach angle in the second angular position than in the actual angular position.

139th clause: According to one aspect, the present technology relates to the method as defined in the 137th clause, wherein the track system has a larger approach angle in the second angular position than in the actual angular position.

140th clause: According to one aspect, the present technology relates to the method as defined in any one of the 132th or the 139th clauses, wherein the track system is a front track system of the vehicle.

141th clause: According to one aspect, the present technology relates to the method as defined in any one of the 132th or the 140th clauses, wherein the track system is a rear track system of the vehicle.

142th clause: According to one aspect, the present technology relates to the method as defined in any one of the 132th or the 141th clauses, wherein the track system is a left track system of the vehicle.

143th clause: According to one aspect, the present technology relates to the method as defined in any one of the 132th or the 141th clauses, wherein the track system is a right track system of the vehicle.

144th clause: According to one aspect, the present technology relates to the method as defined in any one of the 132th or the 143th clauses, wherein the vehicle is a harvesting vehicle.

145th clause: According to one aspect, the present technology relates to the method as defined in any one of the 132th or the 144th clauses, wherein the vehicle is an articulated vehicle.

146th clause: According to one aspect, the present technology relates to a processor for controlling angular movement of a track system, the track system comprising a frame, the track system being operatively connected to a vehicle, the processor being configured to: determine based on a first signal that an actual angular position of the track system is to be changed to a second angular position, the track system in the second angular position having a different contact patch on a ground surface than when in the actual angular position; and send a second signal to a motor for performing a corrective angular movement of the track system, the motor being mounted to the frame, the corrective movement for changing the actual angular position of the track system to the second angular position.

147th clause: According to one aspect, the present technology relates to the processor as defined in the 146th clause, wherein the track system in the second angular position has a smaller contact patch on a ground surface than when in the actual angular position.

148th clause. According to one aspect, the present technology relates to the processor as defined in any one of the 146th or the 147th clauses, wherein the processor is further configured to acquire the first signal indicative of an actual steering angle of the track system, the determining being executed in response to a comparison between the actual steering angle and a steering angle threshold.

149th clause: According to one aspect, the present technology relates to the processor as defined in the 148th clause, wherein the processor is further configured to acquire a third signal indicative of an actual speed of the vehicle, the processor being further configured to determine that the actual angular position of the track system is to be changed to the second angular position in response to a comparison of the actual speed against a speed threshold.

150th clause: According to one aspect, the present technology relates to the processor as defined in any one of the 146th or the 149th clauses, wherein the processor is further configured to acquire the first signal from a user-interface component, the user-interface component having generated the first signal in response to a user input.

151th clause: According to one aspect, the present technology relates to the processor as defined in any one of the 146th or the 150th clauses, wherein the track system has a different approach angle in the second angular position than in the actual angular position.

152th clause: According to one aspect, the present technology relates to the processor as defined in any one of the 146th or the 147th clauses, wherein the track system has a smaller approach angle in the second angular position than in the actual angular position.

153th clause: According to one aspect, the present technology relates to the processor as defined in the 152th clause, wherein the track system has a larger approach angle in the second angular position than in the actual angular position.

154th clause: According to one aspect, the present technology relates to the processor as defined in any one of the 146th or the 153th clauses, wherein the track system is a front track system of the vehicle.

155th clause: According to one aspect, the present technology relates to the processor as defined in any one of the 146th or the 153th clauses, wherein the track system is a rear track system of the vehicle.

156th clause: According to one aspect, the present technology relates to the processor as defined in any one of the 146th or the 155th clauses, wherein the track system is a left track system of the vehicle.

157th clause: According to one aspect, the present technology relates to the processor as defined in any one of the 146th or the 156th clauses, wherein the track system is a right track system of the vehicle.

158th clause: According to one aspect, the present technology relates to the processor as defined in any one of the 146th or the 147th clauses, wherein the vehicle is a harvesting vehicle.

159th clause: According to one aspect, the present technology relates to the processor as defined in any one of the 146th or the 158th clauses, wherein the vehicle is an articulated vehicle.

160th clause: According to one aspect, the present technology relates to a computer-implemented method of controlling angular movement of a track system, the track system comprising a frame, the track system being operatively connected to a vehicle, the method being executable by a processor, the method comprising: determining, by the processor, based on a first signal that an actual angular position of the track system is to be changed to a second angular position, the track system in the second angular position having a different approach angle than when in the actual angular position; and sending, by the processor, a second signal to a motor for performing a corrective angular movement of the track system, the motor being mounted to the frame, the corrective movement for changing the actual angular position of the track system to the second angular position.

161th clause: According to one aspect, the present technology relates to the method as defined in the 160th clause, wherein the track system in the second angular position has a larger approach angle than when in the actual angular position.

162th clause: According to one aspect, the present technology relates to the method as defined in the 160th clause, wherein the track system in the second angular position has a smaller approach angle than when in the actual angular position.

163th clause: According to one aspect, the present technology relates to the method as defined in any one of the 160th to the 162nd clauses, wherein the method further comprises acquiring, by the processor, the first signal indicative of a presence of an obstacle in front of the track system.

164th clause: According to one aspect, the present technology relates to the method as defined in any one of the 160th to the 163rd clauses, wherein the method further comprises acquiring, by the processor, the first signal from a user-interface component, the user-interface component having generated the first signal in response to a user input.

165th clause: According to one aspect, the present technology relates to the method as defined in any one of the 160th to the 164th clauses, wherein the track system has a different contact patch on a ground surface in the second angular position than in the actual angular position.

166th clause: According to one aspect, the present technology relates to the method as defined in any one of the 160th to the 165th clauses, wherein the track system is a front track system of the vehicle.

167th clause: According to one aspect, the present technology relates to the method as defined in any one of the 160th to the 165th clauses, wherein the track system is a rear track system of the vehicle.

168th clause: According to one aspect, the present technology relates to the method as defined in any one of the 160th to the 167th clauses, wherein the track system is a left track system of the vehicle.

169th clause: According to one aspect, the present technology relates to the method as defined in any one of the 160th to the 167th clauses, wherein the track system is a right track system of the vehicle.

170th clause: According to one aspect, the present technology relates to the method as defined in any one of the 160th to the 169th clauses, wherein the vehicle is a harvesting vehicle.

171th clause: According to one aspect, the present technology relates to the method as defined in any one of the 160th to the 170th clauses, wherein the vehicle is an articulated vehicle.

172th clause: According to one aspect, the present technology relates to a processor for controlling angular movement of a track system, the track system comprising a frame, the track system being operatively connected to a vehicle, the processor being configured to: determine based on a first signal that an actual angular position of the track system is to be changed to a second angular position, the track system in the second angular position having a different approach angle than when in the actual angular position; and send a second signal to a motor for performing a corrective angular movement of the track system, the motor being mounted to the frame, the corrective movement for changing the actual angular position of the track system to the second angular position.

173th clause: According to one aspect, the present technology relates to the processor as defined in the 172th clause, wherein the track system in the second angular position has a larger approach angle than when in the actual angular position.

174th clause: According to one aspect, the present technology relates to the processor as defined in the 172th clause, wherein the track system in the second angular position has a smaller approach angle than when in the actual angular position.

175th clause: According to one aspect, the present technology relates to the processor as defined in any one of the 172th to the 174th clauses, wherein the processor is further configured to acquire the first signal indicative of a presence of an obstacle in front of the track system.

176th clause: According to one aspect, the present technology relates to the processor as defined in any one of the 172th to the 175th clauses, wherein the processor is further configured to acquire the first signal from a user-interface component, the user-interface component having generated the first signal in response to a user input.

177th clause: According to one aspect, the present technology relates to the processor as defined in any one of the 172th to the 176th clauses, wherein the track system has a different contact patch on a ground surface in the second angular position than in the actual angular position.

178th clause: According to one aspect, the present technology relates to the processor as defined in any one of the 172th to the 177th clauses, wherein the track system is a front track system of the vehicle.

179th clause: According to one aspect, the present technology relates to the processor as defined in any one of the 172th to the 177th clauses, wherein the track system is a rear track system of the vehicle.

180th clause: According to one aspect, the present technology relates to the processor as defined in any one of the 172th to the 178th clauses, wherein the track system is a left track system of the vehicle.

181th clause: According to one aspect, the present technology relates to the processor as defined in any one of the 172th to the 178th clauses, wherein the track system is a right track system of the vehicle.

182th clause: According to one aspect, the present technology relates to the processor as defined in any one of the 172th to the 180th clauses, wherein the vehicle is a harvesting vehicle.

183th clause: According to one aspect, the present technology relates to the processor as defined in any one of the 172th to the 181th clauses, wherein the vehicle is an articulated vehicle.

184th clause: According to one aspect, the present technology relates to a computer-implemented method of controlling angular movement of a track system, the track system comprising a frame, the track system being operatively connected to a vehicle, the method being executable by a processor, the method comprising: in response to a difference between an actual track system-vehicle angle (ATSV) and a pre-determined track system-vehicle angle (PTSV) being greater than a pre-determined angular threshold value (ATV): sending, by the processor, a first signal to a motor for performing a corrective angular movement of the track system, the motor being mounted to the frame; acquiring, by the processor, a second signal indicative of an actual acceleration of the vehicle; in response to a comparison between the actual acceleration and a pre-determined acceleration threshold: updating, by the processor, at least one of the PTSV and the ATV.

185th clause: According to one aspect, the present technology relates to the method as defined in the 184th clause, wherein the updating includes updating the ATV so that an updated ATV is greater than the ATV.

186th clause: According to one aspect, the present technology relates to the method as defined in the 184th clause, wherein the updating includes updating the PTSV so that an updated PTSV is equal to the ATSV.

187th clause: According to one aspect, the present technology relates to the method as defined in any one of the 184th to the 186th clauses, wherein the method further comprises: acquiring, by the processor, a third signal indicative of an actual angular position of the vehicle and a fourth signal indicative of an actual angular position of the track system, the ATSV being a difference between the actual angular position of the vehicle and the actual angular position of the track system.

188th clause: According to one aspect, the present technology relates to the method as defined in any one of the 184th to the 187th clauses, wherein the track system is a front track system of the vehicle.

189th clause: According to one aspect, the present technology relates to the method as defined in any one of the 184th to the 187th clauses, wherein the track system is a rear track system of the vehicle.

190th clause: According to one aspect, the present technology relates to the method as defined in any one of the 184th to the 189th clauses, wherein the track system is a left track system of the vehicle.

191th clause: According to one aspect, the present technology relates to the method as defined in any one of the 184th to the 189th clauses, wherein the track system is a right track system of the vehicle.

192th clause: According to one aspect, the present technology relates to the method as defined in any one of the 184th to the 191th clauses, wherein the vehicle is a harvesting vehicle.

193th clause: According to one aspect, the present technology relates to the method as defined in any one of the 184th to the 192th clauses, wherein the vehicle is an articulated vehicle.

194th clause: According to one aspect, the present technology relates to a processor for controlling angular movement of a track system, the track system comprising a frame, the track system being operatively connected to a vehicle, the processor being configured to: in response to a difference between an actual track system-vehicle angle (ATSV) and a pre-determined track system-vehicle angle (PTSV) being greater than a pre-determined angular threshold value (ATV): send a first signal to a motor for performing a corrective angular movement of the track system, the motor being mounted to the frame; acquire a second signal indicative of an actual acceleration of the vehicle; in response to a comparison between the actual acceleration and a pre-determined acceleration threshold: update at least one of the PTSV and the ATV.

195th clause: According to one aspect, the present technology relates to the processor as defined in the 194th clause, wherein to update includes the processor configured to update the ATV so that an updated ATV is greater than the ATV.

196th clause: According to one aspect, the present technology relates to the processor as defined in the 194th clause, wherein to update includes the processor configured to update the PTSV so that an updated PTSV is equal to the ATSV.

197th clause: According to one aspect, the present technology relates to the processor as defined in any one of the 194th to the 196th clauses, wherein the processor is further configured to: acquire a third signal indicative of an actual angular position of the vehicle and a fourth signal indicative of an actual angular position of the track system, the ATSV being a difference between the actual angular position of the vehicle and the actual angular position of the track system.

198th clause: According to one aspect, the present technology relates to the processor as defined in any one of the 194th to the 197th clauses, wherein the track system is a front track system of the vehicle.

199th clause: According to one aspect, the present technology relates to the processor as defined in any one of the 194th to the 197th clauses, wherein the track system is a rear track system of the vehicle.

200th clause: According to one aspect, the present technology relates to the processor as defined in any one of the 194th to the 199th clauses, wherein the track system is a left track system of the vehicle.

201th clause: According to one aspect, the present technology relates to the processor as defined in any one of the 194th to the 199th clauses, wherein the track system is a right track system of the vehicle.

202th clause: According to one aspect, the present technology relates to the processor as defined in any one of the 194th to the 201th clauses, wherein the vehicle is a harvesting vehicle.

203th clause: According to one aspect, the present technology relates to the processor as defined in any one of the 194th to the 201th clauses, wherein the vehicle is an articulated vehicle.

204th clause: According to one aspect, the present technology relates to a computer-implemented method of controlling an angular position of a track system, the track system comprising a frame, the track system being operatively connected to a vehicle, the method being executable by a processor, the method comprising: in response to a difference between an actual track system-vehicle angle (ATSV) and a pre-determined track system-vehicle angle (PTSV) being greater than a pre-determined angular threshold value (ATV): sending, by the processor, a first signal to a motor for performing a corrective angular movement of the track system, the motor being mounted to the frame; acquiring, by the processor, a second signal indicative of an actual angular position of the vehicle; in response to a comparison between a pre-determined angular position of the vehicle and the actual angular position of the vehicle: updating, by the processor, the ATV so that an updated ATV is greater than the ATV.

205th clause: According to one aspect, the present technology relates to the method as defined in the 204th clause, wherein the method further comprises: acquiring, by the processor, a third signal indicative of an actual angular position of the track system; acquiring, by the processor, a fourth signal indicative of an actual angular position of an other track system of the vehicle; the updating being further in response to: a comparison between the actual angular position of the vehicle and the actual angular position of the track system, a comparison between the actual angular position of the vehicle and the actual angular position of the other track system, and a comparison between the actual angular position of the track system and the actual angular position of the other track system.

206th clause: According to one aspect, the present technology relates to the method as defined in the 205th clause, wherein one of the track system and the other track system is a front track system and the other one of the track system and the other track system is a rear track system.

207th clause: According to one aspect, the present technology relates to the method as defined in in the 204th clause or the 206th clause, wherein the vehicle is an articulated vehicle comprising a first vehicle body and a second vehicle body, the track system being operatively connect to the first vehicle body, the second signal being indicative of the actual angular position of the first vehicle body, the method further comprises: acquiring, by the processor, a third signal indicative of an actual angular position of the track system; acquiring, by the processor, a fourth signal indicative of an actual angular position of an other track system of the articulated vehicle; acquiring, by the processor, a fifth signal indicative of an actual angular position of the second vehicle body; the updating being further in response to: a comparison between the actual angular position of the first vehicle body and the actual angular position of the second vehicle body, a comparison between the actual angular position of the first vehicle body and the actual angular position of the track system, a comparison between the actual angular position of the second vehicle body and the actual angular position of the other track system, and a comparison between the actual angular position of the track system and the actual angular position of the other track system.

208th clause: According to one aspect, the present technology relates to the method as defined in in the 207th clause, wherein the first vehicle body is a front vehicle body and the track system is a front track system of the articulated vehicle, and the second vehicle body is a rear vehicle body and the other track system is a rear track system of the articulated vehicle.

209th clause: According to one aspect, the present technology relates to the method as defined in in the 207th clause, wherein the first vehicle body is a rear vehicle body and the track system is a rear track system of the articulated vehicle, and the second vehicle body is a front vehicle body and the other track system is a front track system of the articulated vehicle.

210th clause: According to one aspect, the present technology relates to a processor for controlling angular movement of a track system, the track system comprising a frame, the track system being operatively connected to a vehicle, the processor being configured to: in response to a difference between an actual track system-vehicle angle (ATSV) and a pre-determined track system-vehicle angle (PTSV) being greater than a pre-determined angular threshold value (ATV): send a first signal to a motor for performing a corrective angular movement of the track system, the motor being mounted to the frame; acquire a second signal indicative of an actual angular position of the vehicle; in response to a comparison between a pre-determined angular position of the vehicle and the actual angular position of the vehicle: update the ATV so that an updated ATV is greater than the ATV.

211th clause: According to one aspect, the present technology relates to the processor as defined in the 210th clause, wherein the processor is further configured to: acquire a third signal indicative of an actual angular position of the track system; acquire a fourth signal indicative of an actual angular position of an other track system of the vehicle; the processor being configured to update further in response to: a comparison between the actual angular position of the vehicle and the actual angular position of the track system, a comparison between the actual angular position of the vehicle and the actual angular position of the other track system, and a comparison between the actual angular position of the track system and the actual angular position of the other track system.

212th clause: According to one aspect, the present technology relates to the processor as defined in the 211th clause, wherein one of the track system and the other track system is a front track system and the other one of the track system and the other track system is a rear track system.

213th clause: According to one aspect, the present technology relates to the processor as defined in the 211th clause, wherein the vehicle is an articulated vehicle comprising a first vehicle body and a second vehicle body, the track system being operatively connect to the first vehicle body, the second signal being indicative of the actual angular position of the first vehicle body, the processor being further configured to: acquire a third signal indicative of an actual angular position of the track system; acquire a fourth signal indicative of an actual angular position of an other track system of the articulated vehicle; acquire a fifth signal indicative of an actual angular position of the second vehicle body; the processor being configured to update further in response to: a comparison between the actual angular position of the first vehicle body and the actual angular position of the second vehicle body, a comparison between the actual angular position of the first vehicle body and the actual angular position of the track system, a comparison between the actual angular position of the second vehicle body and the actual angular position of the other track system, and a comparison between the actual angular position of the track system and the actual angular position of the other track system.

214th clause: According to one aspect, the present technology relates to the processor as defined in the 213th clause, wherein the first vehicle body is a front vehicle body and the track system is a front track system of the articulated vehicle, and the second vehicle body is a rear vehicle body and the other track system is a rear track system of the articulated vehicle.

215th clause: According to one aspect, the present technology relates to the processor as defined in the 213th clause, wherein the first vehicle body is a rear vehicle body and the track system is a rear track system of the articulated vehicle, and the second vehicle body is a front vehicle body and the other track system is a front track system of the articulated vehicle.

216th clause: According to one aspect, the present technology relates to a computer-implemented method of controlling angular movement of a track system, the track system comprising a frame and a wheel assembly rotationally connected to the frame, the wheel assembly being operatively connected to a vehicle, the method being executable by a processor, the method comprising: acquiring, by the processor, a first signal indicative of a rotational speed of a transmission assembly, the transmission assembly operatively connecting a motor mounted to the frame with the wheel assembly; acquiring, by the processor, a second signal indicative of a linear speed of the vehicle; determining, by the processor, based on the first signal and the second signal that an actual angular position of the track system is to be changed to a second angular position, the track system in the second angular position having a different approach angle than when in the actual angular position; sending, by the processor, a third signal to the motor for performing a corrective angular movement of the track system using the transmission assembly, the corrective movement for changing the actual angular position of the track system to the second angular position.

217th clause: According to one aspect, the present technology relates to the method as defined in the 216th clause, wherein the transmission assembly comprises a first transmission part being operatively coupled to the wheel assembly, and a second transmission part being operatively coupled to the motor the first and second transmission parts being drivingly engaged with each other.

218th clause: According to one aspect, the present technology relates to the method as defined in the 217th clause, wherein the rotational speed is a rotational speed of the first transmission part.

219th clause: According to one aspect, the present technology relates to the method as defined in the 217th clause, wherein the rotational speed is a rotational speed of the second transmission part.

220th clause: According to one aspect, the present technology relates to a processor for controlling angular movement of a track system, the track system comprising a frame and a wheel assembly rotationally connected to the frame, the wheel assembly being operatively connected to a vehicle, the processor being configured to: acquire a first signal indicative of a rotational speed of a transmission assembly, the transmission assembly operatively connecting a motor mounted to the frame with the wheel assembly; acquire a second signal indicative of a linear speed of the vehicle; determine based on the first signal and the second signal that an actual angular position of the track system is to be changed to a second angular position, the track system in the second angular position having a different approach angle than when in the actual angular position; send a third signal to the motor for performing a corrective angular movement of the track system using the transmission assembly, the corrective movement for changing the actual angular position of the track system to the second angular position.

221th clause: According to one aspect, the present technology relates to the processor as defined in the 221st clause, wherein the transmission assembly comprises a first transmission part being operatively coupled to the wheel assembly, and a second transmission part being operatively coupled to the motor, the first and second transmission parts being drivingly engaged with each other.

222th clause: According to one aspect, the present technology relates to the processor as defined in the 222nd clause, wherein the rotational speed is a rotational speed of the first transmission part.

223th clause: According to one aspect, the present technology relates to the processor as defined in the 222nd clause, wherein the rotational speed is a rotational speed of the second transmission part.

224th clause: According to one aspect, the present technology relates to a computer-implemented method of controlling angular movement of a track system, the track system comprising a frame, the track system being operatively connected to the vehicle, the method being executable by a processor, the method comprising: acquiring, by the processor, a first signal indicative of at least one of an actual pitch and an actual roll of the track system; acquiring, by the processor, a second signal indicative of at least one of an actual pitch and an actual roll of the vehicle; in response to at least one of (i) a difference between the actual pitch of the track system and the actual pitch of the vehicle, and (ii) a difference between the actual roll of the track system and the actual roll of the vehicle, being greater than at least one of (i) a pre-determined pitch threshold and (ii) a pre-determined roll threshold: determining, by the processor, that an actual angular position of the track system is to be changed to a second angular position, the track system in the second angular position having a different approach angle than when in the actual angular position; sending, by the processor, a third signal to a motor for performing a corrective angular movement of the track system, the motor being mounted to the frame, the corrective movement for changing the actual angular position of the track system to the second angular position.

225th clause: According to one aspect, the present technology relates to a processor for controlling angular movement of a track system, the track system comprising a frame, the track system being operatively connected to the vehicle, the processor being configured to: acquire a first signal indicative of at least one of an actual pitch and an actual roll of the track system; acquire a second signal indicative of at least one of an actual pitch and an actual roll of the vehicle; in response to at least one of (i) a difference between the actual pitch of the track system and the actual pitch of the vehicle, and (ii) a difference between the actual roll of the track system and the actual roll of the vehicle, being greater than at least one of (i) a pre-determined pitch threshold and (ii) a pre-determined roll threshold: determine that an actual angular position of the track system is to be changed to a second angular position, the track system in the second angular position having a different approach angle than when in the actual angular position; send a third signal to a motor for performing a corrective angular movement of the track system, the motor being mounted to the frame, the corrective movement for changing the actual angular position of the track system to the second angular position.

226th clause: According to one aspect, the present technology relates to a computer-implemented method of controlling angular movement of a track system, the track system comprising a frame, the track system being operatively connected to the vehicle, the method being executable by a processor, the method comprising: acquiring, by the processor, a first signal indicative of a torque of a motor mounted to the frame; acquiring, by the processor, a second signal indicative of a torque of an other motor mounted to an other frame of an other track system, the other track system being operatively connected to the vehicle; in response to a difference between the torque of the motor and the torque of the other motor being above a pre-determined torque threshold: determining, by the processor, that an actual angular position of the track system is to be changed to a second angular position, the track system in the second angular position having a different approach angle than when in the actual angular position; sending, by the processor, a third signal to the motor for performing a corrective angular movement of the track system, the corrective movement for changing the actual angular position of the track system to the second angular position.

227th clause: According to one aspect, the present technology relates to a processor for controlling angular movement of a track system, the track system comprising a frame, the track system being operatively connected to the vehicle, the method being executable by a processor, the method comprising: acquire a first signal indicative of a torque of a motor mounted to the frame; acquire a second signal indicative of a torque of an other motor mounted to an other frame of an other track system, the other track system being operatively connected to the vehicle; in response to a difference between the torque of the motor and the torque of the other motor being above a pre-determined torque threshold: determine that an actual angular position of the track system is to be changed to a second angular position, the track system in the second angular position having a different approach angle than when in the actual angular position; send a third signal to the motor for performing a corrective angular movement of the track system, the corrective movement for changing the actual angular position of the track system to the second angular position.

228th clause: According to one aspect, the present technology relates to the processor as defined in the 227th clause, being suitable for integration into a track system.

229th clause: According to one aspect, the present technology relates to an angular controlling system for a track system for a vehicle, the angular controlling system comprising: a transmission assembly including: a motor mounted to a frame of the track system, a first transmission part being operatively coupled to a wheel of the track system and defining a first rotational speed, a second transmission part being operatively coupled to the motor and defining a second rotational speed, the first and second transmission parts being drivingly engaged with each other and defining a pre-determined speed ratio when the vehicle is static; and a controller assembly including: an angular monitoring device configured for monitoring a vehicle angle and a track system angle relative to the vehicle angle, a controller unit configured to perform an operation to the motor based on the track system angle.

230th clause: According to one aspect, the present technology relates to an angular controlling system for a track system for a vehicle, the angular controlling system comprising: a motor mounted to a frame of the track system and operatively connected to a wheel of the track system, the wheel defining a first rotational speed and the motor defining a second rotational speed; the first and second rotational speeds defining a pre-determined speed ratio when the vehicle is static; and a controller assembly including: an angular monitoring device configured for monitoring a vehicle angle and a track system angle relative to the vehicle angle, and a controller unit configured to perform an operation to the motor based on the track system angle.

231th clause: According to one aspect, the present technology relates to the angular controlling system as defined in any one of the 229th to the 230th clauses, wherein the wheel is a drive wheel.

232th clause: According to one aspect, the present technology relates to the angular controlling system as defined in any one of the 229th to the 230th clauses, wherein the controller assembly further comprises a rotational speed monitoring device configured for monitoring an actual speed ratio defined by the first rotational speed over the second rotational speed when the vehicle is in operation.

233th clause: According to one aspect, the present technology relates to the angular controlling system as defined in 232nd clause, wherein the controller unit is configured to perform an operation to the motor based on at least one of the track system angle and the actual speed ratio.

234th clause: According to one aspect, the present technology relates to the angular controlling system as defined in any one of the 229th to the 230th clauses, further comprising a power source operatively connected to the controller unit.

235th clause: According to one aspect, the present technology relates to the angular controlling system as defined in 234th clause, wherein the power source is a battery integrated to the track system.

236th clause: According to one aspect, the present technology relates to the angular controlling system as defined in 234th clause, wherein the power source is a battery integrated to the vehicle.

237th clause: According to one aspect, the present technology relates to the angular controlling system as defined in 234th clause, wherein the vehicle has a battery and the power source is the battery of the vehicle.

238th clause: According to one aspect, the present technology relates to the angular controlling system as defined in 234th clause, wherein the vehicle has an alternator and the power source is the alternator of the vehicle.

239th clause: According to one aspect, the present technology relates to the angular controlling system as defined in 234th clause, wherein the motor is a generator configured to charge the power source.

240th clause: According to one aspect, the present technology relates to the angular controlling system as defined in any one of the 229th to the 230th clauses, wherein the motor is an electric motor.

241th clause: According to one aspect, the present technology relates to the angular controlling system as defined in any one of the 229th to the 230th clauses, wherein the motor has an output shaft parallel to the axle of the wheel.

242th clause: According to one aspect, the present technology relates to the angular controlling system as defined in 241th clause, wherein the output shaft is offset from the axle of the wheel.

243th clause: According to one aspect, the present technology relates to the angular controlling system as defined in 241th clause, wherein the output shaft is coaxial with the axle of the wheel.

244th clause: According to one aspect, the present technology relates to the angular controlling system as defined in any one of the 229th to the 230th clauses, wherein the motor has an output shaft perpendicular to the axle of the wheel.

245th clause: According to one aspect, the present technology relates to the angular controlling system as defined in 229th clause, wherein the first and second transmission parts are directly engaged with each other.

246th clause: According to one aspect, the present technology relates to the angular controlling system as defined in 229th clause, wherein the first and second transmission parts are indirectly engaged with each other via a transmission link such as a belt, a chain, or an intermediate pinion.

247th clause: According to one aspect, the present technology relates to the angular controlling system as defined in 229th clause, wherein the first and second transmission parts are a first and a second gears, respectively.

248th clause: According to one aspect, the present technology relates to the angular controlling system as defined in 247th clause, wherein the first and second transmission parts are parts of a planetary gear box.

249th clause: According to one aspect, the present technology relates to the angular controlling system as defined in any one of the 229th to the 230th clauses, wherein the pre-determined speed ratio is 1.

250th clause: According to one aspect, the present technology relates to the angular controlling system as defined in any one of the 229th to the 230th clauses, wherein the pre-determined speed ratio is greater than 1.

251th clause: According to one aspect, the present technology relates to the angular controlling system as defined in any one of the 229th to the 230th clauses, wherein the pre-determined speed ratio is lower than 1.

252th clause: According to one aspect, the present technology relates to the angular controlling system as defined in 251th clause, wherein the pre-determined speed ratio is defined by the number of teeth of the first transmission part over the number of teeth of the second transmission part.

253th clause: According to one aspect, the present technology relates to the angular controlling system as defined in 251th clause, wherein the pre-determined speed ratio is defined by a first diameter of the first transmission part over a second diameter of the second transmission part.

254th clause: According to one aspect, the present technology relates to the angular controlling system as defined in any one of the 229th to the 230th clauses, wherein the angular monitoring device includes a vehicle angle monitoring device and a track system angle monitoring device.

255th clause: According to one aspect, the present technology relates to the angular controlling system as defined in 254th clause, wherein the vehicle angle monitoring device measures a vehicle inclination relative to the gravity.

256th clause: According to one aspect, the present technology relates to the angular controlling system as defined in 254th clause, wherein the vehicle angle is a pitch angle.

257th clause: According to one aspect, the present technology relates to the angular controlling system as defined in 254th clause, wherein the vehicle angle is a roll angle.

258th clause: According to one aspect, the present technology relates to the angular controlling system as defined in 254th clause, wherein the vehicle angle monitoring device is integrated to the vehicle.

259th clause: According to one aspect, the present technology relates to the angular controlling system as defined in 254th clause, wherein the vehicle angle monitoring device includes at least one of an inclinometer, an accelerometer, and a gyroscope.

260th clause: According to one aspect, the present technology relates to the angular controlling system as defined in 254th clause, wherein the track system monitoring device measures a track system inclination relative to the gravity.

261th clause: According to one aspect, the present technology relates to the angular controlling system as defined in 260th clause, wherein the track system angle is a pitch angle.

262th clause: According to one aspect, the present technology relates to the angular controlling system as defined in 260th clause, wherein the track system angle is a roll angle.

263 th clause: According to one aspect, the present technology relates to the angular controlling system as defined in 260th clause, wherein the track system angle monitoring device is integrated to the track system.

264 th clause: According to one aspect, the present technology relates to the angular controlling system as defined in 260th clause, wherein the track system angle monitoring device includes at least one of an inclinometer, an accelerometer, a gyroscope, a pressure sensor, a magnetic sensor, and an encoder operatively coupled to the motor.

265th clause: According to one aspect, the present technology relates to the angular controlling system as defined in any one of the 229th to the 230th clauses, wherein the angular monitoring device is configured to transmit the track system angle and the actual speed ratio to the controller unit.

266th clause: According to one aspect, the present technology relates to the angular controlling system as defined in any one of the 229th to the 230th clauses, wherein the angular monitoring device is configured to transmit at least one of the track system angle and the vehicle angle via a wireless link.

267th clause. According to one aspect, the present technology relates to the angular controlling system as defined in any one of the 229th to the 230th clauses, wherein the angular monitoring device is configured to transmit at least one of the track system angle and the vehicle angle via a wired link.

268th clause: According to one aspect, the present technology relates to the angular controlling system as defined in the 233th clause, wherein the rotational speed monitoring device is configured to transmit the actual speed ratio via a wireless link.

269th clause: According to one aspect, the present technology relates to the angular controlling system as defined in the 233th clause, wherein the rotational speed monitoring device is configured to transmit the actual speed ratio via a wired link.

270th clause: According to one aspect, the present technology relates to the angular controlling system as defined in any one of the 229th to the 230th clauses, wherein the controller unit is integrated to the track system.

271th clause: According to one aspect, the present technology relates to the angular controlling system as defined in any one of the 229th to the 230th clauses, wherein the controller unit is integrated to the vehicle.

272th clause: According to one aspect, the present technology relates to the angular controlling system as defined in any one of the 229th to the 230th clauses, wherein the controlling unit is configured to compare the track system angle with a pre-determined reference value.

273th clause: According to one aspect, the present technology relates to the angular controlling system as defined in any one of the 229th to the 230th clauses, wherein the controlling unit is configured to compare the actual speed ratio with a pre-determined reference value.

274th clause: According to one aspect, the present technology relates to the angular controlling system as defined in any one of the 229th to the 230th clauses, wherein the operation of the controlling unit is to selectively supply the required power from the power source to the motor to create a correcting angular movement of the track system relative to the vehicle.

275th clause: According to one aspect, the present technology relates to the angular controlling system as defined in the 274th clause, wherein the correcting angular movement of the track system is about the drive wheel axis.

276th clause: According to one aspect, the present technology relates to the angular controlling system as defined in the 274th clause, wherein the correcting angular movement of the track system is in clockwise direction.

277th clause: According to one aspect, the present technology relates to the angular controlling system as defined in the 274th clause, wherein the correcting angular movement of the track system is in counterclockwise direction.

278th clause: According to one aspect, the present technology relates to the angular controlling system as defined in the 274th clause, wherein the controller unit selectively varies the rotational speed of the motor.

279th clause: According to one aspect, the present technology relates to the angular controlling system as defined in the 274th clause, wherein the controller unit is configured to perform the operation when the track system angle differs from a reference value.

280th clause: According to one aspect, the present technology relates to the angular controlling system as defined in the 279th clause, wherein the controller unit is a Proportional Integral Derivative (PID) controller configured to automatically adjust the operation based on the difference between the reference value and the track system angle.

281th clause: According to one aspect, the present technology relates to the angular controlling system as defined in the 274th clause, wherein the controller unit is configured to perform the operation when the actual speed ratio differs from a reference value.

282th clause: According to one aspect, the present technology relates to the angular controlling system as defined in the 281th clause, wherein the controller unit is a Proportional Integral Derivative (PID) controller configured to automatically adjust the operation based on the difference between the reference value and the actual speed ratio.

283th clause: According to one aspect, the present technology relates to the angular controlling system as defined in any one of the 229th to the 230th clauses, wherein the controller unit automatically performs the operation without any manual input from a user.

284th clause: According to one aspect, the present technology relates to the angular controlling system as defined in any one of the 229th to the 230th clauses, wherein the controller unit autonomously performs the operation without any manual input from a user.

285th clause: According to one aspect, the present technology relates to the angular controlling system as defined in any one of the 229th to the 230th clauses, further comprising a housing configured to receive at least partially at least one of the components of the angular controlling device.

286th clause: According to one aspect, the present technology relates to the angular controlling system as defined in the 285th clause, wherein the housing is integrated to the frame of the track system.

287th clause: According to one aspect, the present technology relates to the angular controlling system as defined in the 285th clause, wherein the housing is removable from the frame of the track system.

288th clause: According to one aspect, the present technology relates to the angular controlling system as defined in the 285th clause, wherein the housing includes a removable cover granting access to the components contained in the housing.

289th clause: According to one aspect, the present technology relates to the angular controlling system as defined in any one of the 229th to the 230th clauses, wherein the angular controlling system further comprises a user interface including an input device and configured to allow the user to adjust at least one parameter of the angular controlling system.

290 th clause: According to one aspect, the present technology relates to the angular controlling system as defined in the 289th clause, wherein the parameter is at least one reference value.

291th clause: According to one aspect, the present technology relates to the angular controlling system as defined in the 289th clause, wherein some of the at least one parameter are grouped to form a performance mode configured to cooperatively adjust the grouped parameters to selectively modify the way the angular controlling system operates.

292th clause: According to one aspect, the present technology relates to the angular controlling system as defined in the 289th clause, wherein the performance mode is one of a traction mode, a ride comfort quality mode, a speed mode, an obstacle overcoming mode, and a ground clearance raising mode.

293th clause: According to one aspect, the present technology relates to the angular controlling system as defined in the 289th clause, wherein the user interface provides a warning notification when at least one of the track system angle and the actual speed ratio reaches a threshold value.

294th clause: According to one aspect, the present technology relates to the angular controlling system as defined in any one of the 229th to the 230th clauses, wherein the axle is a driving axle.

295th clause: According to one aspect, the present technology relates to the angular controlling system as defined in any one of the 229th to the 230th clauses, wherein the vehicle is a powersports vehicle.

296th clause: According to one aspect, the present technology relates to the angular controlling system as defined in any one of the 229th to the 295th clauses, where the angular controlling system is fully integrated to the track system and does not require any further mechanical connection to the vehicle.

297th clause: According to one aspect, the present technology relates to the angular controlling system as defined in any one of the 229th to the 295th clauses, where the angular controlling system is fully integrated to the track system and does not require any further electrical connection to the vehicle.

298th clause: According to one aspect, the present technology relates to the angular controlling system as defined in any one of the 229th to the 297th clauses, wherein at least one of the motor, the power source, the controller unit, the first transmission part, the second transmission part, the angular monitoring device, and the rotational speed ratio monitoring device is at least partially integrated inside the frame of the track system.

299th clause: According to one aspect, the present technology relates to a track system operatively connectable to a vehicle, the track system comprising: a frame; a drive wheel rotatably connected to the frame and operatively connected to an axle of the vehicle; at least one support wheel rotatably connected to the frame; an endless track surrounding the frame, the drive wheel, the at least one support wheel; and an angular controlling system as defined in any one of the 229th to the 298th clauses.

300th clause: According to one aspect, the present technology relates to the track system as defined in the 299th clause, wherein the axle is a driving axle.

301th clause: According to one aspect, the present technology relates to the track system as defined in the 299th clause, wherein the vehicle is a powersports vehicle.

302th clause: According to one aspect, the present technology relates to the track system as defined in the 299th clause, where the angular controlling system is fully integrated to the track system and does not require any further mechanical connection to the vehicle.

303th clause: According to one aspect, the present technology relates to the track system as defined in the 299th clause, where the angular controlling system is fully integrated to the track system and does not require any further electrical connection to the vehicle.

304th clause: According to one aspect, the present technology relates to a vehicle having at least one track system as the track system defined in one of the 299th to the 303th clause.

305th clause: According to one aspect, the present technology relates to the vehicle as defined in the 304th clause, wherein the vehicle has a plurality of track systems including a first and a second track systems as defined in the 299th clause, wherein the angular controlling system of the first track system is in communication with the angular controlling system of the second track system such that the angular controlling systems cooperate together to optimize the overall performance of the vehicle.

306th clause: According to one aspect, the present technology relates to the vehicle as defined in the 305th clause, wherein at least one of the track system angle and the actual speed ratio of the angular controlling system of the first track system is used by the controller unit of the angular controlling system of the second track system for performing an operation on the second track system.

307th clause: According to one aspect, the present technology relates to the vehicle as defined in the 304th clause, wherein the axle is a driving axle.

308th clause: According to one aspect, the present technology relates to the vehicle as defined in the 304th clause, wherein the vehicle is a powersports vehicle.

309th clause: According to one aspect, the present technology relates to method for controlling an inclination of a track system relative to a vehicle, the track system including a wheel and a motor mounted on the track system and drivingly engaged with the wheel, the method comprising: comparing a first input and a second input to a reference value; generating a correcting angular movement of the track system relative to the vehicle, selectively modifying the rotational speed of the motor to create a correcting angular movement of the track system relative to the vehicle.

310th clause: According to one aspect, the present technology relates to method the method as defined in the 309th clause, wherein the first input is a first rotational speed and the second input is a second rotational speed.

311th clause: According to one aspect, the present technology relates to method the method as defined in the 309th clause, wherein the first rotational speed is a rotational speed of the wheel and the second rotational speed is a rotational speed of the motor.

312th clause: According to one aspect, the present technology relates to method the method as defined in the 309th clause, wherein the correcting angular movement is generated by selectively modifying the rotational speed of the motor.

313th clause: According to one aspect, the present technology relates to method the method as defined in the 309th clause, wherein the first input is a vehicle angle and the second input is a track system angle relative to the vehicle angle.

314th clause: According to one aspect, the present technology relates to method the method as defined in the 313th clause, wherein the correcting angular movement is generated by selectively modifying the rotational speed of the motor.

315th clause: According to one aspect, the present technology relates to method the method as defined in the 309th clause, wherein the track system is a first track system and the vehicle includes a second track system, the first input being an inclination angle of the first track system and the second input being an inclination angle of the second track system.

The invention claimed is:

1. A computer-implemented method of controlling angular movement of a track system, the track system comprising a frame, the track system being operatively connected to a vehicle, the method being executable by a processor, the method comprising:

in response to a difference between an actual track system-vehicle angle (ATSV) and a pre-determined track system-vehicle angle (PTSV) being greater than a pre-determined angular threshold value (ATV):

sending, by the processor, a first signal to a motor for performing a corrective angular movement of the track system, the motor being mounted to the frame;

acquiring, by the processor, a second signal indicative of an actual acceleration of the vehicle;

in response to a comparison between the actual acceleration and a pre-determined acceleration threshold:

updating, by the processor, at least one of the PTSV and the ATV.

2. The method of claim 1, wherein the updating includes updating the ATV so that an updated ATV is greater than the ATV.

3. The method of claim 1, wherein the updating includes updating the PTSV so that an updated PTSV is equal to the ATSV.

4. The method of claim 1, wherein the method further comprises:

acquiring, by the processor, a third signal indicative of an actual angular position of the vehicle and a fourth signal indicative of an actual angular position of the track system, the ATSV being a difference between the actual angular position of the vehicle and the actual angular position of the track system.

5. The method of claim 1, wherein the track system is a front track system of the vehicle.

6. The method of claim 1, wherein the track system is a rear track system of the vehicle.

7. The method of claim 1, wherein the track system is a left track system of the vehicle.

8. The method of claim 1, wherein the track system is a right track system of the vehicle.

9. The method of claim 1, wherein the vehicle is a harvesting vehicle.

10. The method of claim 1, wherein the vehicle is an articulated vehicle.

11. A processor for controlling angular movement of a track system, the track system comprising a frame, the track system being operatively connected to a vehicle, the processor being configured to:

in response to a difference between an actual track system-vehicle angle (ATSV) and a pre-determined track system-vehicle angle (PTSV) being greater than a pre-determined angular threshold value (ATV):

send a first signal to a motor for performing a corrective angular movement of the track system, the motor being mounted to the frame;

acquire a second signal indicative of an actual acceleration of the vehicle;

in response to a comparison between the actual acceleration and a pre-determined acceleration threshold:

update at least one of the PTSV and the ATV.

12. The processor of claim 11, wherein to update includes the processor configured to update the ATV so that an updated ATV is greater than the ATV.

13. The processor of claim 11, wherein to update includes the processor configured to update the PTSV so that an updated PTSV is equal to the ATSV.

14. The processor of claim 11, wherein the processor is further configured to:

acquire a third signal indicative of an actual angular position of the vehicle and a fourth signal indicative of an actual angular position of the track system, the ATSV being a difference between the actual angular position of the vehicle and the actual angular position of the track system.

15. The processor of claim 11, wherein the track system is a front track system of the vehicle.

16. The processor of claim 11, wherein the track system is a rear track system of the vehicle.

17. The processor of claim 11, wherein the track system is a left track system of the vehicle.

18. The processor of claim 11, wherein the track system is a right track system of the vehicle.

19. The processor of claim 11, wherein the vehicle is a harvesting vehicle.

20. The processor of claim 11, wherein the vehicle is an articulated vehicle.

* * * * *